(12) United States Patent
Haseba et al.

(10) Patent No.: US 8,409,673 B2
(45) Date of Patent: *Apr. 2, 2013

(54) CHLOROBENZENE DERIVATIVE, OPTICALLY ISOTROPIC LIQUID CRYSTAL MEDIUM, AND OPTICAL DEVICE

(75) Inventors: Yasuhiro Haseba, Chiba (JP); Takafumi Kuninobu, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/321,173

(22) PCT Filed: May 7, 2010

(86) PCT No.: PCT/JP2010/057800
§ 371 (c)(1),
(2), (4) Date: Dec. 22, 2011

(87) PCT Pub. No.: WO2010/134430
PCT Pub. Date: Nov. 25, 2010

(65) Prior Publication Data
US 2012/0099039 A1    Apr. 26, 2012

(30) Foreign Application Priority Data
May 19, 2009  (JP) ................. 2009-120439

(51) Int. Cl.
| C09K 19/12 | (2006.01) |
| C09K 19/20 | (2006.01) |
| C09K 19/30 | (2006.01) |
| C09K 19/32 | (2006.01) |
| C09K 19/34 | (2006.01) |
| C09K 19/38 | (2006.01) |
| C07C 43/225 | (2006.01) |
| G02F 1/133 | (2006.01) |

(52) U.S. Cl. ............... 428/1.1; 252/299.61; 252/299.62; 252/299.63; 252/299.66; 252/299.67; 568/656

(58) Field of Classification Search .............. 252/299.66, 252/299.61, 299.62, 299.63, 299.67; 428/1.1; 568/656; 570/127, 129, 130, 131
See application file for complete search history.

(56) References Cited

U.S. PATENT DOCUMENTS

| 6,329,027 B1 * | 12/2001 | Kondo et al. ............... 428/1.1 |
| 7,722,783 B2 * | 5/2010 | Haseba et al. ......... 252/299.01 |
| 2009/0135368 A1 * | 5/2009 | Haseba et al. .............. 349/183 |
| 2010/0296029 A1 * | 11/2010 | Yasuhiro ...................... 349/96 |
| 2011/0242473 A1 * | 10/2011 | Haseba et al. .............. 349/139 |

FOREIGN PATENT DOCUMENTS

| JP | 2000-327632 | 11/2000 |
| JP | 2003-327966 | 11/2003 |
| JP | 2004-059772 | 2/2004 |
| JP | 2004-182949 | 7/2004 |
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| JP | 2009-144135 | 7/2009 |
| WO | 98/23561 | 6/1998 |
| WO | 2005/080529 | 9/2005 |
| WO | 2005/090520 | 9/2005 |
| WO | 2006/063662 | 6/2006 |

OTHER PUBLICATIONS

Kikuchi et al., "Polymer-Stabilized Liquid Crystal Blue Phases", Nature Materials, vol. 1, Sep. 2, 2002, pp. 64-68.
Hisakado et al., "Large Electro-Optic Kerr Effect in Polymer-Stabilized Liquid-Crystalline Blue Phases", Advanced Materials, vol. 17, Jan. 2005, pp. 96-98.
Haseba et al., "Electro-Optic Effects of the Optically Isotropic State Induced by the Incorporative Effects of a Polymer Network and the Chirality of Liquid Crystal", Journal of the SID, vol. 14, Jun. 2006, pp. 551-556.

* cited by examiner

*Primary Examiner* — Shean C Wu
(74) *Attorney, Agent, or Firm* — Jianq Chyun IP Office

(57) ABSTRACT

A liquid crystal compound having a large refractive index anisotropy, a large dielectric anisotropy, and a low melting point, and a liquid crystal medium having a liquid crystal phase over a wide temperature range, a large refractive index anisotropy, a large dielectric anisotropy, and having an optically isotropic liquid crystal phase, are provided. The present invention is a liquid crystal compound having a chlorobenzene ring, and a liquid crystal medium characterized by containing the liquid crystal compound and a chiral reagent, and exhibiting an optically isotropic liquid crystal phase.

42 Claims, 1 Drawing Sheet

Electrode part for connection

CHLOROBENZENE DERIVATIVE, OPTICALLY ISOTROPIC LIQUID CRYSTAL MEDIUM, AND OPTICAL DEVICE

CROSS-REFERENCE TO RELATED APPLICATION

This application is a 371 of international application of PCT application serial no. PCT/JP2010/057800, filed on May 7, 2010, which claims the priority benefit of Japan application no. 2009-120439, filed on May 19, 2009. The entirety of each of the above-mentioned patent applications is hereby incorporated by reference herein and made a part of this specification.

BACKGROUND OF THE INVENTION

1. Field of the Invention

The present invention relates to a liquid crystal compound useful as a material for an optical device, and a liquid crystal medium, and in particular, to a liquid crystal compound having a large dielectric anisotropy, a large refractive index anisotropy, and a low melting point; and a liquid crystal medium having a liquid crystal phase over a wide temperature range, a large dielectric anisotropy, and a large refractive index anisotropy. In addition, the present invention further relates to an optical device using the liquid crystal medium, and in particular, to an optical device that can be used over a wide temperature range and driven at a low voltage, and can achieve a high-speed electro-optical response.

2. Description of Related Art

Liquid crystal display (LCD) devices containing liquid crystal compositions are widely used as the display for clocks calculators, word processors, and so on. These LCD devices utilize the refractive index anisotropy and dielectric anisotropy of liquid crystal compounds. It is known that the operation modes of the LCD devices mainly include phase change (PC), twisted nematic (TN), super twisted nematic (STN), bistable twisted nematic (BTN), electrically controlled birefringence (ECB), optically compensated bend (OCB), in-plane switching (IPS), and vertical alignment (VA) which utilize one or more polarizers for display. Moreover, in recent years, more attentions have been paid to the mode in which an electric field is applied to an optically isotropic liquid crystal phase to make the liquid crystal phase to exhibit electrically controlled birefringence (Patent Documents 1-9, and Non-patent Documents 1-3).

Moreover, wavelength variable filters, wavefront control devices, liquid-crystal lenses, aberration correction devices, aperture control devices, and optical head devices that utilize the electrically controlled birefringence in a blue phase, as one of the optically isotropic liquid crystal phases have been proposed (Patent Documents 10-12).

According to the driving mode, the LCD devices can be classified into passive matrix (PM) type and active matrix (AM) type. The PM type is further classified into static type and multiplex type, and the AM type is further classified into thin film transistor (TFT) type, metal insulator metal (MIM) type and so on.

Such LCD devices contain a liquid crystal composition having suitable physical properties. To improve the characteristics of an LCD device, the liquid crystal composition preferably has suitable physical properties. A liquid crystal compound as a component of a liquid crystal composition requires to have the following general physical properties:

(1) stable chemical and physical properties;

(2) a high clear point (i.e., phase transition temperature from the liquid crystal phase to the isotropic phase);

(3) a low lower-limit temperature of a liquid crystal phase (i.e., an optically isotropic liquid crystal phase such as nematic phase, cholesteric phase, smectic phase, and blue phase);

(4) excellent compatibility with other liquid crystal compounds;

(5) a suitable dielectric anisotropy; and (6) a suitable refractive index anisotropy.

Particularly, for an optically isotropic liquid crystal phase, a liquid crystal compound having a large dielectric anisotropy and a large refractive index anisotropy is preferred, from the viewpoint of lowering the driving voltage.

When a liquid crystal composition containing a liquid crystal compound having stable chemical and physical properties as described in (1) is used in an LCD device, the voltage holding ratio is improved.

Further, a liquid crystal composition containing a liquid crystal compound having a high clear point or a low lower-limit temperature of a liquid crystal phase as described in (2) and (3), can have a nematic phase or an optically isotropic liquid crystal phase over an expanded temperature range, thus being capable of being used in a display device over a wide temperature range. A liquid crystal composition is generally prepared by mixing a liquid crystal compound with a number of other liquid crystal compounds, so as to exhibit better properties that are difficult to develop by a single compound. Therefore, a liquid crystal compound having good compatibility with other liquid crystal compounds as described in (4) is preferably used in an LCD device. In recent years, LCD devices with superior properties, especially display performances, for example, contrast, display capacity, and response time, are especially required in the industry. In addition, regarding the liquid crystal material that is being used, a liquid crystal composition having a low driving voltage is required. Furthermore, in order to drive an optical device driven in an optically isotropic liquid crystal phase, a liquid crystal compound with a large dielectric anisotropy and a large refractive index anisotropy is preferred.

It was reported that chlorobenzene derivatives analogous to the compound of the present invention have large dielectric anisotropy and large refractive index anisotropy (Patent Document 13), but a compound having a chlorobenzene moiety and the excellent properties of the compound according to the present invention have not been reported. Moreover, as for the optically isotropic polymer/liquid crystal composite material disclosed in Patent Documents 1-3 and Non-patent Documents 1-3, the device needs to operate at a high voltage. Although an optically isotropic liquid crystal composition and a polymer/liquid crystal composite material, which are expected to have an operation voltage lower than the voltages as disclosed in Patent Documents 1-3 and Non-patent Documents 1-3, are disclosed in Patent Documents 4-9, an optically isotropic liquid crystal composition containing a compound having a chlorobenzene moiety of the present invention and polymer/liquid crystal composite material were not disclosed.

DOCUMENTS IN THE PRIOR ART

Patent Documents

Patent Document 1: Japanese Patent Publication No. 2003-327966
Patent Document 2: International Publication No. 2005/90520
Patent Document 3: Japanese Patent Publication No. 2005-336477
Patent Document 4: Japanese Patent Publication No. 2006-89622
Patent Document 5: Japanese Patent Publication No. 2006-299084
Patent Document 6: Japanese Patent Publication No. 2006-506477
Patent Document 7: Japanese Patent Publication No. 2006-506515
Patent Document 8: International Publication No. 2006/063662
Patent Document 9: Japanese Patent Publication No. 2006-225655
Patent Document 10: Japanese Patent Publication No. 2005-157109
Patent Document 11: International Publication No. 2005/80529
Patent Document 12: Japanese Patent Publication No. 2006-127707
Patent Document 13: International Publication No. 1998/023561

Non-Patent Documents

Non-patent Document 1: Nature Materials, 1, 64, (2002)
Non-patent Document 2: Adv. Mater., 17, 96, (2005)
Non-patent Document 3: Journal of the SID, 14, 551, (2006)

SUMMARY OF THE INVENTION

Technical Problems to be Solved in the Invention

Accordingly, the present invention is directed to a liquid crystal compound, which is stable to heat and light, and has a large refractive index anisotropy, a large dielectric anisotropy, and a low melting point. The present invention is also directed to a liquid crystal medium, which is stable to heat and light, and has a liquid crystal phase over a wide temperature range, a large refractive index anisotropy, a large dielectric anisotropy, and also an optically isotropic liquid crystal phase. The present invention is further directed to various optical devices, which contain the liquid crystal medium, can be used over a wide temperature range, and have a short response time and a large contrast, and a low driving voltage.

Technical Means for Solving the Technical Problems

The present invention provides a liquid crystal compound, a liquid crystal medium (a liquid crystal composition or a polymer/liquid crystal composite), and an optical device containing the liquid crystal medium.

[1] A compound, represented by Formula (1):

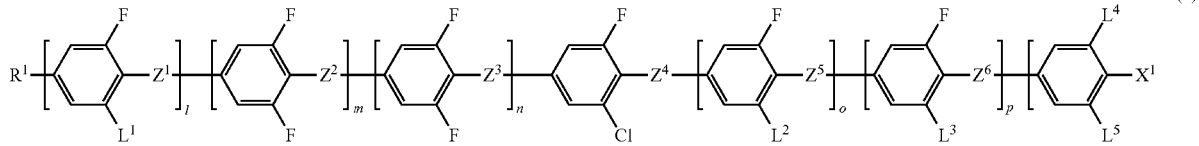

(in Formula (1), $R^1$ is hydrogen or a $C_{1-20}$ alkyl, wherein arbitrary —$CH_2$— in the alkyl may be substituted with —O—, —S—, —COO—, —OCO—, —CH=CH—, —CF=CF— or —C≡C—, and arbitrary hydrogen in the alkyl and the alkyl with arbitrary —$CH_2$— substituted with —O—, —S—, —COO—, —OCO—, —CH=CH—, —CF=CF—, or —C≡C— may be substituted with halogen or a $C_{1-3}$ alkyl; $Z^1$, $Z^2$, $Z^3$, $Z^4$, $Z^5$, and $Z^6$ are independently a single bond or —$CF_2O$—, provided that at least one of $Z^1$, $Z^2$, $Z^3$, $Z^4$, $Z^5$, and $Z^6$ is —$CF_2O$—; $L^1$, $L^2$, $L^3$, $L^4$, and $L^5$ are independently hydrogen or fluorine; $X^1$ is halogen, —C≡N, —N=C=S, —$SF_5$ or a $C_{1-3}$ alkyl in which arbitrary hydrogen is substituted with fluorine, and arbitrary —$CH_2$— in the alkyl may be substituted with —O—, —S—, —CH=CH— or —C≡C—; and l, m, n, o and p are independently 0 or 1, and $1 \leq l+m+n+o+p \leq 3$.)

[2] The liquid crystal compound according to item 1, wherein in Formula (1), $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or —$(CH_2)_v$—CH=$CF_2$, in which v is 0 or an integer of 1-19; and $X^1$ is halogen, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O$(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$, or —CH=$CHCF_2CF_3$.

[3] The liquid crystal compound according to item 1 or 2, wherein in Formula (1), $R^1$ is a $C_{1-20}$ alkyl or a $C_{2-21}$ alkenyl.

[4] The liquid crystal compound according to any one of items 1 to 3, represented by Formula (1-1), Formula (1-2), Formula (1-3), Formula (1-4), Formula (1-5) or Formula (1-6).

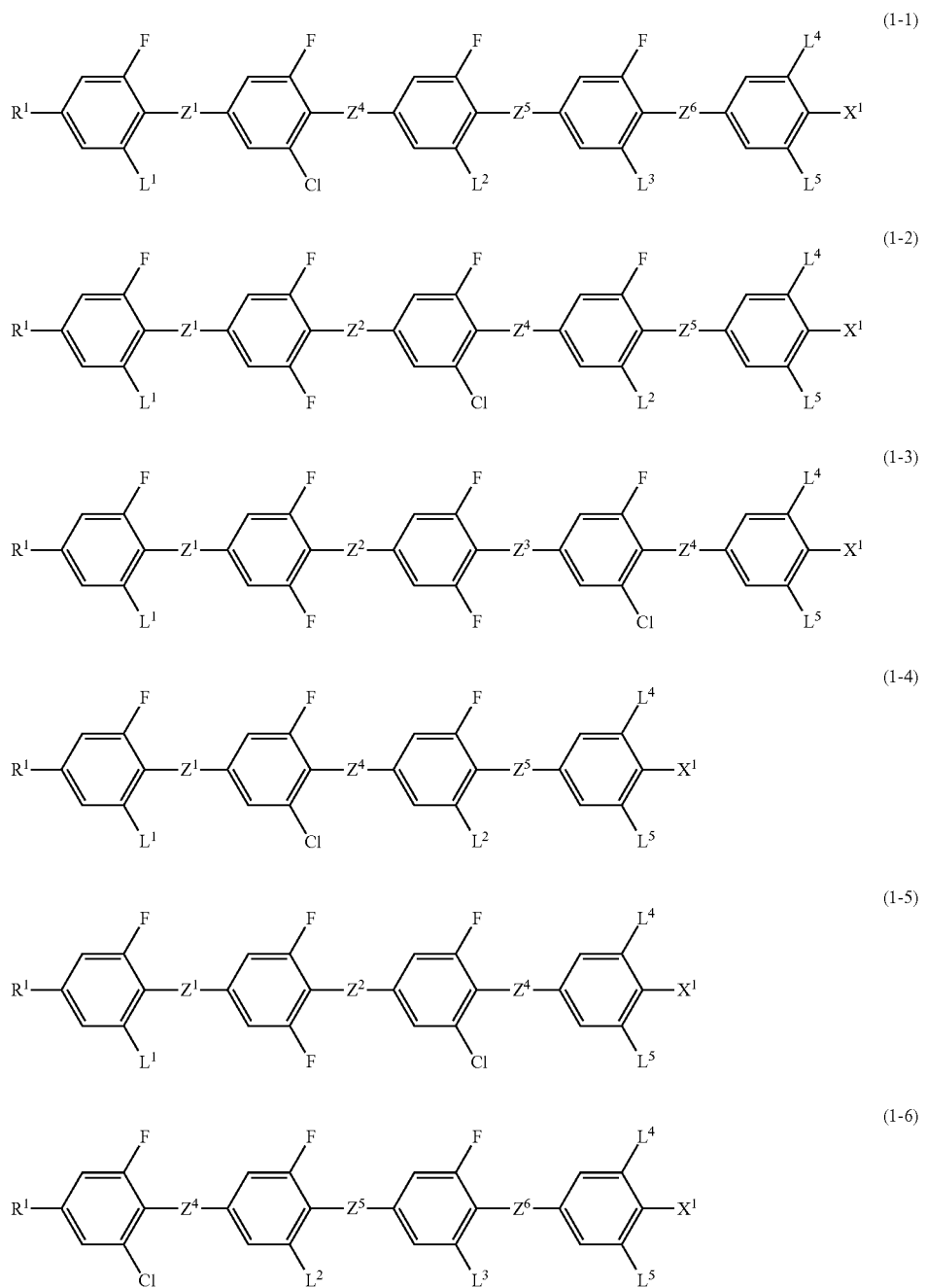

(in the formulas, $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or —$(CH_2)_v$—CH=$CF_2$, in which v is 0 or an integer of 1-19; $Z^1$, $Z^2$, $Z^3$, $Z^4$, $Z^5$ and $Z^6$ are independently a single bond or —$CF_2O$—, provided that at least one of $Z^1$, $Z^2$, $Z^3$, $Z^4$, $Z^5$ and $Z^6$ is —$CF_2O$—; $L^1$, $L^2$, $L^3$, $L^4$ and $L^5$ are independently hydrogen or fluorine; and $X^1$ is halogen, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$, or —CH=$CHCF_2CF_3$.)

[5] The liquid crystal compound according to item 4, represented by Formula (1-1-1), Formula (1-1-2), Formula (1-2-1), Formula (1-2-2), Formula (1-3-1), Formula (1-3-2), Formula (1-4-2), Formula (1-4-3), Formula (1-5-3) or Formula (1-6-2).

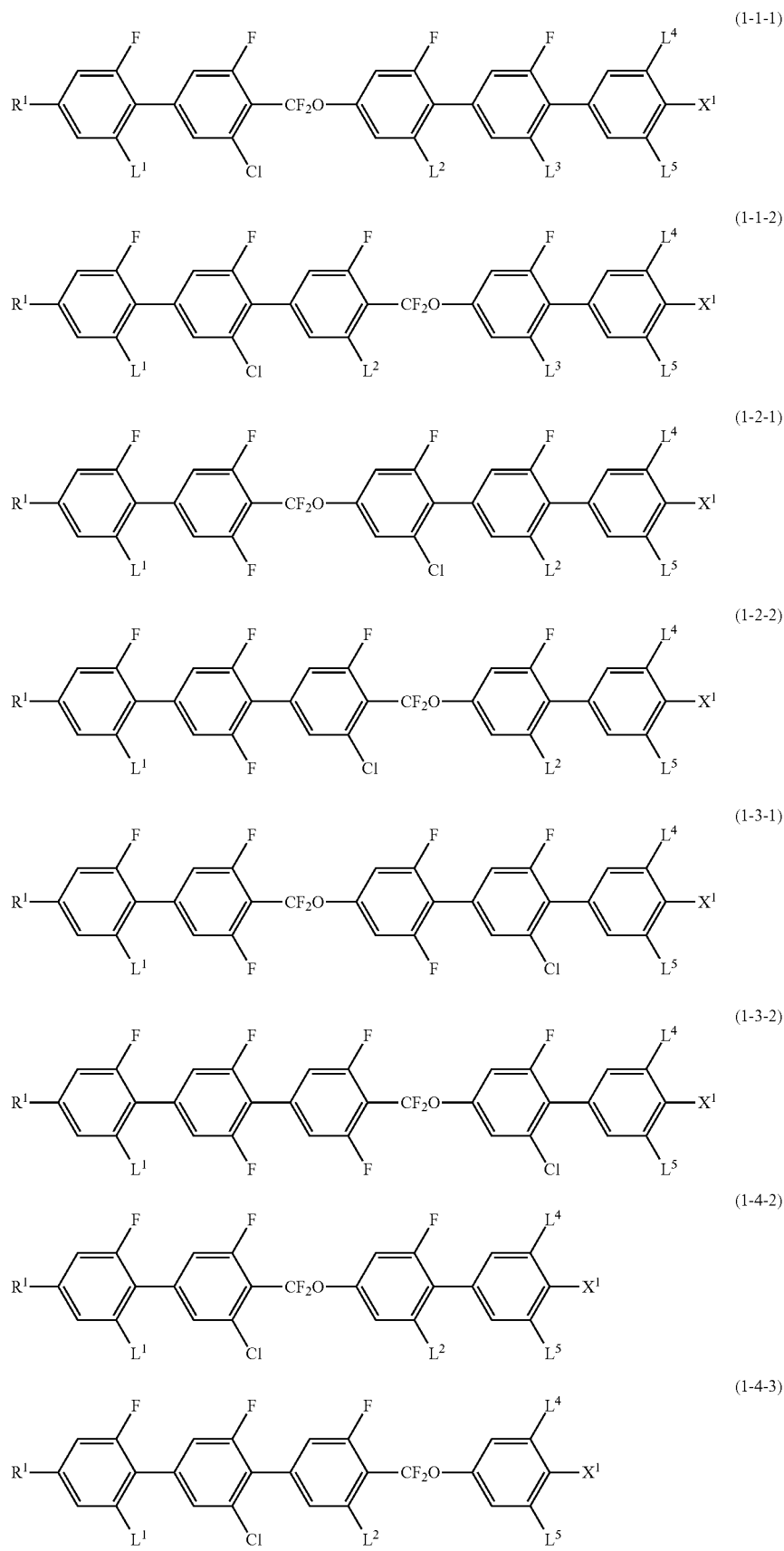

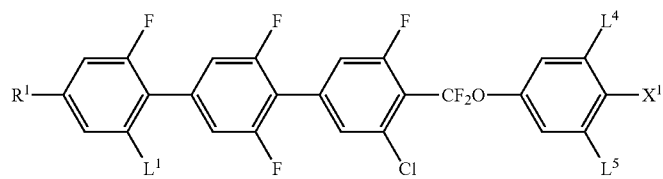
(1-5-3)

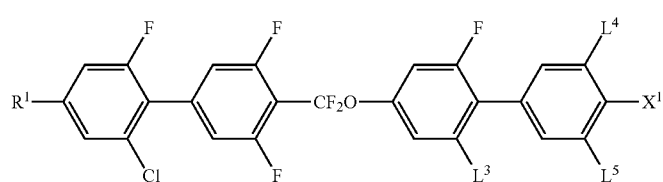
(1-6-2)

(in the formulas, $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or $-(CH_2)_v-CH=CF_2$, in which v is 0 or an integer of 1-19; $L^1, L^2, L^3, L^4$ and $L^5$ are independently hydrogen or fluorine; and $X^1$ is halogen, $-SF_5$, $-CH_2F$, $-CHF_2$, $-CF_3$, $-(CH_2)_2-F$, $-CF_2CH_2F$, $-CF_2CHF_2$, $-CH_2CF_3$, $-CF_2CF_3$, $-(CH_2)_3-F$, $-(CF_2)_3-F$, $-CF_2CHFCF_3$, $-CHFCF_2CF_3$, $-(CH_2)_4-F$, $-(CF_2)_4-F$, $-(CH_2)_5-F$, $-(CF_2)_5-F$, $-OCH_2F$, $-OCHF_2$, $-OCF_3$, $-O-(CH_2)_2-F$, $-OCF_2CH_2F$, $-OCF_2CHF_2$, $-OCH_2CF_3$, $-O-(CH_2)_3-F$, $-O-(CF_2)_3-F$, $-OCF_2CHFCF_3$, $-OCHFCF_2CF_3$, $-O(CH_2)_4-F$, $-O-(CF_2)_4-F$, $-O-(CH_2)_5-F$, $-O-(CF_2)_5-F$, $-CH=CHF$, $-CH=CF_2$, $-CF=CHF$, $-CH=CHCH_2F$, $-CH=CHCF_3$, $-(CH_2)_2-CH=CF_2$, $-CH_2CH=CHCF_3$, or $-CH=CHCF_2CF_3$.).

[6] The liquid crystal compound according to item 5, represented by Formula (1-1-2), Formula (1-2-2), Formula (1-4-3) or Formula (1-5-3).

[7] The liquid crystal compound according to any one of items 1 to 6, where $L^1$ is hydrogen.

[8] The liquid crystal compound according to any one of items 1 to 6, where $L^1$ is fluorine.

[9] The liquid crystal compound according to any one of items 1 to 8, where both $L^4$ and $L^5$ are fluorine, and $X^1$ is fluorine, chlorine, $-OCF_3$ or $-CF_3$.

[10] A liquid crystal compound, represented by Formula (1-4-3-1), Formula (1-1-2-1), Formula (1-5-3-1), Formula (1-2-2-1) or Formula (1-6-2-1).

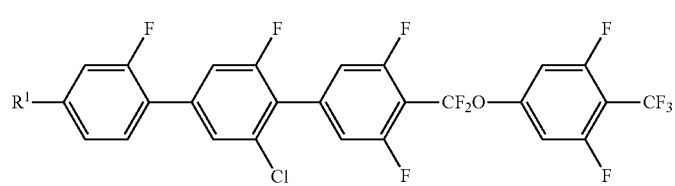
(1-4-3-1)

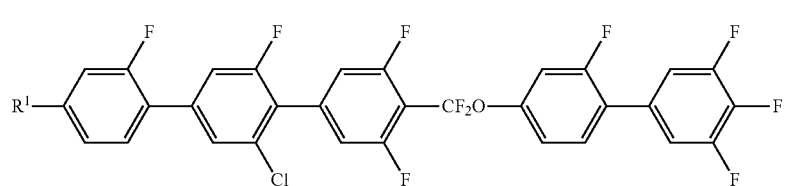
(1-1-2-1)

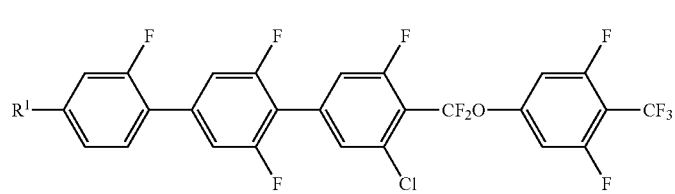
(1-5-3-1)

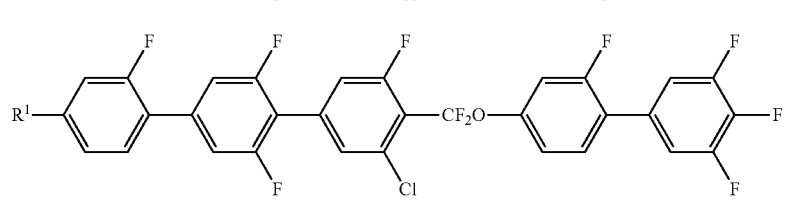
(1-2-2-1)

-continued (1-6-2-1)

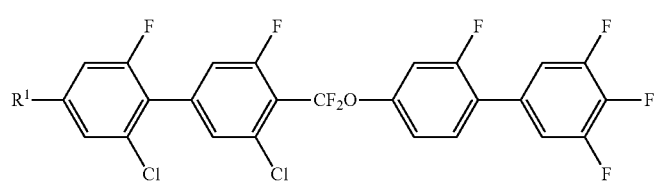

(in the formulas, $R^1$ is a $C_{1-20}$ alkyl or a $C_{2-20}$ alkenyl.)

[11] A liquid crystal composition, containing the compound according to any one of items 1 to 10 and a chiral reagent, and exhibiting an optically isotropic liquid crystal phase.

[12] The liquid crystal composition according to item 11, further containing at least one compound selected from the group consisting of the compounds represented by Formula (2), Formula (3) and Formula (4).

(2)

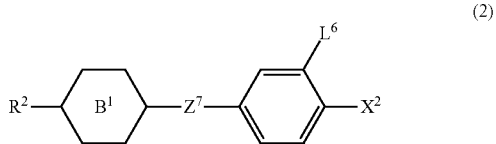

(3)

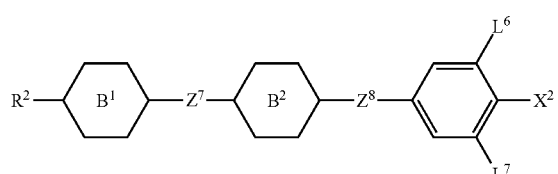

(4)

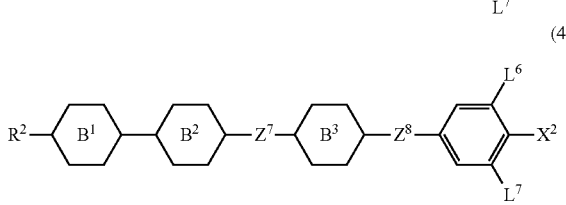

(in the formulas, $R^2$ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; ring $B^1$, ring $B^2$ and ring $B^3$ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is substituted with fluorine, or naphthalene-2,6-diyl in which arbitrary hydrogen is substituted with fluorine or chlorine; $Z^7$ and $Z^8$ are independently —$(CH_2)_2$—, —$(CH_2)_4$—, —COO—, —$CF_2O$—, —$OCF_2$—, —CH=CH—, —C≡C—, —$CH_2O$— or a single bond; and $L^6$ and $L^7$ are independently hydrogen or fluorine.)

[13] The liquid crystal composition according to item 11, further containing at least one compound selected from the group consisting of the compounds represented by Formula (5).

(5)

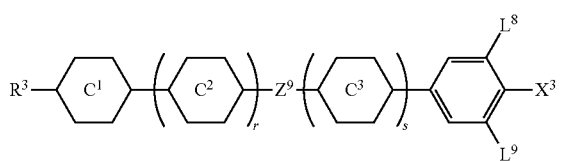

(in the formula, $R^3$ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; $X^3$ is —C≡N or —C≡C—C≡N; ring $C^1$, ring $C^2$ and ring $C^3$ are independently 1,4-cyclohexylene, 1,4-phenylene, 1,4-phenylene in which arbitrary hydrogen is substituted with fluorine, naphthalene-2,6-diyl, naphthalene-2,6-diyl in which arbitrary hydrogen is substituted with fluorine or chlorine, 1,3-dioxane-2,5-diyl, tetrahydropyran-2,5-diyl, or pyrimidine-2,5-diyl; $Z^9$ is —$(CH_2)_2$—, —COO—, —$CF_2O$—, —$OCF_2$—, —C≡C—, —$CH_2O$— or a single bond; $L^8$ and $L^9$ are independently hydrogen or fluorine; and r is 1 or 2, s is 0 or 1, r+s=0, 1 or 2.)

[14] The liquid crystal composition according to item 11, further containing at least one compound selected from the group consisting of the compounds represented by Formula (6).

(6)

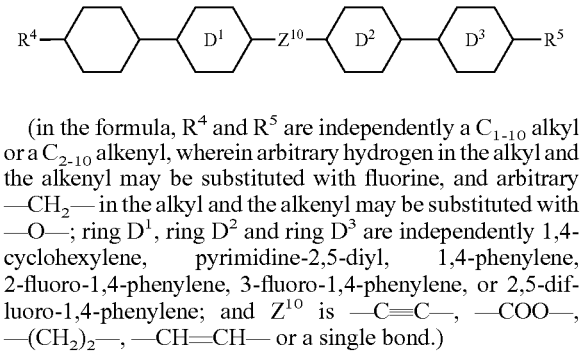

(in the formula, $R^4$ and $R^5$ are independently a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^{10}$ is —C≡C—, —COO—, —$(CH_2)_2$—, —CH=CH— or a single bond.)

[15] The liquid crystal composition according to item 12, further containing at least one compound selected from the group consisting of the compounds represented by Formula (5) according to item 13.

[16] The liquid crystal composition according to item 12, further containing at least one compound selected from the group consisting of the compounds represented by Formula (6).

[17] The liquid crystal composition according to item 13, further containing at least one compound selected from the group consisting of the compounds represented by Formula (6).

[18] The liquid crystal composition according to item 11, further containing at least one compound selected from the group consisting of the compounds represented by Formula (7), Formula (8), Formula (9) and Formula (10).

ring $E^3$, and ring $E^4$ is 3-chloro-5-fluoro-1,4-phenylene, $Z^{11}$, $Z^{12}$ and $Z^{13}$ are not —$CF_2O$—; and $L^{10}$ and $L^{11}$ are independently hydrogen or fluorine.)

[19] The liquid crystal composition according to item 11, further containing at least one compound selected from the group consisting of the compounds represented by Formula (11).

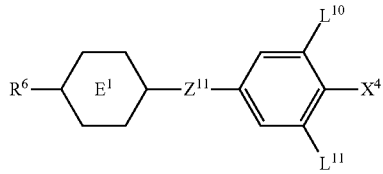
(7)

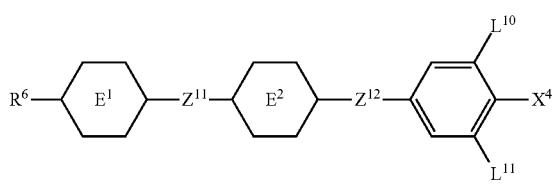
(8)

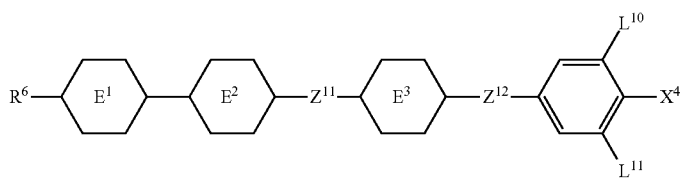
(9)

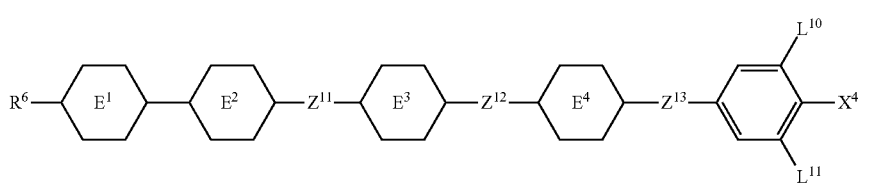
(10)

(in the formulas, $R^6$ is a $C_{1-10}$ alkyl, a $C_{2-10}$ alkenyl, or a $C_{2-10}$ alkynyl, wherein arbitrary hydrogen in the alkyl, the alkenyl and the alkynyl may be substituted with fluorine, and arbitrary —$CH_2$— in the alkyl, the alkenyl and the alkynyl may be substituted with —O—; $X^4$ is fluorine, chlorine, —$SF_5$, —$OCF_3$, —$OCHF_2$, —$CF_3$, —$CHF_2$, —$CH_2F$, —$OCF_2CHF_2$ or —$OCF_2CHFCF_3$; ring $E^1$, ring $E^2$, ring $E^3$ and ring $E^4$ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is substituted with fluorine or chlorine, or naphthalene-2,6-diyl in which arbitrary hydrogen is substituted with fluorine or chlorine; $Z^{11}$, $Z^{12}$ and $Z^{13}$ are independently —$(CH_2)_2$—, —$(CH_2)_4$—, —COO—, —$CF_2O$—, —$OCF_2$—, —CH=CH—, —C≡C—, —$CH_2O$—, or a single bond, provided that when any one of ring $E^1$, ring $E^2$,

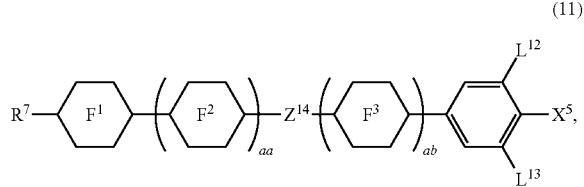
(11)

(in the formula, $R^7$ is a $C_{1-10}$ alkyl, a $C_{2-10}$ alkenyl, or a $C_{2-10}$ alkynyl, wherein arbitrary hydrogen in the alkyl, the alkenyl and the alkynyl may be substituted with fluorine, and arbitrary —$CH_2$— in the alkyl, the alkenyl and the alkynyl may be substituted with —O—; $X^5$ is —C≡N, —N=C=S or —C≡C—C≡N; ring $F^1$, ring $F^2$ and ring $F^3$ are independently 1,4-cyclohexylene, 1,4-phenylene, 1,4-phenylene in which arbitrary hydrogen is substituted with fluorine or chlorine, naphthalene-2,6-diyl, naphthalene-2,6-diyl in which arbitrary hydrogen is substituted with fluorine or chlorine, 1,3-dioxane-2,5-diyl, tetrahydropyran-2,5-diyl, or pyrimidine-2,5-diyl; $Z^{14}$ is —$(CH_2)_2$—, —COO—, —$CF_2O$—, —$OCF_2$—, —C≡C—, —$CH_2O$— or a single bond; $L^{12}$ and $L^{13}$ are independently hydrogen or fluorine; and aa is 0, 1 or 2, ab is 0 or 1, aa+ab is 0, 1 or 2.)

[20] The liquid crystal composition according to any one of items 11 to 19, containing at least one antioxidant and/or UV absorber.

[21] The liquid crystal composition according to any one of items 11 to 20, where the optically isotropic liquid crystal phase does not exhibit two or more colors of diffracted light.

[22] The liquid crystal composition according to any one of items 11 to 20, where the optically isotropic liquid crystal phase exhibits two or more colors of diffracted light.

[23] The liquid crystal composition according to item 21 or 22, obtained by adding a chiral reagent into a composition having a temperature difference between an upper-limit temperature and a lower-limit temperature of 3° C.-150° C. of co-existence of a chiral nematic phase and a non-liquid crystal isotropic phase.

[24] The liquid crystal composition according to item 21 or 22, obtained by adding a chiral reagent into a composition having a temperature difference between an upper-limit temperature and a lower-limit temperature of 5° C.-150° C. of co-existence of a chiral nematic phase and a non-liquid crystal isotropic phase.

[25] The liquid crystal composition according to item 21 or 22, obtained by adding a chiral reagent into a composition having a temperature difference between an upper-limit temperature and a lower-limit temperature of 3° C.-150° C. of co-existence of a nematic phase and a non-liquid crystal isotropic phase.

[26] The liquid crystal composition according to any one of items 11 to 25, where the content of the chiral reagent is 1-40 wt % based on the total weight of the liquid crystal composition.

[27] The liquid crystal composition according to any one of items 11 to 25, where the content of the chiral reagent is 5-15 wt % based on the total weight of the liquid crystal composition.

[28] The liquid crystal composition according to item 26 or 27, exhibiting a chiral nematic phase at any temperature in the range of 70° C. to −20° C., and having a helical pitch of 700 nm or less within at least a part of the temperatures range.

[29] The liquid crystal composition according to any one of items 26 to 28, where the chiral reagent includes at least one compound selected from the group consisting of compounds represented by Formulas (K1) to (K5).

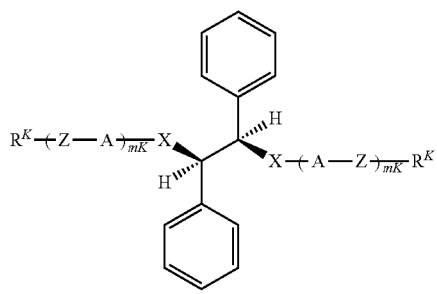
(K1)

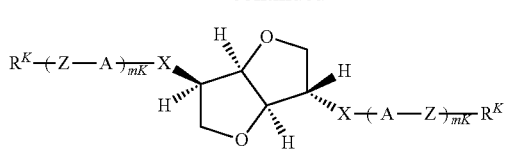
(K2)

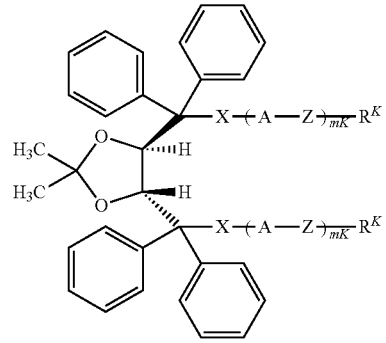
(K3)

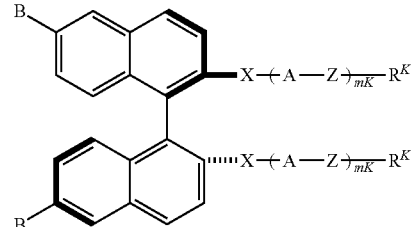
(K4)

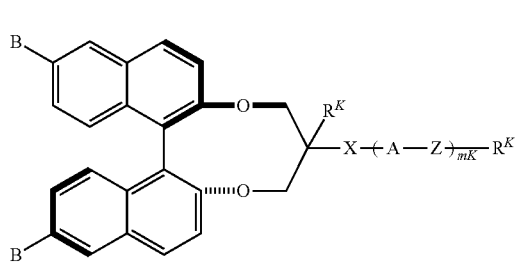
(K5)

(in formulas (K1) to (K5), $R^K$ is independently hydrogen, halogen, —C≡N, —N=C=O, —N=C=S, or a $C_{1-20}$ alkyl, wherein arbitrary —$CH_2$— in the alkyl may be substituted with —O—, —S—, —COO—, —COO—, —CH=CH—, —CF=CF— or and arbitrary hydrogen in the alkyl may be substituted with halogen; A is independently aromatic or non-aromatic 3 to 8-membered ring, or a fused ring of 9 or more carbons, wherein arbitrary hydrogen in the rings may be substituted with halogen, a $C_{1-3}$ alkyl, or a $C_{1-3}$ haloalkyl, —$CH_2$— in the rings may be substituted with —O—, —S— or —NH—, —CH= in the rings may be substituted with —N=; B is independently hydrogen, halogen, a $C_{1-3}$ alkyl, a $C_{1-3}$ haloalkyl, aromatic or a non-aromatic 3 to 8-membered ring, or a fused ring of 9 or more carbons, wherein arbitrary hydrogen in the rings may be substituted with halogen, a $C_{1-3}$ alkyl, or a $C_{1-3}$ haloalkyl, —$CH_2$— in the rings may be substituted with —O—, —S— or —NH—, and —CH= in the rings may be substituted with —N=; Z is independently a single bond, or a $C_{1-8}$ alkylene, wherein arbitrary —$CH_2$— in the alkylene may be substituted with —O—, —S—, —COO—, —COO—, —CSO—, —OCS—, —N=N—, —CH=N—, —N=CH—, —CH=CH—, —CF=CF— or —C≡C—, and arbitrary hydrogen in the alkylene may be substituted with halogen;

X is a single bond, —COO—, —COO—, —$CH_2O$—, —$OCH_2$—, —$CF_2O$—, —$OCF_2$—, or —$CH_2CH_2$—; and mK is an integer of 1-4.)
[30] The liquid crystal composition according to any one of items 26 to 28, where the chiral agent includes at least one compound selected from the group consisting of compounds represented by Formulas (K2-1) to (K2-8), Formulas (K4-1) to (K4-6) and Formulas (K5-1) to (K5-3).
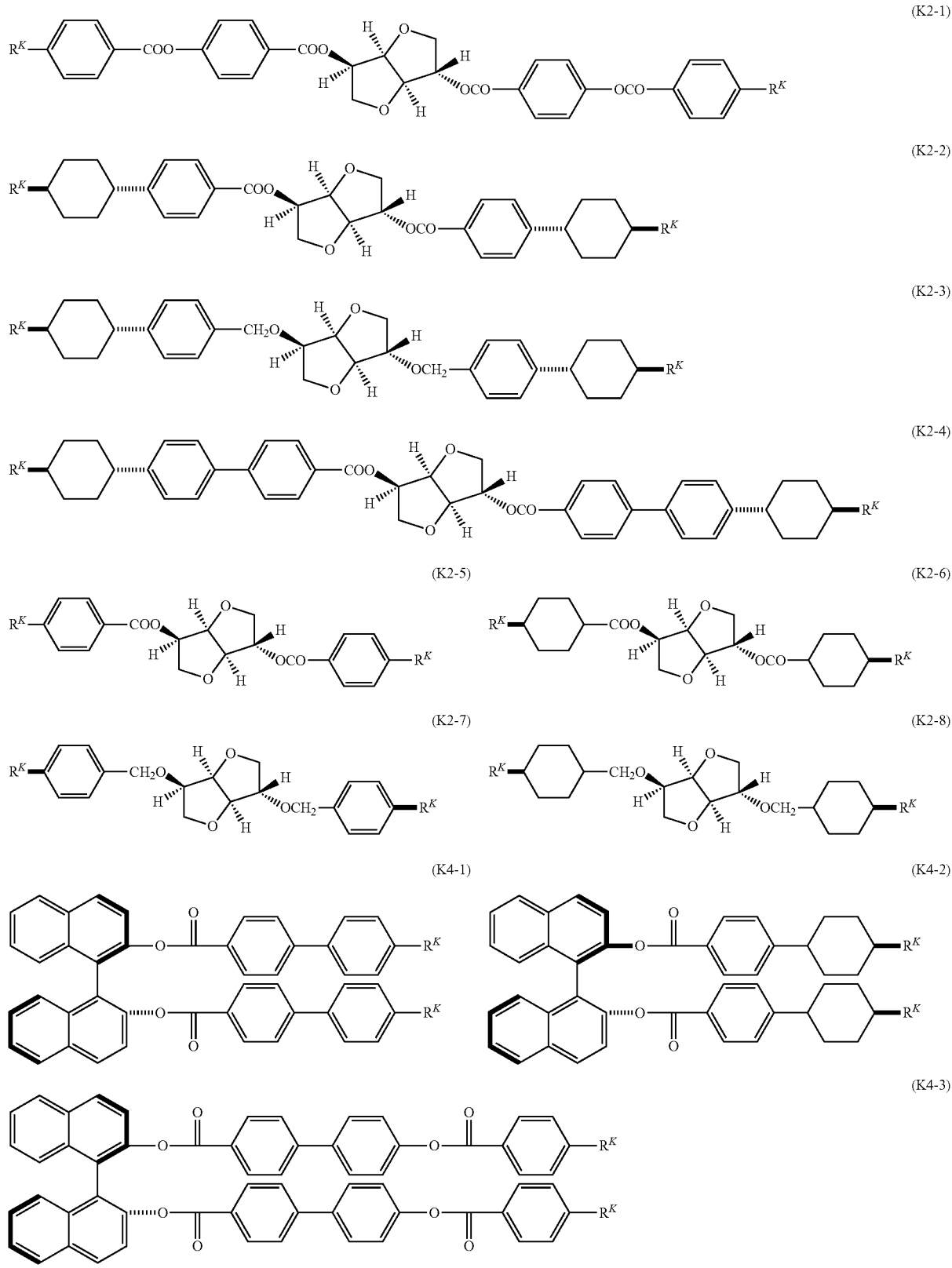

(K4-4)
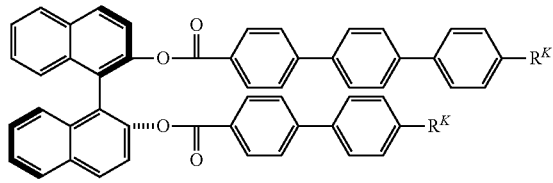

(K4-5)
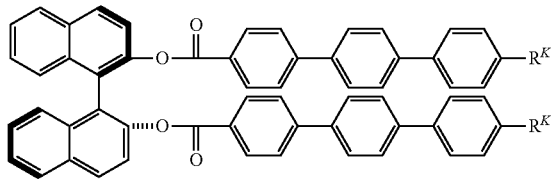

(K4-6)
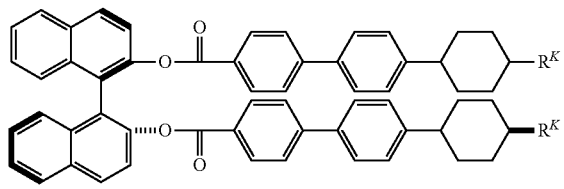

(K5-1)
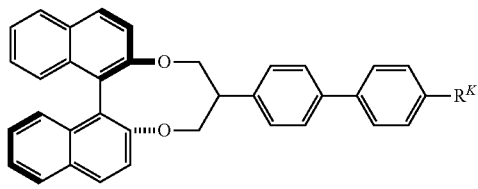

(K5-2)
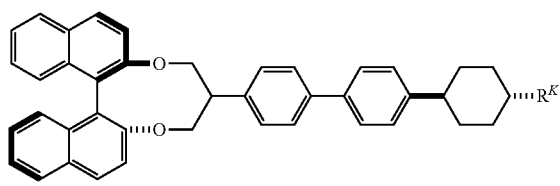

(K5-3)
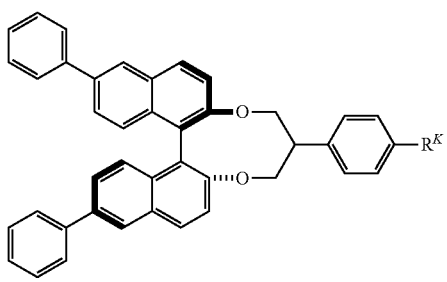

(in the formulas, $R^K$ is independently a $C_{3-10}$ alkyl, wherein —CH$_2$— adjacent to a ring in the alkyl may be substituted with —O—, and arbitrary —CH$_2$— in the alkyl may be substituted with —CH=CH—.)

[31] A mixture, containing the liquid crystal composition according to any one of items 11 to 30 and a polymerizable monomer.

[32] The mixture according to item 31, where the polymerizable monomer is a photopolymerizable monomer or a thermal-polymerizable monomer.

A polymer/liquid crystal composite material, obtained by polymerizing the mixture according to item 31 or 32, for use in a device driven in an optically isotropic liquid crystal phase.

[34] The polymer/liquid crystal composite material according to item 33, obtained by polymerizing the mixture according to item 31 or 32 in a non-liquid crystal isotropic phase or an optically isotropic liquid crystal phase.

[35] The polymer/liquid crystal composite material according to item 33 or 34, where the polymer contained in the polymer/liquid crystal composite material has a mesogen moiety.

[36] The polymer/liquid crystal composite material according to any one of items 33 to 35, where the polymer contained in the polymer/liquid crystal composite material has a cross-linked structure.

[37] The polymer/liquid crystal composite material according to any one of items 33 to 36, where the content of the liquid crystal composition is 60-99 wt %, and the content of the polymer is 1-40 wt %.

[38] An optical device, including a liquid crystal medium arranged between substrates having electrodes arranged on either or both surfaces thereof and an electric field-applying means for applying an electric field to the liquid crystal medium via the electrodes, where the liquid crystal medium is the liquid crystal composition according to any one of items 26 to 30 or the polymer/liquid crystal composite material according to any one of items 33 to 37.

[39] An optical device, including a set of substrates having electrodes arranged on either or both surfaces thereof and at least one being transparent, a liquid crystal medium arranged between the substrates, a polarizer arranged outside of the substrates, and an electric field-applying means for applying an electric field to the liquid crystal medium via the electrodes, where the liquid crystal medium is the liquid crystal composition according to any one of items 26 to 30 or the polymer/liquid crystal composite material according to any one of items 33 to 37.

[40] The optical device according to item 39, where on at least one of the set of substrates, the electrodes are constructed in a manner such that an electric field is applied in at least two directions.

[41] The optical device according to item 39, where on one or two of the set of substrates arranged in parallel, the electrodes are constructed in a manner such that an electric field is applied in at least two directions.

[42] The optical device according to any one of items 38 to 41, where the electrodes are arranged in a matrix form to form pixel electrodes, and each pixel is provided with an active element being a thin film transistor (TFT).

According to the present invention, the so-called liquid crystal medium is a generic term of a liquid crystal composition and a polymer/liquid crystal composite. Furthermore, the so-called optical device refers to various devices using electro-optic effect to achieve optical modulation or optical switching functions, for example, display device (LCD device), and optical modulation device used in optical communication systems, optical information processing or various sensor systems. As for the optical modulation with changes in refractive index caused by applying a voltage to an optically isotropic liquid crystal medium, the Kerr effect is known. The so-called Kerr effect is a phenomenon, in which the electric birefringence value Δn (E) is proportional to the square of the electric field E, that is, $\Delta n(E)=K\lambda E^2$ (K=Kerr coefficient (or Kerr constant), λ: wavelength), for a material exhibiting the Kerr effect. Herein, the so-called electric birefringence value refers to a refractive index anisotropy value induced by applying an electric field to an isotropic medium.

The terms in this specification are defined as follows. The liquid crystal compound is a generic term of compounds having a liquid crystal phase such as nematic phase and smectic phase and compounds having no liquid crystal phase but being useful as a component of a liquid crystal composition. The chiral reagent is an optically active compound, which is added to impart the necessary twisted molecular arrangement to a liquid crystal composition. The LCD device is a generic term of LCD panels and LCD modules. The liquid crystal compound, the liquid crystal composition, and the LCD device are sometimes simply referred to as the compound, the composition, and the device, respectively. Furthermore, for example, the upper-limit temperature of a liquid crystal phase is the liquid crystal phase-isotropic phase transition temperature, and sometimes only simply referred to as the clear point or the upper-limit temperature, and the lower-limit temperature of a liquid crystal phase is sometimes only simply referred to as the lower-limit temperature. The compound of Formula (1) is sometimes simply referred to as Compound (1), and this rule is also applicable for the compound of Formula (2) and so on. In Formulas (1)-(11), the symbols B, D, and E surrounded by hexagons, correspond to ring B, ring D, and ring E respectively. The compound content by percentage is weight percent (wt %) based on the total weight of the composition. A plurality of identical symbols such as ring $A^1$, ring $Y^1$, or ring B is included in the same or different formulas; however, the groups represented by these symbols can be the same or different.

"Arbitrary" denotes not only arbitrary position, but also arbitrary number, except for the case where the number is 0. The expression that arbitrary A may be substituted with B, C, or D not only means arbitrary A may be substituted with B, arbitrary A may be substituted with C, and arbitrary A may be substituted with D, but also means that a plurality of A may be substituted with at least two of B-D. For example, the alkyl in which arbitrary —CH$_2$— may be substituted with —O— or —CH=CH— includes alkyl, alkenyl, alkoxy, alkoxyalkyl, alkoxyalkenyl, alkenyloxyalkyl, and the like. Furthermore, in the present invention, the case in which two contiguous —CH$_2$—are substituted with —O— to form —O—O— is unsuitable, and the case in which —CH$_2$-terminal to an alkyl is substituted with —O— is also unsuitable. The present invention will be further described below. The terminal groups, rings, and bonding groups of the compound of Formula (1) will also be illustrated with preferred examples.

Effects of the Invention

The liquid crystal compound of the present invention is stable to heat and light, and has a large refractive index anisotropy, a large dielectric anisotropy, and a low melting point. Due to the low melting point, the content of the compound in the liquid crystal composition may be high. The liquid crystal composition is stable to heat and light, and includes a material of an optically isotropic liquid crystal phase that exhibits a high upper temperature and a low lower temperature, and has a low driving voltage when used in a device driven in an optically isotropic liquid crystal phase. The polymer/liquid crystal composite material of the present invention contains a polymer/liquid crystal composite material in an optically isotropic liquid crystal phase, exhibits a high upper temperature and a low lower temperature of the optically isotropic liquid crystal phase, and has a low driving voltage when used in a device driven in an optically isotropic liquid crystal phase. The optical device driven in the optically isotropic liquid crystal phase of the present invention can be used over a wide temperature range, has a short response time, a large contrast, and a low driving voltage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

1-1 Compound (1)

Figure 1:
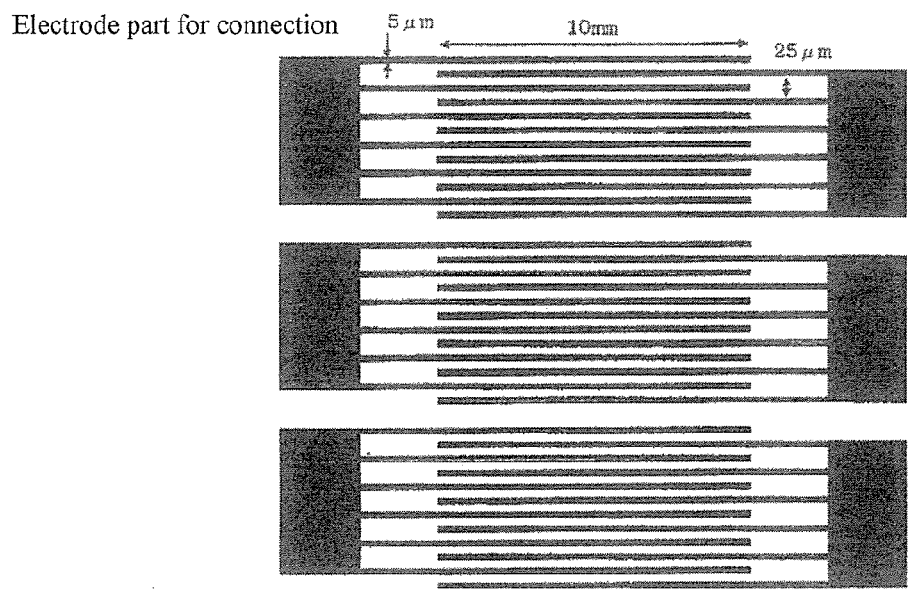
FIG. 1 shows a comb-like electrode substrate used in Examples 6, 7, 11 and 14.

The liquid crystal compound of the present invention is the compound of Formula (1). The liquid crystal composition having an optically isotropic liquid crystal phase of the present invention contains a compound of Formula (1) as Component A. A first aspect of the liquid crystal composition of the present invention is a composition of merely Component A or a composition of Component A and other components not specifically indicated herein. First, the compound of Formula (1) is described.

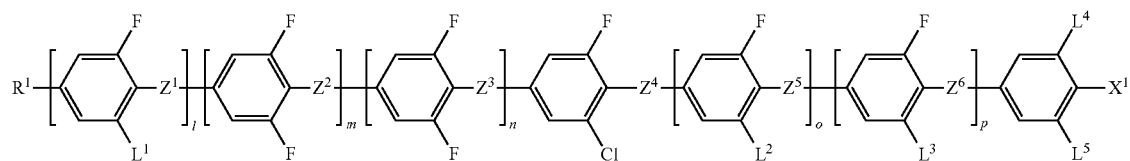

(1)

In Formula (1), $R^1$ is hydrogen or a $C_{1-20}$ alkyl, wherein arbitrary —CH$_2$— in the alkyl may be substituted with —O—, —S—, —COO—, —OCO—, —CH=CH—, —CF=CF— or —C≡C—, and arbitrary hydrogen in the alkyl and in the group formed by substituting arbitrary —CH$_2$— in the alkyl with —O—, —S—, —COO—, —COO—, —CH=CH—, —CF=CF— or —C≡C— may be substituted with halogen or a $C_{1-3}$ alkyl.

For example, examples of the group formed by substituting arbitrary —CH$_2$— in CH$_3$(CH$_2$)$_3$— with —O—, —S— or —CH=CH— are CH$_3$(CH$_2$)$_2$O—, CH$_3$—O—(CH$_2$)$_2$—, CH$_3$—O—CH$_2$—O—, CH$_3$(CH$_2$)$_2$S—, CH$_3$—S—(CH$_2$)$_2$—, CH$_3$—S—CH$_2$—S—, CH$_2$=CH—(CH$_2$)$_3$—, CH$_3$—CH=CH—(CH$_2$)$_2$—, CH$_3$—CH=CH—CH$_2$O—, CH$_3$CH$_2$C≡C—, and the like. For example, examples of the group formed by substituting arbitrary hydrogen with halogen in CH$_3$(CH$_2$)$_3$— or a group formed by substituting arbitrary —CH$_2$— in CH$_3$(CH$_2$)$_3$— with —O—, —C≡C—, or —CH=CH—, are ClCH$_2$(CH$_2$)$_3$—, CF$_2$=CH—(CH$_2$)$_3$—, CH$_2$F(CH$_2$)$_2$O—, CH$_2$FCH$_2$C≡C—.

A preferred stereo configuration of —CH=CH— in alkenyl depends on the position of the double bond. A trans-configuration is preferred for such an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$, and —C$_2$H$_4$CH=CHC$_2$H$_5$. A cis-configuration is preferred for such an alkenyl having a double bond at an even position, such as —CH$_2$CH=CHCH$_3$, —CH$_2$CH=CHC$_2$H$_5$, and —CH$_2$CH=CHC$_3$H$_7$. An alkenyl compound having a preferred stereo configuration has a liquid crystal phase with a high upper-limit temperature or over a wide temperature range, which is illustrated in detail in *Mol. Cryst. Liq. Cryst.*, 1985, 131, 109; and *Mol. Cryst. Liq. Cryst.*, 1985, 131, 327. Moreover, the position of the alkenyl is preferably that is not conjugated to a benzyl ring.

The alkyl may be linear or branched, and specific examples include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

The alkoxy may be linear or branched, and specific examples include —OCH$_3$, —OC$_2$H$_5$, —OC$_3$H$_7$, —OC$_4$H$_9$, —OC$_5$H$_{11}$, —OC$_6$H$_{13}$ and —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

The alkoxyalkyl may be linear or branched, and specific examples include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ and —(CH$_2$)$_5$—OCH$_3$.

The alkenyl may be linear or branched, and specific examples include —CH$_2$CH=CH$_2$, —CH$_2$CH=CHCH$_3$, —(CH$_2$)$_2$—CH=CH$_2$, —CH$_2$CH=CHC$_2$H$_5$, —(CH$_2$)$_2$—CH=CHCH$_3$ and —(CH$_2$)$_3$—CH=CH$_2$.

The alkenyloxy may be linear or branched, and specific examples include —OCH$_2$CH=CH$_2$, —OCH$_2$CH=CHCH$_3$ and —OCH$_2$CH=CHC$_2$H$_5$.

The alkynyl may be linear or branched, and specific examples include —C≡CH, —C≡CCH$_3$, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

$R^1$ preferably has a structure as shown in Formulas (CHN-1) to (CHN-6). Herein, $R^{1a}$ is hydrogen or a C$_{1-20}$ alkyl, and more preferably (CHN-1) or (CHN-2).

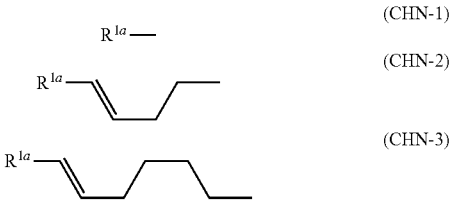

(CHN-1)

(CHN-2)

(CHN-3)

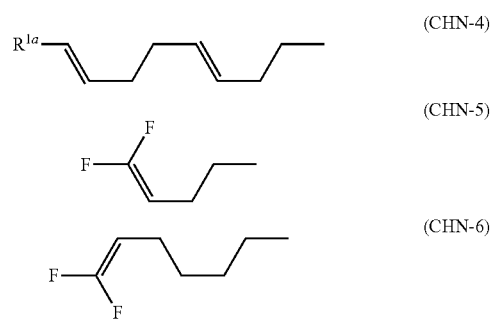

(CHN-4)

(CHN-5)

(CHN-6)

In Formula (1), $Z^1$, $Z^2$, $Z^3$, $Z^4$, $Z^5$ and $Z^6$ are independently a single bond or —CF$_2$O—, provided that at least one of $Z^1$, $Z^2$, $Z^3$, $Z^4$, $Z^5$ and $Z^6$ is —CF$_2$O—, and more preferably only one of $Z^1$, $Z^2$, $Z^3$, $Z^4$, $Z^5$ and $Z^6$ is —CF$_2$O—.

In Formula (1), $L^1$, $L^2$, $L^3$, $L^4$ and $L^5$ are independently hydrogen or fluorine. In case that $L^1$ is hydrogen, Compound (1) has a low melting point and excellent compatibility with other liquid crystal compounds; and in case that $L^1$ is fluorine, Compound (1) exhibits a large dielectric anisotropy.

In Formula (1), $X^1$ is halogen, —C≡N, —N=C=S, —SF$_5$, or a C$_{1-3}$ alkyl, in which arbitrary hydrogen is substituted with fluorine, and arbitrary —CH$_2$— may be substituted with —O—, —S—, —CH=CH— or —C≡C—.

Specific examples of alkyl in which arbitrary hydrogen is substituted with fluorine are —CHF$_2$, —CF$_3$, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CF$_2$)$_4$—F and —(CF$_2$)$_5$—F.

Specific examples of alkoxy in which arbitrary hydrogen is substituted with fluorine are —OCHF$_2$, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$, —OCHFCF$_2$CF$_3$, —O—(CF$_2$)$_4$—F and —O—(CF$_2$)$_5$—F.

Specific examples of alkenyl in which arbitrary hydrogen is substituted with fluorine are —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Preferred specific examples of $X^1$ are fluorine, chlorine, —SF$_5$, —CHF$_2$, —CF$_3$, —CF$_2$CH$_2$F, —CF$_2$CHF$_2$, —CH$_2$CF$_3$, —CF$_2$CF$_3$, —(CF$_2$)$_3$—F, —CF$_2$CHFCF$_3$, —CHFCF$_2$CF$_3$, —(CF$_2$)$_4$—F, —(CF$_2$)$_5$—F, —OCHF$_2$, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$, —OCHFCF$_2$CF$_3$, —O—(CF$_2$)$_4$—F, —O—(CF$_2$)$_5$—F, —CH=CF$_2$, —CF=CHF, —CH=CHCF$_3$, —(CH$_2$)$_2$—CH=CF$_2$, —CH$_2$CH=CHCF$_3$ and —CH=CHCF$_2$CF$_3$.

More preferred examples of $X^1$ are fluorine, chlorine, —CF$_3$, —CHF$_2$, —OCF$_3$ and —OCHF$_2$. Most preferred examples of $X^1$ are fluorine, chlorine, —CF$_3$ and —OCF$_3$.

In Formula (1), l, m, n, o and p are independently 0 or 1, and $1 \leq l+m+n+o+p \leq 3$.

Formula (1) preferably has a structure represented by Formulas (1-1)-(1-6).

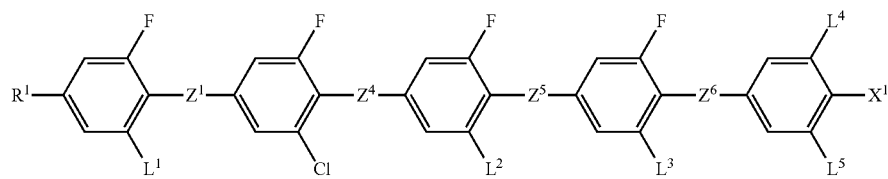
(1-1)

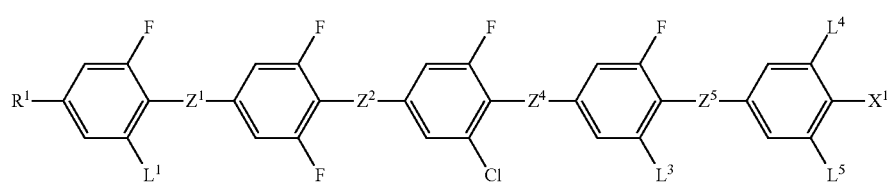
(1-2)

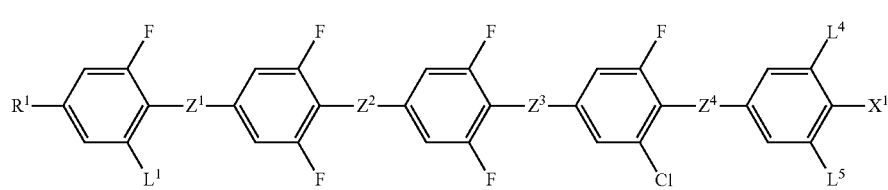
(1-3)

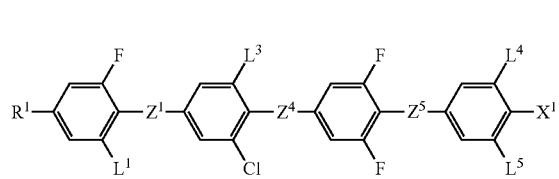
(1-4)

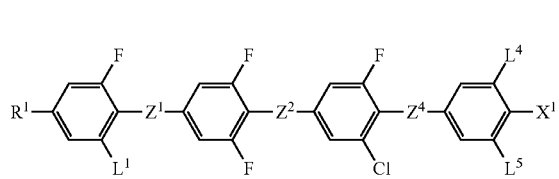
(1-5)

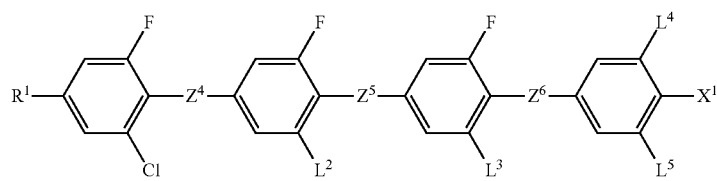
(1-6)

In the Formulas, $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or —(CH$_2$)$_v$—CH=CF$_2$, in which v is 0 or an integer of 1-19; $Z^1$, $Z^2$, $Z^3$, $Z^4$, $Z^5$ and $Z^6$ are independently a single bond or —CF$_2$O—, provided that at least one of $Z^1$, $Z^2$, $Z^3$, $Z^4$, $Z^5$ and $Z^6$ is —CF$_2$O—; $L^1$ $L^2$, $L^3$ $L^4$ and $L^5$ are independently hydrogen or fluorine; $X^1$ is halogen, —SF$_5$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ or —CH=CHCF$_2$CF$_3$.

Among the compounds, a compound is more preferred in which $R^1$ has a structure represented by any one of Formulas (CHN-1) to (CHN-6), $R^{1a}$ is hydrogen or a $C_{1-20}$ alkyl; $Z^1$, $Z^2$, $Z^3$, $Z^4$, $Z^5$ and $Z^6$ are independently a single bond or —CF$_2$O—, provided that at least one of $Z^1$, $Z^2$, $Z^3$, $Z^4$, $Z^5$ and $Z^6$ is —CF$_2$O—; $L^2$, $L^3$, $L^4$ and $L^5$ are independently hydrogen or fluorine; $X^1$ is fluorine, chlorine, —CF$_3$, —CHF$_2$, —OCF$_3$, —OCHF$_2$, —OCH$_2$F or —C≡C—CF$_3$.

Among the compounds of Formulas (1-1) to (1-6), further more preferred are compounds represented by Formulas (1-1-1) to Formula (1-1-3), (1-2-1) to (1-2-3), (1-3-1) to (1-3-3), (1-4-1) to (1-4-3), (1-5-1) to (1-5-3), and (1-6-1) to (1-6-3). Among the compounds, further more preferred are compounds represented by Formulas (1-1-1), (1-1-2), (1-2-1), (1-2-2), (1-3-1), (1-3-2), (1-4-2), (1-4-3), (1-5-3), and (1-6-2).

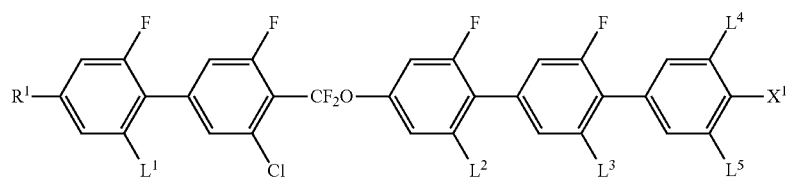
(1-1-1)
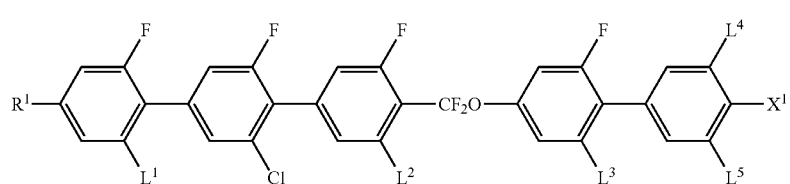
(1-1-2)
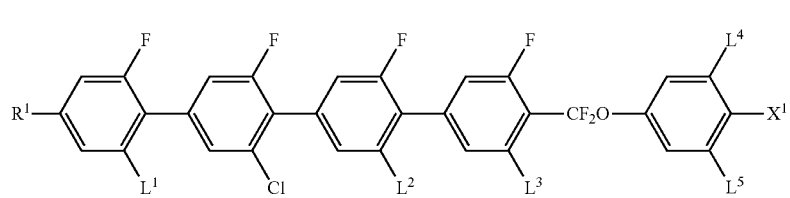
(1-1-3)
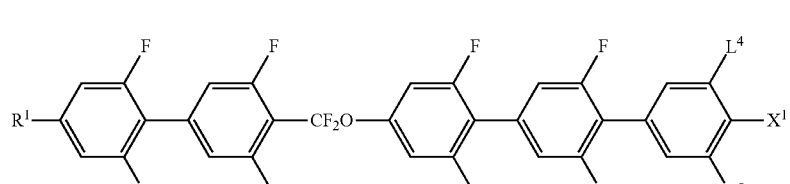
(1-2-1)
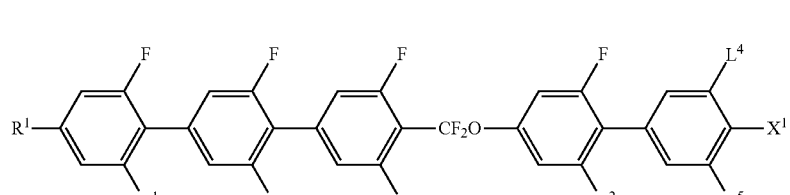
(1-2-2)
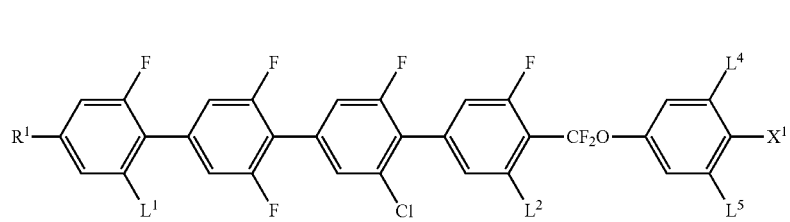
(1-2-3)
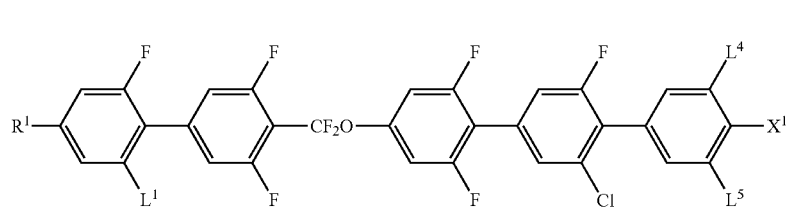
(1-3-1)
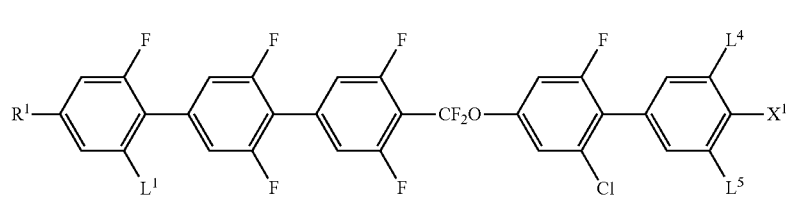
(1-3-2)

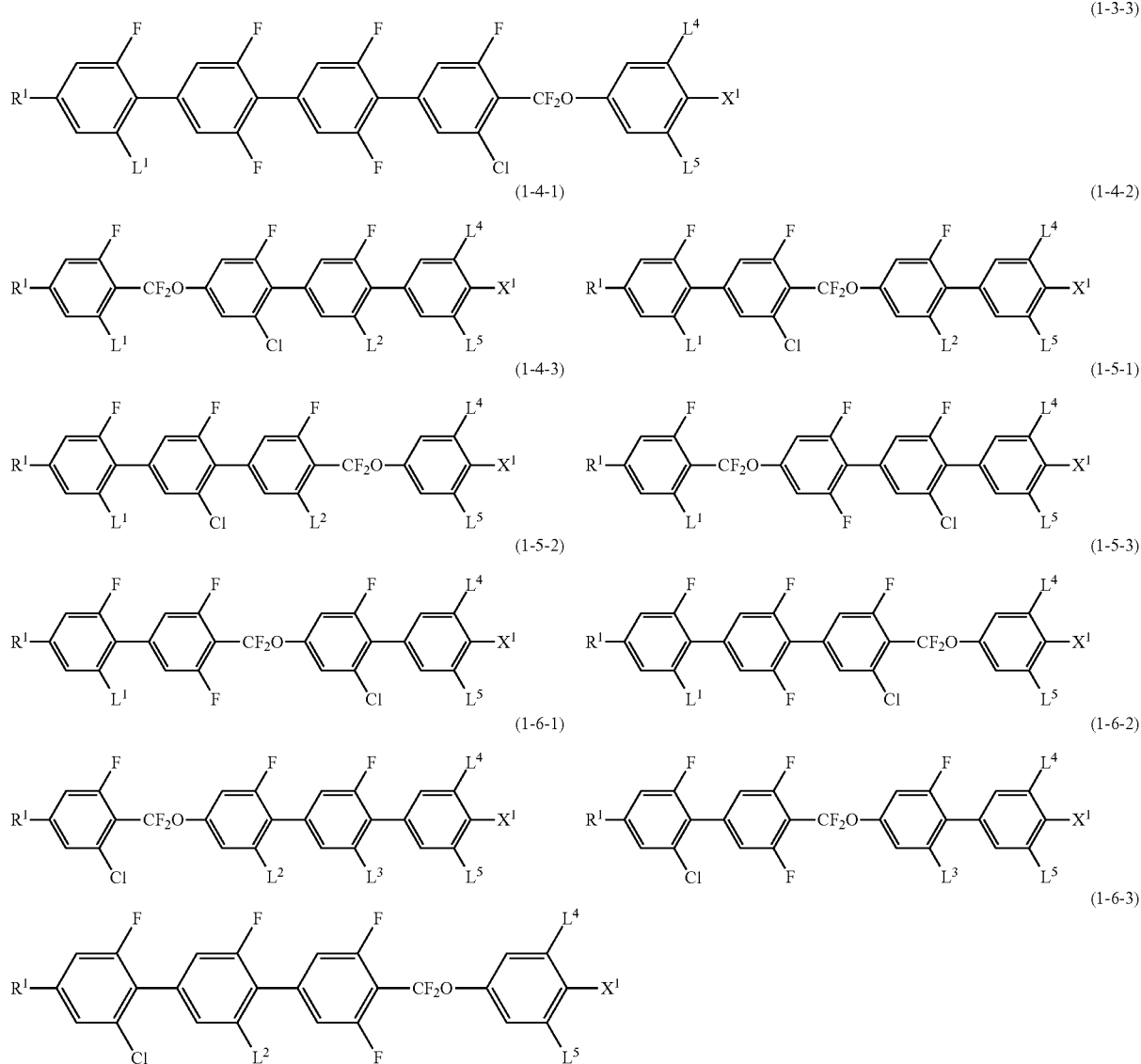

In the Formulas, $R^1$, $L^1$, $L^5$ and $X^1$ have the same meaning as defined for Formulas (1-1) to (1-6).

1-2 Properties of Compound (1)

Compound (1) used in the present invention is further described in detail. Compound (1) is a liquid crystal compound bearing a chlorophenyl ring, which has very stable physical and chemical properties under the conditions where the device is generally used, has an excellent compatibility with other liquid crystal compounds, and is difficult to exhibit a smectic phase. The composition containing such a compound is stable under the conditions where the device is generally used. Therefore, the composition has an optically isotropic liquid crystal phase in an expanded temperature range, and thus can be used in a display device over a wide temperature range. Moreover, due to large dielectric anisotropy and refractive index anisotropy, the compound can be used as a component for lowering the driving voltage in a composition driven in an optically isotropic liquid crystal phase.

By properly selecting the combination of l, m, n, o and p, the left terminal group $R^1$, the most right substituents on the phenyl ring and substitution positions thereof ($L^1$, $L^2$ and $X^1$), or the bonding groups $Z^1$ to $Z^6$ of the Compound (1), the physical properties such as the clear point, the refractive index anisotropy, and the dielectric anisotropy can be adjusted at will. The effects of the combination of l, m, n, o and p, the left terminal group $R^1$, the right terminal group $X^1$, and the bonding groups $Z^1$ to $Z^6$, and $L^1$ to $L^5$ on the physical properties of the Compound (1) will be described below.

Generally, when l+m+n+o+p=2, the clear point of the compounds is high, and when l+m+n+o+p=1, the melting point of the compounds is low.

When $R^1$ is linear, Compound (1) has a liquid crystal phase over a wide temperature range and a low viscosity. When $R^1$ is branched, Compound (1) is well compatible with other liquid crystal compounds. The compound in which $R^1$ is an optically active group can be used as a chiral dopant. The compound in which $R^1$ is a non-optically active group can be used as a component of the composition. When $R^1$ is an alkenyl, a preferred stereo configuration depends on the position of the double bond. An alkenyl compound having a preferred stereo configuration has a high upper-limit temperature or a liquid crystal phase over a wide temperature range.

When the bonding groups $Z^1$—$Z^6$ are a single bond or —$CF_2O$—, Compound (1) has relatively stable chemical properties and thus is unlikely to be deteriorated. Furthermore, when the bonding group is a single bond, the Compound (1) has a low viscosity. Moreover, where the bonding group is —$CF_2O$—, the Compound (1) exhibits a large dielectric anisotropy.

When the right terminal group $X^1$ is fluorine, chlorine, —$SF_5$, —$CF_3$, —$OCF_3$ or —CH=CH—$CF_3$, Compound (1) has a large dielectric anisotropy. When $X^1$ is fluorine, —$OCF_3$ or —CF3, Compound (1) has stable chemical properties.

When $L^1$ is hydrogen, Compound (1) has a low melting point; when $L^1$ is fluorine, Compound (1) has a large dielectric anisotropy. When $L^4$ and $L^5$ are both fluorine, Compound (1) has a very large dielectric anisotropy.

As described above, a compound with target physical properties can be obtained by properly selecting the structure of the rings and the types of the terminal groups, the bonding groups and the like.

1-3 Specific Examples of Compound (1)

Preferred examples of Compound (1) are Formulas (1-1)-(1-6). More preferred examples are Formulas (1-1-1)-(1-1-3), (1-2-1)-(1-2-3), (1-3-1)-(1-3-3), (1-4-1)-(1-4-3), (1-5-1)-(1-5-3), (1-6-1)-(1-6-3). Among the formulas, further more preferred are Formulas (1-1-1), (1-1-2), (1-2-1), (1-2-2), (1-3-1), (1-3-2), (1-4-2), (1-4-3), (1-5-3), and (1-6-2). Specific compounds include compounds represented by Formulas (1-1-1-a)-(1-1-1-f), (1-1-2-a)-(1-1-2-f), (1-2-1-a)-(1-2-1-f), (1-2-2-a)-(1-2-2-f), (1-3-1-a)-(1-3-1-d), (1-3-2-a)-(1-3-2-d), (1-4-2-a)-(1-4-2-f), (1-4-3-a)-(1-4-3-f), (1-5-3-a)-(1-5-3-f), and (1-6-2-a)-(1-6-2-c), and the compounds represented by Formulas (S1-11), (S2-1), (S3-1), (S4-1), (S5-1), (S6-1), (S7-1), Formula (S8-1), (S9-1), (S10-1), and (S11-1) described in Examples 1-11.

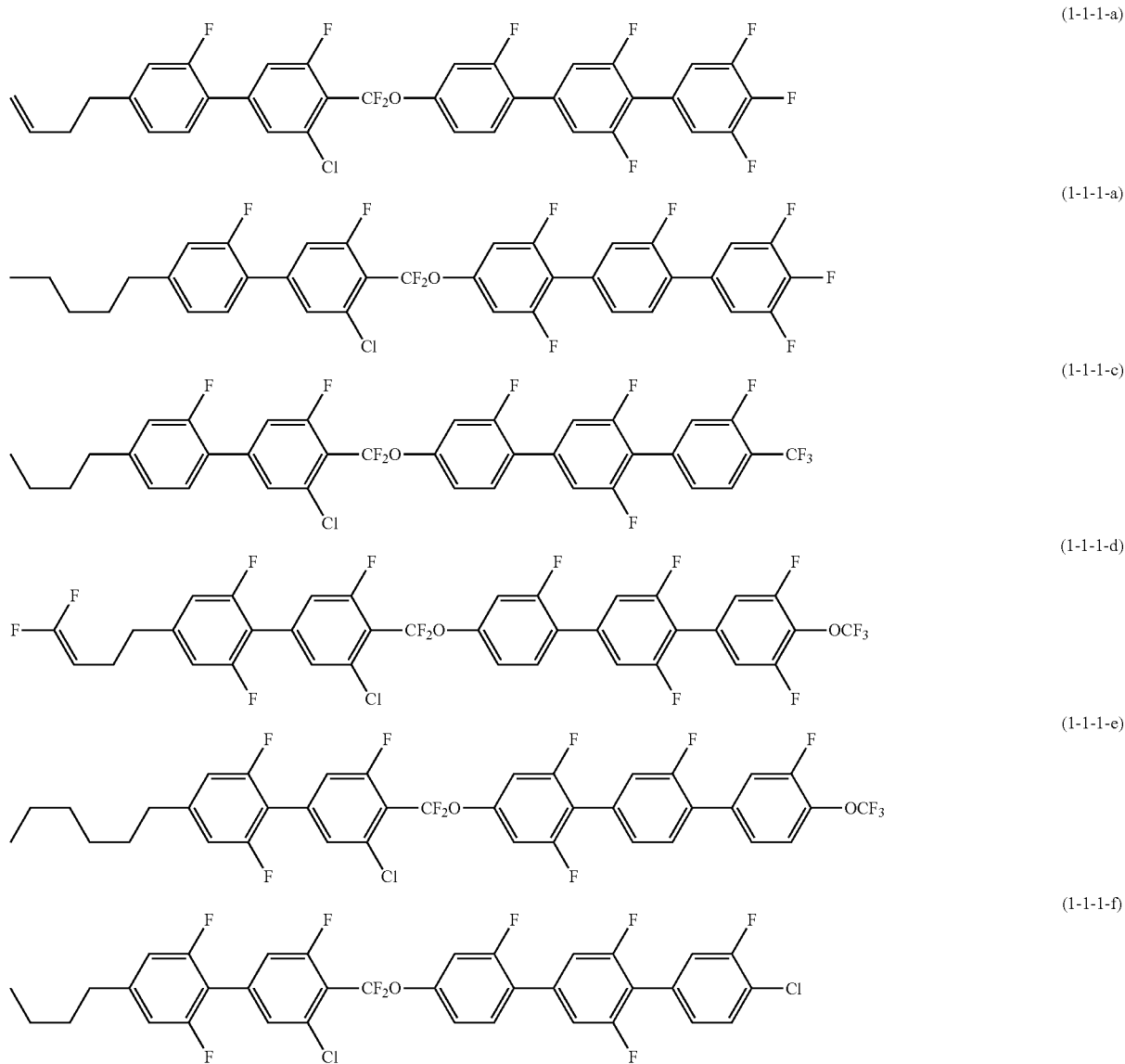

-continued
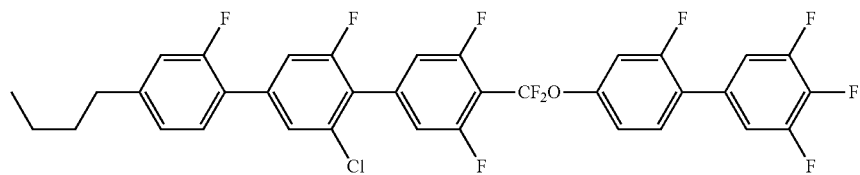
(1-1-2-a)
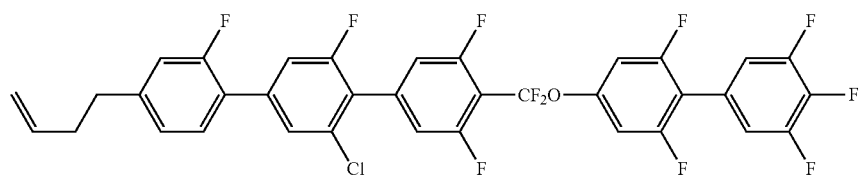
(1-1-2-b)
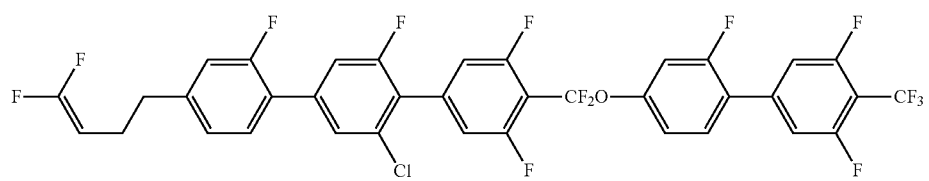
(1-1-2-c)
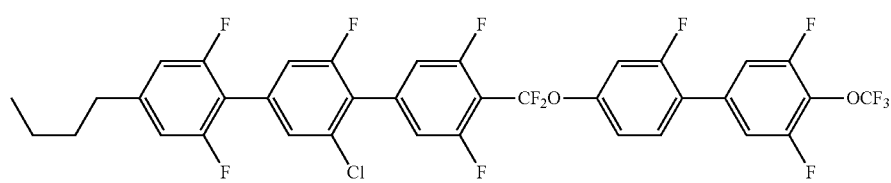
(1-1-2-d)
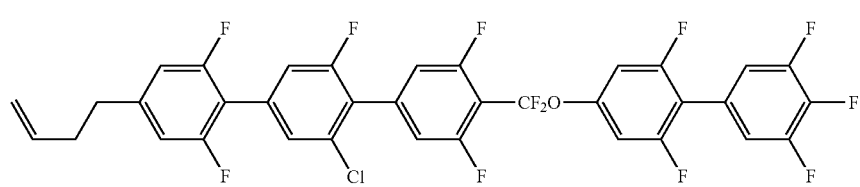
(1-1-2-e)
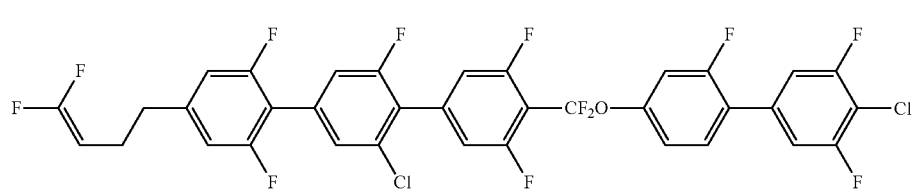
(1-1-2-f)
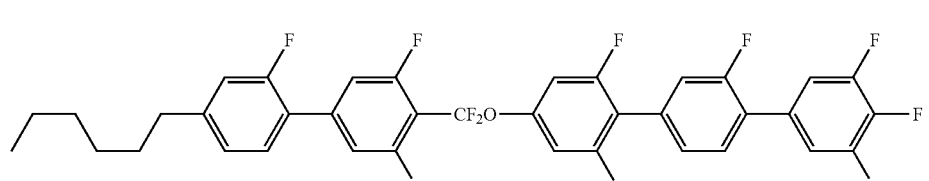
(1-2-1-a)
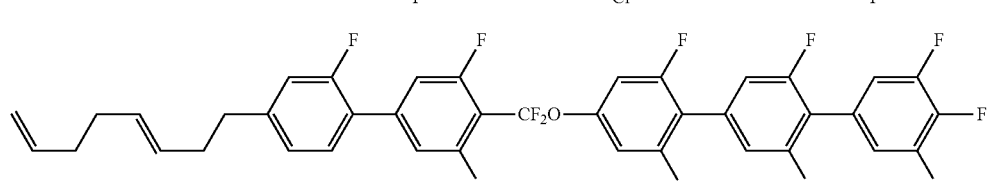
(1-2-1-b)
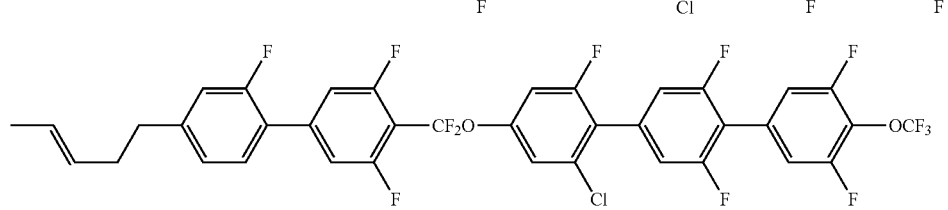
(1-2-1-c)

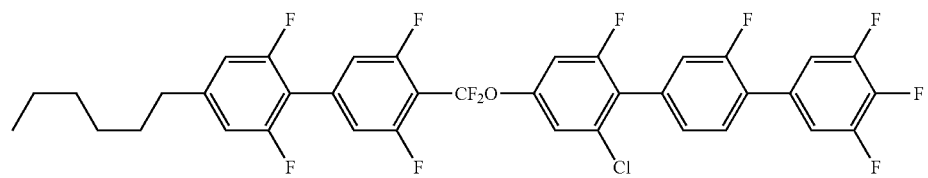
(1-2-1-d)
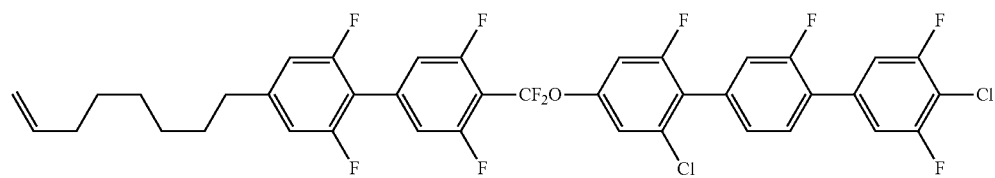
(1-2-1-e)
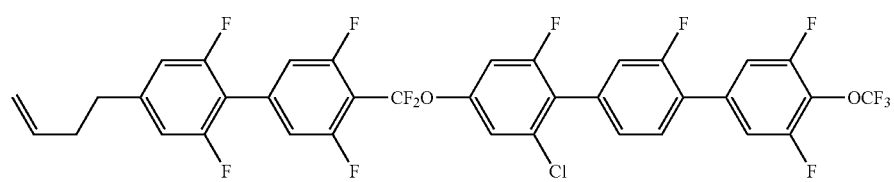
(1-2-1-f)
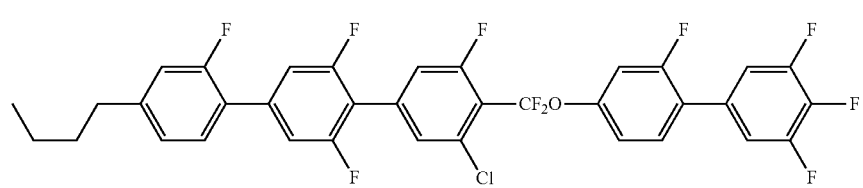
(1-2-2-a)
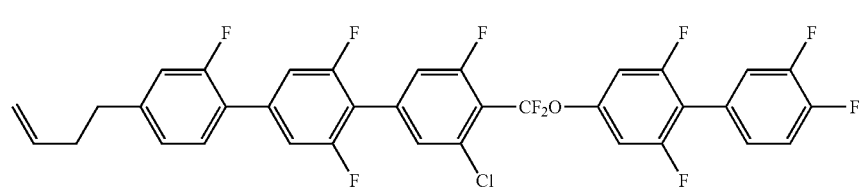
(1-2-2-b)
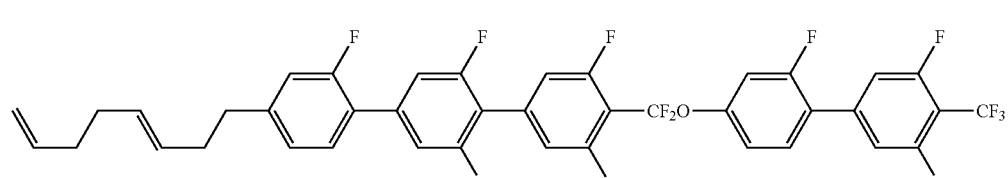
(1-2-2-c)
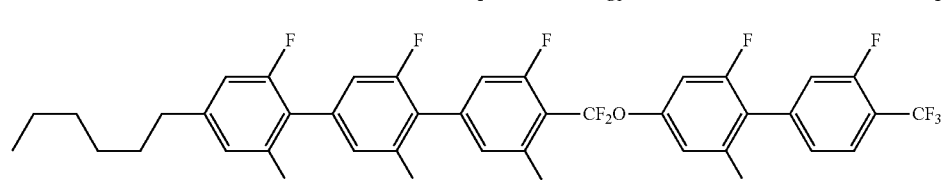
(1-2-2-d)
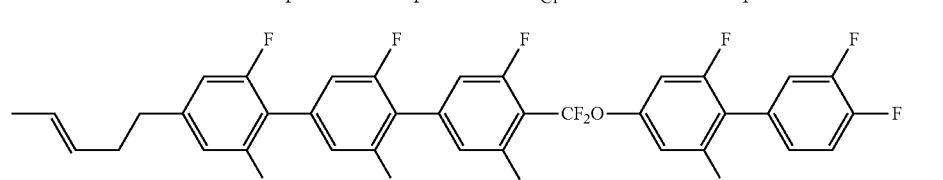
(1-2-2-e)
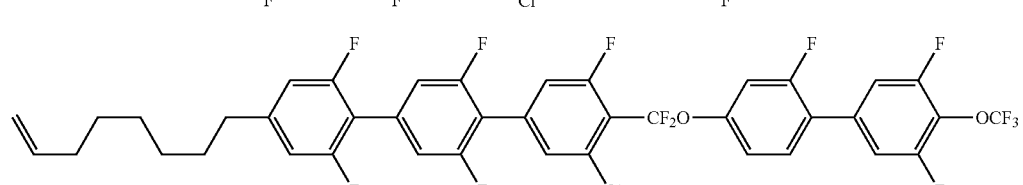
(1-2-2-f)

-continued
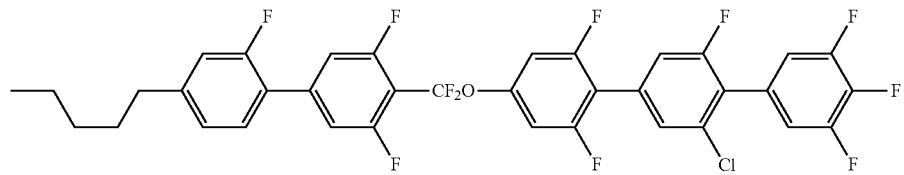
(1-3-1-a)
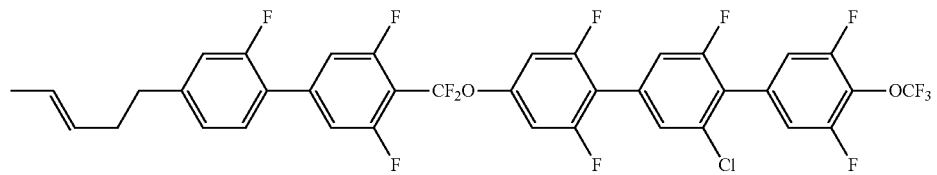
(1-3-1-b)
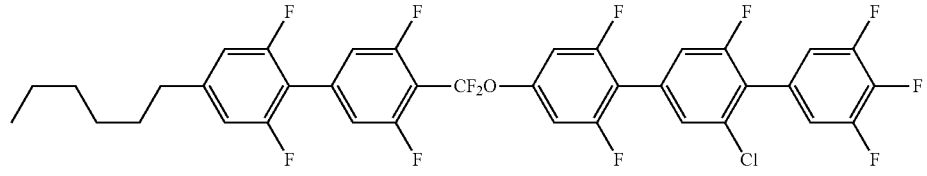
(1-3-1-c)
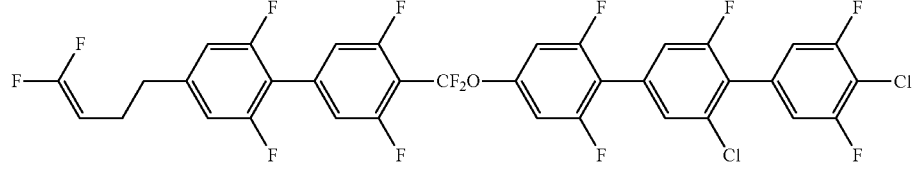
(1-3-1-d)
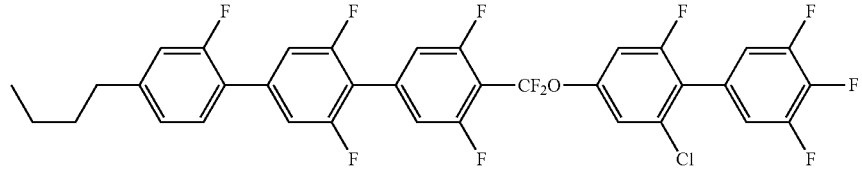
(1-3-2-a)
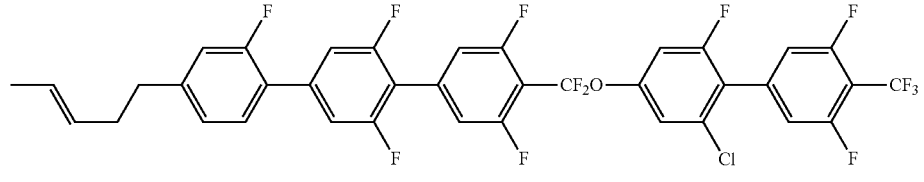
(1-3-2-b)
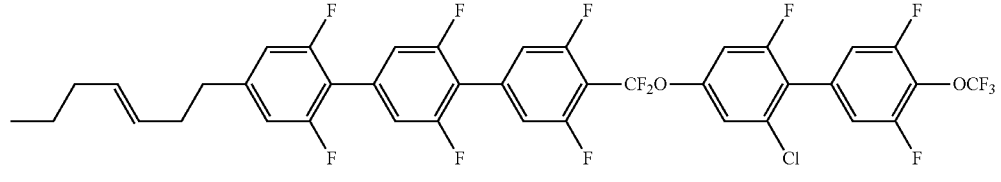
(1-3-2-c)
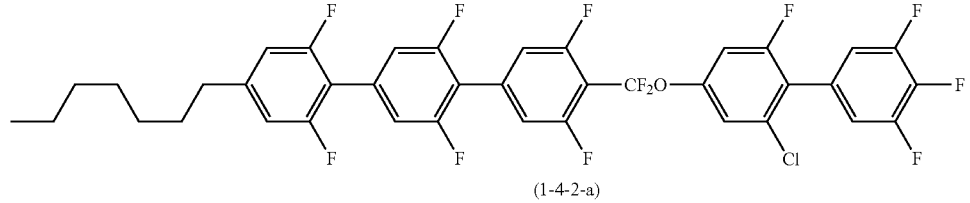
(1-3-2-d)
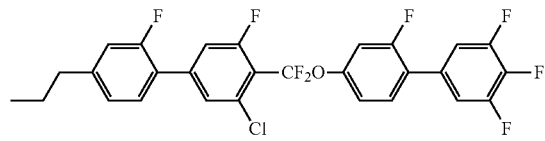
(1-4-2-a)
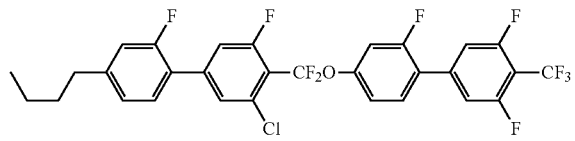
(1-4-2-b)

-continued
(1-4-2-c)
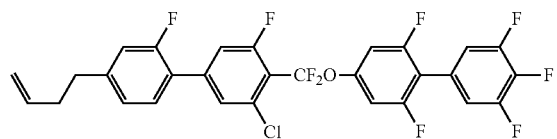
(1-4-2-d)
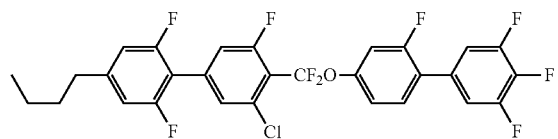
(1-4-2-e)
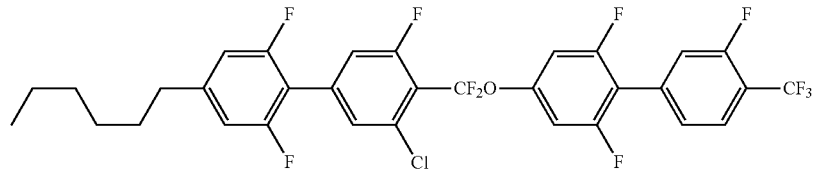
(1-4-2-f)
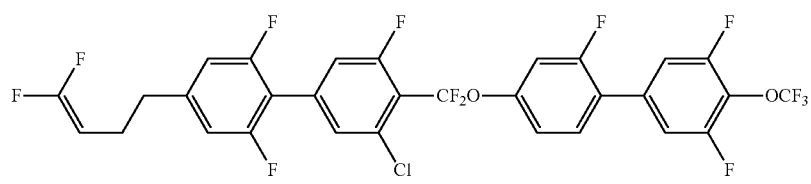
(1-4-3-a)
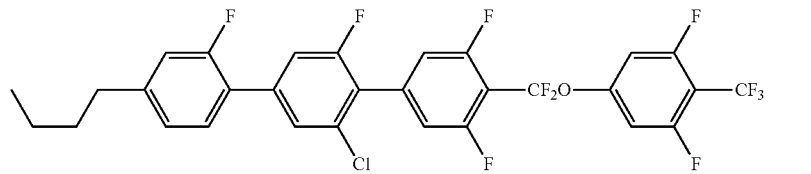
(1-4-3-b)
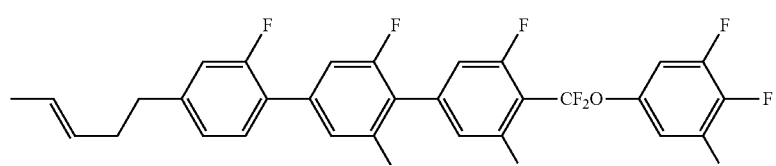
(1-4-3-c)
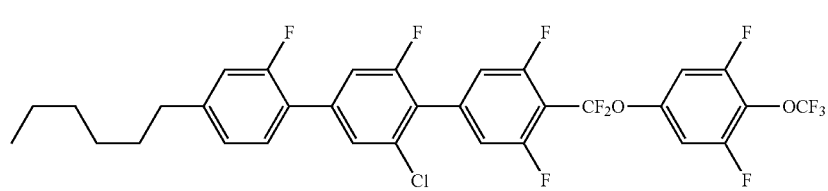
(1-4-3-d)
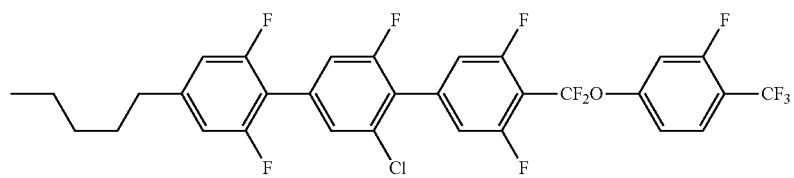
(1-4-3-e)
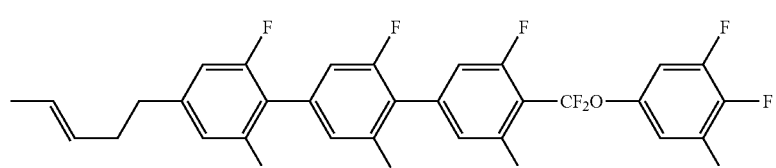
(1-4-3-f)
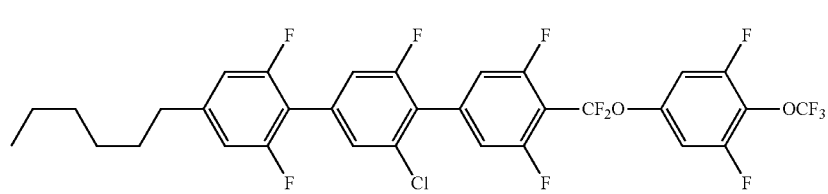

-continued
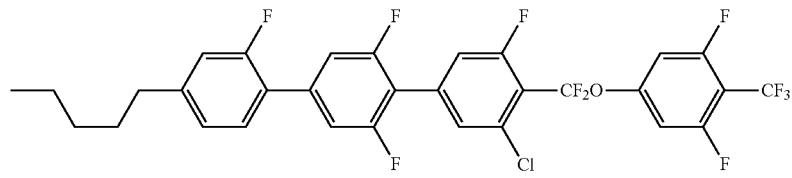
(1-5-3-a)
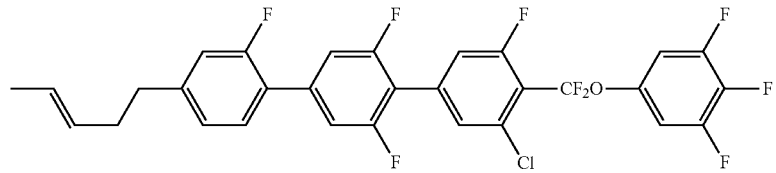
(1-5-3-b)
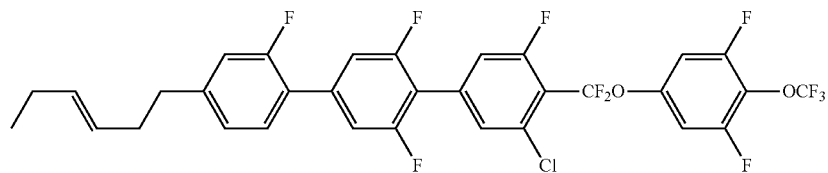
(1-5-3-c)
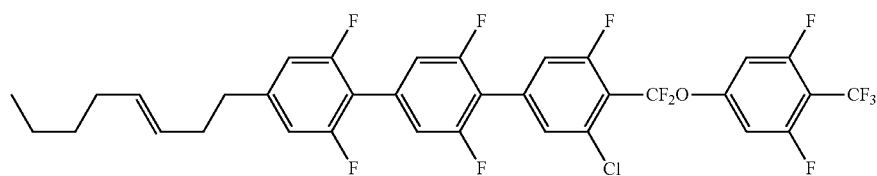
(1-5-3-d)
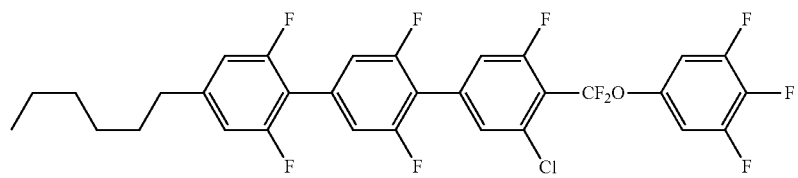
(1-5-3-e)
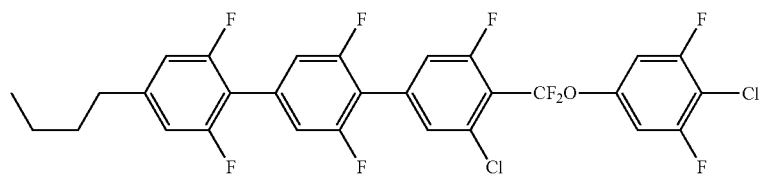
(1-5-3-f)
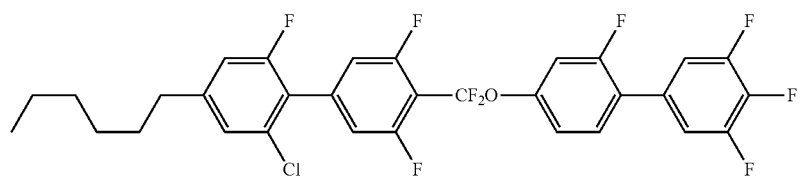
(1-6-2-a)
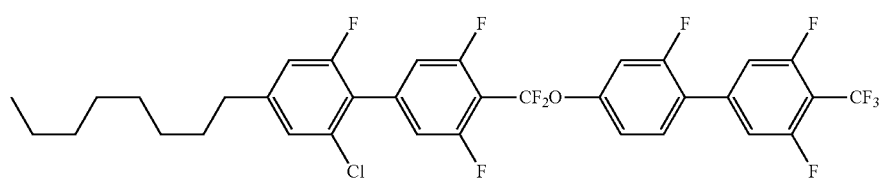
(1-6-2-b)

(1-6-2-c)

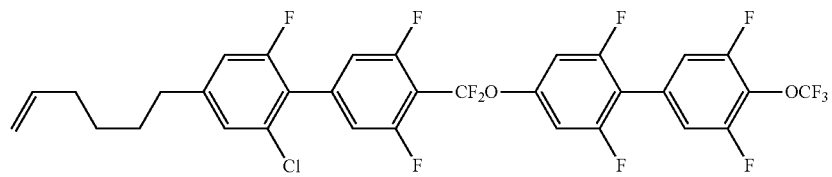

1-4 Synthesis of Compound (1)

Next, synthesis of Compound (1) is described. Compound (1) may be synthesized by a suitable combination of organic synthesis methods. The methods for introducing target terminal groups, rings, and bonding groups in the starting material are described in, for example, *Organic Syntheses*, John Wiley & Sons, Inc, *Organic Reactions*, John Wiley & Sons, Inc, *Comprehensive Organic Synthesis*, Pergamon Press, and *New Lecture on Experimental Chemistry* (Maruzen).

1-4-1 Chlorophenyl Ring

Chlorobenzene compounds such as 1-bromo-3-chloro-5-fluorobenzene and 3-chloro-5-fluorophenol are commercially available as reagent.

1-4-2 Formation of Bonding Groups $Z^1$—$Z^6$

An example for forming the bonding groups $Z^1$—$Z^6$ in Compound (1) is as shown in the scheme below. In this scheme, $MSG^1$ or $MSG^2$ is a monovalent organic group having at least one ring. The multiple $MSG^1$ (or $MSG^2$) used in the scheme can be the same or different. Compounds (1A)-(1J) are equivalent to Compound (1).

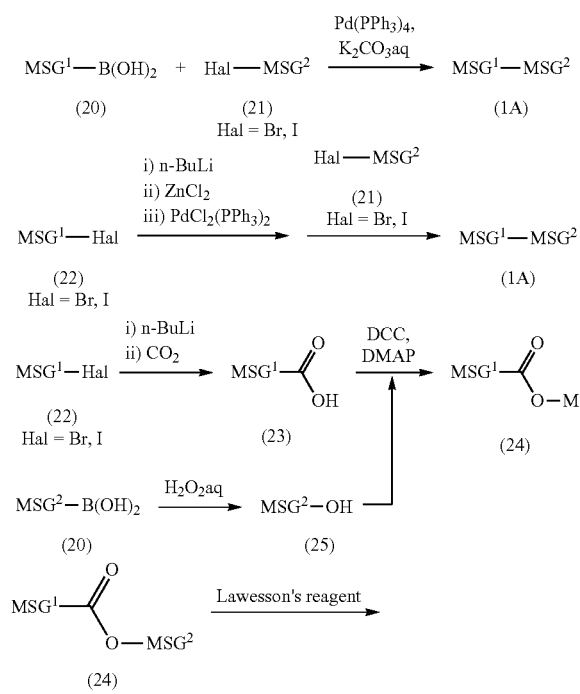

Next, the methods for forming each bond of the bonding groups $Z^1$—$Z^6$ in Compound (1) are described in Sections (I)-(II) below.

(I) Formation of Single Bond

Arylboric acid (20) is reacted with Compound (21), which is synthesized by a well-known method, in the presence of an aqueous carbonate solution and a catalyst such as tetrakis(triphenylphosphine)palladium, to synthesize Compound (1A). Compound (1A) may also be synthesized by reacting Compound (22) synthesized by a well-known method through reacting with n-butyl lithium, then reacting with zinc chloride, and next reacting with Compound (21) in the presence of a catalyst such as bis(triphenylphosphine)palladium dichloride.

(II) Formation of —$CF_2O$—Compound (22) is reacted with n-butyl lithium, and then reacted with carbon dioxide to produce carboxylic acid (23). Next, Compound (23) and a phenol compound (25) synthesized by a well-known method are subjected to dehydration in the presence of DCC (1,3-dicyclohexylcarbodiimide) and DMAP (4-dimethylaminopyridine) to synthesize Compound (24) having —COO—. A compound having —COO— may also be synthesized by this method. Compound (24) is treated with a vulcanizing agent such as Lawesson's reagent to produce Compound (26). Then, Compound (26) is fluorinated with a hydrogen fluoride pyridine complex and NBS (N-bromosuccinimide), to synthesize Compound (1B) having —$CF_2O$—. See M. Kuroboshi et al., *Chem. Lett.*, 1992, 827. Compound (1B) may also be synthesized by fluorinating Compound (26) with (diethylamino)sulfur trifluoride (DAST). See W. H. Bunnelle et al., *J. Org. Chem.* 1990, 55, 768. A compound having —$OCF_2$— may also be synthesized by this method. The bonding groups may also be synthesized by the method described in Peer. Kirsch et al., *Angew. Chem. Int. Ed.* 2001, 40, 1480.

1-4-4 Synthesis of Compound (1)

There are numerous methods for synthesizing the compound of Formula (1), and the compound of Formula (1) may be synthesized from commercially available reagents with proper reference to the examples in the specification or documents and books.

2 Compounds (2)-(11)

A second aspect of the present invention relates to a liquid crystal composition obtained by adding a component selected from the components B, C, D, and E shown below to the compound of Formula (1) (i.e. Component A). Compared with a composition merely containing Component A, the liquid crystal composition can be freely adjusted for the driving voltage, temperature range of a liquid crystal phase, refractive index anisotropy value, dielectric anisotropy value, viscosity and so on.

Preferably, the component to be added into the component A is a mixture obtained by mixing Component B, C, D, E, or F, where Component B includes at least one compound selected from the group consisting of Formulas (2), (3), and (4) above, Component C includes at least one compound selected from the group consisting of Formula (5) above, Component D includes at least one compound selected from the group consisting of Formula (6) above, Component E includes at least one compound selected from the group consisting of Formulas (7)-(10) above, and Component F includes at least one compound selected from the group consisting of Formula (11) above.

Moreover, for each component of the liquid crystal composition used in the present invention, an analogue containing isotopes of each element can be used due to the small difference in physical properties.

In Component B above, preferred examples for the compound of Formula (2) are Formulas (2-1) to (2-16), preferred examples for the compound of Formula (3) are Formulas (3-1) to (3-112), and preferred examples for the compound of Formula (4) are Formulas (4-1) to (4-52).

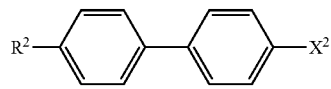
(2-1)

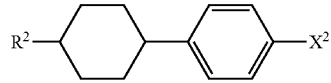
(2-2)

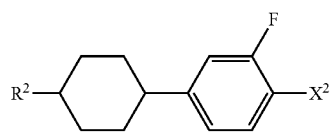
(2-3)

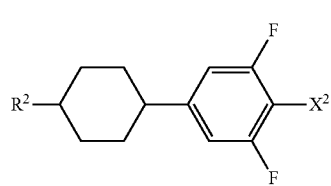
(2-4)

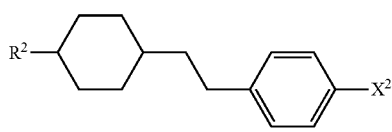
(2-5)

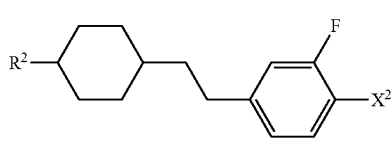
(2-6)

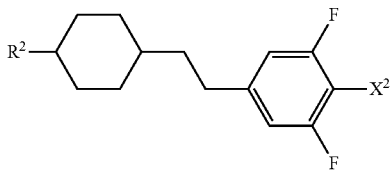
(2-7)

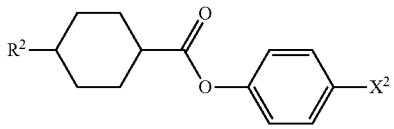
(2-8)

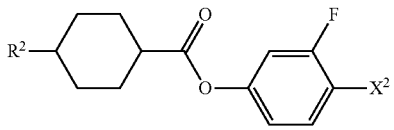
(2-9)

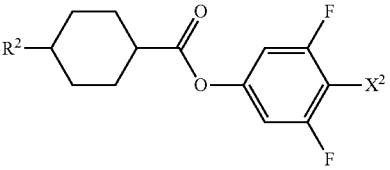
(2-10)

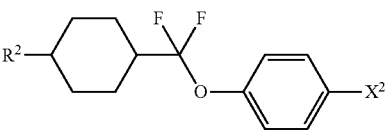
(2-11)

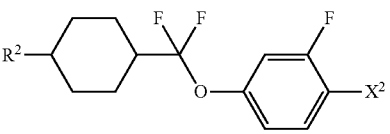
(2-12)

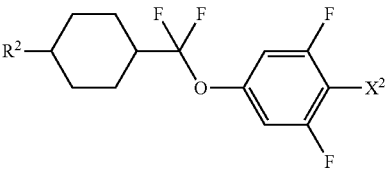
(2-13)

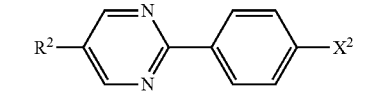
(2-14)

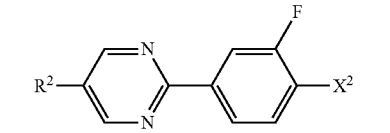
(2-15)

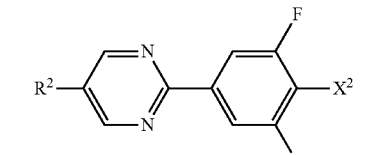
(2-16)

(3-1)

(3-2) 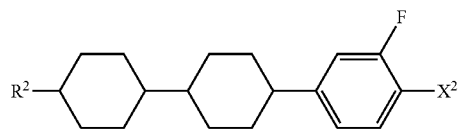
(3-3) 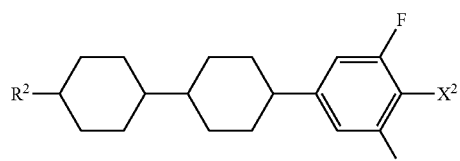
(3-4) 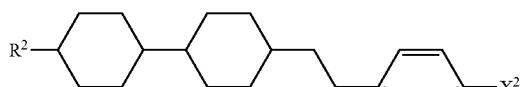
(3-5) 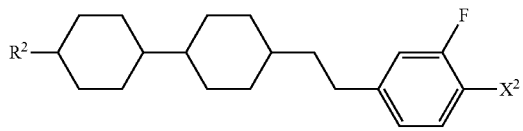
(3-6) 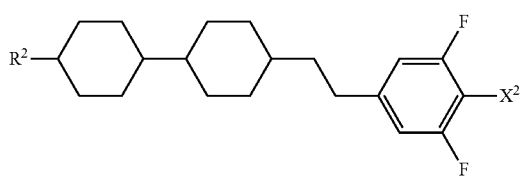
(3-7) 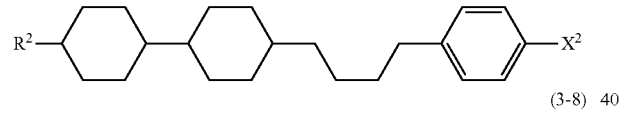
(3-8) 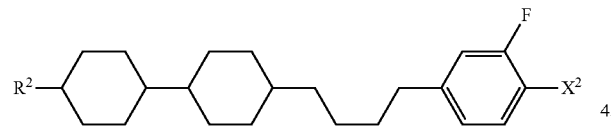
(3-9) 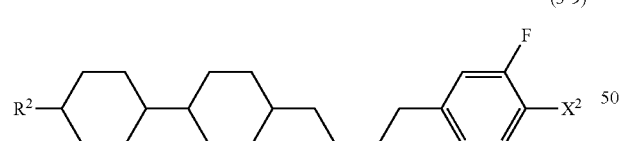
(3-10) 
(3-11) 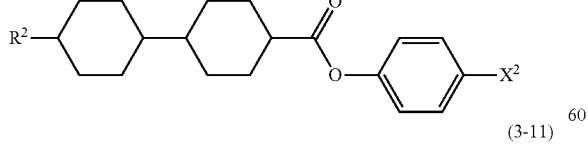
(3-12) 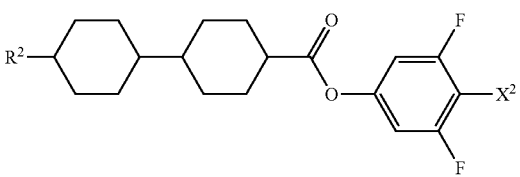
(3-13) 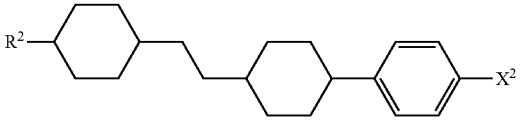
(3-14) 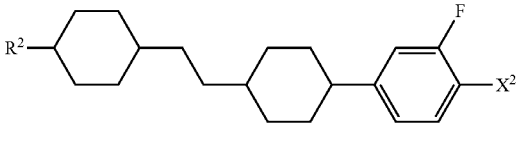
(3-15) 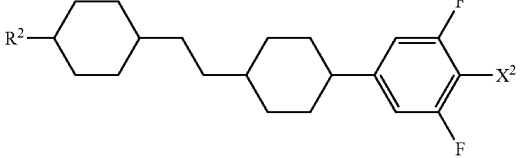
(3-16) 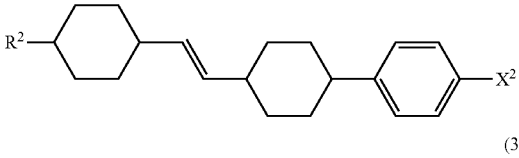
(3-17) 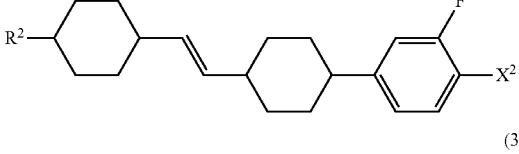
(3-18) 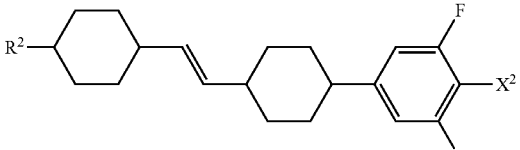
(3-19) 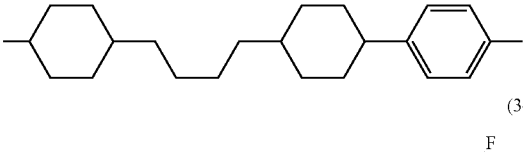
(3-20) 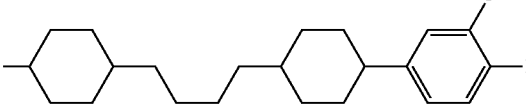

(3-21)
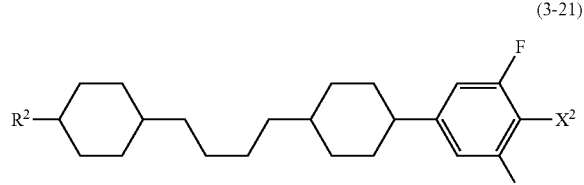
(3-22)
(3-23)
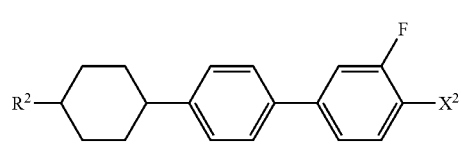
(3-24)
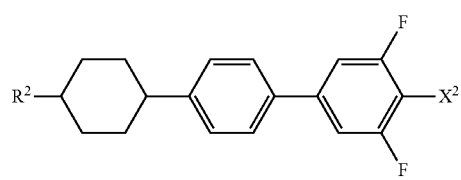
(3-25)
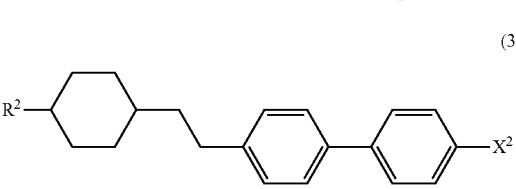
(3-26)
(3-27)
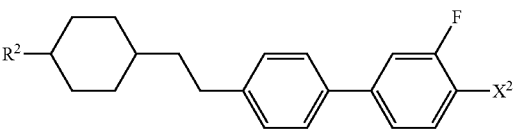
(3-28)
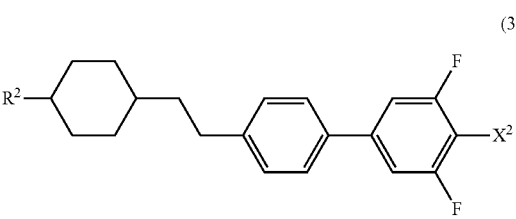
(3-29)
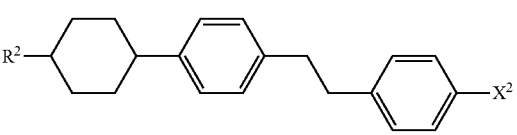
(3-29 cont.)
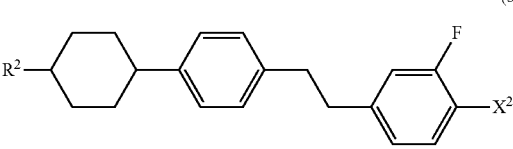
(3-30)
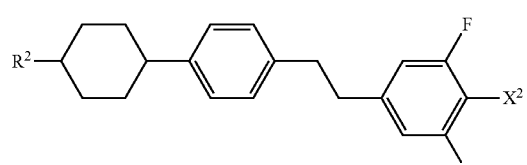
(3-31)
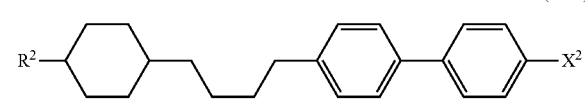
(3-32)
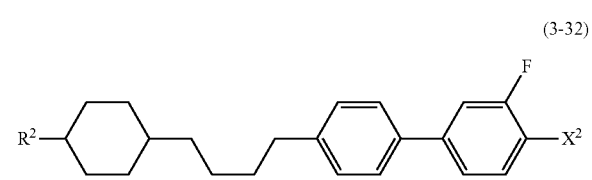
(3-33)
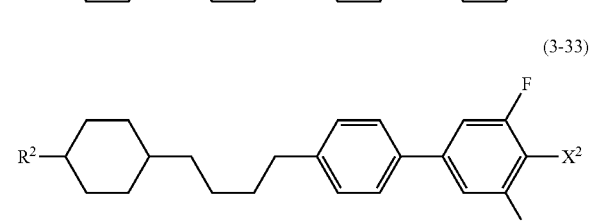
(3-34)
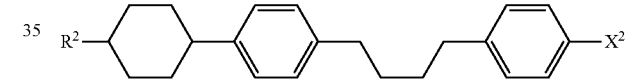
(3-35)
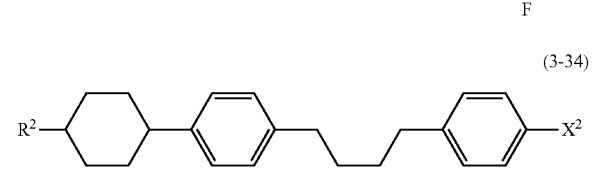
(3-36)
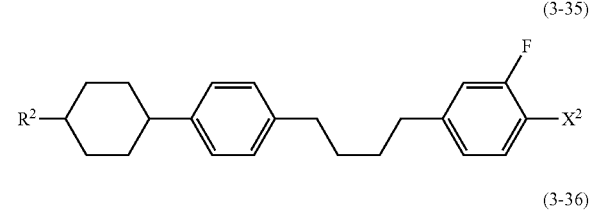
(3-37)
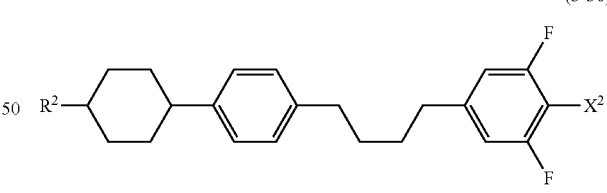
(3-38)
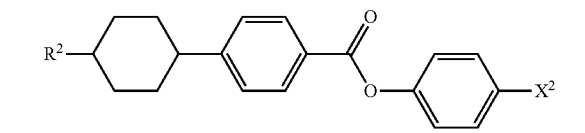
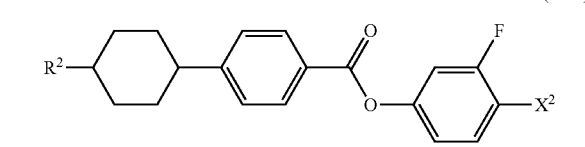

(3-39) 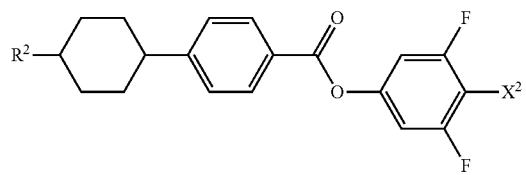
(3-40) 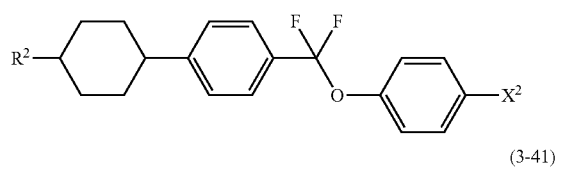
(3-41) 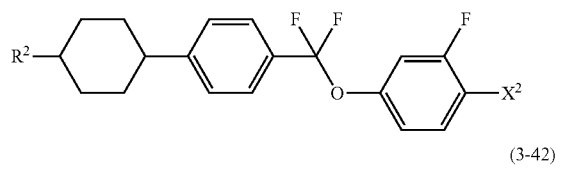
(3-42) 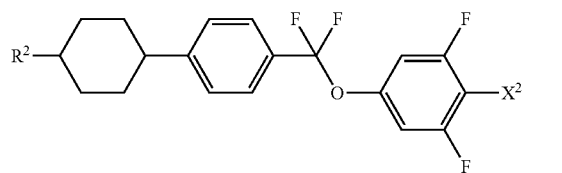
(3-43) 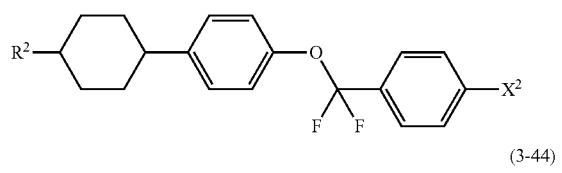
(3-44) 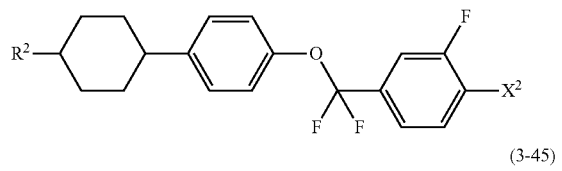
(3-45) 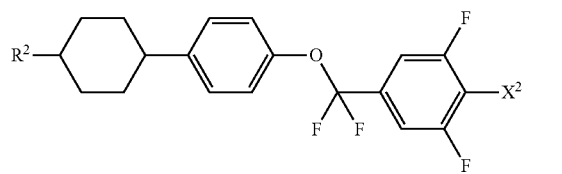
(3-46) 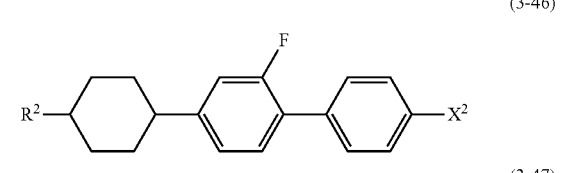
(3-47) 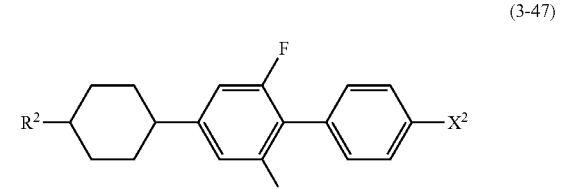
(3-48) 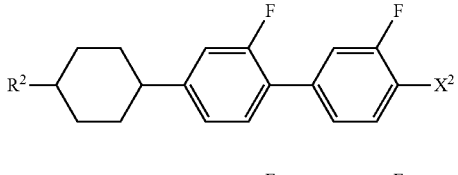
(3-49) 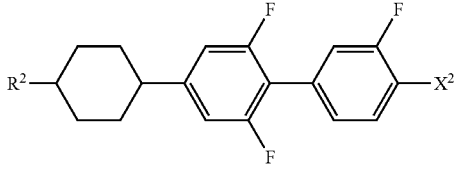
(3-50) 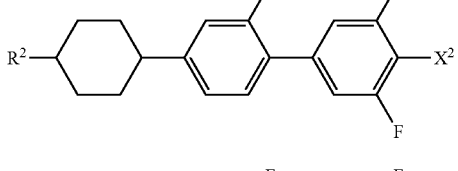
(3-51) 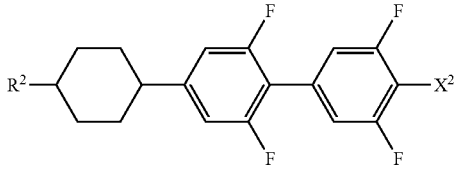
(3-52) 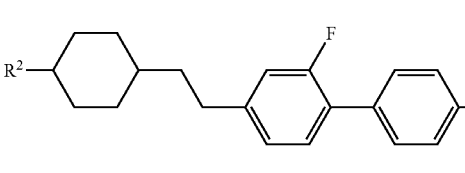
(3-53) 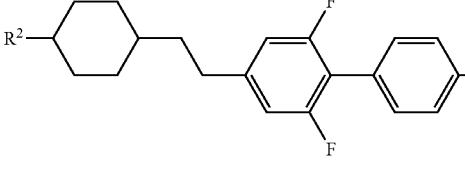
(3-54) 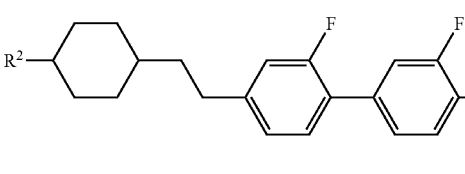
(3-55) 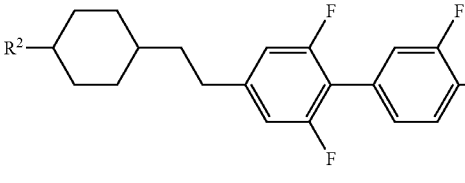
(3-56) 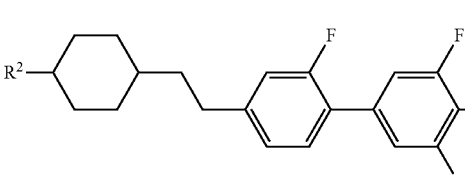

(3-57) 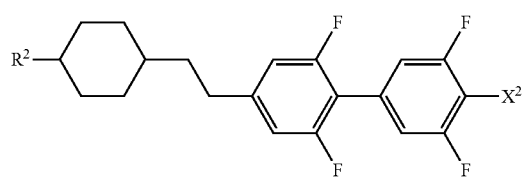
(3-58) 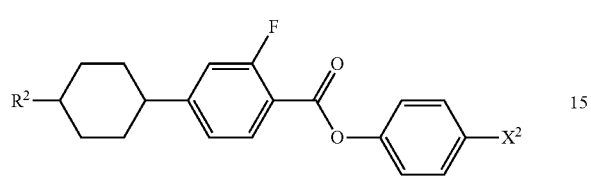
(3-59) 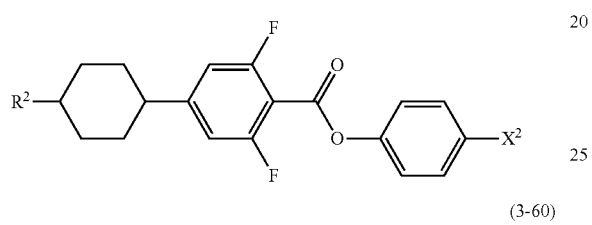
(3-60) 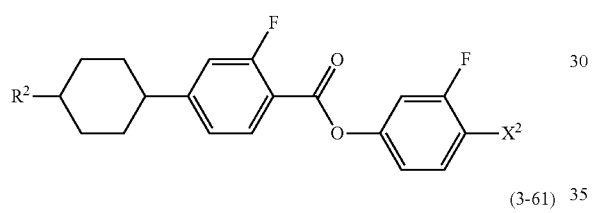
(3-61) 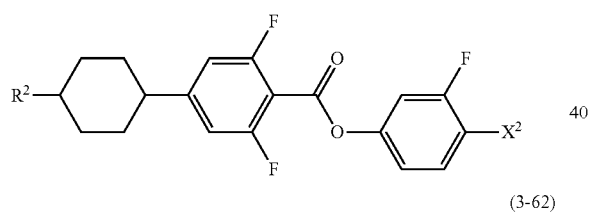
(3-62) 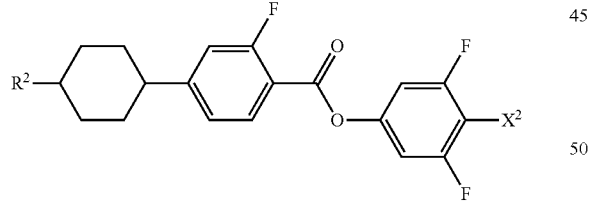
(3-63) 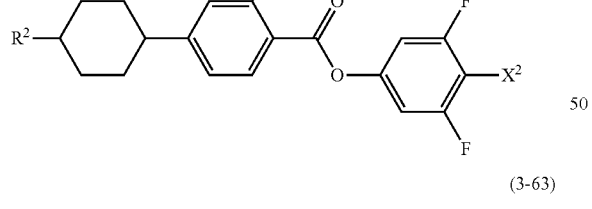
(3-64) 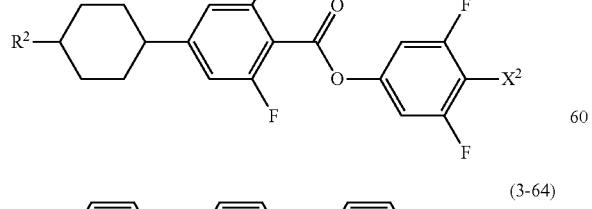
(3-65) 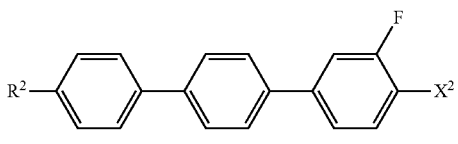
(3-66) 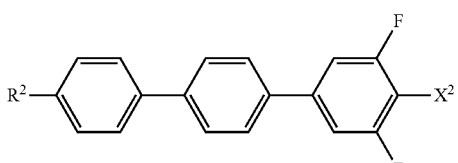
(3-67) 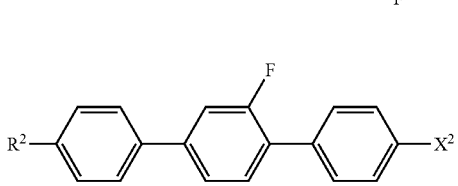
(3-68) 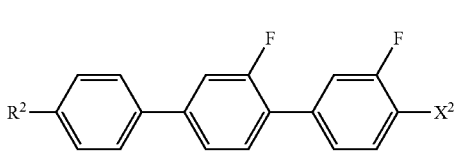
(3-69) 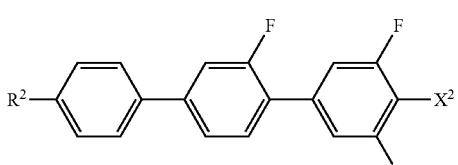
(3-70) 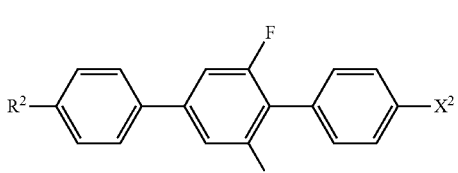
(3-71) 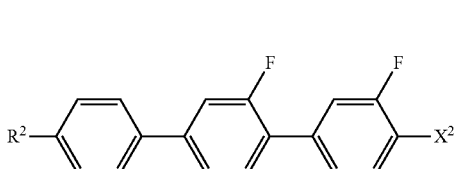
(3-72) 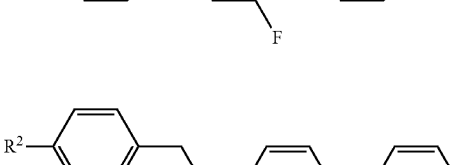
(3-73) 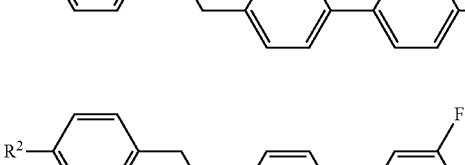

(3-74) 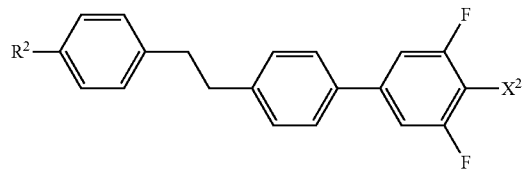
(3-75) 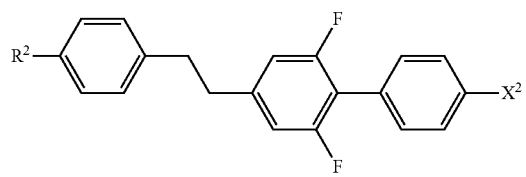
(3-76) 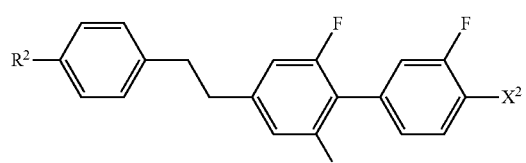
(3-77) 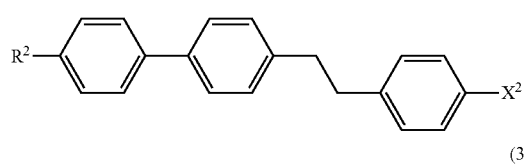
(3-78) 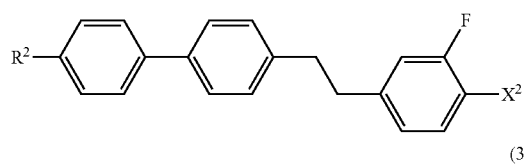
(3-79) 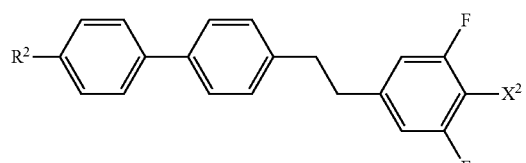
(3-80) 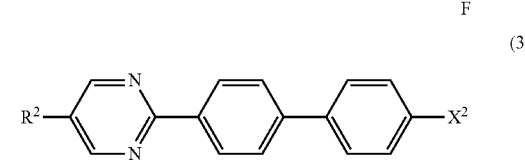
(3-81) 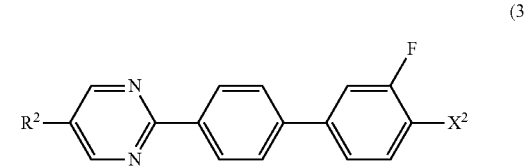
(3-82) 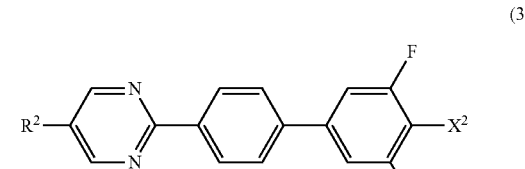
(3-83) 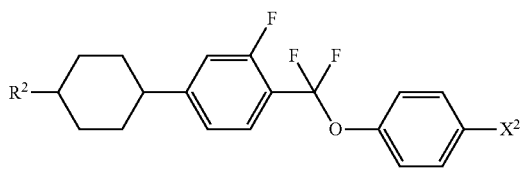
(3-84) 
(3-85) 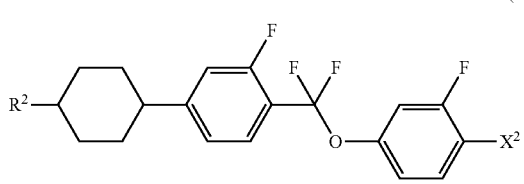
(3-86) 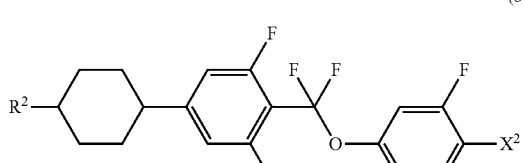
(3-87) 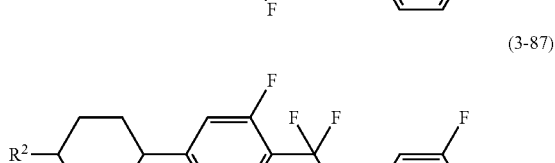
(3-88) 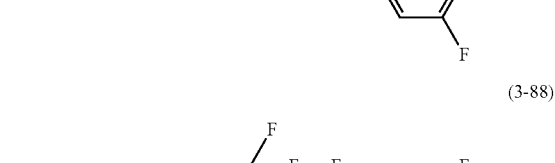
(3-89) 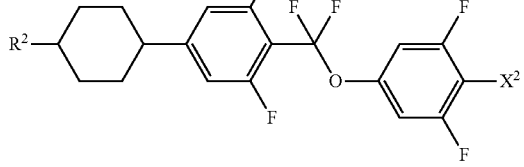
(3-90) 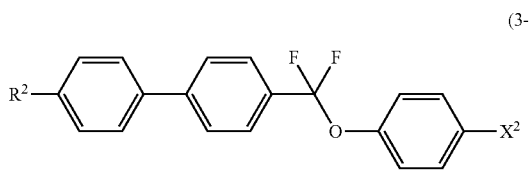

(3-91) 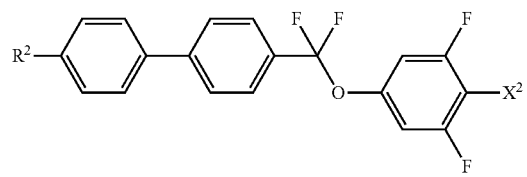
(3-92) 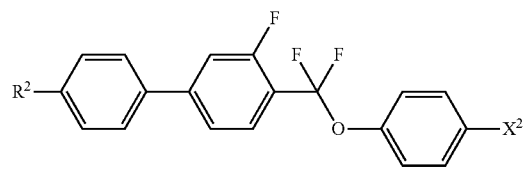
(3-93) 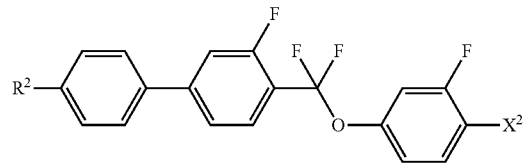
(3-94) 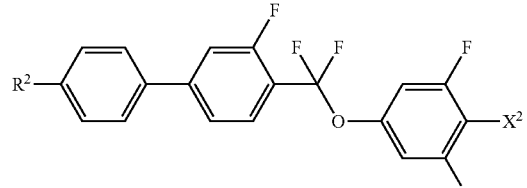
(3-95) 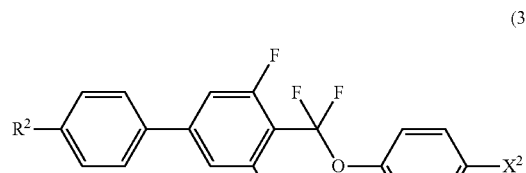
(3-96) 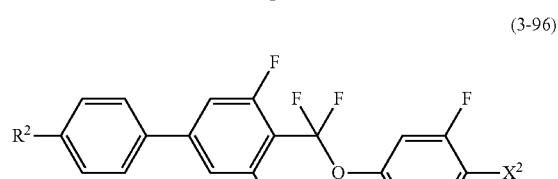
(3-97) 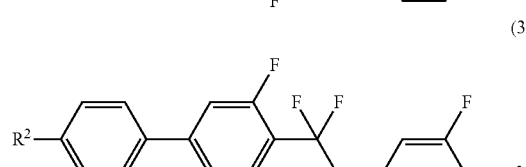
(3-98) 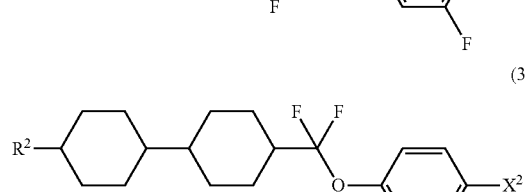
(3-99) 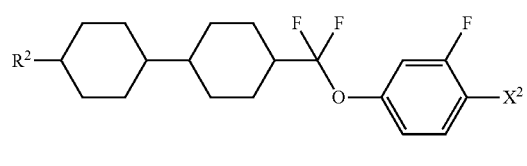
(3-100) 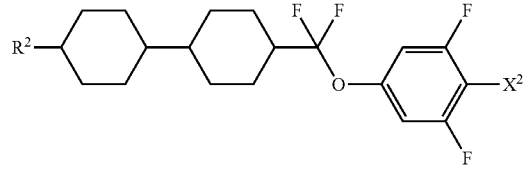
(3-101) 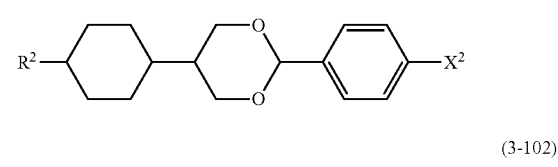
(3-102) 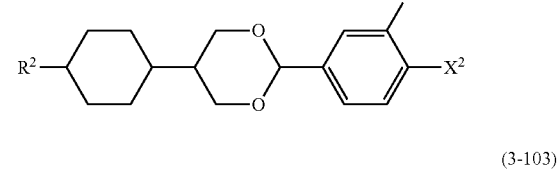
(3-103) 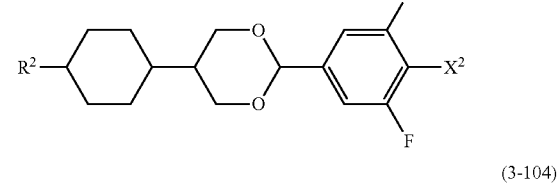
(3-104) 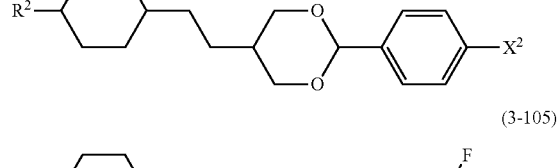
(3-105) 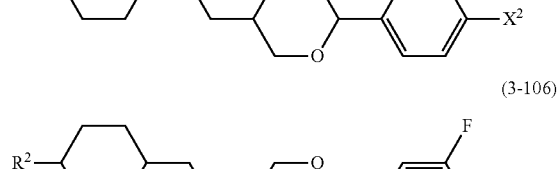
(3-106) 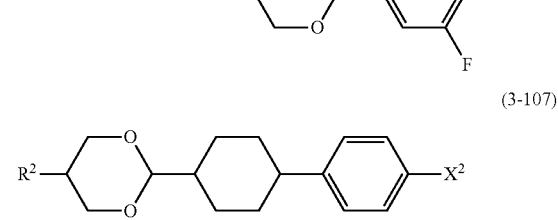
(3-107)

(3-108)
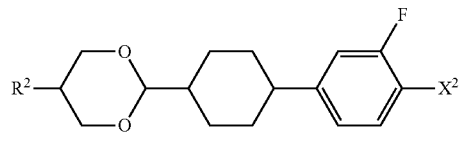
(3-109)
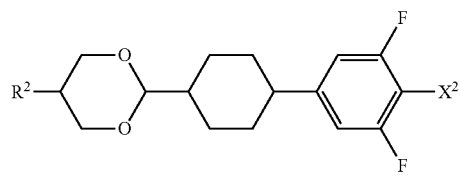
(3-110)
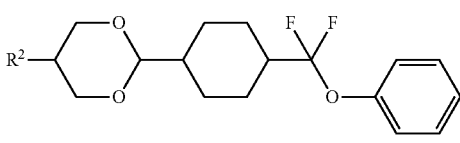
(3-111)
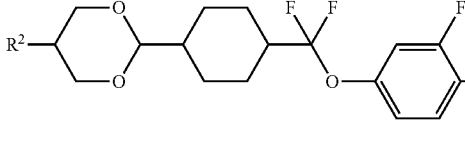
(3-112)
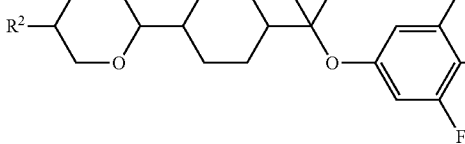
(4-1)
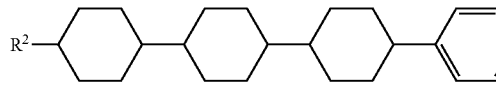
(4-2)
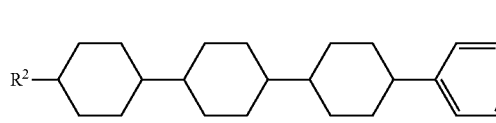
(4-3)
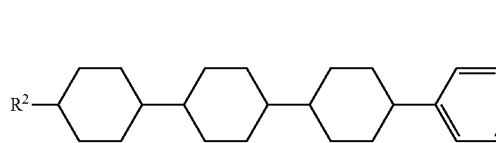
(4-4)
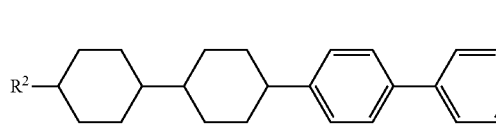
(4-5)
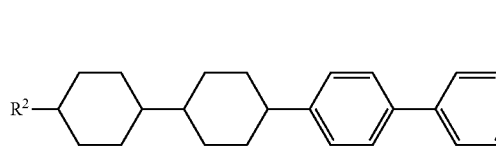
(4-6)
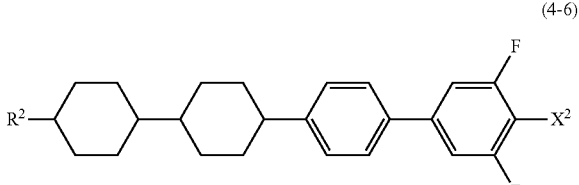
(4-7)
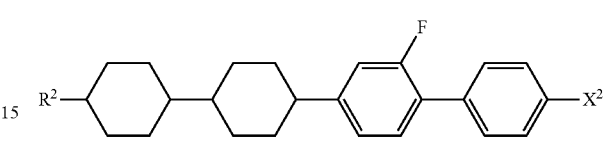
(4-8)
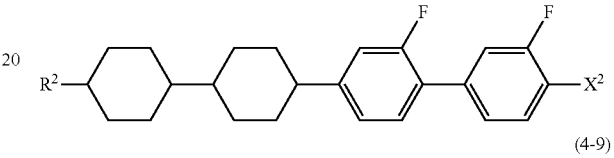
(4-9)
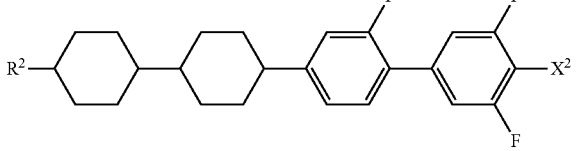
(4-10)
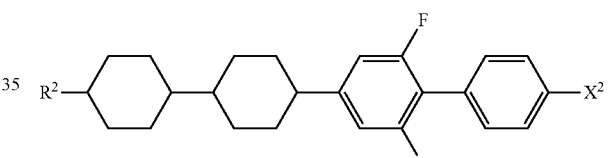
(4-11)
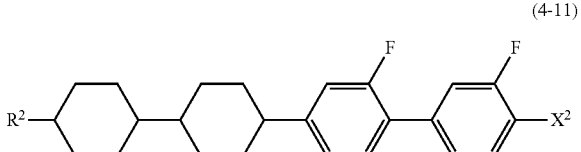
(4-12)
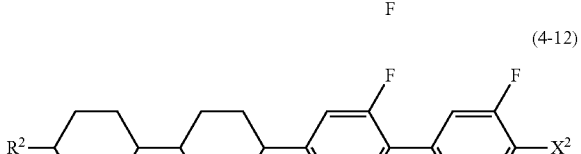
(4-13)
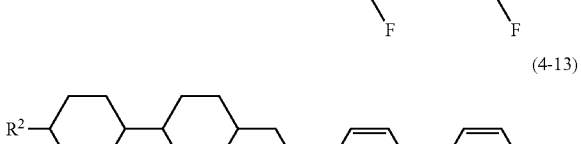
(4-14)
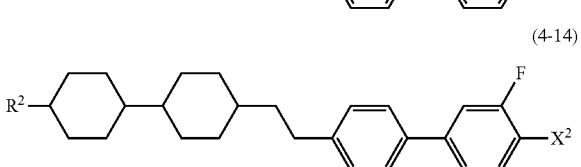

(4-15)
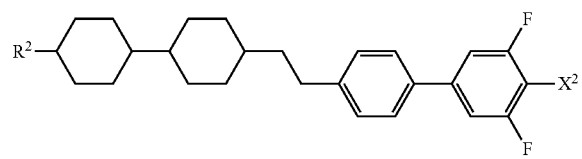
(4-16)
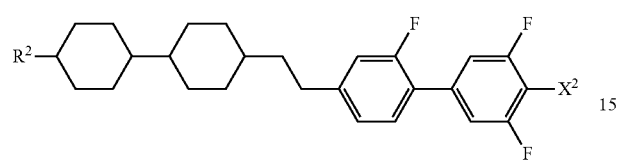
(4-17)
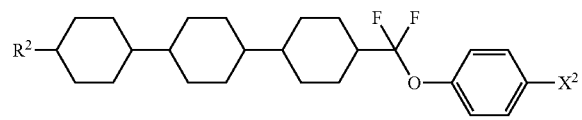
(4-18)
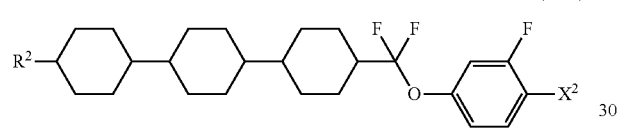
(4-19)
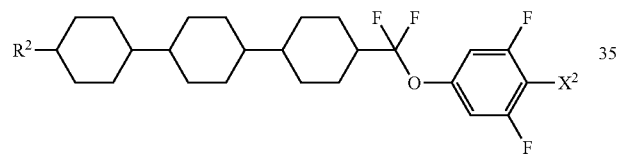
(4-20)
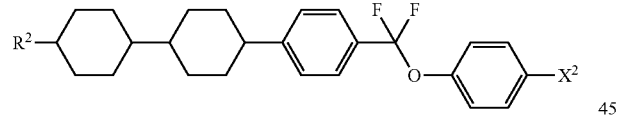
(4-21)
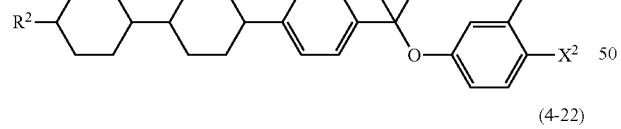
(4-22)
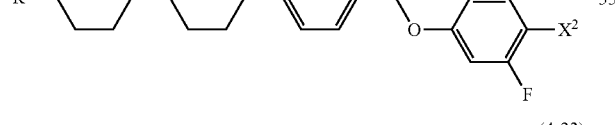
(4-23)
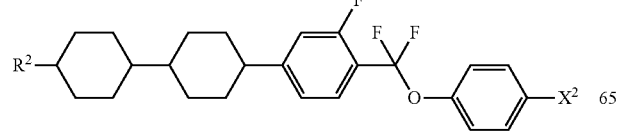
(4-24)
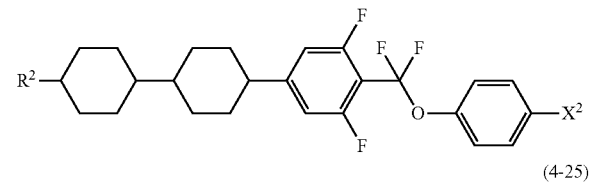
(4-25)
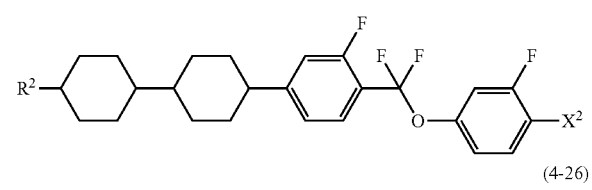
(4-26)
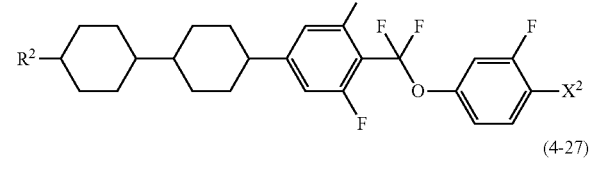
(4-27)
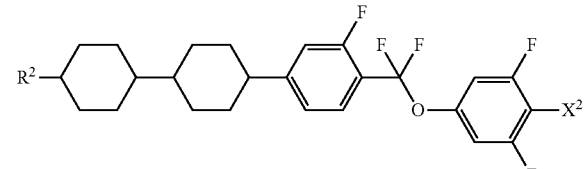
(4-28)
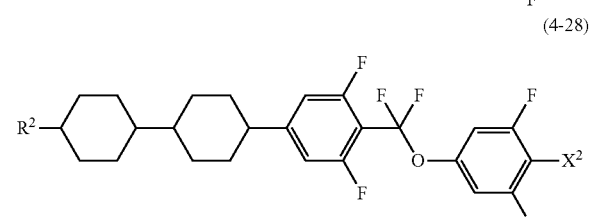
(4-29)
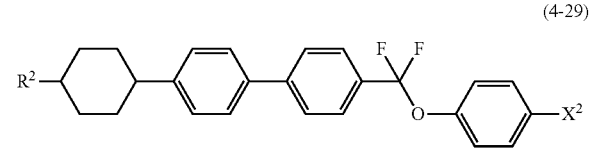
(4-30)
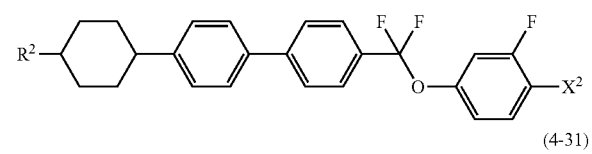
(4-31)
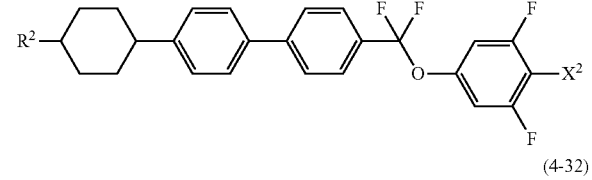
(4-32)
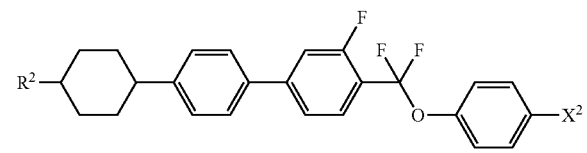

(4-33)
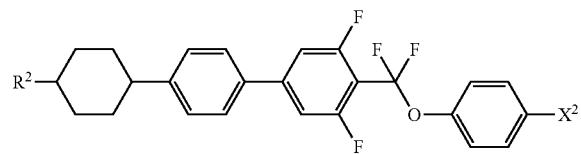
(4-34)
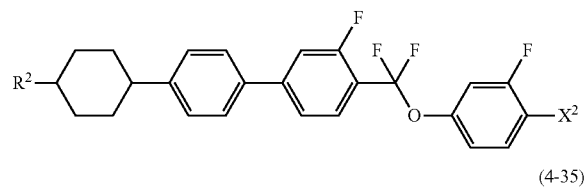
(4-35)
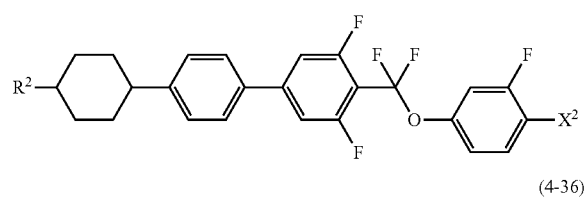
(4-36)
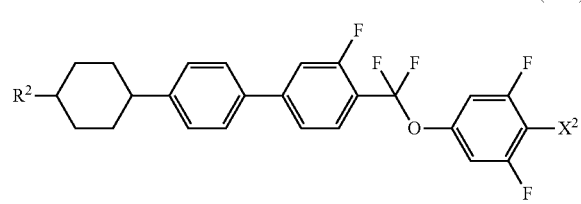
(4-37)
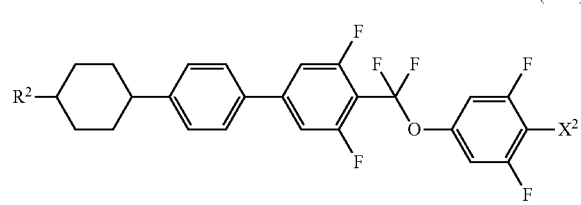
(4-38)
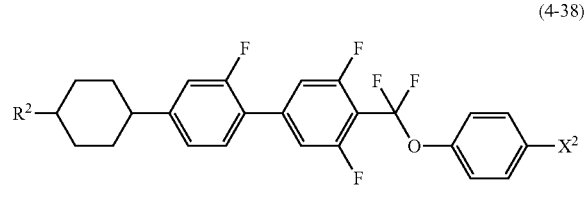
(4-39)
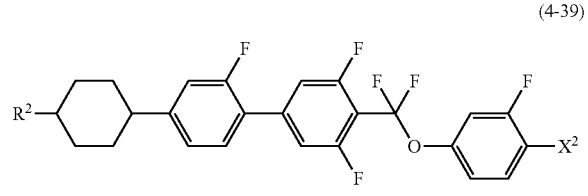
(4-40)
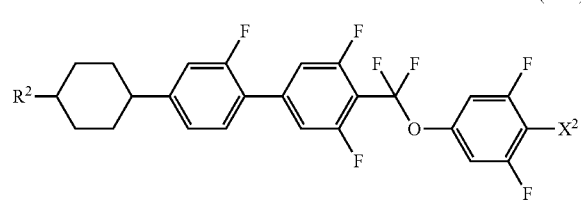
(4-41)
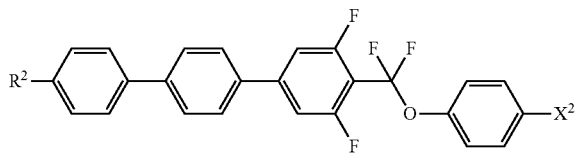
(4-42)
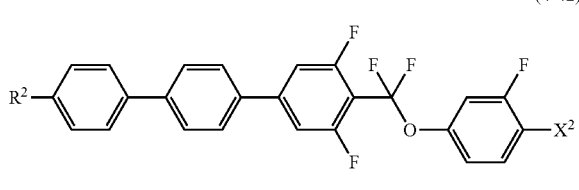
(4-43)
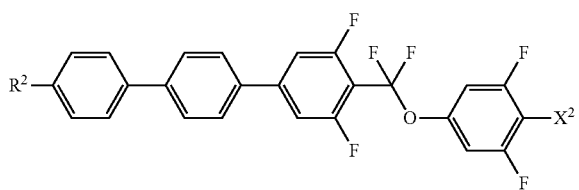
(4-44)
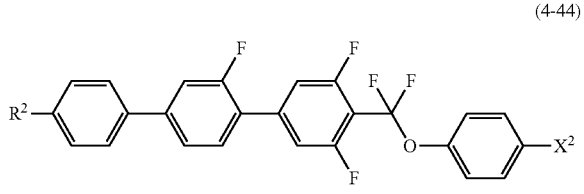
(4-45)
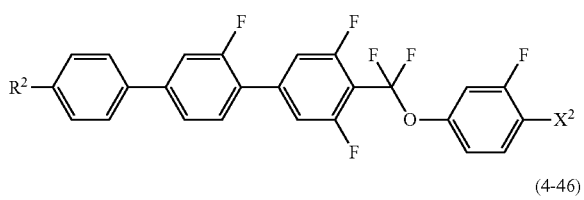
(4-46)
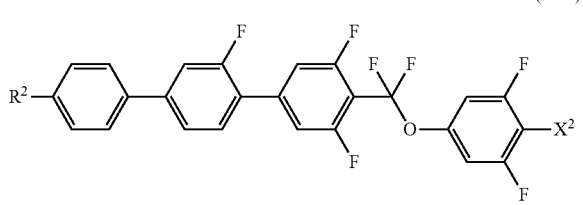
(4-47)
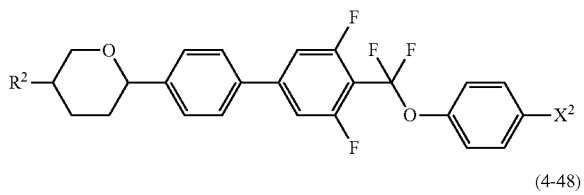
(4-48)
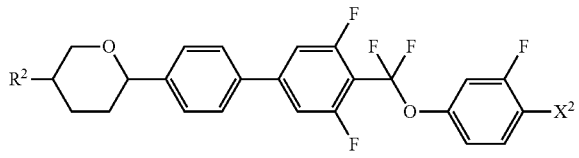

-continued (4-49)
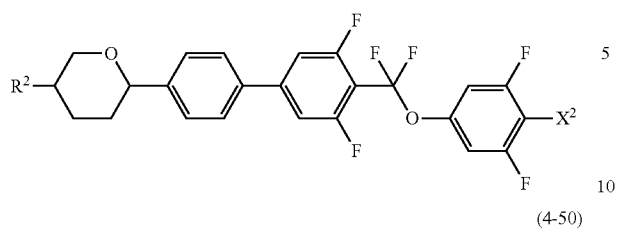

(4-50)
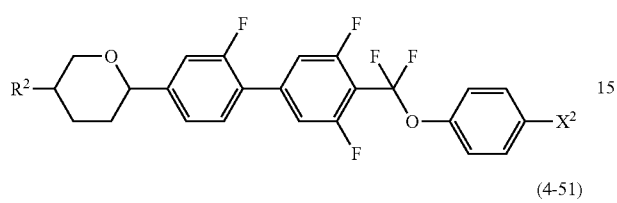

(4-51)
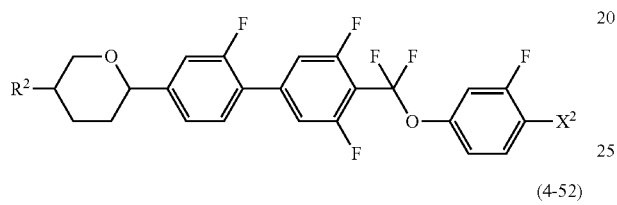

(4-52)
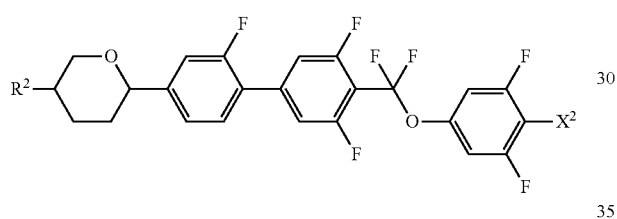

(in these formulas, $R^2$ and $X^2$ are defined as above.)

The compounds of the Formulas (2)-(4) (i.e. Component B) have a positive dielectric anisotropy value and very good thermal or chemical stability, and thus are useful for preparing a liquid crystal composition for TFT. Based on the total weight of the liquid crystal composition, the content of Component B in the liquid crystal composition of the present invention is suitably 1-99 wt %, preferably 10-97 wt %, and more preferably 40-95 wt %.

Preferred examples for the compound of Formula (5) (i.e. Component C) are Formulas (5-1) to (5-62).

(5-1)
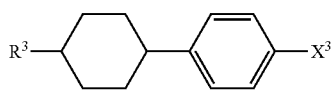

(5-2)
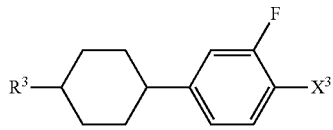

(5-3)
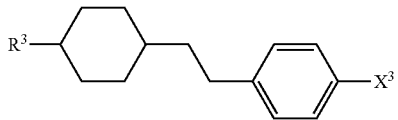

-continued (5-4)
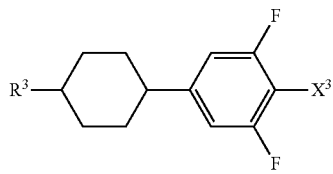

(5-5)
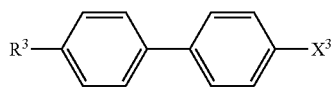

(5-6)
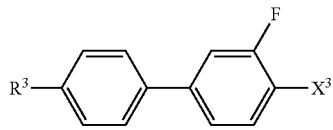

(5-7)
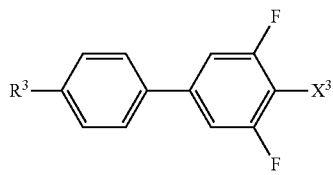

(5-8)
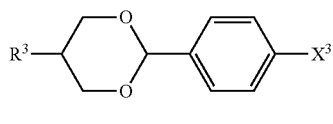

(5-9)
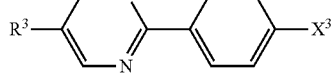

(5-10)
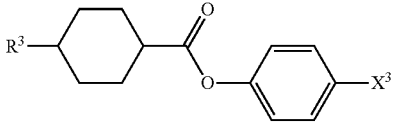

(5-11)
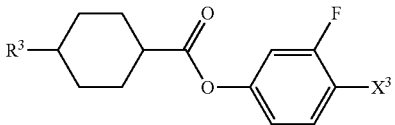

(5-12)
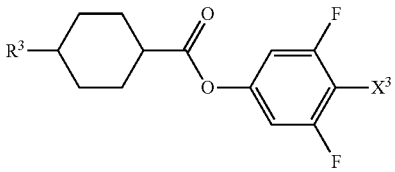

(5-13)
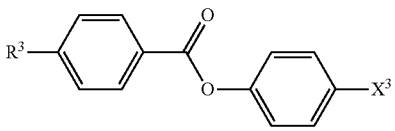

(5-14)
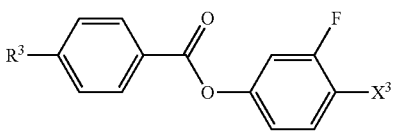

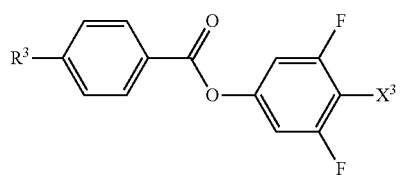 (5-15)
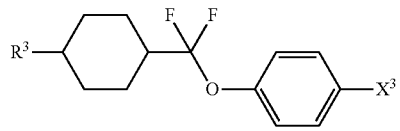 (5-16)
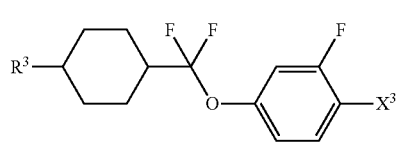 (5-17)
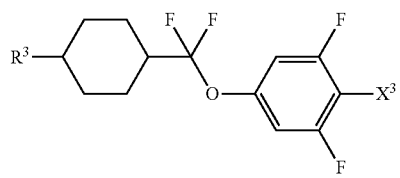 (5-18)
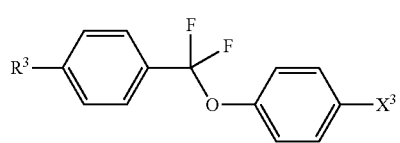 (5-19)
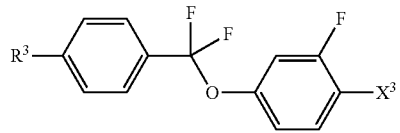 (5-20)
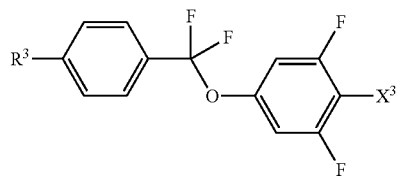 (5-21)
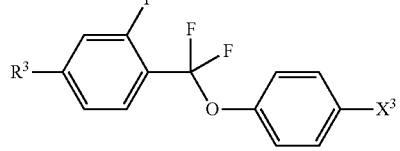 (5-22)
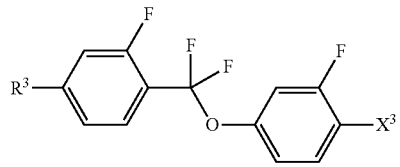 (5-23)
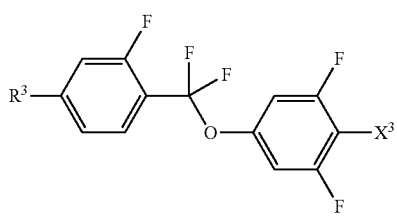 (5-24)
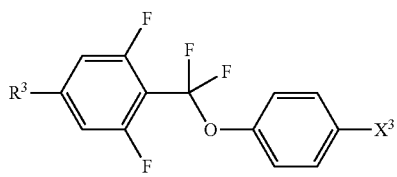 (5-25)
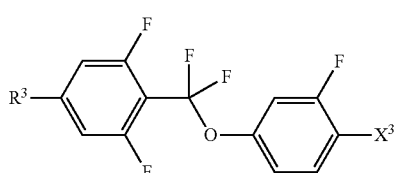 (5-26)
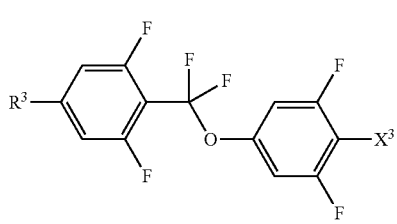 (5-27)
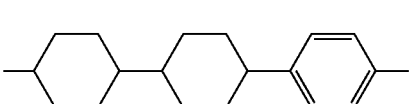 (5-28)
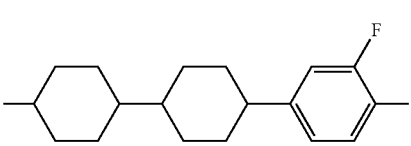 (5-29)
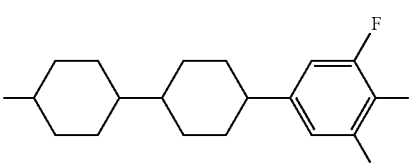 (5-30)
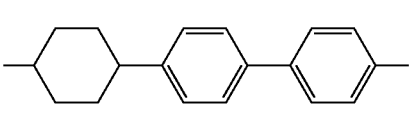 (5-31)
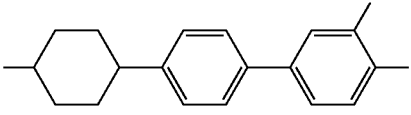 (5-32)

(5-33) 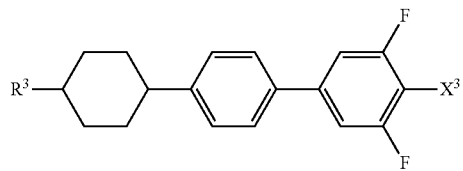
(5-34) 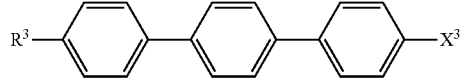
(5-35) 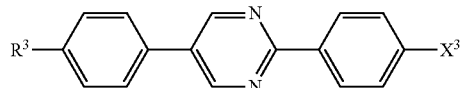
(5-36) 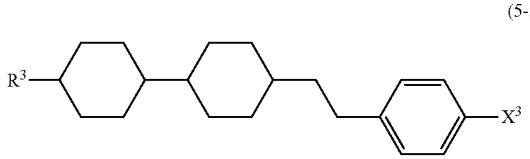
(5-37) 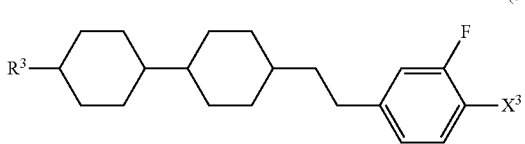
(5-38) 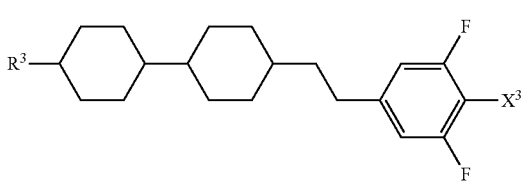
(5-39) 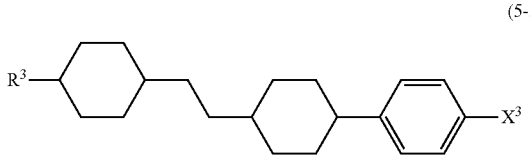
(5-40) 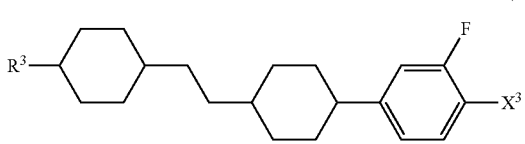
(5-41) 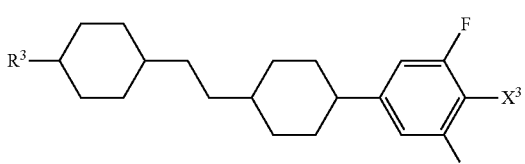
(5-42) 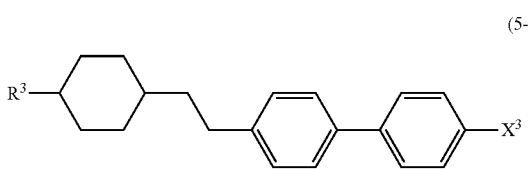
(5-43) 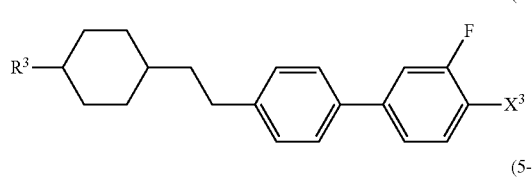
(5-44) 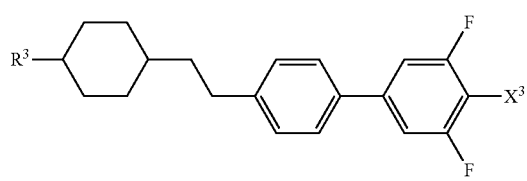
(5-45) 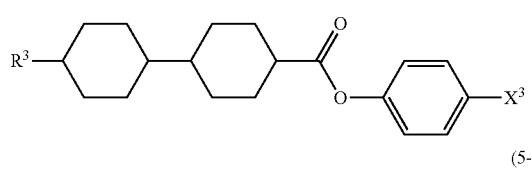
(5-46) 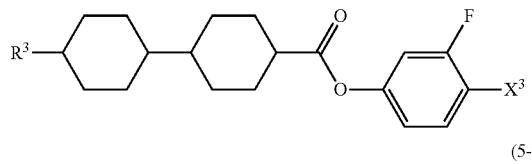
(5-47) 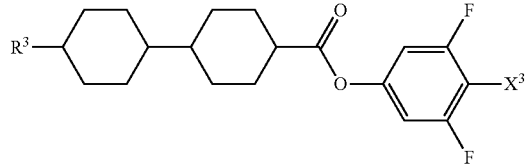
(5-48) 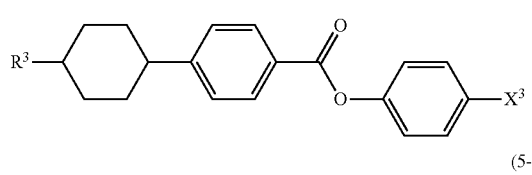
(5-49) 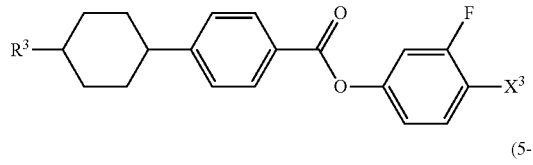
(5-50) 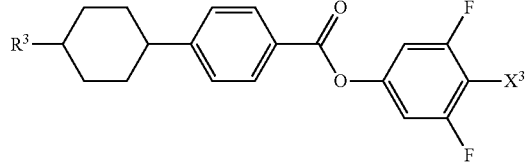
(5-51) 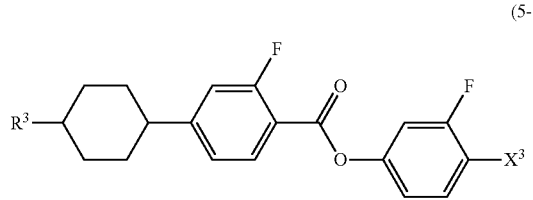

(5-52)
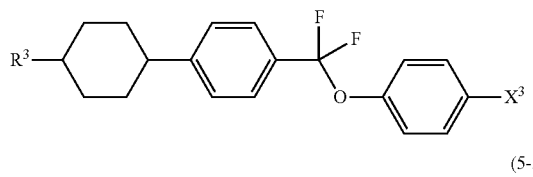

(5-53)
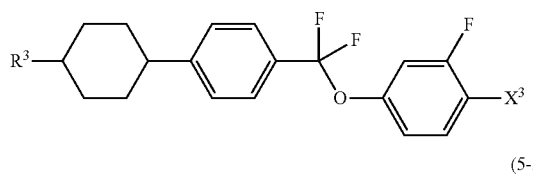

(5-54)
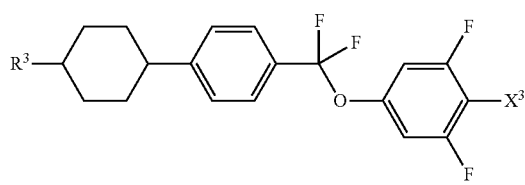

(5-55)
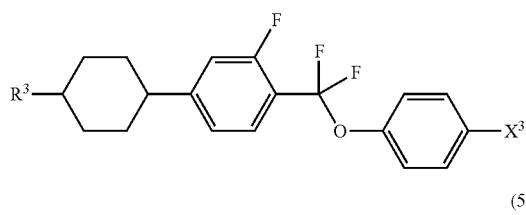

(5-56)
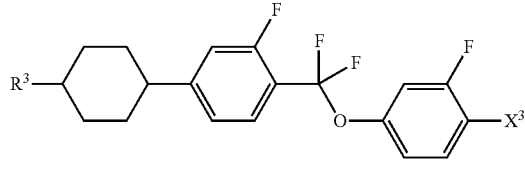

(5-57)
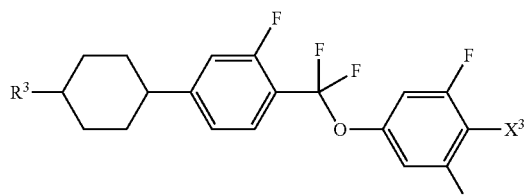

(5-58)
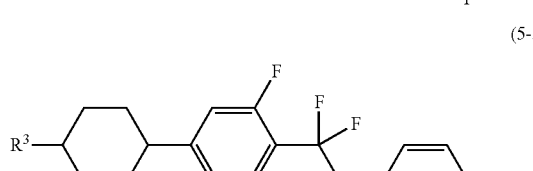

(5-59)
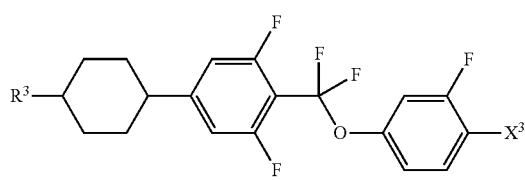

(5-60)
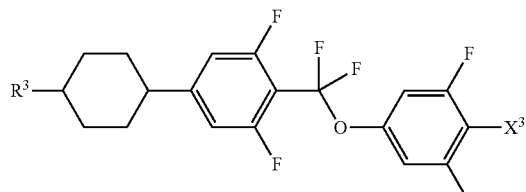

(5-61)
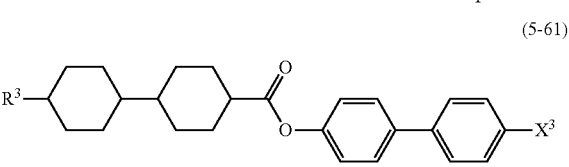

(5-62)

(in the formulas, $R^3$ and $X^3$ are defined as above.)

The compounds of the Formulas (5) (i.e. Component C) has a positive and very large dielectric anisotropy value. The driving voltage of the composition can be lowered, when the liquid crystal composition contains Component C. Moreover, the viscosity and the refractive index anisotropy value can be adjusted, and the temperature range of a liquid crystal phase can be expanded.

Based on the total weight of the composition, the content of Component C is preferably 0.1-99.9 wt %, more preferably 10-97 wt %, and still more preferably 40-95 wt %. Furthermore, the threshold voltage, the liquid crystal phase temperature range, the refractive index anisotropy value, the dielectric anisotropy value, and the viscosity can be adjusted by mixing with the components below.

Preferred examples for the compound of Formula (6) (Component D) are Formulas (6-1)-(6-6).

(6-1)
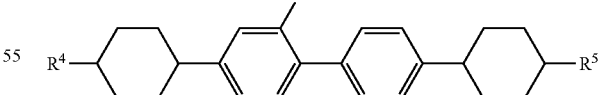

(6-2)
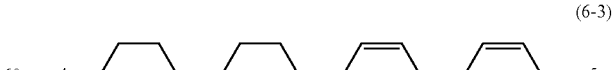

(6-3)

(6-4)
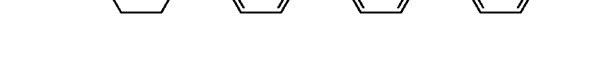

(6-5)

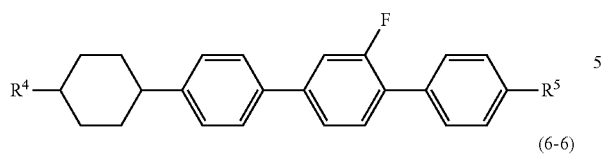

(6-6)

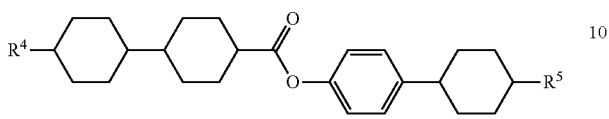

(in the formulas, $R^4$ and $R^5$ are defined as above.)

The compounds of Formula (6) (Component D) have a small absolute value of dielectric anisotropy, and are nearly neutral. The compounds of Formula (6) have the effect of expanding the temperature range of an optically isotropic liquid crystal phase, such as increasing the clear point, or have the effect of adjusting the refractive index anisotropy value.

If the content of the compounds of Component D is increased, the driving voltage of the liquid crystal composition is raised, and the viscosity is lowered. Therefore, the content of the compounds of Component D is expected to be as high as possible, provided that the desired driving voltage of the liquid crystal composition can be met. During the preparation of a liquid crystal composition for TFT, the content of Component D is preferably 60 wt % or less, and more preferably 40 wt % or less, based on the total weight of the composition.

In order for the liquid crystal composition of the present invention to exhibit excellent properties, it is preferred that the liquid crystal composition contains 0.1-99 wt % of at least one compound of Formula (1) of the present invention.

The liquid crystal composition of the present invention generally can be prepared by a well-know method, for example, a method in which essential components are dissolved at high temperature.

3 Compounds (7)-(11)

A third aspect of the present invention is a liquid crystal composition obtained by adding a component selected from Components E and F below to Component A.

Preferably, a component added to Component A is a mixture obtained by mixing Component E or F, where Component E includes at least one compound selected from the group consisting of Formulas (7), (8), (9), and (10) above, and Component F includes at least one compound selected from the group consisting of Formula (11) above.

Moreover, for each component of the liquid crystal composition used in the present invention, an analogue containing isotopes of each element also can be used due to the small difference in physical properties.

In Component E above, preferred examples for the compound of Formula (7) are Formulas (7-1) to (7-8), preferred examples for the compound of Formula (8) are Formulas (8-1) to (8-26), preferred examples for the compound of Formula (9) are Formulas (9-1) to (9-22), and preferred examples for the compound of Formula (10) are Formulas (10-1) to (10-5).

(7-1)

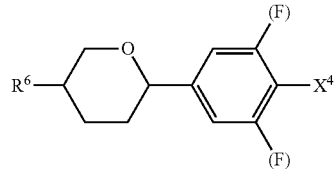

(7-2)

(7-3)

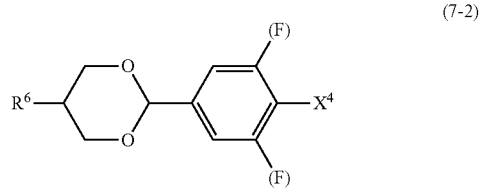

(7-4)

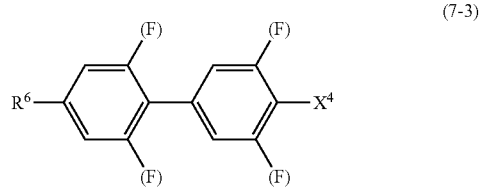

(7-5)

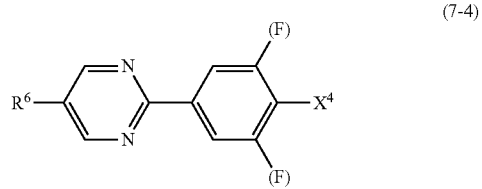

(7-6)

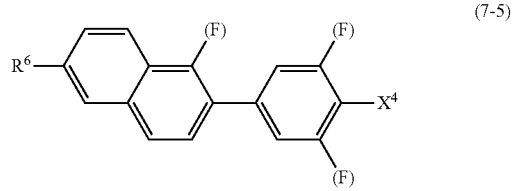

(7-7)

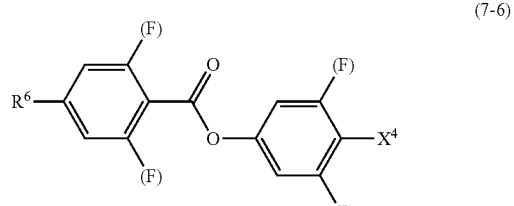

(7-8)

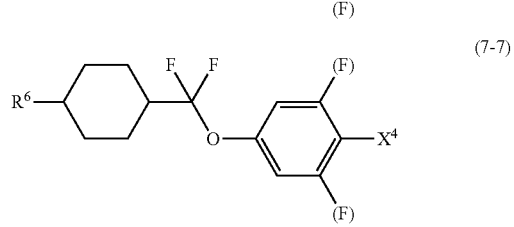

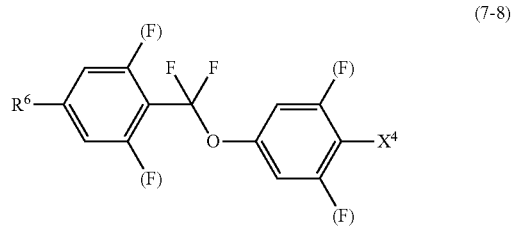

(8-1) 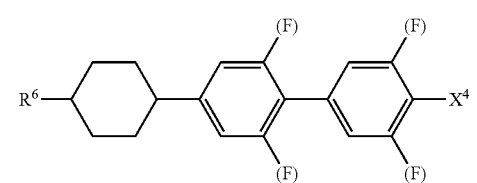
(8-2) 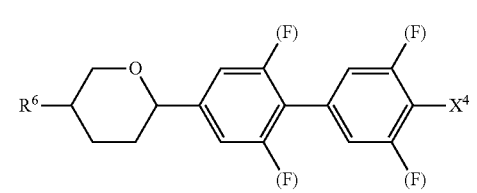
(8-3) 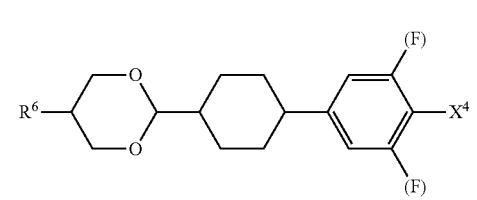
(8-4) 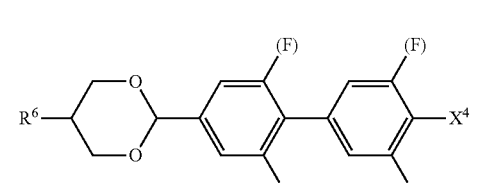
(8-5) 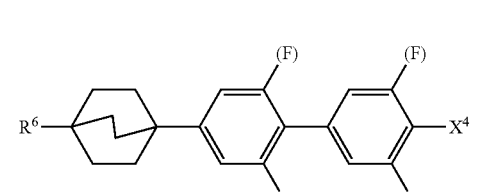
(8-6) 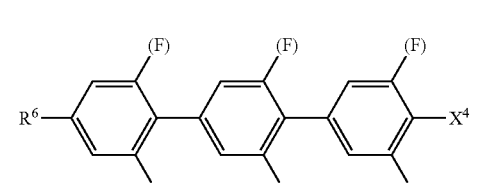
(8-7) 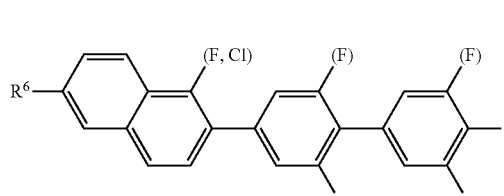
(8-8) 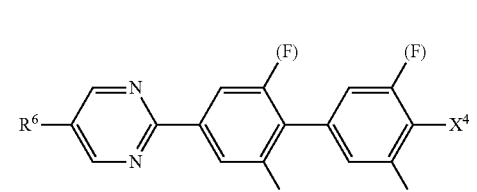
(8-9) 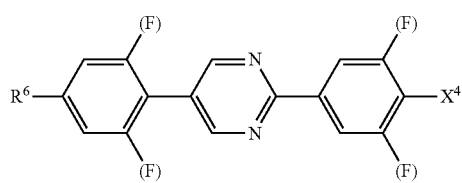
(8-10) 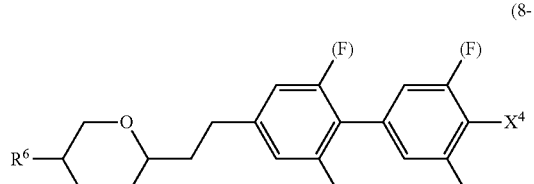
(8-11) 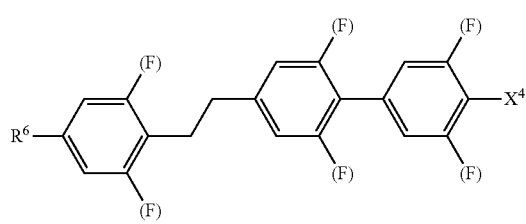
(8-12) 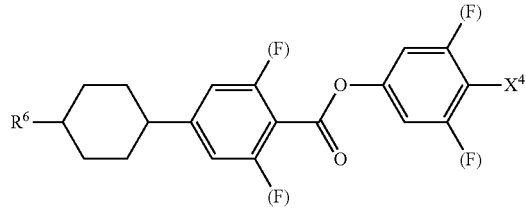
(8-13) 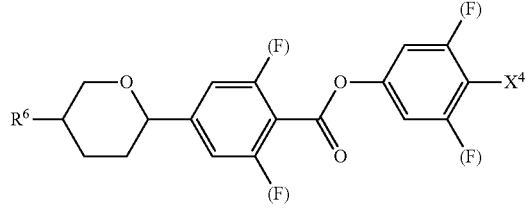
(8-14) 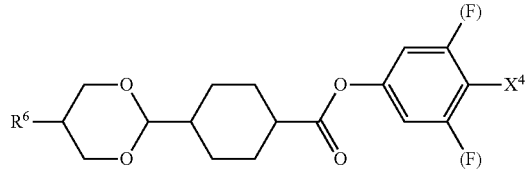
(8-15) 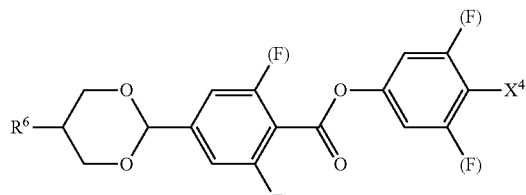

(8-16) 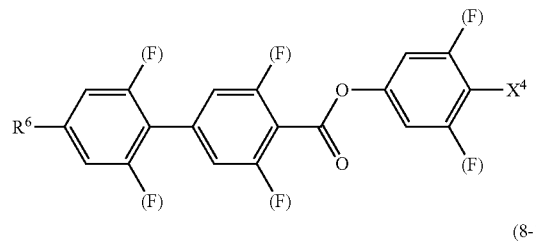
(8-17) 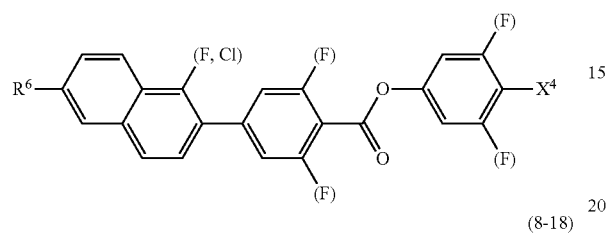
(8-18) 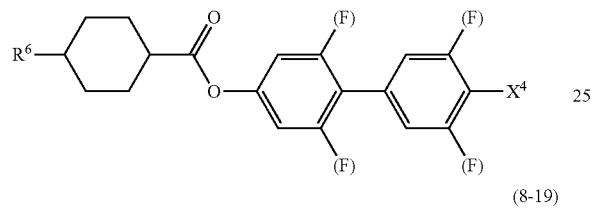
(8-19) 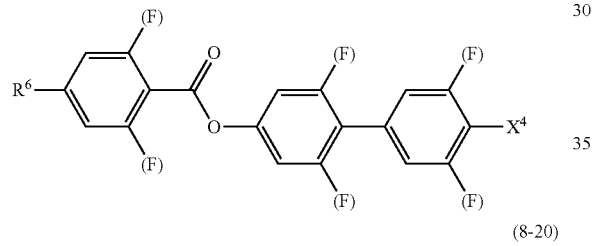
(8-20) 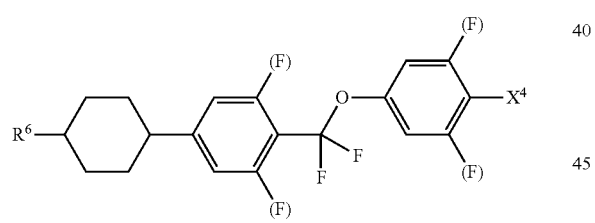
(8-21) 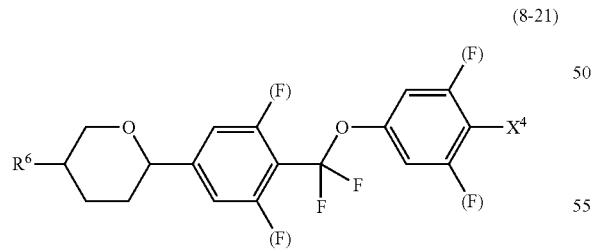
(8-22) 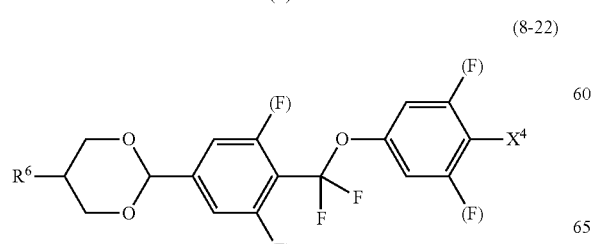
(8-23) 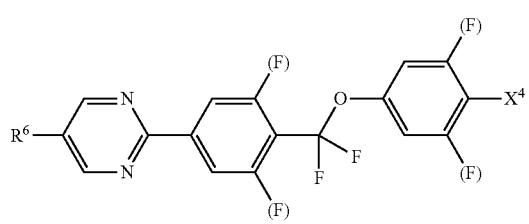
(8-24) 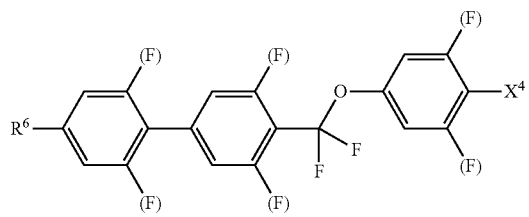
(8-25) 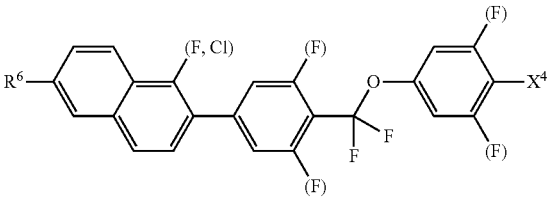
(8-26) 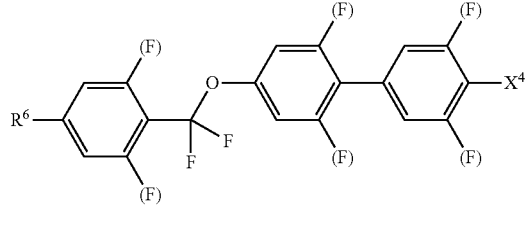
(9-1) 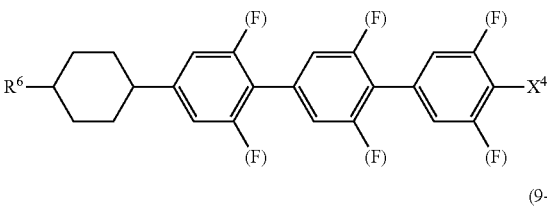
(9-2) 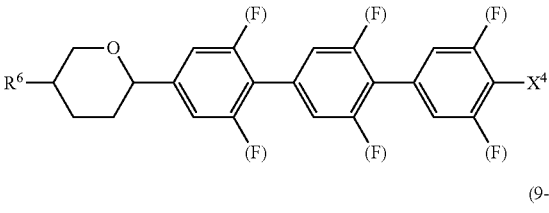
(9-3) 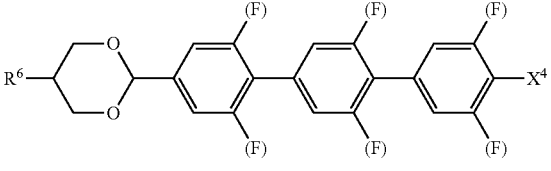

(9-4) 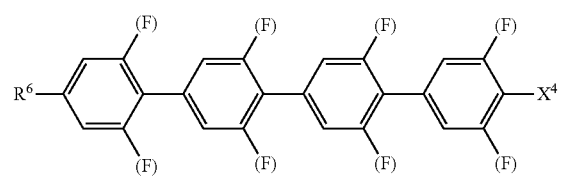
(9-5) 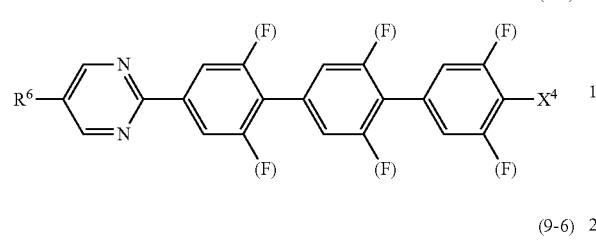
(9-6) 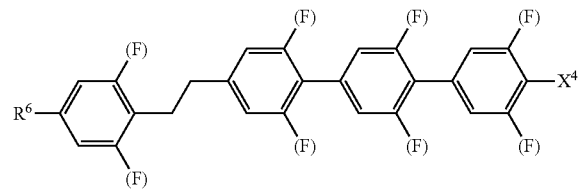
(9-7) 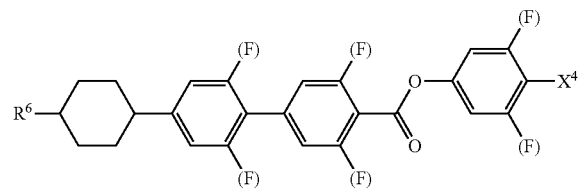
(9-8) 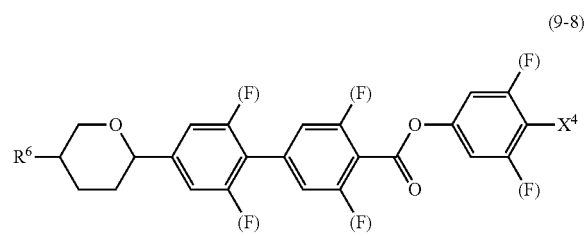
(9-9) 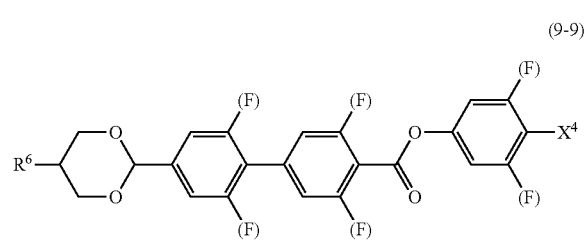
(9-10) 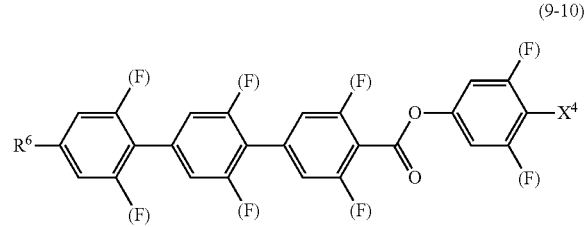
(9-11) 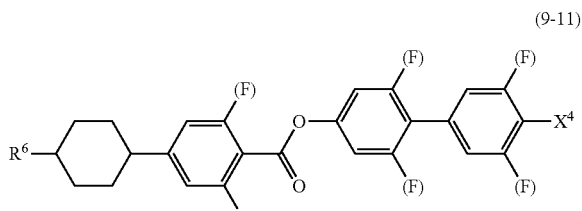
(9-12) 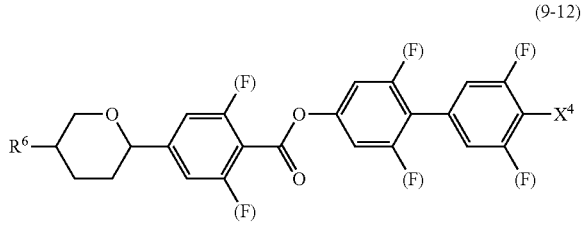
(9-13) 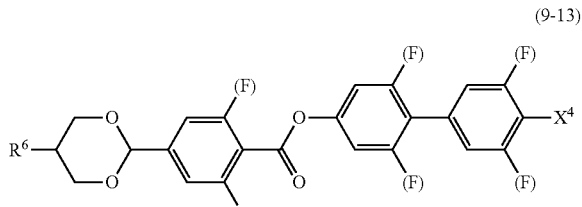
(9-14) 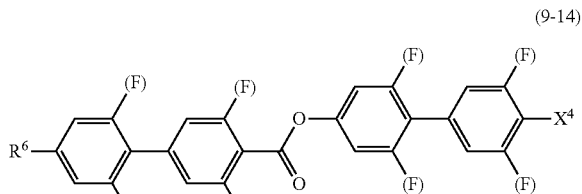
(9-15) 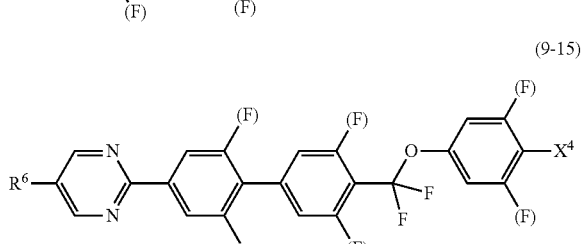
(9-16) 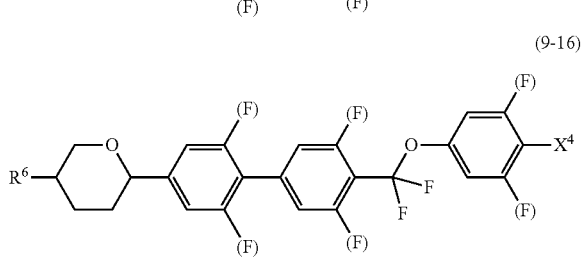
(9-17) 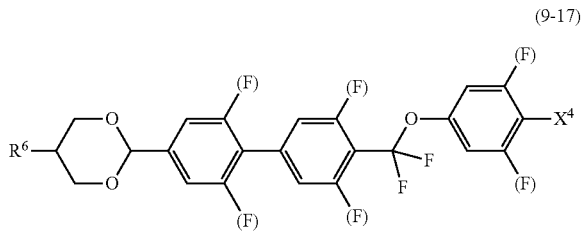

(9-18)
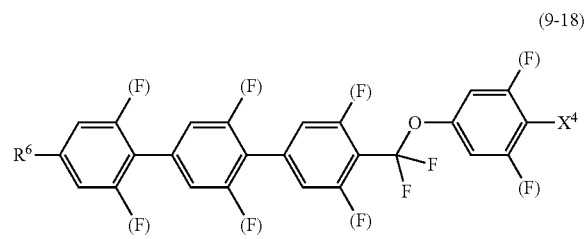

(9-19)
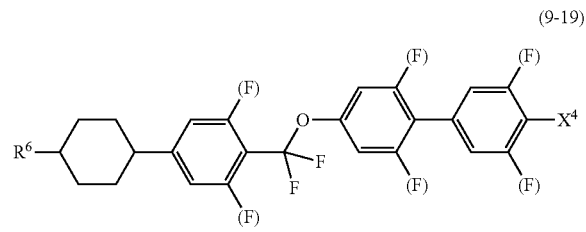

(9-20)
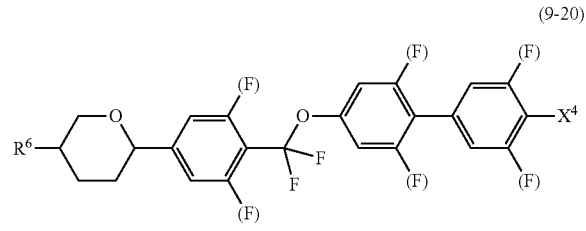

(9-21)
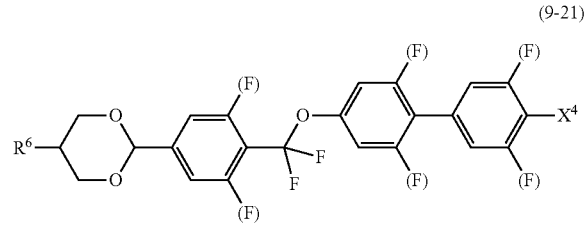

(9-22)
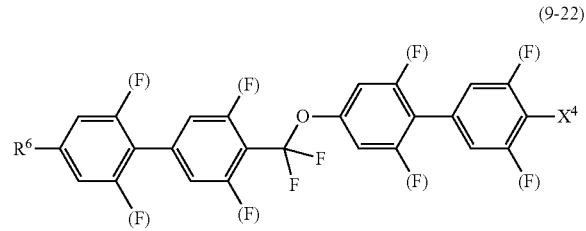

(10-1)
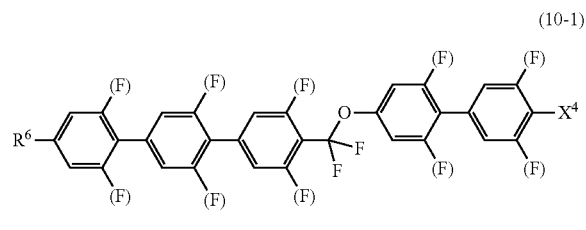

(10-2)
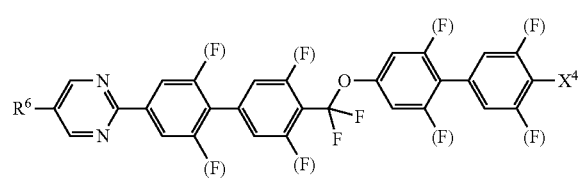

(10-3)
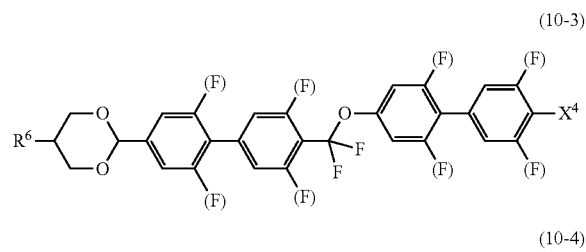

(10-4)
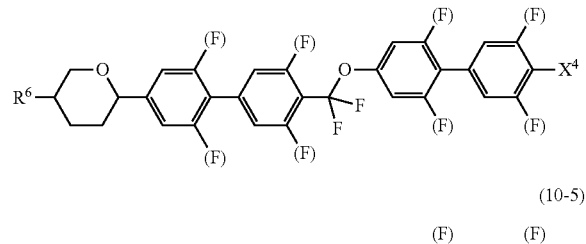

(10-5)
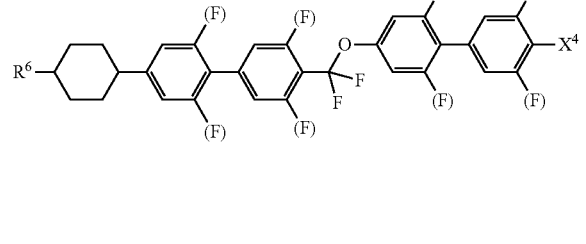

(in the formulas, $R^6$ and $X^4$ are defined as above; and (F) denotes hydrogen or fluorine, and (F, Cl) denotes hydrogen, fluorine, or chlorine.)

The compounds of the Formulas (7)-(10) (i.e. Component E) have a positive and very large dielectric anisotropy value and very good thermal and chemical stability, and thus are suitable for preparing a liquid crystal composition used in active driving such as TFT driving. In the liquid crystal composition of the present invention, the content of Component E is suitably in the range of 1-99 wt %, preferably 10-97 wt %, and more preferably 40-95 wt %, based on total weight of the liquid crystal composition. Furthermore, the clear point and viscosity can be adjusted, when the liquid crystal composition further contains the compounds of Formula (6) (Component D).

Preferred examples for the compound of Formula (11) above (i.e. Component F) are Formulas (11-1) to (11-37).

(11-1)
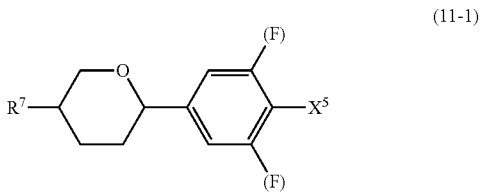

(11-2)
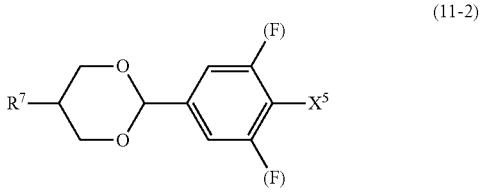

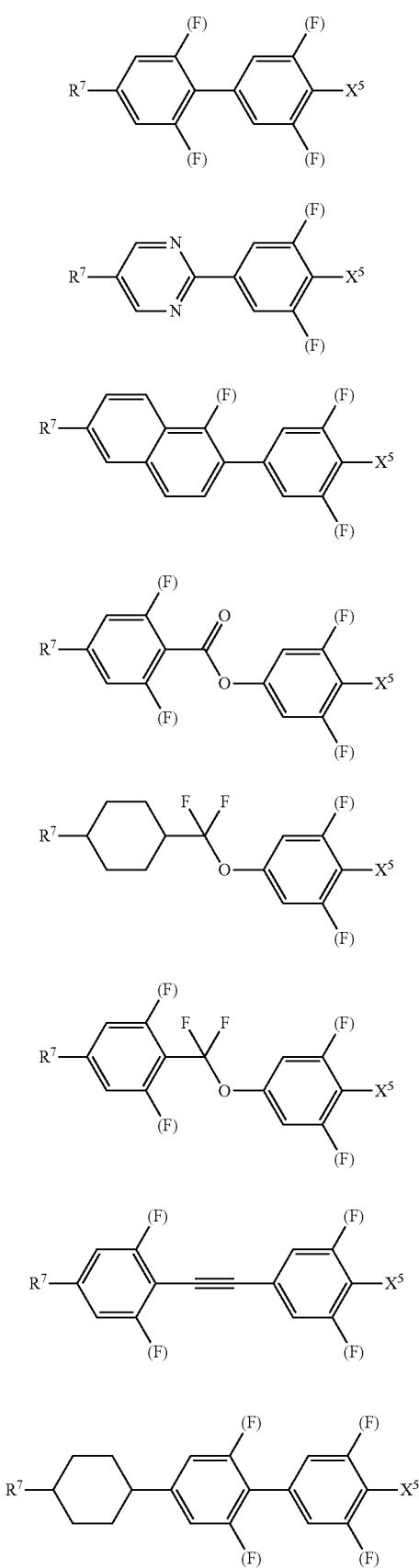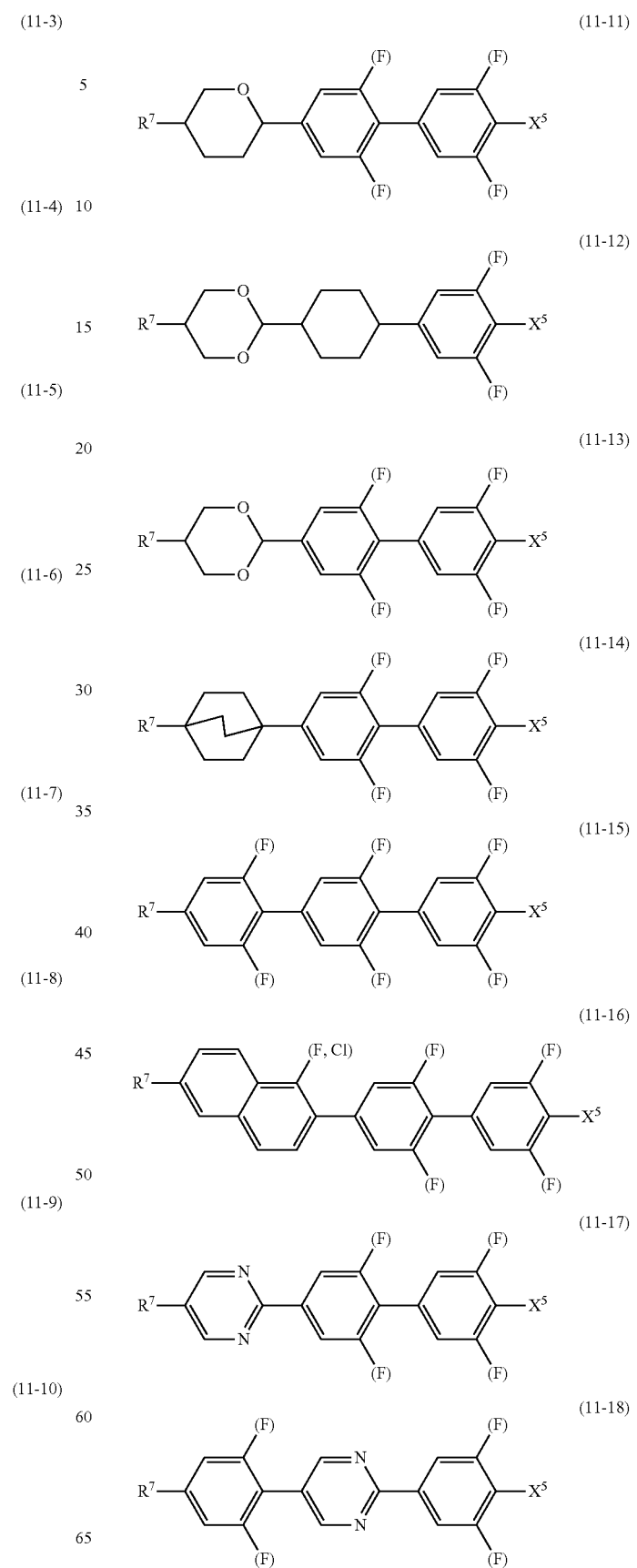

(11-19)
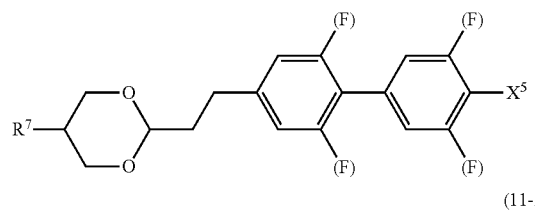
(11-20)
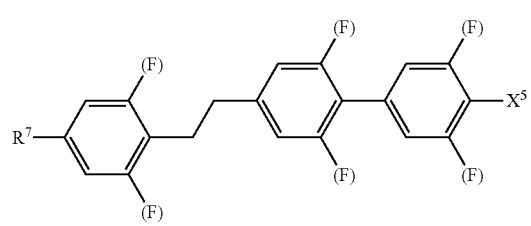
(11-21)
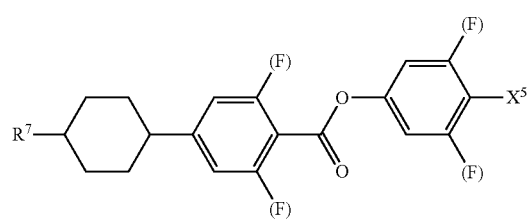
(11-22)
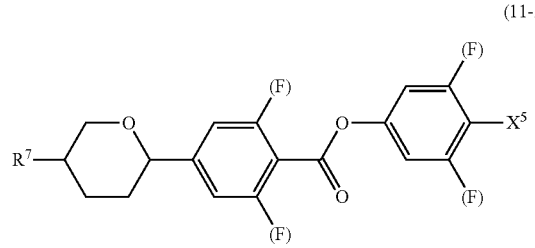
(11-23)
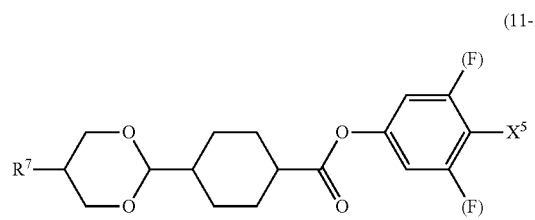
(11-24)
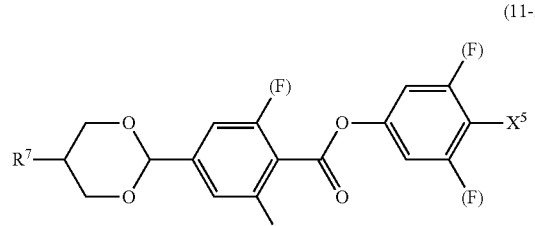
(11-25)
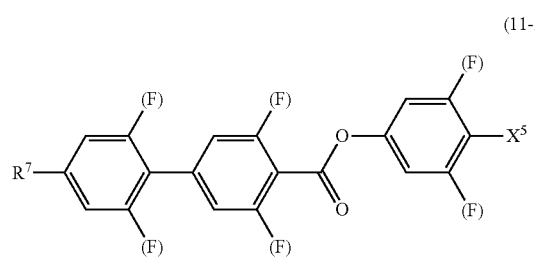
(11-26)
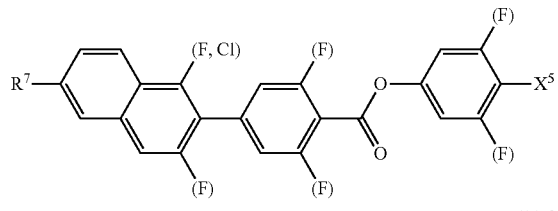
(11-27)
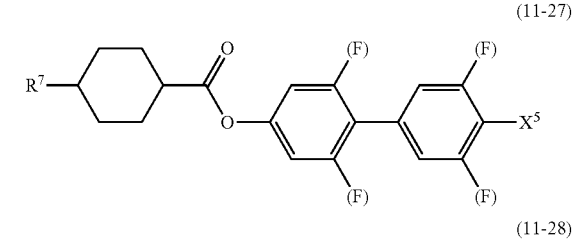
(11-28)
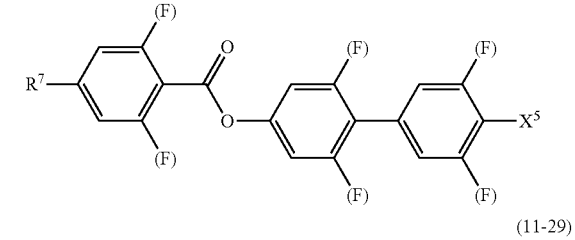
(11-29)
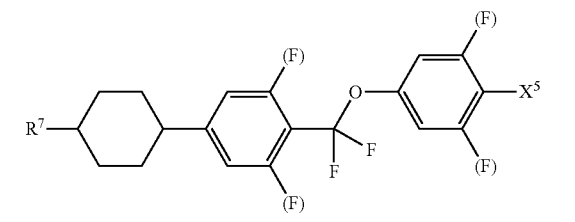
(11-30)
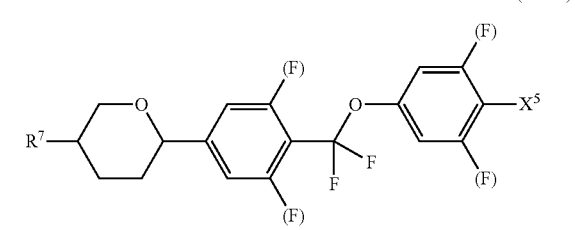
(11-31)
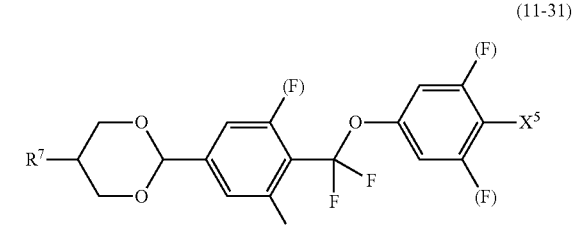
(11-32)
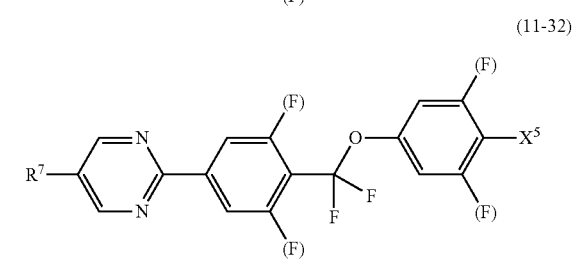

(11-33)

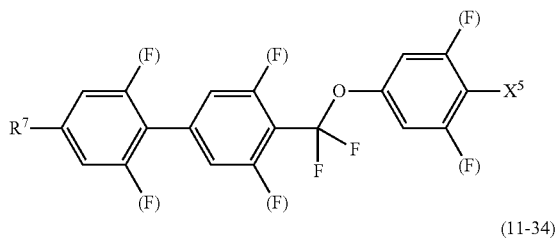

(11-34)

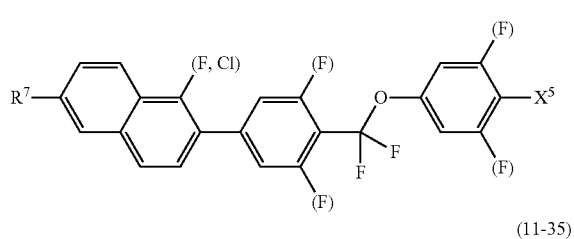

(11-35)

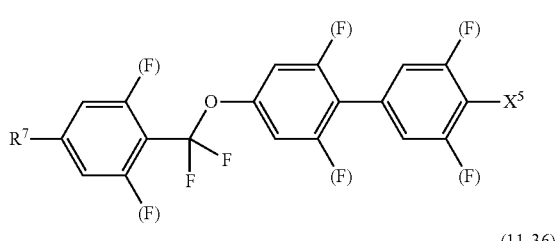

(11-36)

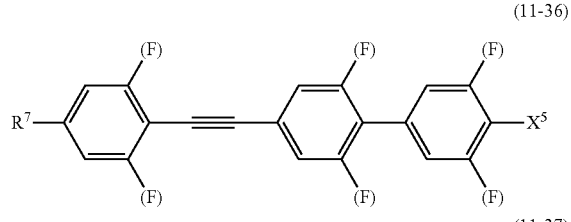

(11-37)

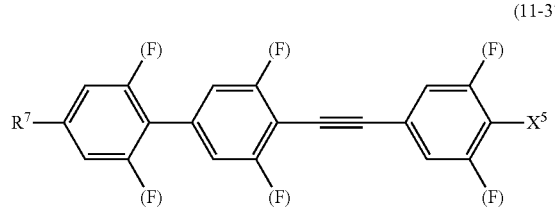

(in the formulas, $R^7$, $X^5$, (F), and (F, Cl) are defined as above.)

These compounds of Formula (11) (i.e. Component F) have a positive and very large dielectric anisotropy value, and thus are mainly used to lower the driving voltage of the devices below: devices driven in an optically isotropic liquid crystal phase, polymer dispersed LCD (PDLCD) devices, polymer network LCD (PNLCD) devices, polymer-stabilized cholesteric LCD (PSCLCD) devices, and so on. When the liquid crystal composition contains Component F, the driving voltage of the composition can be lowered, as well as the viscosity and the refractive index anisotropy value may also be adjusted, and the temperature range of a liquid crystal phase can be expanded. Moreover, Component F may also be used to improve the sharpness.

The content of Component F is preferably in the range of 0.1-99.9 wt %, more preferably 10-97 wt %, and still more preferably 40-95 wt %, based on the total weight of the composition.

4 Composition Having Optically Isotropic Liquid Crystal Phase

4.1 Composition of Composition Having Optically Isotropic Liquid Crystal Phase A fourth aspect of the present invention is a composition containing the compound of Formula (1) and a chiral reagent, which is a liquid crystal composition useful in an optical device driven in an optically isotropic liquid crystal phase and exhibiting an optically isotropic liquid crystal phase.

The compound of Formula (1) has a low clear point, a large dielectric anisotropy, and a large refractive index anisotropy, and the content of the compound of Formula (1) may be 5-100 wt %, preferably 5-80 wt %, and more preferably 10-70 wt %, based on the total weight of the non-chiral liquid crystal composition without a chiral reagent.

The content of the chiral reagent is preferably 1-40 wt %, more preferably 3-25 wt %, and most preferably 5-15 wt %, based on the total weight of the liquid crystal composition. A liquid crystal composition in which the content of the chiral reagent is the range above is likely to have an optically isotropic liquid crystal phase, and thus is preferred.

The chiral reagent contained in the liquid crystal composition may be a single reagent, or a mixture of two or more reagents.

4.2 Chiral Reagent

The chiral reagent contained in the optically isotropic liquid crystal composition is preferably a compound with a large helical twisting power. When a compound with a large helical twisting power is used, the addition amount required for obtaining a desired pitch is reduced, thus preventing the driving voltage from being raised, which is advantageous in practice. Specifically, the compounds of Formulas (K1)-(K5) below are preferred.

(K1)

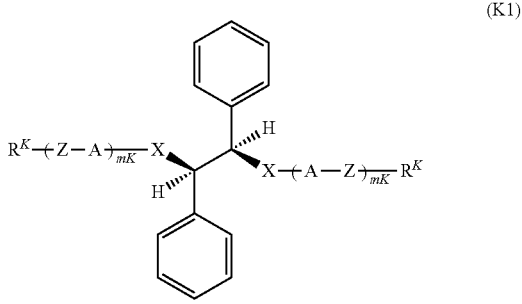

(K2)

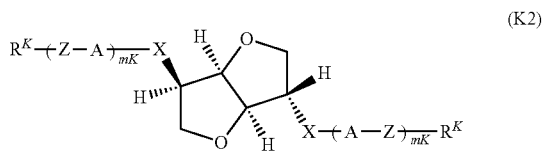

(K3)

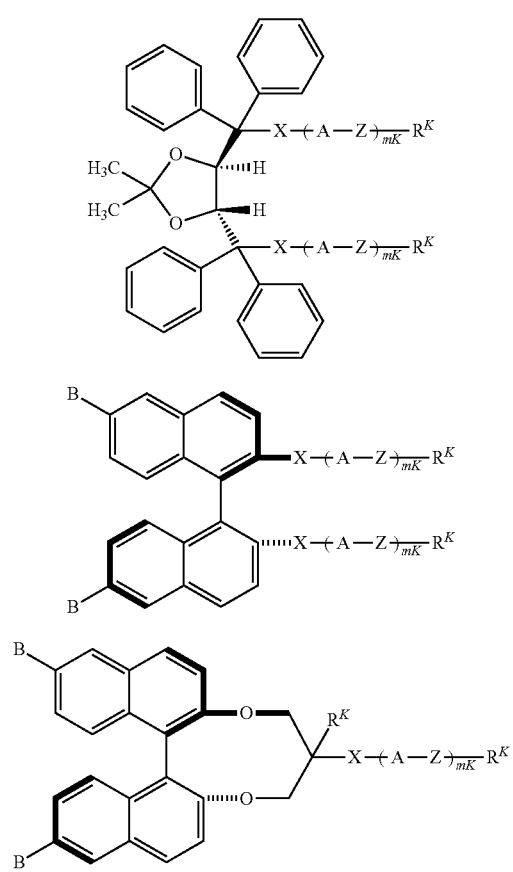

(K4)

(K5)

In Formulas (K1)-(K5), $R^K$ is independently hydrogen, halogen, —C≡N, —N═C═O, —N═C═S or a $C_{1-20}$ alkyl, wherein arbitrary —CH$_2$— in the alkyl may be substituted with —O—, —S—, —COO—, —OCO—, —CH═CH—, —CF═CF— or —C≡C—, and arbitrary hydrogen in the alkyl may be substituted with halogen; A is independently an aromatic or non-aromatic 3 to 8-membered ring, or a fused ring of 9 or more carbons, wherein arbitrary hydrogen in the rings may be substituted with halogen, a $C_{1-3}$ alkyl or a $C_{1-3}$ haloalkyl, —CH$_2$— in the rings may be substituted with —O—, —S— or —NH—, and —CH═ in the rings may be substituted with —N═; B is independently hydrogen, halogen, a $C_{1-3}$ alkyl, a $C_{1-3}$ haloalkyl, an aromatic or non-aromatic 3 to 8-membered ring, or a fused ring of 9 or more carbons, wherein arbitrary hydrogen in the rings may be substituted with halogen, a $C_{1-3}$ alkyl or a $C_{1-3}$ haloalkyl, —CH$_2$— in the rings may be substituted with —O—, —S— or —NH—, and —CH═ in the rings may be substituted with —N═; Z is independently a single bond, or a $C_{1-8}$ alkylene, in which arbitrary —CH$_2$— in the alkylene may be substituted with —O—, —S—, —COO—, —OCO—, —CSO—, —OCS—, —N═N—, —CH═N—, —N═CH—, —CH═CH—, —CF═CF— or —C≡C—, and arbitrary hydrogen in the alkylene may be substituted with halogen; X is a single bond, —COO—, —OCO—, —CH$_2$O—, —OCH$_2$—, —CF$_2$O—, —OCF$_2$—, or —CH$_2$CH$_2$—; and mK is 1-4.

Among these compounds, the chiral reagent added in the liquid crystal composition is preferably Formulas (K2-1)-(K2-8) covered by Formula (K2), Formulas (K4-1)-(K4-6) covered by Formula (K4), and Formulas (K5-1)-(K5-3) covered by Formula (K5).

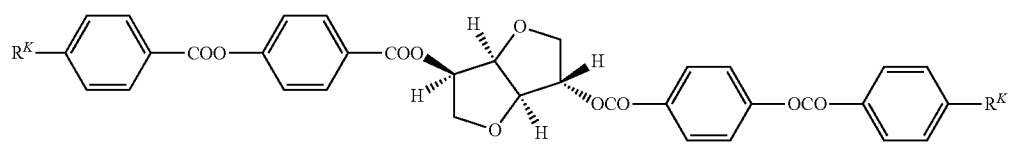

(K2-1)

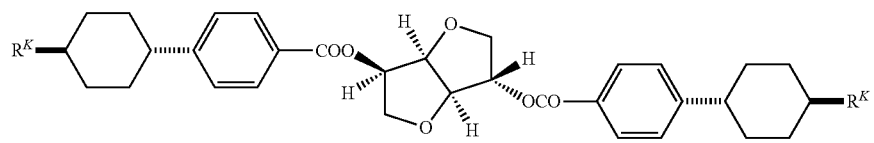

(K2-2)

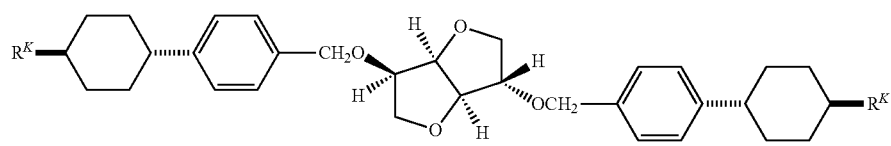

(K2-3)

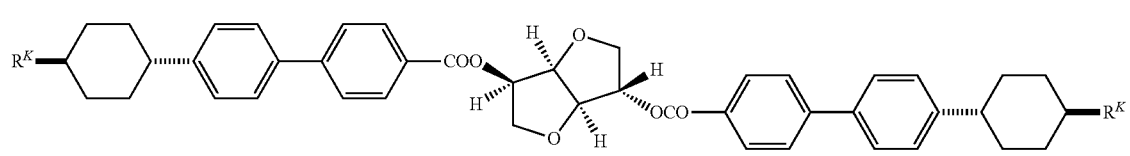

(K2-4)

-continued
(K2-5) 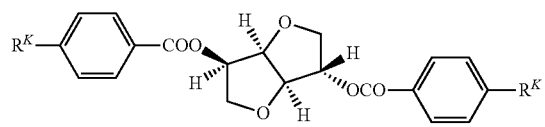
(K2-6) 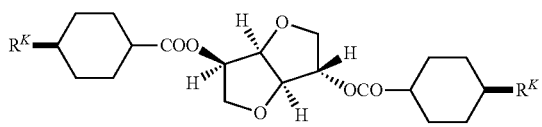
(K2-7) 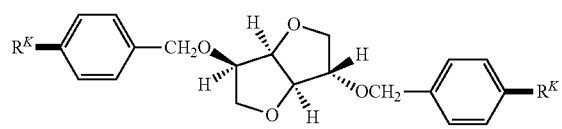
(K2-8) 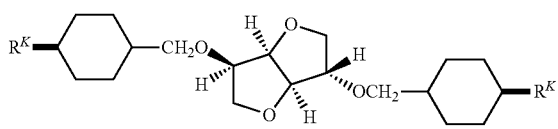
(K4-1) 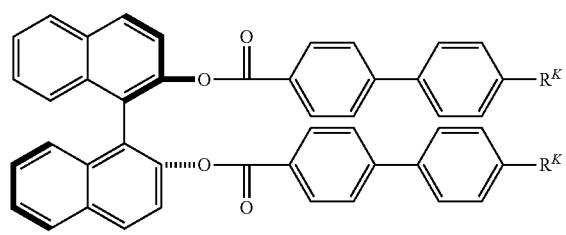
(K4-2) 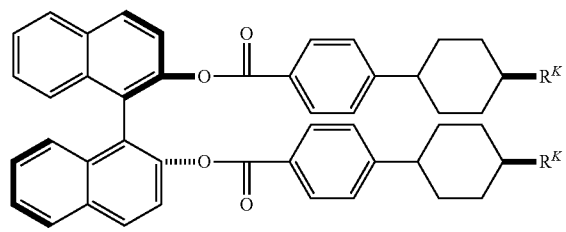
(K4-3) 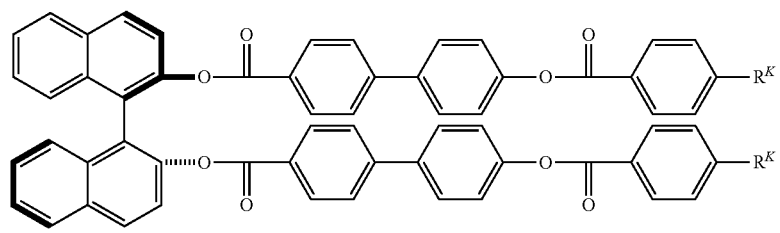
(K4-4) 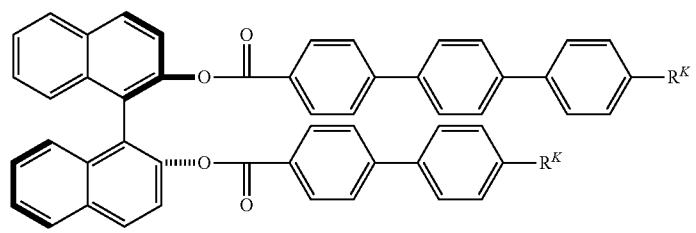
(K4-5) 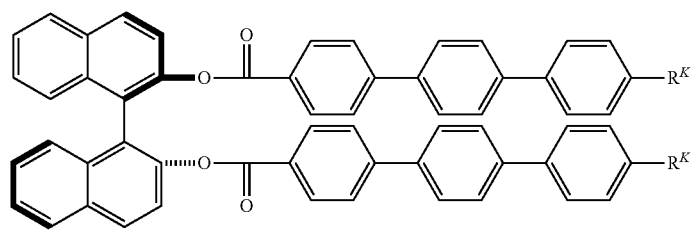

(K4-6)

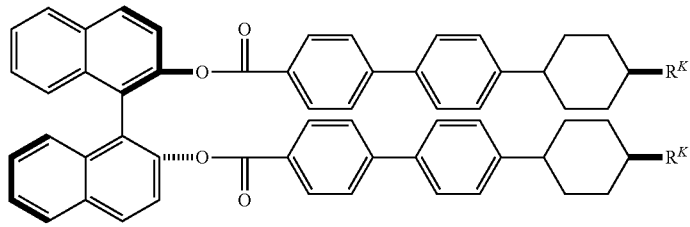

(K5-1)

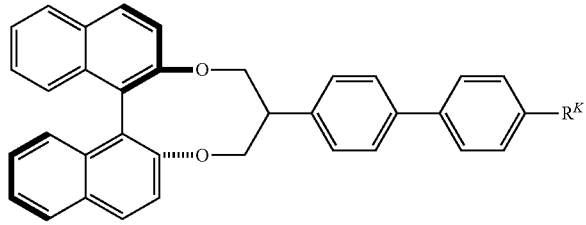

(K5-2)

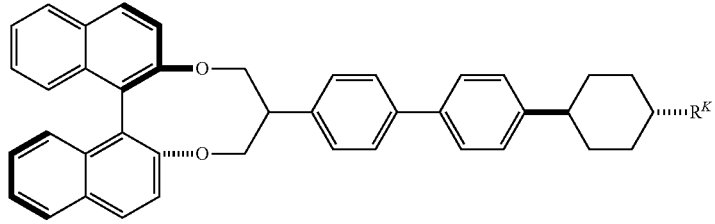

(K5-3)

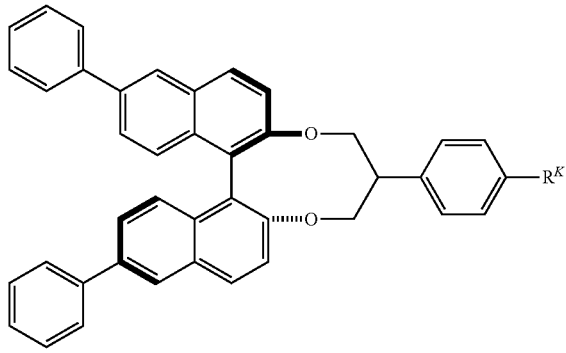

(in the formulas, $R^K$ is independently a $C_{3-10}$ alkyl, wherein —$CH_2$— adjacent to a ring in the alkyl may be substituted with —O—, and arbitrary —$CH_2$— in the alkyl may be substituted with —CH=CH—.)

4.3 Optically Isotropic Liquid Crystal Phase

The so-called liquid crystal composition having optical isotropy means that the composition exhibits optical isotropy because the arrangement of liquid crystal molecules is macroscopically isotropic, but has microscopic liquid crystal order. "Pitch corresponding to the microscopic liquid crystal order of the liquid crystal composition (sometimes referred to as pitch, hereinafter)" is preferably 700 nm or less, more preferably 500 nm or less, and most preferably 350 nm or less.

Herein, the so-called "non-liquid crystal isotropic phase" refers to a commonly defined isotropic phase (i.e. disordered phase), that is, a phase that still exhibits isotropy due to fluctuation, even when a region with a non-zero local order parameter is generated. For example, an isotropic phase exhibited at a high temperature side of a nematic phase is equivalent to the non-liquid crystal isotropic phase in this specification. The chiral liquid crystal in this specification also is similarly defined. Moreover, the so-called "optically isotropic liquid crystal phase" in this specification means a phase that exhibits optical isotropy without fluctuation, an example of which is a phase having platelet tissue (i.e. blue phase in narrow sense).

The optically isotropic liquid crystal composition of the present invention has an optically isotropic liquid crystal phase. However, the typical platelet tissue is not observed in the blue phase under a polarizing microscope sometimes. Therefore, in this specification, a phase exhibiting the platelet tissue is designated as blue phase, and an optically isotropic liquid crystal phase including the blue phase is designated as optically isotropic liquid crystal phase. That is, the blue phase is included in the optically isotropic liquid crystal phase.

Generally, the blue phase can be classified into three types, the blue phase I, the blue phase II, and the blue phase III, and all the three types of blue phases are optical active and isotropic. In the blue phase I or the blue phase II, two or more types of diffracted light produced by the Bragg reflection from different lattice planes are observed. The blue phase is generally observed between the non-liquid crystal isotropic phase and the chiral nematic phase.

That the optically isotropic liquid crystal phase does not exhibit two or more colors of diffracted light means that a platelet tissue observed in the blue phase I, blue phase II is not observed and the phase exhibits substantially a single color in the entire plane. For an optically isotropic liquid crystal phase not exhibiting two or more colors of diffracted light, brightness/darkness of the colors is not necessarily to be even in plane.

The optically isotropic liquid crystal phase not exhibiting two or more colors of diffracted light has the advantage of inhibiting the intensity of reflected light caused by Bragg reflection, or shifting toward the low wavelength side.

Furthermore, when a liquid crystal material reflecting visible light is used in a display device, sometimes a color variation problem may occur. However, for a liquid crystal not exhibiting two or more colors of diffracted light, the reflection of visible light may be eliminated in the helical pitch larger than that in the blue phase in narrow sense (a phase exhibiting the platelet tissue), as a result of reflection wavelength shift toward the low wavelength side.

The optically isotropic liquid crystal composition of the present invention can be obtained by adding a chiral reagent to a composition having a nematic phase. In this case, the chiral reagent is preferably added in a concentration such that the helical pitch is 700 nm or less. Furthermore, the composition having a nematic phase contains the compound of Formula (1) and other optional components. Moreover, the optically isotropic liquid crystal composition of the present invention may also be obtained by adding a chiral reagent to a composition having a chiral nematic phase but no optically isotropic liquid crystal phase. Furthermore, the composition having a chiral nematic phase but no optically isotropic liquid phase contains the compound of Formula (1), an optically active compound, and other optional components. In this case, the optically active compound is preferably added in a concentration such that the helical pitch is 700 nm or more, so as not to exhibit an optically isotropic liquid crystal phase. Herein, the optically active compounds added may be the compounds with a large helical twisting power, that is, the compounds of Formulas (K1)-(K5), (K2-1)-(K2-8), Formulas (K4-1)-(K4-6), or Formulas (K5-1)-(K5-3). Moreover, the optically active compound added may not have a so large helical twisting power. Such an optically active compound is, for example, one added in a liquid crystal composition for a device driven in a nematic phase (for example, the TN mode and the STN mode).

Examples of the optically active compound without a so large helical twisting power are the following optically active Compounds (Op-1)-(Op-13).

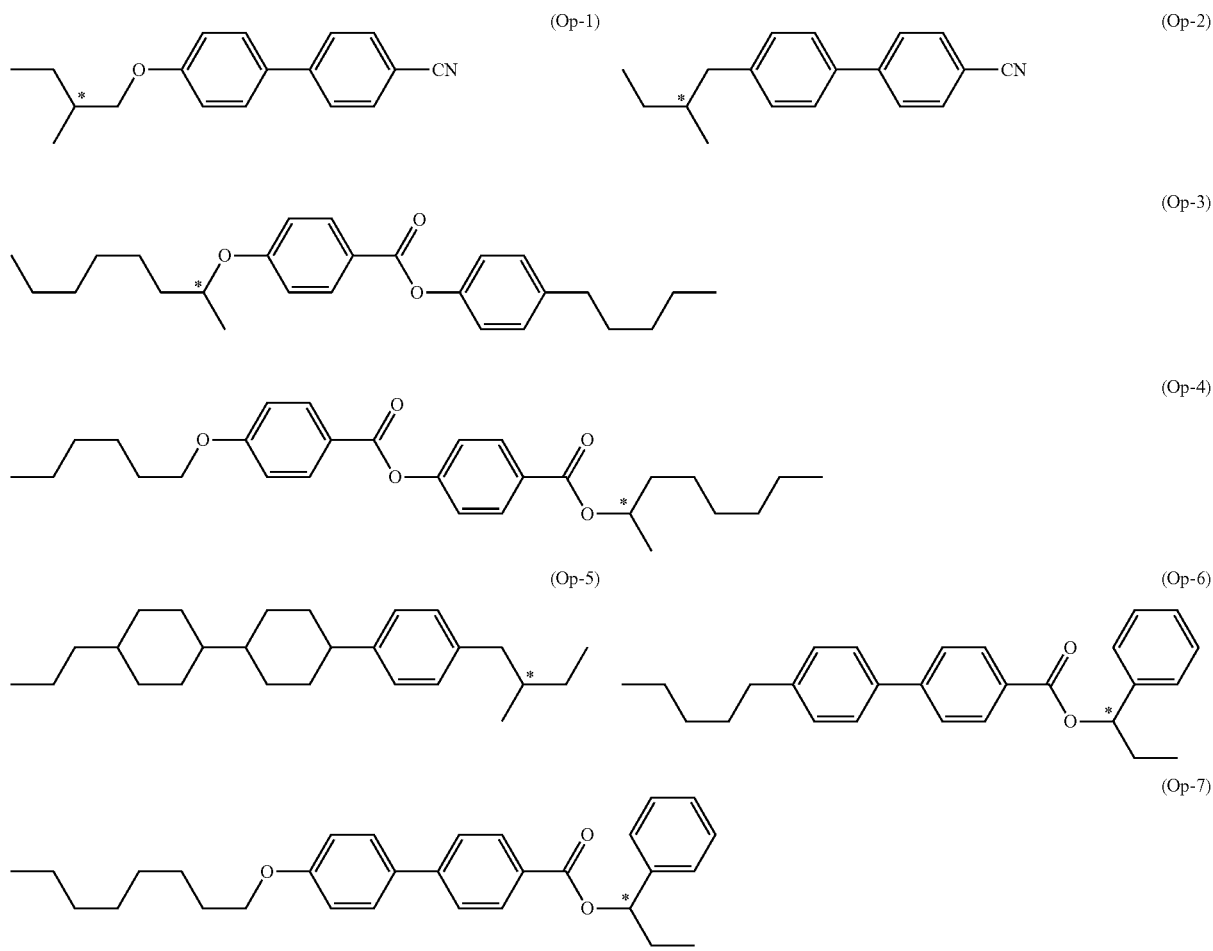

-continued

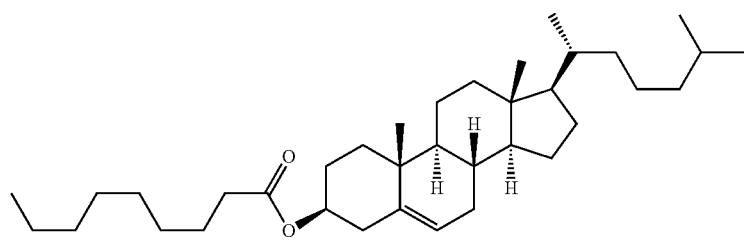
(Op-8)

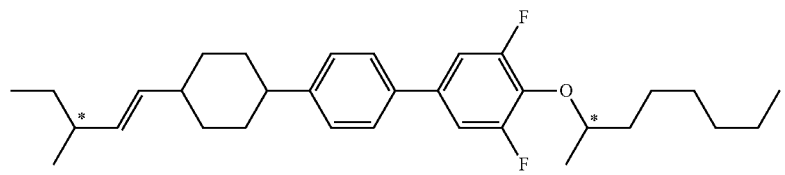
(Op-9)

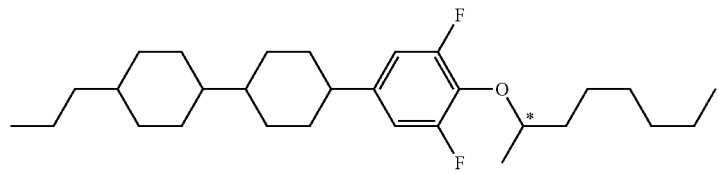
(Op-10)

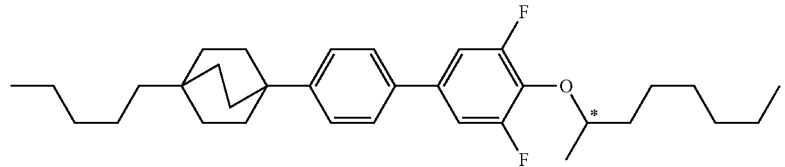
(Op-11)

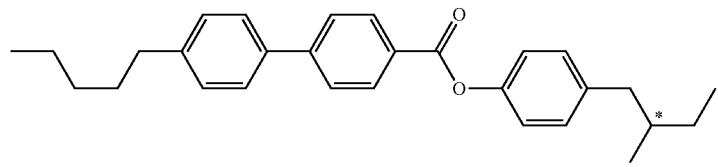
(Op-12)

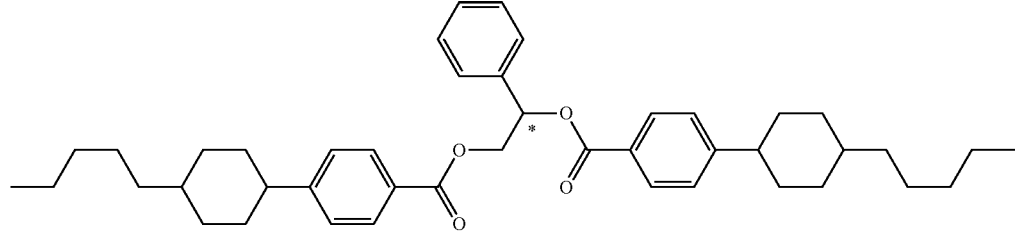
(Op-13)

Moreover, the temperature range of the optically isotropic liquid crystal composition of the present invention may be expanded by adding a chiral reagent to a liquid crystal composition having the co-existence of a nematic phase or a chiral nematic phase and an non-liquid crystal isotropic phase over a wide temperature range for exhibiting an optically isotropic liquid crystal phase. For example, a composition exhibiting an optically isotropic liquid crystal phase in a wide temperature range can be prepared as follows. A liquid crystal compound having a high clear point is mixed with a liquid crystal compound having a low clear point, to prepare a liquid crystal composition with a wide temperature range of the co-existence of a nematic phase and an isotropic phase. Then, a chiral reagent is added to the liquid crystal composition.

For a liquid crystal composition with a wide coexisting temperature range of a nematic phase or chiral nematic phase and a non-liquid crystal isotropic phase, the difference between the upper-limit temperature and lower-limit temperature of the co-existence is preferably 3-150° C., and more preferably 5-150° C. Moreover, for a preferred liquid crystal composition, the difference between the upper-limit temperature and lower-limit temperature of the co-existence of the nematic phase and the non-liquid crystal isotropic phase is 3-150° C.

When an electric field is applied to the liquid crystal medium of the present invention in an optically isotropic liquid crystal phase, an electrically controlled birefringence occurs, but the Kerr effect does not necessarily occur.

Because the electrically controlled birefringence effect of an optically isotropic liquid crystal phase increases with the helical pitch, the electrically controlled birefringence effect can be improved by adjusting the kind and content of the chiral reagent to increase the helical pitch, provided that other optical properties, such as, transmittance and diffraction wavelength, could be satisfied.

4.4 Other Components

Other compounds, such as polymer material, may be further added into the optically isotropic liquid crystal composition of the present invention, so long as they do not affect the properties of the composition. In addition to the polymer material, the liquid crystal composition of the present invention can also contain, for example, a dichroic dye or a photochromic compound. Examples of the dichroic dye include merocyanine dyes, styryl dyes, azo dyes, azomethine dyes, azoxy dyes, quinophthalone dyes, anthraquinone dyes, tetrazine dyes, and so on.

5. Optically Isotropic Polymer/Liquid Crystal Composite Material

A fifth aspect of the present invention is a composite material of a polymer and a liquid crystal composition containing the compound of Formula (1) and a chiral reagent, which exhibits an optical isotropy. The composite material is an optically isotropic polymer/liquid crystal composite material which can be used in an optical device driven in an optically isotropic liquid crystal phase. The optically isotropic polymer/liquid crystal composite material contains a liquid crystal with polymer-stabilized blue phase of Non-patent Document 1, obtained by polymerizing a mixture of a monomer and a liquid crystal in blue phase, or a quasi-isotropic liquid crystal of Non-patent Document 2, obtained by polymerizing a mixture of a monomer and a liquid crystal in isotropic phase. Such a polymer/liquid crystal composite material includes, for example, the liquid crystal composition according to items 1-30 (liquid crystal composition CLC) and a polymer.

The "polymer/liquid crystal composite material" of the present invention has no particular limitation, provided that it is a composite containing a liquid crystal material and a polymer compound, where the polymer compound may be partially or entirely not dissolved in the liquid crystal material, such that the polymer compound is separated from the liquid crystal material. Furthermore, in this specification, a nematic phase refers to one in narrow sense but does not include a chiral nematic phase, unless specifically indicated.

The optically isotropic polymer/liquid crystal composite material according to a preferred aspect of the present invention can exhibit an optically isotropic liquid crystal phase in a wide temperature range. Moreover, the polymer/liquid crystal composite material according to a preferred aspect of the present invention has a very high response speed. Furthermore, based on such effects, the polymer/liquid crystal composite material according to a preferred aspect of the present invention is useful in an optical device such as a display device.

5.2 Polymer

Although the composite material of the present invention can be produced by mixing an optically isotropic liquid crystal composition with a pre-polymerized polymer, it is preferably produced by mixing a low-molecular weight monomer, macromonomer, or oligomer (generally referred to as "monomers", hereinafter) of the polymer, with the liquid crystal composition CLC, and then polymerizing the mixture. In this specification, the mixture containing the monomers and the liquid crystal composition is referred to as "polymerizable monomer/liquid crystal mixture". The "polymerizable monomer/liquid crystal mixture" may optionally contain a polymerization initiator, a curing agent, a catalyst, a stabilizer, a dichroic dye, or a photochromic compound, and so on, without compromising the effects of the present invention. For example, the polymerizable monomer/liquid crystal mixture of the present invention may also optionally contain 0.1-20 weight parts of a polymerization initiator, based on 100 weight parts of the polymerizable monomer.

The polymerization temperature is preferably such a temperature that the polymer/liquid crystal composite material exhibits a high transparency and isotropy, and more preferably such a temperature that the mixture of the monomer and the liquid crystal material exhibits an isotropic phase or a blue phase, while the polymerization is terminated in the isotropic phase or optically isotropic liquid crystal phase. That is, the temperature is preferably set, such that after the polymerization, the polymer/liquid crystal composite material substantially does not scatter light of wavelength greater than that of visible light and exhibits an optical isotropy.

For example, a low-molecular weight monomer, macromonomer, and oligomer can be used as a raw material of the polymer forming the composite material of the present invention. In this specification, the so-called raw material monomer of the polymer covers low-molecular weight monomer, macromonomer, oligomer, and so on. Furthermore, the obtained polymer preferably has a three-dimensional cross-linked structure, so the raw material monomer of the polymer is preferably a multi-functional monomer having two or more polymerizable functional groups. The polymerizable functional groups have no particular limitation, and include, for example, acryloyl, methacryloyl, glycidyl, epoxy, oxetanyl, vinyl, and the like. In view of the polymerization rate, acryloyl and methacryloyl are preferred. It is preferred that the raw material monomer of the polymer contains 10 wt % or more of the monomer having two or more polymerizable functional groups, since the obtained composite material of the present invention can easily exhibit a high transparency and isotropy.

Moreover, in order to obtain a suitable composite material, the polymer preferably has a mesogen moiety, and a part or all of the raw material monomers of the polymer may be the raw material monomers having a mesogen moiety.

5.2.1 Mono- and Difunctional Monomer Having Mesogen Moiety

The mono- or difunctional monomer having a mesogen moiety has no particular limitation in structure, and can be, for example, the compounds of Formula (M1) or (M2) below.

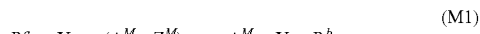

(M1)

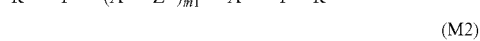

(M2)

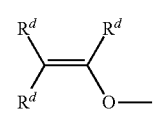

(M3-1)

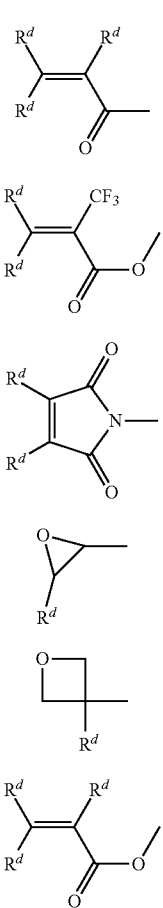

(M3-2)
(M3-3)
(M3-4)
(M3-5)
(M3-6)
(M3-7)

In Formula (M1), $R^a$ is each independently hydrogen, halogen, —C≡N, —N═C═S, or a $C_{1\text{-}20}$ alkyl, in which arbitrary —CH$_2$— may be substituted with —O—, —S—, —CO—, —COO—, —OCO—, —CH═CH—, —CF═CF— or —C≡C—, and arbitrary hydrogen may be substituted with halogen or —C≡N. $R^b$ is each independently polymerizable group of Formulas (M3-1)-(M3-7).

$R^a$ is preferably hydrogen, halogen, —C≡N, —CF$_3$, —CF$_2$H, —CFH$_2$, —OCF$_3$, —OCF$_2$H, a $C_{1\text{-}20}$ alkyl, a $C_{1\text{-}19}$ alkoxy, a $C_{2\text{-}21}$ alkenyl, and a $C_{2\text{-}21}$ alkynyl. Particularly preferably, $R^a$ is a $C_{1\text{-}20}$ alkyl and a $C_{1\text{-}19}$ alkoxy.

In Formula (M2), $R^b$ is each independently a polymerizable group of Formulas (M3-1)-(M3-7).

Herein, in Formulas (M3-1)-(M3-7), $R^d$ is each independently hydrogen, halogen or a $C_{1\text{-}5}$ alkyl, in which arbitrary hydrogen may be substituted with halogen. $R^d$ is preferably hydrogen, halogen and methyl. Most preferably, $R^d$ is hydrogen, fluorine and methyl.

Furthermore, Formula (M3-2), Formula (M3-3), Formula (M3-4), and Formula (M3-7) are suitably polymerized through free radical polymerization. Formula (M3-1), Formula (M3-5), and Formula (M3-6) are suitably polymerized through cationic polymerization. The polymerizations above are living polymerizations, and are initiated when a small amount of free radicals or cationic active species are generated in the reaction system. In order to accelerate the generation of the active species, a polymerization initiator may be used. Light or heat may be used to generate active species.

In Formulas (M1) and (M2), $A^M$ is each independently an aromatic or non-aromatic 5 or 6-membered ring, or a fused ring of 9 or more carbons, in which —CH$_2$— may be substituted with —O—, —S—, —NH— or —NCH$_3$—, —CH═ may be substituted with —N═, and hydrogen atoms may be substituted with halogen, and a $C_{1\text{-}5}$ alkyl or a $C_{1\text{-}5}$ haloalkyl. Specific examples of preferred $A^M$ are 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, in which arbitrary —CH$_2$— may be substituted with —O—, arbitrary —CH═ may be substituted with —N═, and arbitrary hydrogen may be substituted with halogen, a $C_{1\text{-}5}$ alkyl or a $C_{1\text{-}5}$ haloalkyl.

In consideration of the stability of the compound, —CH$_2$—O—CH$_2$—O— with oxygen being not adjacent to one another is preferred to —CH$_2$—O—O—CH$_2$— with oxygen being adjacent to one another. The same case is applicable to sulfur.

Among the groups, preferred $A^M$ is 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl, and pyrimidine-2,5-diyl. Moreover, the stereo configuration of 1,4-cyclohexylene and 1,3-dioxane-2,5-diyl above is in trans-configuration superior to in cis-configuration.

Because 2-fluoro-1,4-phenylene and 3-fluoro-1,4-phenylene are identical in structure, the latter is not exemplified. This rule is also applicable to the relationship between 2,5-difluoro-1,4-phenylene and 3,6-difluoro-1,4-phenylene.

In Formulas (M1) and (M2), Y is each independently a single bond or a $C_{1\text{-}20}$ alkylene, in which arbitrary —CH$_2$— may be substituted with —O—, —S—, CH═CH—, —C≡C—, —COO— or —OCO—. Y is preferably a single bond, —(CH$_2$)$_{m2}$—, —O(CH$_2$)$_{m2}$— and —(CH$_2$)$_{m2}$O— (where m2 is an integer of 1-20). Particularly preferably, Y is a single bond, —(CH$_2$)$_{m2}$—, —O(CH$_2$)$_{m2}$— and —(CH$_2$)$_{m2}$O— (where m2 is an integer of 1-10). In consideration of the stability of the compound, —Y—$R^a$ and —Y—$R^b$ are preferably those not having —O—O—, —O—S—, —S—O—, or —S—S—.

In Formulas (M1) and (M2), $Z^M$ is each independently a single bond, —(CH$_2$)$_{m3}$—, —O(CH$_2$)$_{m3}$—, —(CH$_2$)$_{m3}$O—, —O(CH$_2$)$_{m3}$O—, —CH═CH—, —C≡C—, —COO—, —OCO—, —(CF$_2$)$_2$—, —(CH$_2$)$_2$—COO—, —OCO—(CH$_2$)$_2$—, —CH═CH—COO—, —OCO—CH═CH—, —C≡C—COO—, —OCO—C≡C—, —CH═CH—(CH$_2$)$_2$—, —(CH$_2$)$_2$—CH═CH—, —CF═CF—, —C≡C—CH═CH—, —CH═CH—C≡C—, —OCF$_2$—(CH$_2$)$_2$—, —(CH$_2$)$_2$—CF$_2$O—, —OCF$_2$— or —CF$_2$O— (where m3 is an integer of 1-20). $Z^M$ is preferably a single bond, —(CH$_2$)$_{m3}$—, —O(CH$_2$)$_{m3}$—, —(CH$_2$)$_{m3}$O—, —CH═CH—, —C≡C—, —COO—, —OCO—, —(CH$_2$)$_2$—COO—, —OCO—(CH$_2$)$_2$—, —CH═CH—COO—, —OCO—CH═CH—, —OCF$_2$— and —CF$_2$O—.

In Formulas (M1) and (M2), m1 is an integer of 1-6, and preferably an integer of 1-3. When m1 is 1, they are bicyclic compounds having two, for example, 6-membered rings. When m1 is 2 or 3, they are separately tricyclic and tetracyclic compounds. For example, when m1 is 1, the two $A^M$s can be identical or different. Moreover, for example, when m1 is 2, the three $A^M$s (or two $Z^M$s) can be identical or different. When m1 is 3-6, it is also the case. The case is also applicable to $R^a$, $R^b$, $R^d$, $Z^M$, $A^M$ and Y.

Even the Compound (M1) of Formula (M1) and the Compound (M2) of Formula (M2) contains an isotope in an amount higher than the relative isotopic abundance, such as $^2$H (deuterium) and $^{13}$C, the Compound (M1) and the Compound (M2) are useful, due to the identical properties.

More preferred examples of Compounds (M1) and (M2) are Compounds (M1-1)-(M1-41) and (M2-1)-(M2-27). In these compounds, $R^a$, $R^b$, $R^d$, $Z^M$, $A^M$, Y and p are defined as in the cases of Formulas (M1) and (M2) in the above aspects of the present invention.

Partial structures of Compounds (M1-1)-(M1-41) and Compounds (M2-1)-(M2-27) are described as follows. Partial Structure (a1) represents 1,4-phenylene in which arbitrary hydrogen atom is substituted with fluorine. Partial Structure (a2) represents 1,4-phenylene in which arbitrary hydrogen is substituted with fluorine. Partial Structure (a3) represents 1,4-phenylene in which arbitrary hydrogen is substituted with fluorine or methyl. Partial Structure (a4) represents fluorene in which hydrogen at position 9 may be substituted with methyl.

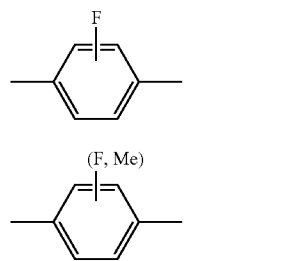

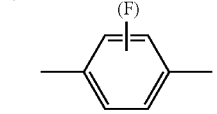

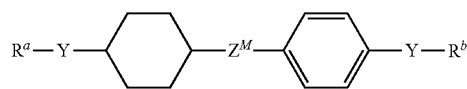

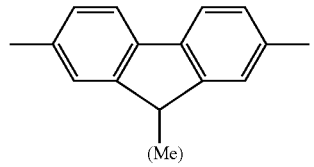

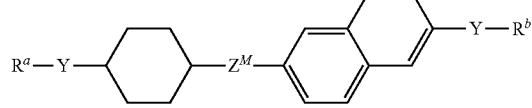

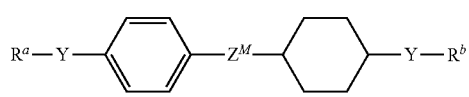

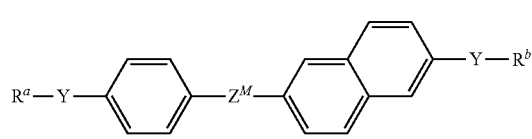

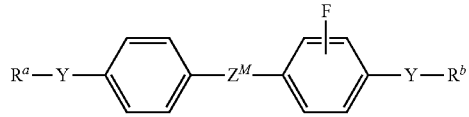

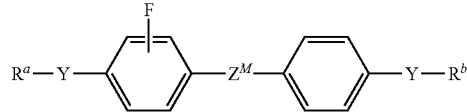

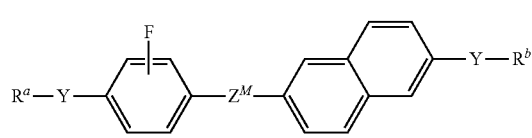

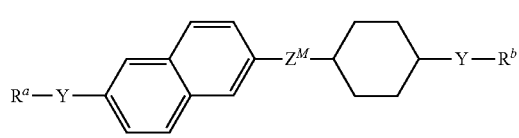

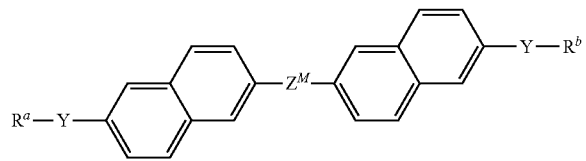
(M1-15)
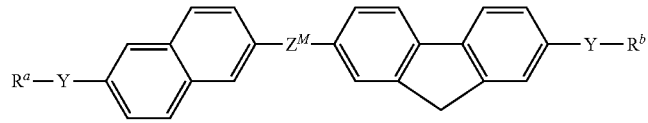
(M1-16)
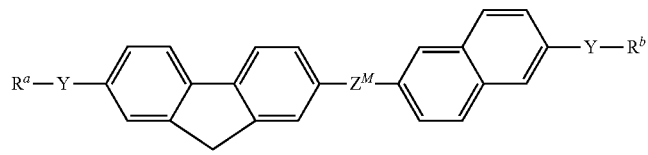
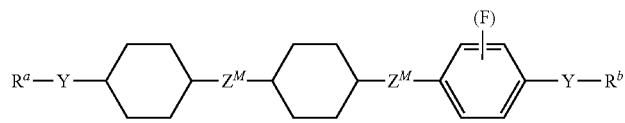
(M1-18)
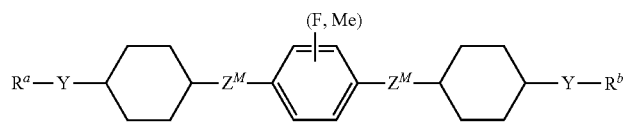
(M1-19)
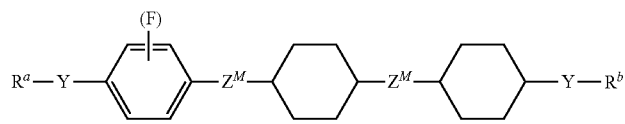
(M1-20)
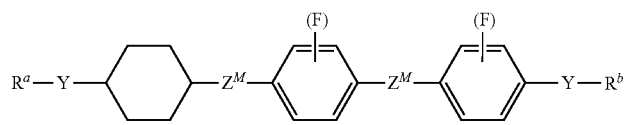
(M1-21)
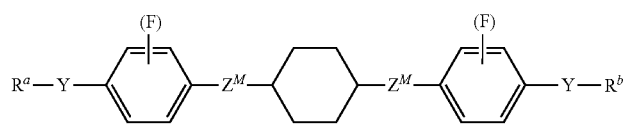
(M1-22)
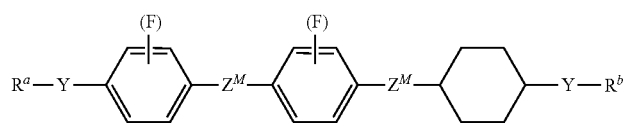
(M1-23)
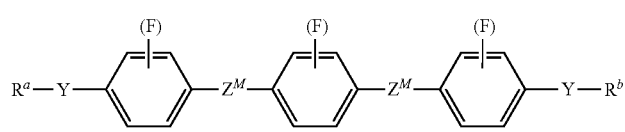
(M1-24)
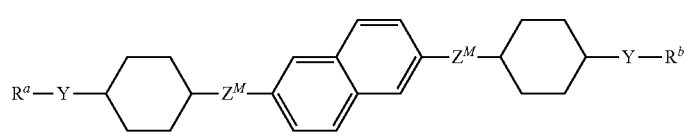
(M1-25)

-continued
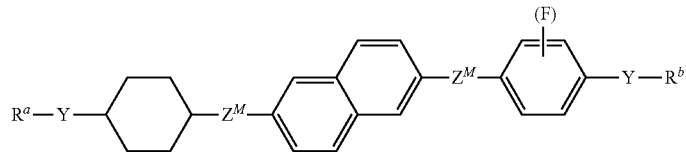
(M1-26)
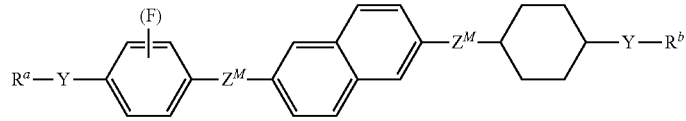
(M1-27)
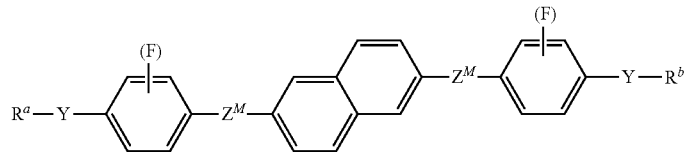
(M1-28)
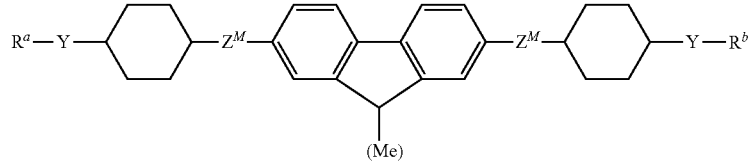
(M1-29)
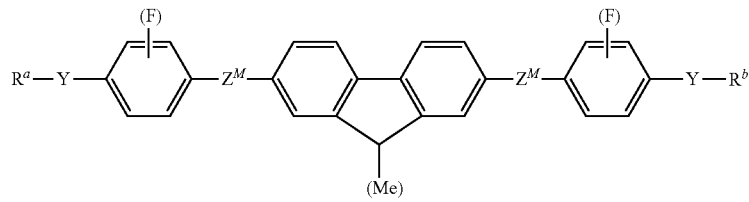
(M1-30)
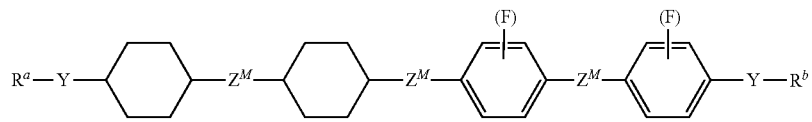
(M1-31)
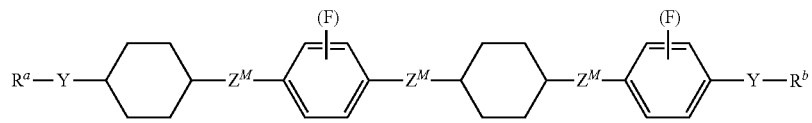
(M1-32)
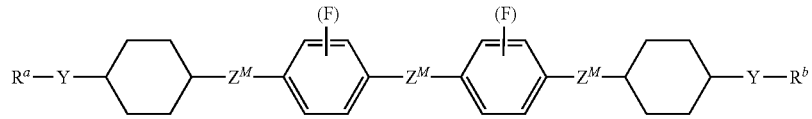
(M1-33)
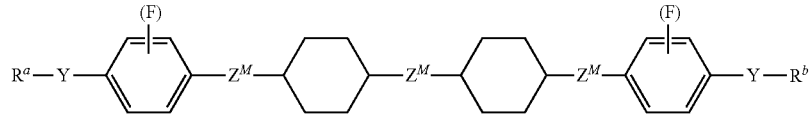
(M1-34)
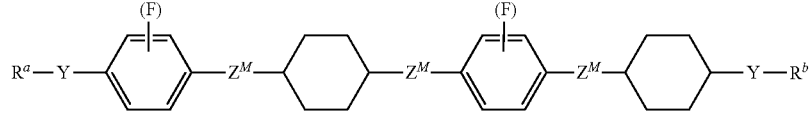
(M1-35)

(M1-36)
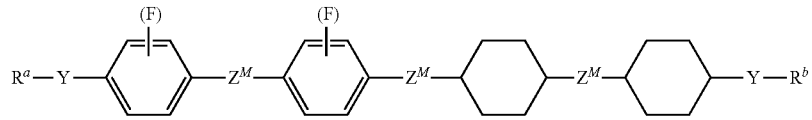
(M1-37)
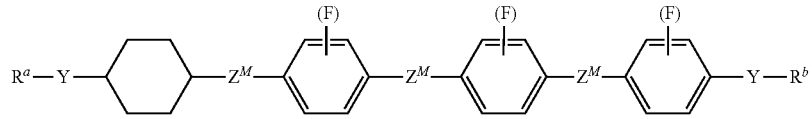
(M1-38)
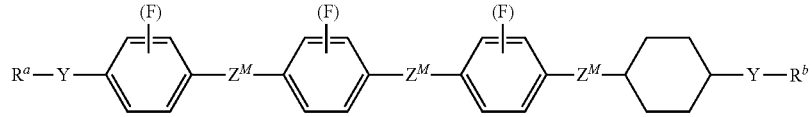
(M1-39)
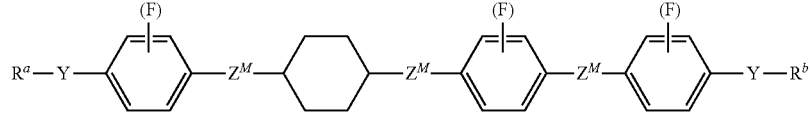
(M1-40)
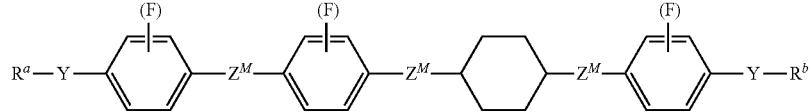
(M1-41)
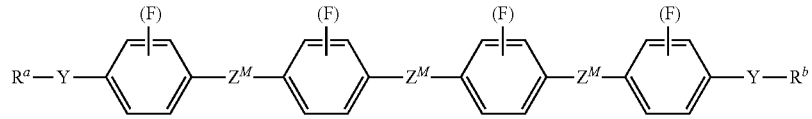
(M2-1)
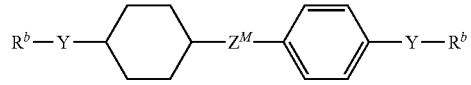
(M2-2)
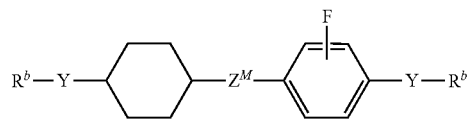
(M2-3)
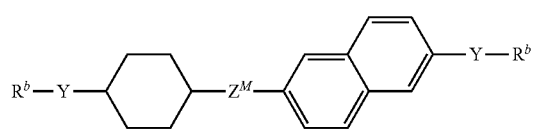
(M2-4)
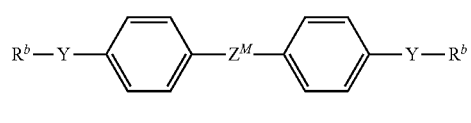
(M2-5)
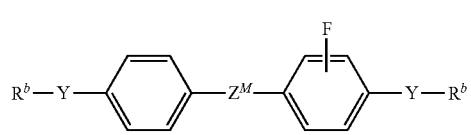
(M2-6)
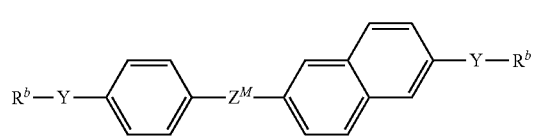
(M2-7)
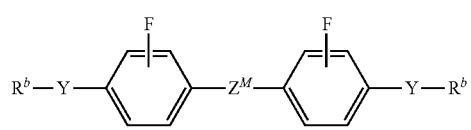
(M2-8)
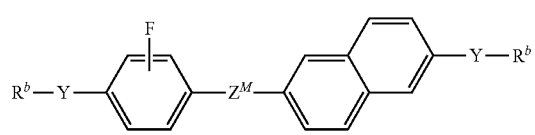
(M2-9)
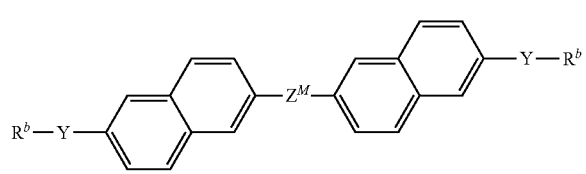

-continued
(M2-10)
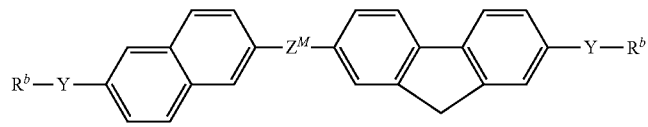
(M2-11)
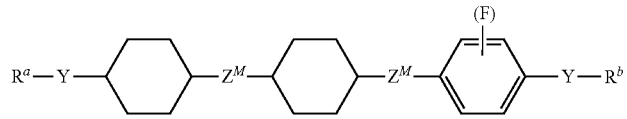
(M2-12)
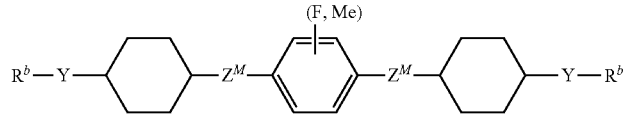
(M2-13)
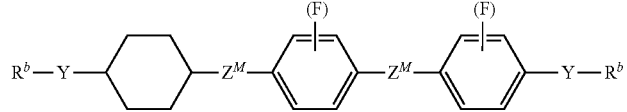
(M2-14)
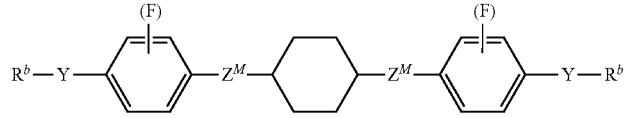
(M2-15)
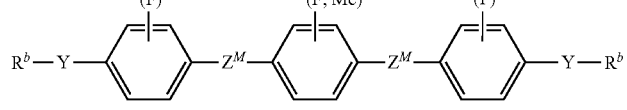
(M2-16)
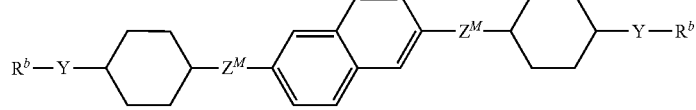
(M2-17)
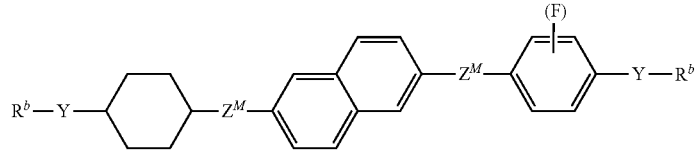
(M2-18)
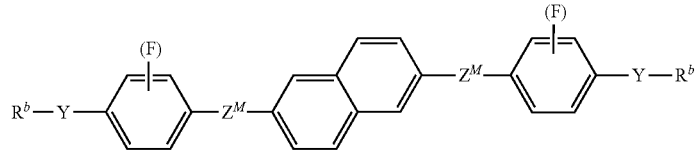
(M2-19)
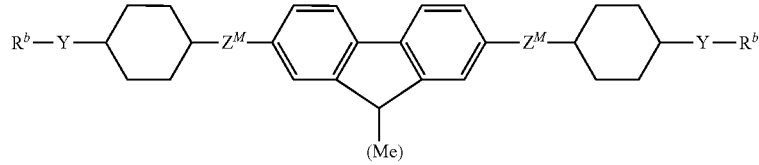
(M2-20)
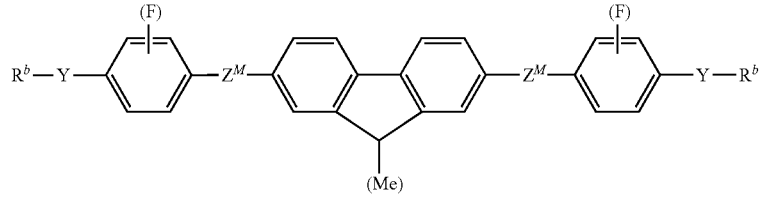

-continued

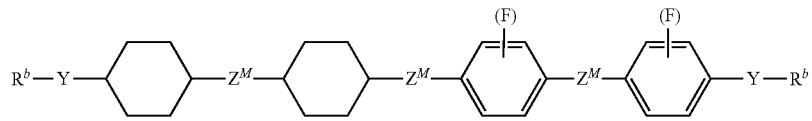
(M2-21)

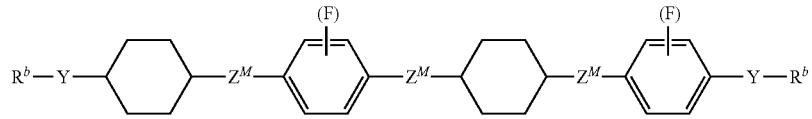
(M2-22)

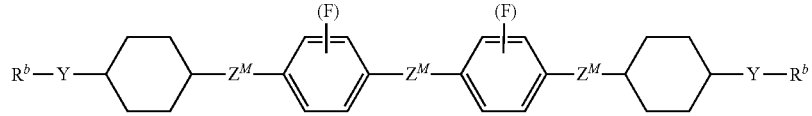
(M2-23)

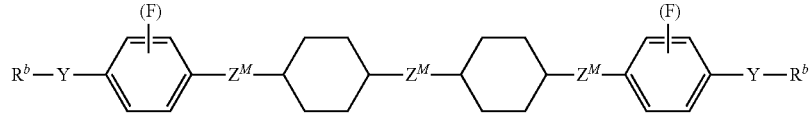
(M2-24)

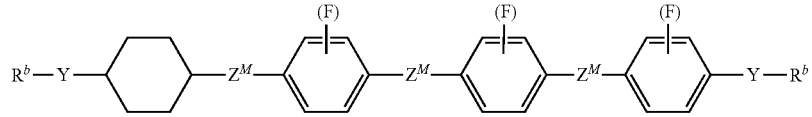
(M2-25)

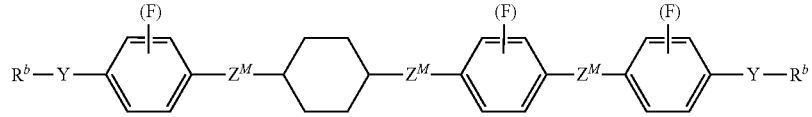
(M2-26)

(M2-27)

A monomer having no mesogen moiety and a polymerizable compound having a mesogen moiety other than the monomers (M1) and (M2) can be used, if desired.

In order to optimize the optical isotropy of the polymer/liquid crystal composite material of the present invention, a monomer having a mesogen moiety and three or more polymerizable functional groups can be used. The monomer having s mesogen moiety and three or more polymerizable functional groups is preferably a well-know compound, for example, (M4-1)-(M4-3), and more specifically, the compounds described in Japanese Patent Publication Nos. 2000-327632, 2004-182949, and 2004-59772. In (M4-1)-(M4-3), $R^b$, Za, Y, and (F) are defined as above.

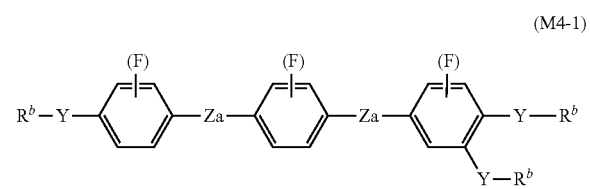
(M4-1)

-continued

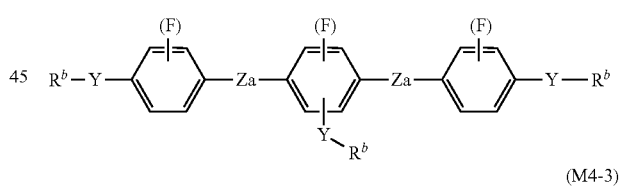
(M4-2)

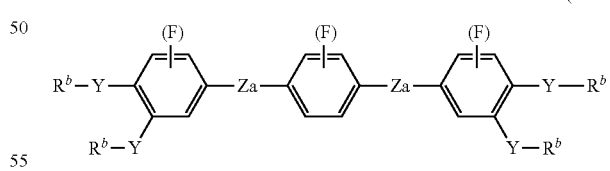
(M4-3)

5.2.2 Monomer Having No Mesogen Moiety and Having Polymerizable Functional Group Examples of the monomer having no mesogen moiety and having a polymerizable group are linear or branched acrylate of 1-30 carbons, linear or branched diacrylate of 1-30 carbons, and a monomer having three or more polymerizable groups, for example, but not limited to, glycerol-propoxide (1PO/OH) triacrylate, pentaerythritol-propoxide triacrylate, pentaerythritol triacrylate, trihydroxylmethylpropane-ethoxide triacrylate, trihydroxylmethylpropane-propoxide triacrylate, trihydroxylmethylpropane triacrylate, di(trihydroxylmethylpropane) tetraacrylate, pentaerythritol tetraacrylate, di(pentaerythritol) pentaacrylate, di(pentaerythritol) hexaacrylate, and trihydroxylmethylpropane triacrylate.

5.2.3 Polymerization Initiator

The polymerization pattern used to produce the polymer forming the composite material of the present invention has no particular limitation, and can be, for example, photo-radical polymerization, thermo-radical polymerization, and photo-cationic polymerization.

The photo-radical polymerization initiator useful for photo-radical polymerization are, for example, DAROCUR™ 1173, and 4265 (both are trade names, from Ciba Specialty Chemicals); and IRGACURE™ 184, 369, 500, 651, 784, 819, 907, 1300, 1700, 1800, 1850, and 2959 (all are trade names, from Ciba Specialty Chemicals).

Preferred examples of the initiators causing radical polymerization with heating and being useful in thermo-radical polymerization are benzoyl peroxide, diisopropyl peroxydicarbonate, tert-butyl peroxy(2-ethylhexanoate), tert-butyl peroxypivalate, tert-butyl peroxydiisobutyrate, lauroyl peroxide, dimethyl 2,2'-azobisisobutyrate (MAIB), di-t-butyl peroxide (DTBPO), azobisisobutyronitrile (AIBN), and azobiscyclohexanecarbonitrile (ACN), and the like.

Examples of the photo-cationic polymerization initiator useful for photo-cationic polymerization are diaryliodonium salt (referred to as "DAS", hereinafter), and triarylsulfonium salt (referred to as "TAS", hereinafter), and the like.

Examples of DAS are diphenyliodonium tetrafluoroborate, diphenyliodonium hexafluorophosphonate, diphenyliodonium hexafluoroarsenate, diphenyliodonium trifluoromesylate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromesylate, 4-methoxyphenylphenyliodonium trifluoroacetate, and 4-methoxyphenylphenyliodonium p-toluenesulfonate, and the like.

DAS may be sensitized by adding a photosensitizer, such as thioxanthone, phenothiazine, chlorothioxanthone, xanthone, anthracene, diphenyl anthracene, and rubrene.

Examples of TAS are triphenylsulfonium tetrafluoroborate, triphenylsulfonium hexafluorophosphonate, triphenylsulfonium hexafluoroarsenate, triphenylsulfonium trifluoromesylate, triphenylsulfonium trifluoroacetate, triphenylsulfonium p-toluenesulfonate, triphenylsulfonium tetrakis(pentafluorophenyl)borate, 4-methoxyphenyldiphenylsulfonium tetrafluoroborate, 4-methoxy phenyldiphenylsulfonium hexafluorophosphonate, 4-methoxyphenyldiphenylsulfonium hexafluoroarsenate, 4-methoxyphenyldiphenylsulfonium trifluoromesylate, 4-methoxyphenyldiphenylsulfonium trifluoroacetate, and 4-methoxyphenyldiphenylsulfonium p-toluenesulfonate, and the like.

Specific examples of the photo-cationic polymerization initiator are Cyracure™ UV1-6990, Cyracure UV1-6974, and Cyracure UV1-6992 (all are trade names, from UCC Corporation); Adeka Optomer SP-150, SP-152, SP-170, and SP-172 (all are trade names, from ADEKA Corporation); Rhodorsil Photoinitiator 2074 (trade name, from RHODIA JAPAN Corporation); IRGACURE™ 250 (trade name, from Ciba Specialty Chemicals); and UV-9380C (trade name, from GE TOSHIBA SILICONES Co. Ltd), and the like.

5.2.4 Curing Agents and Others

In preparing the polymer forming the composite material of the present invention, in addition to the monomers and polymerization initiator above, one or two or more other preferred component(s) may also be further added, for example, curing agent, catalyst, and stabilizer.

The latent curing agents well-known in the art which are commonly used for epoxy resins curing agent can be used. Examples of the latent curing agent for epoxy resins are amine curing agents, novolac-based curing agents, imidazole curing agents, and anhydride-based curing agents, and the like. Examples of amine curing agents are aliphatic polyamines such as diethylenetriamine, triethylenetetraamine, tetraethylenepentaamine, m-xylenediamine, trimethyl hexamethylenediamine, 2-methyl hexamethylenediamine, and diethylaminopropylamine; alicyclic polyamines such as isophorone diamine, 1,3-diaminomethylcyclohexane, bis(4-aminocyclohexyl)methane, norbornanediamine, 1,2-diaminocyclohexane, and Laromin; and aromatic polyamines such as diaminodiphenylmethane, diaminodiphenylethane, and m-phenylenediamine.

Examples of novolac-based curing agents are phenol-Novolac resin, and bisphenol-Novolac resin, and the like. Examples of the imidazole curing agents are 2-methylimidazole, 2-ethylhexylimidazole, 2-phenylimidazole, and 1-cyanoethyl-2-phenylimidazolium trimellitate, and the like.

Examples of anhydride-based curing agents are tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic anhydride, and benzophenonetetracarboxylic dianhydride, and the like.

Furthermore, a curing promoter can further be used to facilitate the curing reaction of a polymerizable compound with glycidyl, epoxy, and oxetanyl and the curing agent. Examples of the curing promoter are tertiary amines such as benzyldimethylamine, tris(dimethylaminomethyl)phenol, and dimethylcyclohexylamine; imidazoles such as 1-cyanoethyl-2-ethyl-4-methylimidazole, and 2-ethyl-4-methylimidazole; organophosphorus compounds such as triphenylphosphine; quaternary phosphosium salts such as tetraphenylphosphosium bromide; diazobicyclo alkenes such as 1,8-diazobicyclo[5.4.0]undecene-7 or an organic acid salt thereof; quaternary ammonium salts such as tetraethylammonium bromide, and tetrabutylammonium bromide; boron compounds such as boron trifluoride, and triphenyl borate, and the like. These curing promoters can be used alone, or in a combination of two or more.

Moreover, a stabilizer is preferably added to prevent unwanted polymerization, for example, during storage. The stabilizer can be any compound well known to those of ordinary skill in the art, and representative examples are 4-ethoxyphenol, hydroquinone, and butylated hydroxytoluene (BHT), and the like.

5.3 Content of Liquid Crystal Composition

The content of the liquid crystal composition in the polymer/liquid crystal composite material of the present invention is preferably as high as possible, provided that it is within a range in which the composite material can exhibit an optically isotropic liquid crystal phase. This is because that the electrically controlled birefringence value of the composite material of the present invention is greater when the content of the liquid crystal composition is higher.

In the polymer/liquid crystal composite material of the present invention, the content of the liquid crystal composition is preferably 60-99 wt %, more preferably 60-95 wt %, and particularly preferably 65-95 wt %, based on the composite material. The content of the polymer is preferably 1-40 wt %, more preferably 5-40 wt %, and particularly preferably 5-35 wt %, based on the composite material.

5.4 Other Components

The polymer/liquid crystal composite material of the present invention can also contain, for example, a dichroic dye and a photochromic compound, without compromising the effects of the present invention.

6 Optical Device

A sixth aspect of the present invention is an optical device, which contains the liquid crystal composition or the polymer/liquid crystal composite material (hereinafter, both are sometimes collectively referred to as liquid crystal medium) and is driven in an optically isotropic liquid crystal phase.

The liquid crystal medium is optically isotropic in the absence of an electric field and exhibits an optical anisotropy in the presence of an electric field, such that optical modulation can be achieved with an electric field.

The structure of the LCD device is, for example, as shown in FIG. 1, in which the electrodes on the comb-like electrode substrate have such a structure that Electrode 1 extending from the left side and Electrode 2 extending from the right side are alternatively arranged. When a potential difference exists between Electrode 1 and Electrode 2, the comb-like electrode substrate is provided with an electric field in two directions (upward and downward), as shown in FIG. 1.

The present invention is further described in detail with reference to examples; however, the present invention is not limited to thereto. Furthermore, "%" denotes "wt %", unless specifically indicated.

EXAMPLES

The resulting compound is characterized with nuclear magnetic resonance (NMR) spectrum using $^1$H-NMR analysis and gas chromatogram obtained from gas chromatography (GC) analysis. The analysis methods are firstly illustrated below.

$^1$H-NMR analysis: $^1$H-NMR analysis was carried out by using DRX-500 (manufactured by Bruker BioSpin Co., Ltd.). In the measurement, a sample prepared in an example was dissolved in a deuterated solvent, such as $CDCl_3$, capable of dissolving the sample, and then was measured with a NMR apparatus at 500 MHz at room temperature in 24 times of accumulation. In the resulting NMR spectrum, s denotes singlet, d denotes doublet, t denotes triplet, q denotes quartet, and m denotes multiplet. Furthermore, tetramethylsilane (TMS) was used as the standard of chemical shift δ of zero.

GC analysis: GC analysis was carried out by using a GC apparatus Model GC-14B (manufactured by Shimazu). The column was the capillary column CBP1-M25-025 (manufactured by Shimazu; length 25=m, inner diameter=0.22 mm, film thickness=0.25 μm; and the stationary liquid phase was dimethicone; non-polarity). The carrier gas was helium, and the flow rate was adjusted to 1 ml/min. The sample evaporation chamber was set at 300° C., and the detector (flame ionization detector, FID) was set at 300° C.

A sample was dissolved in toluene to give a solution of 1 wt %, and then 1 μl of the solution was injected into the sample evaporation chamber.

The recorder used was Chromatopac Model C-R6A (manufactured by Shimazu) or an equivalent thereof. The resulting gas chromatogram exhibited peak retention times and peak areas corresponding to the component compounds.

Furthermore, the solvent for diluting the sample was, for example, chloroform or hexane. The column used was, for example, capillary column DB-1 (length=30 m, inner diameter=0.32 mm, film thickness=0.25 μm, manufactured by Agilent Technologies Inc.), HP-1 (length=30 m, inner diameter=0.32 mm, film thickness=0.25 p.m., manufactured by Agilent Technologies Inc.), Rtx-1 (length=30 m, inner diameter=0.32 mm, film thickness=0.25 μm, manufactured by Restek Corporation), or BP-1 (length=30 m, inner diameter=0.32 mm, film thickness=0.25 μm, manufactured by SGE International Pty. Ltd.).

The area ratios of the peaks in the gas chromatogram correspond to the ratios of the component compounds. Generally, the weight percentages of the component compounds in the analyzed sample are not completely identical to the area percentages of the peaks. However, in the present invention, when the columns above are used, the correction coefficient is substantially 1. Therefore, the weight percentages of the component compounds in the analyzed sample are substantially equivalent to the area percentages of the peaks. The reason lies in that there is no significant difference among the correction coefficients of the component compounds. In order to more accurately calculate the ratios of the liquid crystal compounds in the liquid crystal composition with GC, the internal standard method for GC can be used. GC measurements were simultaneously performed on an accurately weighed specified amount of a liquid crystal compound component (component to be detected) and a liquid crystal compound (standard substance) as standard, and the relative intensity was previously calculated as peak area ratio of the detected component to the standard. If a correction was done by using the relative intensity expressed as peak area ratio of each component to the standard, then the ratios of the liquid crystal compounds in the liquid crystal composition can be more accurately calculated with GC analysis.

Samples for Determining Characteristic Values of Liquid Crystal Compounds

Upon measuring the characteristic values of a liquid crystal compound, there are two situations, i.e., taking a compound per se as a sample, and mixing a compound in a mother liquid crystal to form a sample.

As for the latter situation of using a sample prepared by mixing a compound with a mother liquid crystal, the following method is used for the measurement. First, 15 wt % of the resulting liquid crystal compound was mixed with 85 wt % of the mother liquid crystal to prepare a sample, and then the characteristic values of the compound are calculated from the measured value obtained with the extrapolation method according to the equation below.

[Extrapolated Value]=(100×[measured value of the sample]−[wt % of the mother liquid crystal]×[measured value of the mother liquid crystal])/[wt % of the liquid crystal compound]

While a smectic phase or a crystal may be deposited at the ratio above of a liquid crystal compound and a mother liquid crystal at 25° C., the ratio of the liquid crystal compound and the mother liquid crystal is changed to 10 wt %:90 wt %, 5 wt %:95 wt %, 1 wt %:99 wt % in order. The composition without deposition of a smectic phase or a crystal at 25° C. was measured for the characteristic values, and the extrapolation is calculated based on above equation as the characteristic values of the liquid crystal compound.

There are numerous mother liquid crystals that can be used for the measurement. For example, the composition of the mother liquid crystal A is as follows (wt %).

Mother Liquid Crystal A:

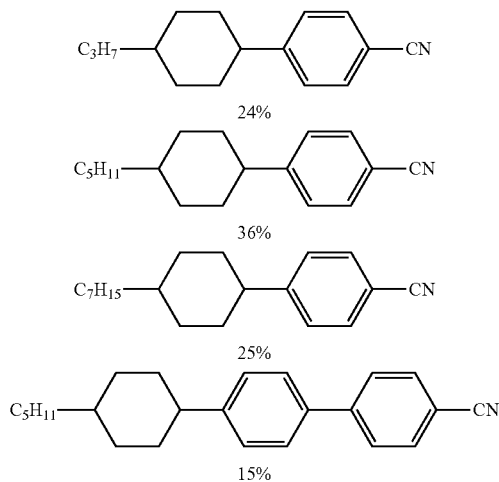

Method for Measuring Characteristic Values of Liquid Crystal Compounds

The measurement of the characteristic values was carried out with the methods below. These methods are mainly those described in EIAJ•ED-2521A of the Standard of Electric Industries Association of Japan, or modifications of the same. Moreover, the TN device used in the measurement was not equipped with TFT.

With respect to the determined values, in case that the liquid crystal compound itself is used as a sample, the obtained values are recorded as experimental data; and in case that a mixture of the liquid crystal compound and a mother liquid crystal is used as a sample, the extrapolated values obtained with the extrapolation method are recorded as experimental data.

The phase structure and the phase transition temperature (° C.) were measured by using Method (1) and Method (2) below.

(1) A compound was placed on a heating plate (Hot Stage, Model FP-52, manufactured by Mettler Corp.) in a melting point measuring apparatus equipped with a polarizing microscope, and the phase behaviour and its change were observed by the polarizing microscope while the sample was heated at a rate of 3° C./min to determine the type of the liquid crystal phase.

(2) A scanning calorimetry DSC-7 system or Diamond DSC system (manufactured by PerkinElmer Corp.) was used, at a heating or cooling rate of 3° C./min, and the on-set temperature of the endothermic peak or the exothermic peak accompanying with the phase change of the sample was calculated with the extrapolation method, so as to determine the phase transition temperature.

Hereinafter, a crystal phase is expressed as K, and for differentiation, two crystals are represented by $K_1$ or $K_2$ respectively. A smectic phase is represented by Sm, a nematic phase is represented by N, and a liquid (isotropic phase) is represented by I. For differentiation, a smectic B phase and a smectic A phase in the smectic phase are presented by SmB and SmA respectively. BP represents a blue phase or an optically isotropic liquid crystal phase. A biphase co-existence is sometimes represented by (N*+I), (N*+BP). Specifically, (N*+I) represents a phase in which a non-liquid crystal isotropic phase and a chiral nematic phase coexist, and (N*+BP) represents a phase in which a BP phase or an optically isotropic liquid crystal phase and a chiral nematic phase coexist. Un represents a non-optically isotropic unidentified phase. For the expression of the phase transition temperature, for example, "K 50.0 N 100.0 I" means that the phase transition temperature (KN) from the crystal to the nematic phase is 50.0° C., and the phase transition temperature (NI) from the nematic phase to the liquid is 100.0° C. This rule is also applicable to other expressions.

Upper-limit temperature of a nematic phase ($T_{NI}$, ° C.): A sample (a mixture of a liquid crystal compound and a mother liquid crystal) was placed on a heating plate (Hot Stage, Model FP-52, manufactured by Mettler Corp.) in a melting point measuring apparatus equipped with a polarizing microscope, and was observed by the polarizing microscope while the sample was heated at a rate of 1° C./min. The temperature at which a part of the sample began to change from a nematic phase to an isotropic liquid was recorded as the upper-limit temperature of the nematic phase, and sometimes abbreviated as "upper-limit temperature" of the nematic phase below.

Low-temperature compatibility: Samples were prepared by mixing a mother liquid crystal with a liquid crystal compound in a manner such that the content of the latter was 20 wt %, 15 wt %, 10 wt %, 5 wt %, 3 wt %, and 1 wt %, respectively, and then placed into glass bottles. The glass bottles were kept in a freezer at −10° C. or −20° C. for a certain period of time, and the presence or absence of a crystal or a smectic phase was observed.

Viscosity (η, determined at 20° C., mPa·s): The viscosity of a mixture of a liquid crystal compound and a mother liquid crystal is measured with an E-type viscometer.

Refractive index anisotropy (Δn): The measurement was carried out at 25° C. by using light having a wavelength of 589 nm, with an Abbe refractometer having a polarizing plate mounted on the ocular lens. After the surface of the main prism is rubbed in a direction, a sample (a mixture of a liquid crystal compound and a mother liquid crystal) was dripped onto the main prism. The refractive index ($n_\parallel$) was determined when the polarizing direction was paralleled to the rubbing direction, and the refractive index ($n_\perp$) was determined when the polarizing direction was perpendicular to the rubbing direction. The value of refractive index anisotropy (Δn) was calculated according to the equation $\Delta n = n_\parallel - n_\perp$.

Dielectric anisotropy (Δ∈: determined at 25° C.): A sample (a mixture of a liquid crystal compound and a mother liquid crystal) was fed into a liquid crystal cell with a distance (cell gap) of about 9 μm between two glass substrates and a twist angle of 80 degrees. The cell was applied with a voltage of 20 V and the dielectric ($\in_\parallel$) in the major-axis direction of the liquid crystal molecule was determined. Then, a voltage of 0.5 V was applied and the dielectric ($\in_\perp$) in the minor axis direction of the liquid crystal molecule was determined. The value of dielectric anisotropy was calculated according to the equation $\Delta \in = \in_\parallel - \in_\perp$ Pitch (P, Determined at 25° C., m)

A pitch length was measured through selective reflection (Handbook of Liquid Crystal, p 196, 2000, Maruzen). For the selective reflection wavelength λ, the relationship <n>p/λ=1 exists. Herein, <n> denotes the average refractive index, and can be calculated according to the equation $<n> = \{(n_\parallel^2 + n_\perp^2)/2\}^{1/2}$. The selective reflection wavelength was determined by a microspectrophotometer (Trade name MSV-350, manufactured by Japan Electronics Co., Ltd.). The pitch was calculated by dividing the resulting reflection wavelength with the average refractive index. When the concentration of the optically active compound is low, the pitch of a cholesteric liquid crystal having a reflection wavelength in a region of wavelength longer than that of visible light is proportional to the reciprocal of the concentration. Therefore, multiple points were measured in the pitch length of the liquid crystal having a selective reflection wavelength in the visible light region, and then the pitch was calculated by using a linear extrapolation method. The "optically active compound" is equivalent to the chiral reagent in the present invention.

Example 1

Synthesis of Compound (S1-11)

Compound (S1-11) is a compound of Formula in which $R^1$ is $C_4H_9$, $L^1$ is hydrogen, $L^2$, $L^4$ and $L^5$ are all fluorine, and $X^1$ is —$CF_3$. (the same as Compound (1-4-3-a))

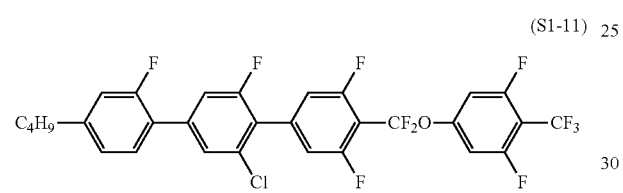

The synthesis scheme is shown below.

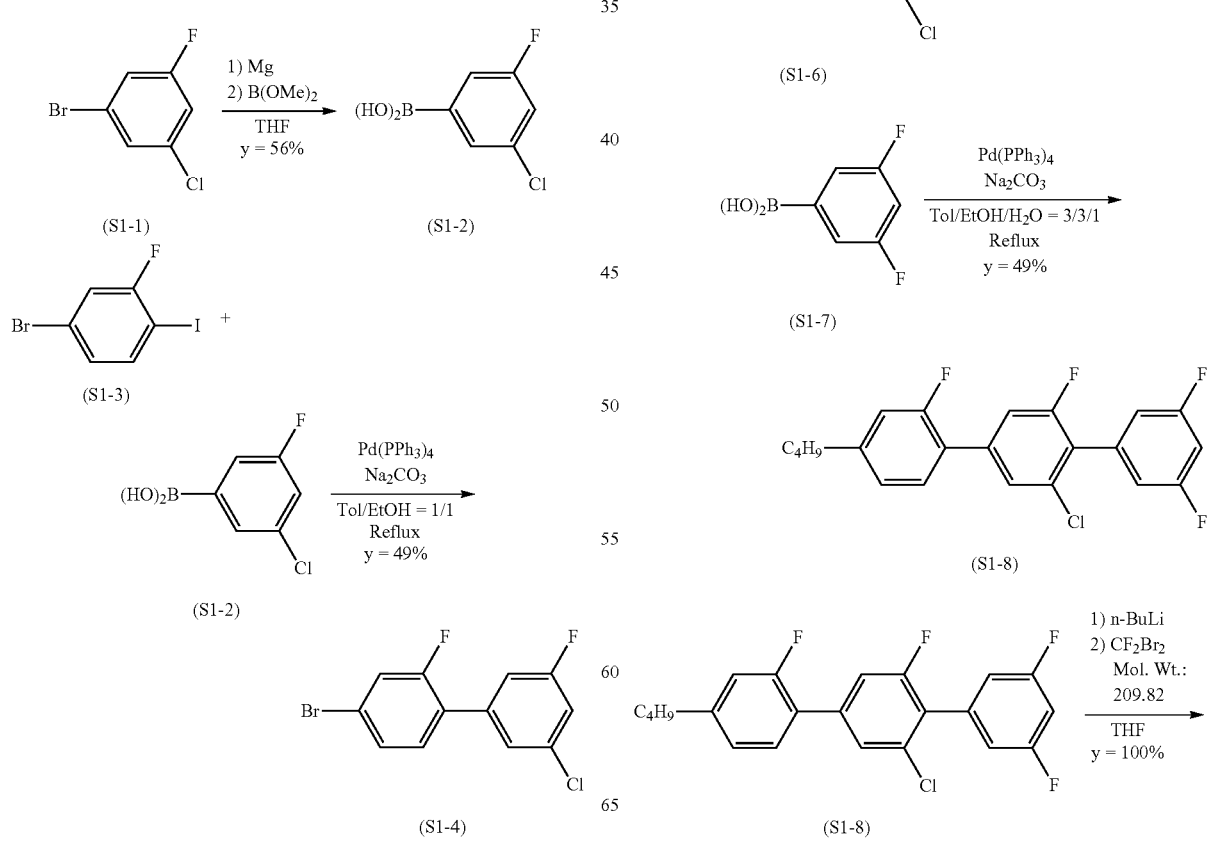

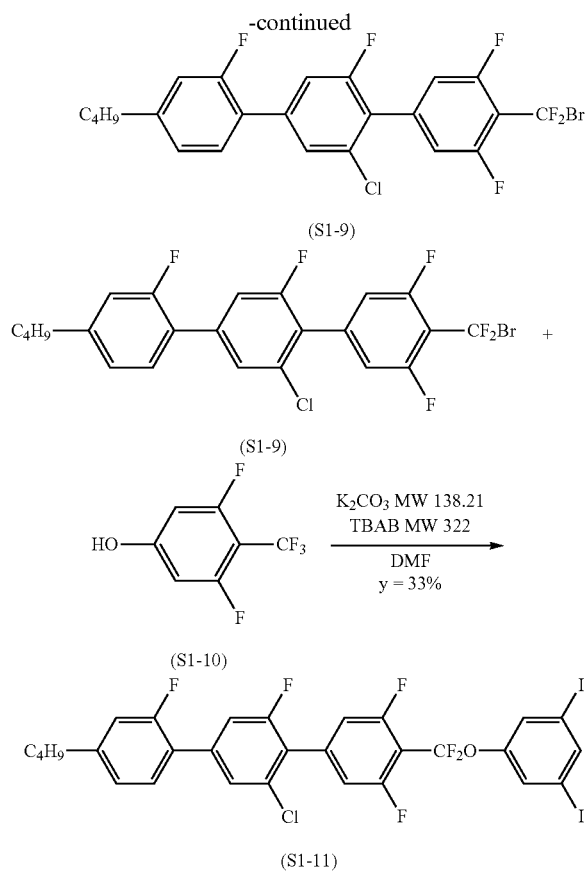

In the scheme, r.t. is room temperature.

Synthesis of Compound (S1-2)

Under nitrogen atmosphere, Grignard reagent was formulated with 11.3 g of dry magnesium and 75.0 g of 1-bromo-3-chloro-5-fluorobenzene (S1-1) in 220 ml of tetrahydrofuran (THF), and cooled to −70° C. A solution of 52.0 g trimethyl borate in 200 ml THF was dropped, directly stirred at −70° C. for 3 hrs, then heated to room temperature for 1 hr, and stirred for 12 hrs. 2N hydrochloric acid was dropped to the reaction solution and stirred for 1 hr, and the resulting product was extracted with ethyl acetate, washed with water, dried, and distilled off the solvent under vacuum. The residue was washed with heptane to obtain 34.7 g of (S1-2). The yield of Compound (S1-2) was 55.7%.

Synthesis of Compound (S1-4)

64.5 g of 3-chloro-5-fluorophenylboric acid (S1-2), 110.0 g of 1-bromo-3-fluoro-5-iodobenzene (S1-3), 6.0 g of tetrakis(triphenylphosphine)palladium, 130.0 g of potassium carbonate, and 1000 ml of a mixed solvent of toluene/ethanol/water 3/3/1 (volume ratio) were added into a reactor under nitrogen atmosphere, and refluxed for 40 hrs. The reaction solution was cooled to room temperature, added with toluene, and then washed with 1N hydrochloric acid, and water. Afterwards, the solution was dried over magnesium sulfate, and then distilled under vacuum to remove the solvent. Then, the product was purified by silica-gel column chromatography with heptane as a developing solvent, and then dried under vacuum to obtain 53.8 g of (S1-4). The yield of Compound (S1-4) from (S1-3) was 48.5%.

Synthesis of Compound (S1-5)

25.3 g of Compound (S1-4) and 250 ml of THF were added to a reactor under nitrogen atmosphere, and then 120 ml of 0.91 M butylmagnesium chloride was dropped at room temperature, and heated to reflux for 6 hrs. After cooling to room temperature, 1N hydrochloric acid was dropped, and stirred for 1 hrs. The resulting product was extracted with toluene, and washed with water. The product was dried over magnesium sulfate, and then the solvent was distilled off under vacuum. The product was purified by silica-gel column chromatography with heptane as a developing agent, and then dried under vacuum to obtain 21.1 g of (S1-5). The yield of (S1-5) from (S1-4) was 90.2%.

Synthesis of Compound (S1-6)

21.1 g of (S1-5) and 300 ml of tetrahydrofuran (THF) were added to a reactor under nitrogen atmosphere, and cooled to −70° C. 56.4 ml of n-BuLi (1.6M; solution in n-hexane) was dropped, and directly stirred at −70° C. for 1 hr. At −70° C., a solution of 22.8 g iodine in 200 ml THF was dropped to the reaction solution, and directly stirred at −70° C. for 1 hr. The reaction solution was heated to room temperature, and poured into an aqueous sodium thiosulfate solution. The resulting product was extracted with toluene, and the organic layer was washed with an aqueous sodium thiosulfate solution and water. The product was dried over magnesium sulfate, and the solvent was distilled off under vacuum. The product was purified by silica-gel column chromatography with heptane as a developing agent, and then dried under vacuum to obtain 30.7 g of (S1-6). The yield of (S1-6) from (S1-5) was 100%.

Synthesis of Compound (S1-8)

30.7 g of (S1-6), 24.0 g of 3,5-difluorophenylboric acid (S1-7), 5.0 g of tetrakis(triphenylphosphine)palladium, 25.0 g of sodium carbonate, and 280 ml of a mixed solvent of toluene/ethanol/water=3/3/1 (volume ratio) were added to a reactor under nitrogen atmosphere, and refluxed for 30 hrs. 2.0 g of additional tetrakis(triphenylphosphine)palladium was added and further refluxed for 10 hrs. The reaction solution was cooled to room temperature, added with toluene, and washed with 1N hydrochloric acid, and water. The product was dried over magnesium sulfate, and the solvent was removed under vacuum. The product was purified by silica-gel column chromatography with heptane as a developing agent, and then dried under vacuum to obtain 14.5 g of (S1-8). The yield of (S1-8) from (S1-6) was 48.9%.

Synthesis of Compound (S1-9)

14.5 g of Compound (S1-8) and 100 ml of THF were added to a reactor under nitrogen atmosphere, and cooled to −74° C. 26.8 ml of a 1.59 M solution of n-butyllithium in n-hexane was dropped at a temperature in the range from −74° C. to −60° C., and further stirred for 60 min. Subsequently, a solution of 12.0 g dibromodifluoromethane in 20.0 ml THF was dropped at a temperature in the range from −75° C. to −70° C., and warmed to 25° C. with stirring for 60 min. The resulting reaction mixture was poured into 150 ml of ice water and mixed. 100 ml of toluene was added to separate the organic layer and the aqueous layer for extraction. The resulting organic layer was decanted, washed with saline, and dried over anhydrous magnesium sulfate. The resulting solution obtained under vacuum was concentrated, and the residue was purified by silica-gel column chromatography with heptane as a developing agent. The product was dried by distilling off the solvent to obtain 16.5 g of (S1-9) as a crude product.

Synthesis of Compound (S1-11)

16.5 g of Compound (S1-9), 5.0 g of 3,5-difluoro-4-trifluoromethylphenol (S1-10), 10.5 g of potassium carbonate, 0.5 g of tetrabutylammonium bromide, and 150 ml of N,N-dimethylformamide (DMF) were added into a reactor under nitrogen atmosphere, and stirred for 90 min at 95° C. After being warmed to 25° C., the reaction mixture was poured into 50 ml of ice water and mixed, 100 ml of toluene was added to separate the organic layer from the aqueous layer for extraction, the organic layer was decanted, washed with a saturated aqueous sodium bicarbonate solution and saline, and dried over anhydrous magnesium sulfate. The resulting solution was concentrated under vacuum, and the residue was purified by silica-gel column chromatography with heptane as a developing agent. The product was further purified by recrystallized in a mixed solvent of ethanol/ethyl acetate=9/1, and dried to obtain 5.5 g of (S1-11). The yield of (S1-11) from (S1-8) was 23.3%.

The phase transition temperature of the resulting Compound (S1-11) is as follows.

Phase transition temperature (° C.): K 83.7 I.

It can be known that the melting point of Compound (S1-11) is low.

The resulting compound was identified as (S1-9) from the following chemical shifts δ(ppm) obtained with $^1$H-NMR analysis in which $CDCl_3$ was used as a solvent. Chemical shifts δ(ppm): 7.53 (m, 1H), 7.37-7.33 (m, 2H), 7.12-7.07 (m, 3H), 7.04-7.01 (m, 3H), 2.67 (t, 2H), 1.67-1.61 (m, 2H), 1.43-1.35 (m, 2H), 0.96 (t, 3H).

Physical Properties of Liquid Crystal Compound (S1-11)

The four compounds designated as mother liquid crystal A above were mixed, to prepare a mother liquid crystal A having a nematic phase. The physical properties of the mother liquid crystal A are as follows.

Upper-limit temperature $(T_{NI})$=71.7° C.; dielectric anisotropy (Δ∈)=11.0; and refractive index anisotropy (Δn)=0.137.

A liquid crystal composition AS1 containing 90 wt % of the mother liquid crystal A and 10 wt % of (S1-10) obtained in Example was prepared, and the characteristic values were determined. The extrapolated characteristic values of the liquid crystal compound (S1-11) calculated based on the measurements using an extrapolation method are as follows.

Upper-limit temperature $(T_{NI})$=14.7° C.; dielectric anisotropy (Δ∈)=63.7; refractive index anisotropy (Δn)=0.137.

It can be seen from the results that the liquid crystal compound (S1-11) is well compatible with other liquid crystal compounds, and has a large dielectric anisotropy (Δ∈) and refractive index anisotropy (Δn).

Example 2

Synthesis of Compound (S2-1)

Compound (S2-1) is a compound of Formula (1-4-3), in which $R^1$ is $C_5H_{11}$, $L^1$ is hydrogen, $L^2$, $L^4$ and $L^5$ are all fluorine, and $X^1$ is —$CF_3$.

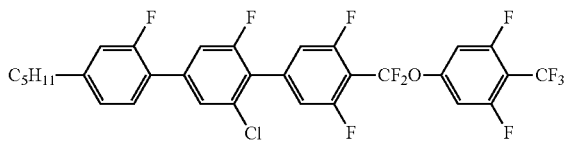

Synthesis of Compound (S2-1)

Synthesis of (S2-1) was accomplished according to the method for synthesizing (S1-11) in Example 1. The phase transition temperature of the resulting Compound (S2-1) is as follows.

Phase transition temperature (° C.): K 91.4 (N 34.4) I.

The resulting compound was identified as (S2-1) $^1$H-NMR from the following chemical shifts δ (ppm) obtained with $^1$H-NMR analysis in which $CDCl_3$ was used as a solvent. Chemical shifts δ(ppm): 7.53 (m, 1H), 7.37-7.33 (m, 2H), 7.12-7.07 (m, 3H), 7.04-7.01 (m, 3H), 2.66 (t, 2H), 1.69-1.63 (m, 2H), 1.41-1.31 (m, 4H), 0.92 (t, 3H).

Comparative Example 1

Compound (Ref-1)

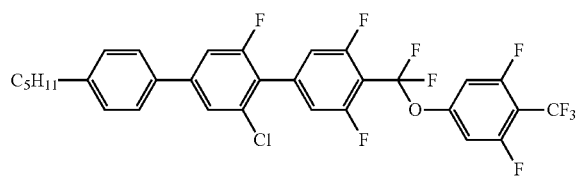

K 102.0 I (°C)

The phase transition temperature of Compound (Ref-1) is as follows.

Phase transition temperature (° C.): K 102.0 I.

It can be known that Compound (S2-2) in Example 2 has a melting point that is 10.6° C. lower than that of Compound (Ref-1), and is a compound having excellent compatibility.

Example 3

Synthesis of Compound (S3-1)

Compound (S3-1) is a compound of Formula (1-4-3), in which $R^1$ is $C_6H_{13}$, $L^1$ is hydrogen, $L^2$, $L^4$ and $L^5$ are all fluorine, and $X^1$ is —$CF_3$. (The same as Compound (1-4-3-c))

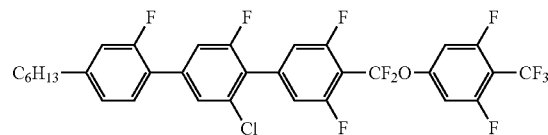

Synthesis of Compound (S3-1)

Synthesis of (S3-1) was accomplished according to the process for synthesizing (S1-11) in Example 1. The phase transition temperature of the resulting Compound (S3-1) is as follows.

Phase transition temperature (° C.): K 69.4 (N 27.7) I.

The resulting compound was identified as (S3-1) from the following chemical shifts δ(ppm) obtained with $^1$H-NMR analysis in which CDCl$_3$ was used as a solvent. Chemical shifts δ (ppm): 7.53 (m, 1H), 7.37-7.33 (m, 2H), 7.12-7.07 (m, 3H), 7.04-7.01 (m, 3H), 2.66 (t, 2H), 1.68-1.62 (m, 2H), 1.39-1.29 (m, 6H), 0.90 (t, 3H).

Physical Properties of Liquid Crystal Compound (S3-1)

The four compounds designated as mother liquid crystal A above were mixed, to prepare a mother liquid crystal A having a nematic phase. The physical properties of the mother liquid crystal A are as follows.

Upper limit temperature $(T_{NI})$=71.7° C.; dielectric anisotropy $(\Delta\varepsilon)$=11.0; and refractive index anisotropy $(\Delta n)$=0.137.

A liquid crystal composition AS3 containing 85 wt % of mother liquid crystal A and 15 wt % of (S3-1) obtained in Example 3 was prepared, and the characteristic values were determined. The extrapolated characteristic values of the liquid crystal compound (S3-1) calculated based on the measurements using an extrapolation method are as follows.

Upper limit temperature $(T_{NI})$=18.4° C.; dielectric anisotropy $(\Delta\varepsilon)$=59.7; and refractive index anisotropy $(\Delta n)$=0.130.

It can be seen from the results that the liquid crystal compound (S3-1) is well compatible with other liquid crystal compounds, and has a large dielectric anisotropy $(\Delta\varepsilon)$ and refractive index anisotropy $(\Delta n)$.

Example 4

Synthesis of Compound (S4-1)

Compound (S4-1) is a compound of Formula (1-1-2), in which R$^1$ is C$_6$H$_{13}$, L$^1$ and L$^3$ are both hydrogen, L$^2$, L$^4$ and L$^5$ are all fluorine, and X$^1$ is fluorine.

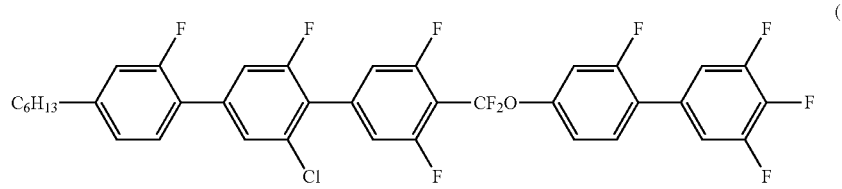

(S4-1)

Synthesis of Compound (S4-1)

Synthesis of (S4-1) was accomplished according to the process for synthesizing (S1-11) in Example 1. The phase transition temperature of the resulting Compound (S4-1) is as follows.

Phase transition temperature (° C.): K 82.9 N 136.6 I.

The resulting compound was identified as (S3-1) from the following chemical shifts δ (ppm) obtained with $^1$H-NMR analysis in which CDCl$_3$ was used as a solvent. Chemical shifts δ (ppm): 7.53 (m, 1H), 7.41-7.34 (m, 3H), 7.23-7.18 (m, 4H), 7.11-7.02 (m, 4H), 2.66 (t, 2H), 1.67-1.62 (m, 2H), 1.39-1.32 (m, 6H), 0.90 (t, 3H).

A liquid crystal composition AS4 containing 85 wt % of mother liquid crystal. A and 15 wt % of (S4-1) obtained in Example 4 was prepared, and the characteristic values were determined. The extrapolated characteristic values of the liquid crystal compound (4-1) calculated based on the measurements using an extrapolation method are as follows.

Upper limit temperature $(T_{NI})$=72.4° C.; dielectric anisotropy $(\Delta\varepsilon)$=54.1; and refractive index anisotropy $(\Delta n)$=0.177.

It can be seen from the results that the liquid crystal compound (S4-1) is well compatible with other liquid crystal compounds, and has a high clear point, dielectric anisotropy $(\Delta\varepsilon)$, and refractive index anisotropy $(\Delta n)$.

Example 5

Synthesis of Compound (S5-1)

Compound (S5-1) is a compound of Formula (1-4-3), in which R$^1$ is C$_8$H$_{17}$, L$^1$ is hydrogen, L$^2$, L$^4$ and L$^5$ are all fluorine, and X$^1$ is —CF$_3$.

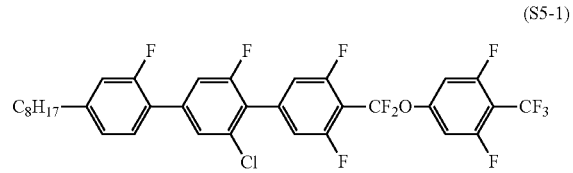

(S5-1)

Synthesis of Compound (S5-1)

Synthesis of (S5-1) was accomplished according to the process for synthesizing (S1-11) in Example 1. The phase transition temperature of the resulting Compound (S5-1) is as follows.

Phase transition temperature (° C.): K 72.5 I.

A liquid crystal composition AS5 containing 85 wt % of mother liquid crystal A and 15 wt % of (S5-1) obtained in Example 5 was prepared, and the characteristic values were determined. The extrapolated characteristic values of the liquid crystal compound (5-1) calculated based on the measurements using an extrapolation method are as follows.

Upper limit temperature $(T_{NI})$=21.0° C.; dielectric anisotropy $(\Delta\varepsilon)$=55.6; and refractive index anisotropy $(\Delta n)$=0.130.

It can be seen from the results that the liquid crystal compound (S5-1) is well compatible with other liquid crystal compounds, and has a large dielectric anisotropy $(\Delta\varepsilon)$ and refractive index anisotropy $(\Delta n)$.

Example 6

Synthesis of Compound (S6-1)

Compound (S6-1) is a compound of Formula (1-1-2), in which R$^1$ is C$_8$H$_{17}$, L$^1$ and L$^3$ are both hydrogen, L$^2$, L$^4$ and L$^5$ are all fluorine, and X$^1$ is fluorine.

(S6-1)

Synthesis of Compound (S6-1)

Synthesis of (S6-1) was accomplished according to the process for synthesizing (S1-11) in Example 1. The phase transition temperature of the resulting Compound (S6-1) is as follows.

Phase transition temperature (° C.): K 68.6 N 126.8 I.

A liquid crystal composition AS6 containing 85 wt % of mother liquid crystal A, and 15 wt % of (S6-1) obtained in Example 6 was prepared, and the characteristic values were determined. The extrapolated characteristic values of the liquid crystal compound (6-1) calculated based on the measurements using an extrapolation method are as follows.

Upper limit temperature $(T_{NI})$=73.7° C.; dielectric anisotropy $(\Delta\in)$=50.3; and refractive index anisotropy $(\Delta n)$=0.177.

It can be seen from the results that the liquid crystal compound (S6-1) is well compatible with other liquid crystal compounds, and has a high clear point, dielectric anisotropy $(\Delta\in)$ and refractive index anisotropy $(\Delta n)$.

Example 7

Synthesis of Compound (S7-1)

Compound (S7-1) is a compound of Formula (1-6-2), in which $R^1$ is $C_6H_{13}$, $L^3$ is hydrogen, $L^4$ and $L^5$ are both fluorine, and $X^1$ is fluorine.

(S7-1)

Phase Transition Point of Compound (S7-1)

Phase transition temperature of Compound (S7-1) is as follows.

Phase transition temperature (° C.): K 61.4 (N 13.5) I.

A liquid crystal composition AS7 containing 85 wt % of mother liquid crystal A and 15 wt % of (S7-1) obtained in Example 7 was prepared, and the characteristic values were determined. The extrapolated characteristic values of the liquid crystal compound (7-1) calculated based on the measurements using an extrapolation method are as follows.

Upper limit temperature $(T_{NI})$=−3.6° C.; dielectric anisotropy $(\Delta\in)$=45.7; and refractive index anisotropy $(\Delta n)$=0.110.

It can be seen from the results that the liquid crystal compound (S7-1) is well compatible with other liquid crystal compounds, and has a dielectric anisotropy $(\Delta\in)$.

Example 8

Synthesis of Compound (S8-1)

Compound (S8-1) is a compound of Formula (1-4-3), in which $R^1$ is $C_4H_9$, $L^1$ is hydrogen, $L^2$, $L^4$ and $L^5$ are all fluorine, and $X^1$ is fluorine.

(S8-1)

Synthesis of Compound (S8-1)

Synthesis of (S8-1) was accomplished according to the process for synthesizing (S1-11) in Example 1. The phase transition temperature of the resulting Compound (S8-1) is as follows.

Phase transition temperature (° C.): K 75.2 I.

A liquid crystal composition AS8 containing 85 wt % of mother liquid crystal A and 15 wt % of (S8-1) obtained in Example 8 was prepared, and the characteristic values were determined. The extrapolated characteristic values of the liquid crystal compound (8-1) calculated based on the measurements using an extrapolation method are as follows.

Upper limit temperature $(T_{NI})$=14.4° C.; dielectric anisotropy $(\Delta\in)$=47.6; and refractive index anisotropy $(\Delta n)$-0.130.

It can be seen from the results that the liquid crystal compound (S8-1) is well compatible with other liquid crystal compounds, and has a large dielectric anisotropy $(\Delta\in)$ and refractive index anisotropy $(\Delta n)$.

Example 9

Synthesis of Compound (S9-1)

Compound (S9-1) is a compound of Formula (1-4-3), in which $R^1$ is $C_5H_{11}$, $L^1$ is hydrogen, $L^2$, $L^4$ and $L^5$ are all fluorine, and $X^1$ is fluorine.

(S9-1)

Synthesis of Compound (S9-1)

Synthesis of (S9-1) was accomplished according to the process for synthesizing (S1-11) in Example 1. The phase transition temperature of the resulting Compound (S9-1) is as follows.

Phase transition temperature (° C.): K 56.6 (N 34.1) I.

A liquid crystal composition AS9 containing 85 wt % of mother liquid crystal A and 15 wt % of (S9-1) obtained in Example 9 was prepared, and the characteristic values were determined. The extrapolated characteristic values of the liquid crystal compound (9-1) calculated based on the measurements using an extrapolation method are as follows.

Upper limit temperature $(T_{NI})$=19.7° C.; dielectric anisotropy $(\Delta\in)$=49.6; refractive index anisotropy $(\Delta n)$=0.137.

It can be seen from the results that the liquid crystal compound (S9-1) is well compatible with other liquid crystal compounds, and has a large dielectric anisotropy $(\Delta\in)$ and refractive index anisotropy $(\Delta n)$.

Example 10

Synthesis of Compound (S10-1)

Compound (S10-1) is a compound of Formula (1-4-3), in which $R^1$ is $C_6H_{13}$, $L^1$ is hydrogen, $L^2$, $L^4$ and $L^5$ are all fluorine, and $X^1$ is fluorine.

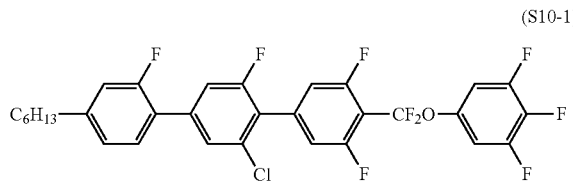

(S10-1)

Example 11

Synthesis of Compound (S11-1)

Compound (S11-1) is a compound of Formula (1-1-2), in which $R^1$ is $C_5H_{11}$, $L^1$ and $L^3$ are both hydrogen, $L^2$, $L^4$ and $L^5$ are all fluorine, and $X^1$ is fluorine.

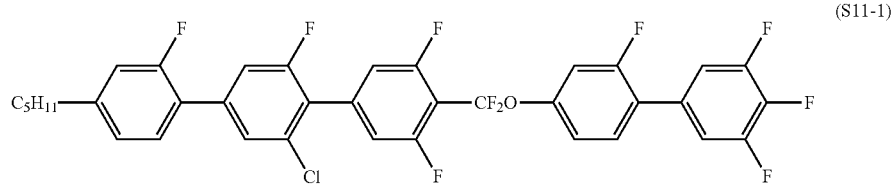

(S11-1)

Synthesis of Compound (S11-1)

Synthesis of (S11-1) was accomplished according to the process for synthesizing (S1-11) in Example 1. The phase transition temperature of the resulting Compound (S11-1) is as follows.

Phase transition temperature (° C.): K 95.7 N 149.0 I.

A liquid crystal composition AS11 containing 90 wt % of mother liquid crystal A and 10 wt % of (S11-1) obtained in Example 11 was prepared, and the characteristic values were determined. The extrapolated characteristic values of the liquid crystal compound (11-1) calculated based on the measurements using an extrapolation method are as follows.

Upper limit temperature $(T_{NI})$=76.7° C.; dielectric anisotropy $(\Delta\in)$=53.4; and refractive index anisotropy $(\Delta n)$=0.187.

It can be seen from the results that the liquid crystal compound (S11-1) has a high clear point, dielectric anisotropy $(\Delta\in)$ and refractive index anisotropy $(\Delta n)$.

(Composition of the Present Invention)

In the present invention, the characteristic values of the liquid crystal composition were measured according to the methods below. The methods are mainly those described in EIAJ•ED-2521A of the Standard of Electric Industries Association of Japan, or modifications of the same. The TN device used in the measurement was not equipped with TFT.

Upper-limit temperature of a nematic phase (NI, ° C.): A sample was placed on a heating plate in a melting point measuring apparatus equipped with a polarizing microscope, and heated at a rate of 1° C./min. The temperature at which a part of the sample began to change from a nematic phase to an isotropic liquid was determined. The upper-limit temperature of a nematic phase which is sometimes abbreviated as "upper-limit temperature".

Lower-limit temperature of a nematic phase $(T_c$, ° C.): A sample having a nematic phase was kept in a freezer at 0° C., –10° C., –20° C., –30° C., and –40° C. for 10 days, and observed for the liquid crystal phase. For example, in a case where the sample exhibits a nematic phase at –20° C., and is changed to a crystal (or a smectic phase) at –30° C., the $T_c$ is recorded as $\geq$–20° C. The lower-limit temperature of a nematic phase is sometimes abbreviated as "lower-limit temperature".

Transition temperature of an optically isotropic liquid crystal phase: a sample was placed on a heating plate in a melting point measuring apparatus equipped with a polarizing microscope with crossed Nicols, which was initially heated to a temperature allowing the sample to form a non-liquid crystal isotropic phase, and then cooled at a rate of 1° C./min until a chiral nematic phase or an optically isotropic liquid crystal phase was completely formed. The phase transition temperature during this cooling process was measured. Then, the temperature was raised at a rate of 1° C./min, and the phase transition temperature during this heating process was measured. In the present invention, unless specifically indicated, the phase transition temperature in the heating process was recorded as the phase transition temperature.

Where it was difficult to determine the phase transition temperature of the optically isotropic liquid crystal phase in a dark field under crossed Nicols, the phase transition temperature could be determined after the polarizing plate is deviated from the crossed Nicol state by 1-10 degrees.

Viscosity (η, determined at 20° C., mPa·s): The viscosity was measured with an E-type rotational viscometer.

Rotational viscosity (γ1, determined at 25° C., mPa·s):

1) For a sample with a positive dielectric anisotropy: The measurement was carried out according to the method described in M. Imai et al., *Molecular Crystals and Liquid*

*Crystals*, Vol. 259, 37 (1995). The sample was placed into a TN device with a twist angle of 0 degree and a distance (cell gap) of 5 μm between two glass substrates. The TN device was applied with a voltage in a range of 16 to 19.5 V stepwise by 0.5 V. After a period of 0.2 s without voltage application, a voltage application was repeated with a rectangular wave (rectangular pulse of 0.2 s) followed by a period of 2 s without voltage application. The peak current and the peak time of the transient current resulted from the application of the voltage were measured. Then, the value of rotational viscosity was calculated according to the measurements and the Equation (8) described in page 40 of the paper of M. Imai et al. The dielectric anisotropy value required for this calculation was obtained by using the device used in the measurement of the rotational viscosity, according to the method for determining dielectric anisotropy below.

2) For a sample with a negative dielectric anisotropy: the measurement was carried out according to the method described in M. Imai et al., *Molecular Crystals and Liquid Crystals*, Vol. 259, 37 (1995). The sample was placed into a vertical alignment (VA) device with a distance (cell gap) of 20 μm between two glass substrates. The device was applied with a voltage in a range of 30 to 50 V stepwise by 1 V. After a period of 0.2 s without voltage application, a voltage application was repeated with a rectangular wave (rectangular pulse of 0.2 s) followed by a period of 2 s without voltage application. The peak current and the peak time of the transient current resulted from the application of the voltage were measured. Then, the value of rotational viscosity was calculated according to the measurements and the Equation (8) described in page 40 of the paper of M. Imai et al. The dielectric anisotropy value required for this calculation was obtained by using the method below.

Refractive index anisotropy (Δn, determined at 25° C.): the measurement was carried out by using light having a wavelength of 589 nm, with an Abbe refractometer having a polarizing plate mounted on the ocular lens. After the surface of the main prism was rubbed in a direction, the sample was dropped onto the main prism. The refractive index ($n_\parallel$) was determined when the polarizing direction was paralleled to the rubbing direction, and the refractive index ($n_\perp$) was determined when the polarizing direction was perpendicular to the rubbing direction. The value of refractive index anisotropy was calculated according the equation $\Delta n = n_\parallel - n_\perp$. When the sample was a composition, the process could be used to determine the refractive index anisotropy. When the sample was a compound, the compound could be mixed with a suitable composition and then determined for the refractive index anisotropy of the mixture. In this case, the refractive index anisotropy of the compound was an extrapolated value.

Dielectric anisotropy (ΔЄ, determined at 25° C.): when the sample was a compound, the compound could be mixed with a suitable composition and then determined for the dielectric anisotropy. In this case, the dielectric anisotropy of the compound was an extrapolated value.

1) For a composition with a positive dielectric anisotropy: A sample was placed into a liquid crystal cell with a distance (gap) of about 9 μm between two glass substrates and a twist angle of 80 degrees. The cell was applied with a voltage of 20 V to determine the dielectric ($\epsilon_\parallel$) in the major axis direction of the liquid crystal molecule. Then, a voltage of 0.5 V was applied to determine the dielectric ($\epsilon_\perp$) in the minor axis direction of the liquid crystal molecule. The value of dielectric anisotropy was calculated according to the equation $\Delta\epsilon = \epsilon_\parallel - \epsilon_\perp$.

2) For a composition with a negative dielectric anisotropy: A sample was placed into a liquid crystal cell, which was processed into homeotropic alignment, and applied with a voltage of 0.5 v to determine the dielectric ($\epsilon_\parallel$). Then, the sample was placed into a liquid crystal cell, which was processed into homogeneous alignment, and applied with a voltage of 0.5 v to determine the dielectric ($\epsilon_\perp$). The value of dielectric anisotropy was calculated according to the equation $\Delta\epsilon = \epsilon_\parallel - \epsilon_\perp$.

Threshold voltage (Vth, determined at 25° C., V): When the sample was a compound, the compound could be mixed with a suitable composition and then measured for the threshold voltage. In this case, the threshold voltage of the compound was an extrapolated value. 1) For a composition with a positive dielectric anisotropy: A sample was placed into an LCD device of a normally white mode with a distance (gap) of $(0.5/\Delta n)$ μm between two glass substrates and a twist angle of 80 degrees, in which Δn was the value of refractive index anisotropy determined by using the method above. A rectangular wave with a frequency of 32 Hz was applied to the device. Then, the voltage of rectangular wave was increased, and the voltage value at which the transmittance of light through the device reached 90% was determined.

2) For a composition with a negative dielectric anisotropy: A sample was placed into an LCD device of a normally black mode with a distance (gap) of about 9 μm between two glass substrates, which was processed into homeotropic alignment. A rectangular wave with a frequency of 32 Hz was applied to the device. Then, the voltage of rectangular wave was increased, and the voltage value at which the transmittance of light through the device reached 10% was determined.

Voltage holding ratio (VHR, determined at 25° C., %): The TN device used for the determination had a polyimide alignment film and a distance (cell gap) of 6 μm between two glass substrates. A sample was placed into the device, which was then sealed with a UV-polymerizable adhesive. Then, the TN device was charged by applying a pulse voltage (5V, 60 ms). The voltage decay was determined by using a high-speed voltmeter at an interval of 16.7 ms, and the area A between the voltage curve and the horizontal axis per unit cycle was calculated. The voltage holding ratio was the percentage of the area A relative to the non-decayed area B.

Helical pitch (determined at 20° C., μm): The helical pitch was measured according to the Cano wedge cell method. A sample was injected into a Cano wedge cell, and then the distance (a, in μm) between the disclination lines observed from the wedge cell was measured. The helical pitch (p) is calculated according to the equation $p = 2 \cdot a \cdot \tan\theta$, in which θ is the angle between the two glass plates in the wedge cell.

Alternatively, the pitch length can be determined by selective reflection (Handbook of Liquid Crystal, p 196, issued in 2000, by Maruzen). For the selective reflection wavelength λ, the relationship $\langle n \rangle p/\lambda = 1$ exists, where $\langle n \rangle$ denotes the average refractive index, and can be calculated with the equation $\langle n \rangle = \{(n_\parallel^2 + n_\perp^2)/2\}^{1/2}$. The selective reflection wavelength was determined with a micro-spectrophotometer (trade name MSV-350, manufactured by Japan Electronics Co., Ltd.). The pitch was obtained by dividing the resulting reflection wavelength with the average refractive index.

When the concentration of the chiral reagent is low, the pitch of the cholesteric liquid crystal having a reflection wavelength in a region of wavelength longer than that of visible light is proportional to the reciprocal of the concentration. Therefore, multiple points were measured in the pitch length of the liquid crystal having a selective reflection wavelength in the visible light region, and the pitch was calculated by using a linear extrapolation method.

The proportion (percentage) of a component or a liquid crystal compound is weight percentage (wt %) based on the total weight of the liquid crystal compounds. The composition can be prepared by mixing the components including liquid crystal compounds after being weighed. Thus, the wt % of each component can be easily calculated.

Example 12

A liquid crystal composition A was prepared by mixing the liquid crystal compounds shown in figure below in the following ratios.

The number of the compound of the present invention corresponding to a general formula is recorded at the right side of the structural formula Liquid Crystal Composition A Phase transition temperature (° C.) of the liquid crystal composition A is N 63.1-64.2 I.

Then, a liquid crystal composition B containing the liquid crystal composition A (94.2 wt %) and chiral reagents BN—H3 (2.9 wt %) and BN—H5 (2.9 wt %) represented by formulas below was obtained.

Phase transition temperature (° C.) of the liquid crystal composition B is N* 51.5 BP 53.4 I.

In addition, BN—H3 and BN—H5 were obtained by esterification of (R)-(+)-1,1'-bis(2-naphthol) and a corresponding carboxylic acid, in the presence of dicyclohexyl carbodiimide (DCC).

BN-H3

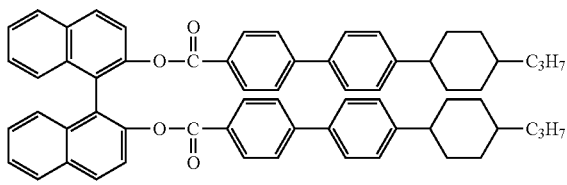

(9-18)

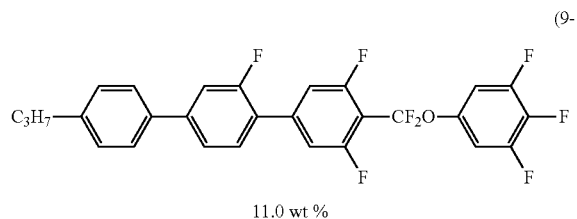

11.0 wt %

(9-18)

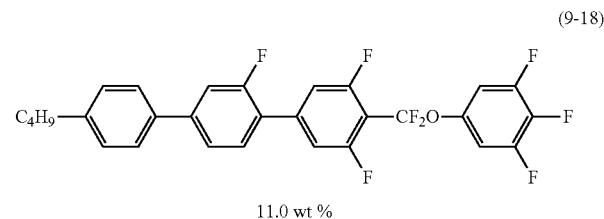

11.0 wt %

(9-18)

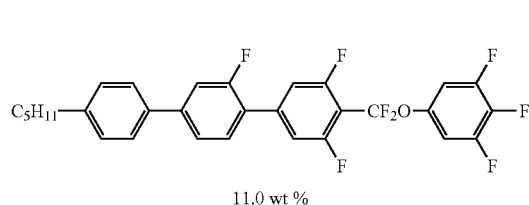

11.0 wt %

(S1-11)

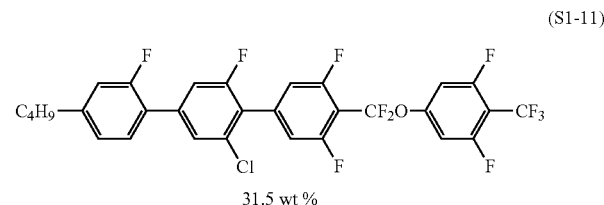

31.5 wt %

(S2-1)

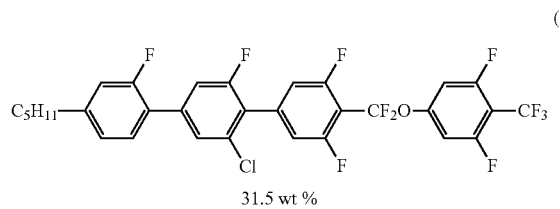

31.5 wt %

(9-17)

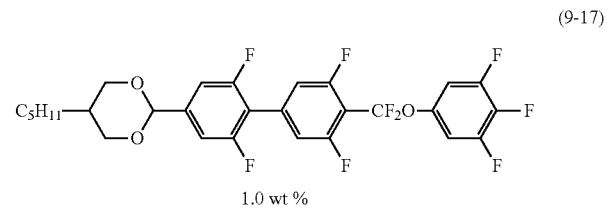

1.0 wt %

(10-3)

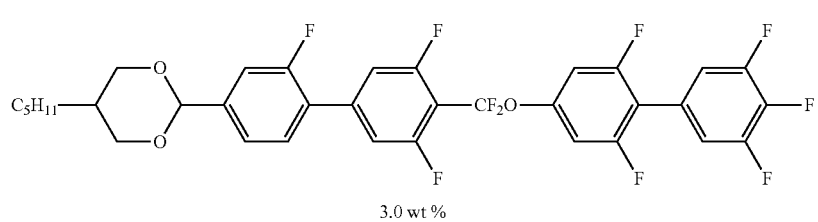

3.0 wt %

-continued

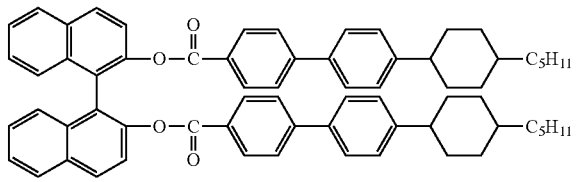
BN-H5

Example 13

Preparation of Mixture of Monomer and Liquid Crystal Composition

A liquid crystal composition B-1M was prepared by mixing 79.4 wt % of the liquid crystal composition B, 10.0 wt % of n-dodecyl acrylate, 10.0 wt % of 1,4-bis(4-(6-(acryloxy)hexyloxy)benzoyloxy)-2-methylbenzene (LCA-6), 0.6 wt % of 2,2'-dimethoxyphenylacetophenone as a photo polymerization initiator, and was used as a mixture of the liquid crystal composition and a monomer.

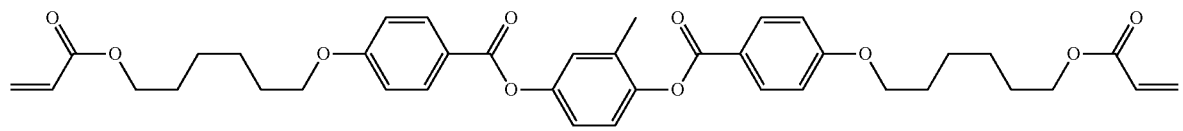
LCA-6

Preparation of Polymer/Liquid Crystal Composite Material

The liquid crystal composition B-1M was held between a non-aligned comb-like electrode substrate and the opposite glass substrate (without an electrode) with a cell thickness of 10 μm, and then the resulting cell was heated until a non-liquid crystal isotropic phase was formed at 57.0° C. In this state, the cell was irradiated with UV light of 365 nm at an intensity of 23 mWcm$^{-2}$ for 1 min for polymerization.

The polymer/liquid crystal composite material B-1P thus prepared could maintain an optically isotropic liquid crystal phase even being cooled to room temperature.

Example 14

Preparation of Mixture of Monomer and Liquid Crystal Composition

A liquid crystal composition B-2M was prepared by mixing 89.4 wt % of the liquid crystal composition B, 5.0 wt % of n-dodecyl acrylate, 5.0 wt % of 1,4-bis(4-(6-(acryloxy)hexyloxy)benzoyloxy)-2-methylbenzene, and 0.6 wt % of 2,2'-dimethoxyphenylacetophenone as a photo polymerization initiator, and was used as a mixture of the liquid crystal composition and a monomer.

Preparation of Polymer/Liquid Crystal Composite Material

The liquid crystal composition B-2M was held between a non-aligned comb-like electrode substrate and the opposite glass substrate (without an electrode) with a cell thickness of 10 μm, and then the resulting cell was controlled to be 18.5° C., so that a blue phase is exhibited. In this state, the cell was irradiated with UV light of 365 nm at an intensity of 23 mWcm$^2$ for 1 min for polymerization.

The polymer/liquid crystal composite material B-2P thus prepared could maintain an optically isotropic liquid crystal phase even being cooled to room temperature.

Furthermore, as shown in FIG. 1, the electrodes on the comb-like electrode substrate were structured such that the electrode 1 extending from the left side and the electrode 2 extending from the right side were alternatively arranged. Therefore, when there is a potential difference between the electrode 1 and the electrode 2, the comb-like electrode substrate is provided with an electric field in two directions (upward and downward), as shown in FIG. 1.

Example 15

Figure 2:
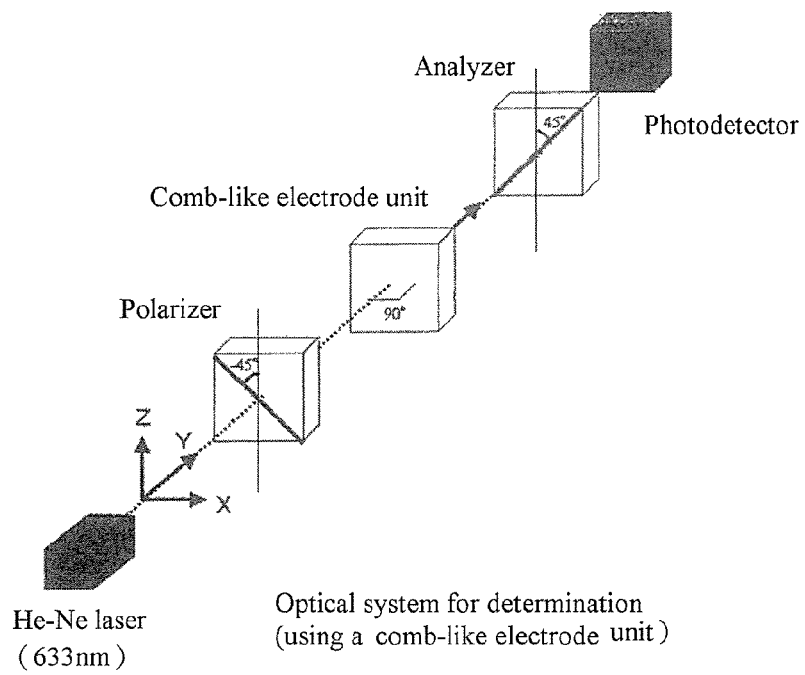
FIG. 2 shows an optical system used in Examples 8, 9, 12, and 15.

A cell holding the polymer/liquid crystal composite material B-1P obtained in Example 13 was arranged in the optical system of FIG. 2 to measure the electro-optical properties. The light source was the white light source with a polarizing microscope (ECLIPSE LV100POL, manufactured by Nikon). The cell was arranged in the optical system in a manner such that the incident light from the light source irradiated on the cell was perpendicular to the surface of the cell, and the line direction of the comb-like electrode was at 45 degrees with respect to the polarizer and the analyzer respectively. The relationship between the applied voltage and the transmittance was investigated. If a rectangular wave of 65.0 V was applied, then the transmittance was up to 83%, and the transmitted light intensity was saturated.

Example 16

A cell holding the polymer/liquid crystal composite material B-2P obtained in Example 14 was arranged in the optical system of FIG. 2 to measure the electro-optical properties. The light source was the white light source with a polarizing microscope (ECLIPSE LV100POL, manufactured by Nikon). The cell was arranged in the optical system in a manner such that the incident light from the light source irradiated on the cell was perpendicular to the surface of the cell, and the line direction of the comb-like electrode was at 45 degrees with respect to the polarizer and the analyzer respectively. The relationship between the applied voltage and the transmittance was investigated at room temperature. If a rectangular wave of 65.0 V was applied, then the transmittance was up to 79%, and the transmitted light intensity was saturated.

Example 17

A liquid crystal composition C was prepared by mixing the liquid crystal compounds shown in figure below in the following ratios.

The number of the compound of the present invention corresponding to a general formula is recorded at the right side of the structural formula.

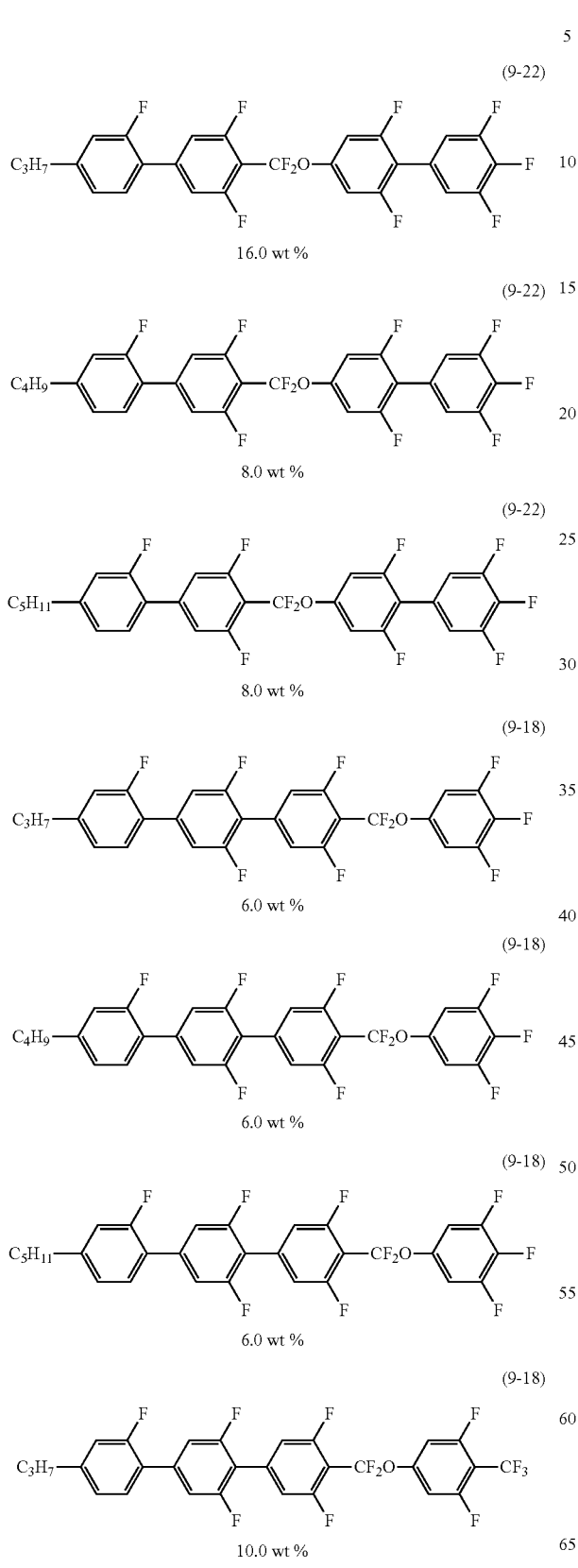

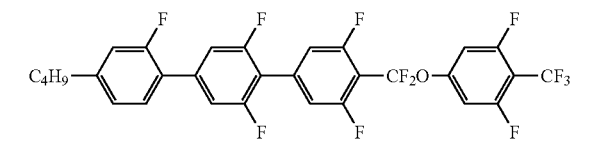

10.0 wt %

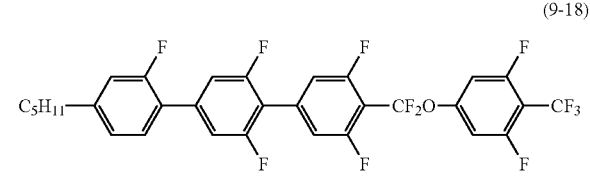

10.0 wt %

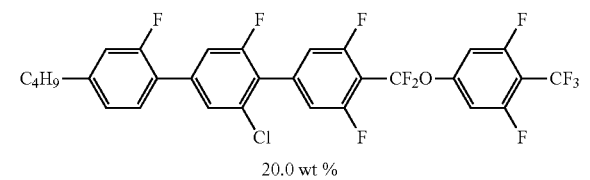

20.0 wt %

Phase transition temperature (° C.) of the liquid crystal composition C is N 89.2-89.5 I.

Then, a liquid crystal composition D containing the liquid crystal composition C (90.0 wt %) and chiral reagents BN—O5 (2.9 wt %) and BN—O6 (5.0 wt %) represented by formulas below was obtained.

Phase transition temperature (° C.) of the liquid crystal composition D is 153.4 (N*+I).

In addition, BN—O5 and BN—O6 were obtained through esterification of (R)-(+)-1,1'-bis(2-naphthol) and a corresponding carboxylic acid, in the presence of dicyclohexyl carbodiimide (DCC).

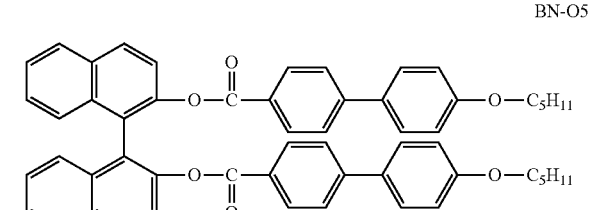

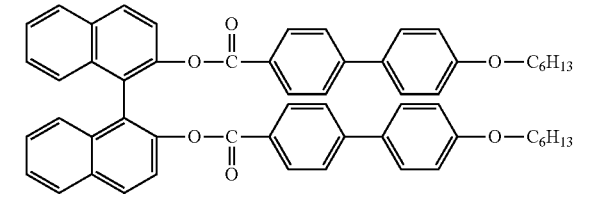

Example 18

Preparation of Mixture of Monomer and Liquid Crystal Composition

A liquid crystal composition D-1M was prepared by mixing 79.4 wt % of the liquid crystal composition D, 10.0 wt % of n-dodecyl acrylate, 10.0 wt % of 1,4-bis(4-(6-(acryloxy) hexyloxy)benzoyloxy)-2-methylbenzene, and 0.6 wt % of 2,2'-dimethoxyphenylacetophenone as a photo polymerization initiator, and was used as a mixture of the liquid crystal composition and a monomer.

Preparation of Polymer/Liquid Crystal Composite Material

The liquid crystal composition D-1M was held between a non-aligned comb-like electrode substrate and the opposite glass substrate (without an electrode) with a cell thickness of 10 μm, and then the resulting cell was heated until a non-liquid crystal isotropic phase was fowled at 63.0° C. In this state, the cell was irradiated with UV light of 365 nm at an intensity of 23 mWcm$^{-2}$ for 1 min for polymerization.

The polymer/liquid crystal composite material D-1P thus prepared could maintain an optically isotropic liquid crystal phase even being cooled to room temperature.

Example 19

A cell holding the polymer/liquid crystal composite material D-1P obtained in Example 18 was arranged in the optical system of FIG. 2 to measure the electro-optical properties. The light source was the white light source with a polarizing microscope (ECLIPSE LV100POL, manufactured by Nikon). The cell was arranged in the optical system in a manner such that the incident light from the light source irradiated on the cell was perpendicular to the surface of the cell, and the line direction of the comb-like electrode was at 45 degrees with respect to the polarizer and the analyzer respectively. The relationship between the applied voltage and the transmittance was investigated at room temperature. If a rectangular wave of 41.0 V was applied, then the transmittance was up to 85%, and the transmitted light intensity was saturated.

Example 20

A liquid crystal composition E was prepared by mixing the liquid crystal compounds shown in figure below in the following ratios.

The number of the compound of the present invention corresponding to a general formula is recorded at the right side of the structural formula.

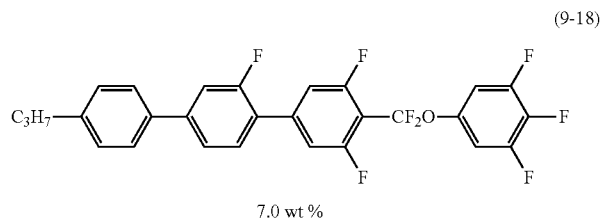
(9-18)
7.0 wt %

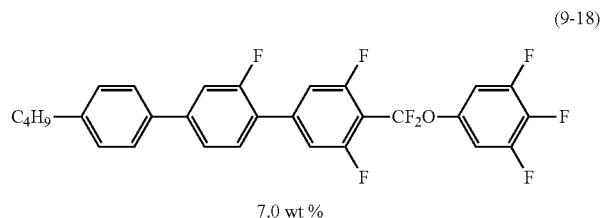
(9-18)
7.0 wt %

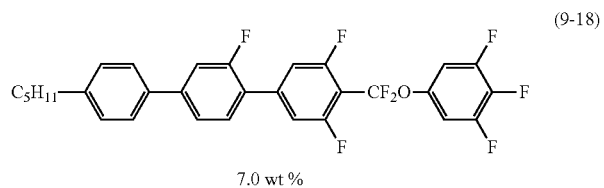
(9-18)
7.0 wt %

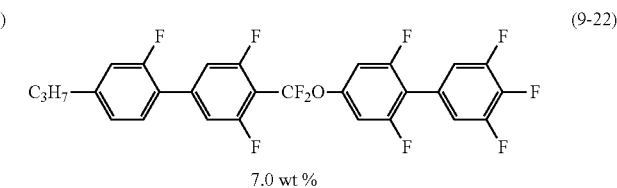
(9-22)
7.0 wt %

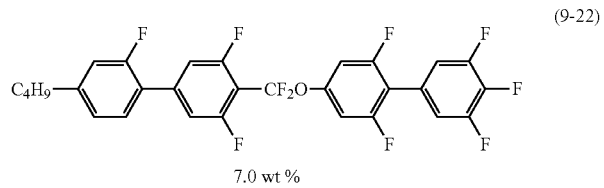
(9-22)
7.0 wt %

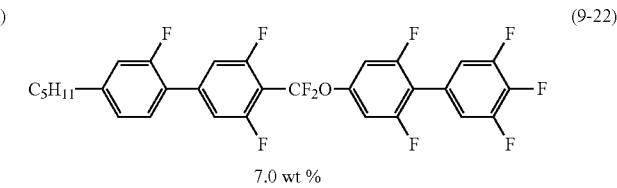
(9-22)
7.0 wt %

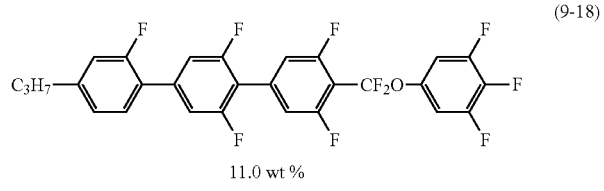
(9-18)
11.0 wt %

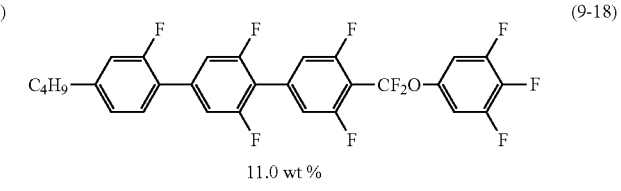
(9-18)
11.0 wt %

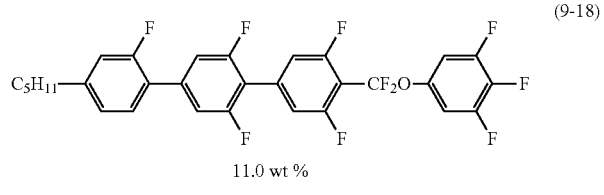
(9-18)
11.0 wt %

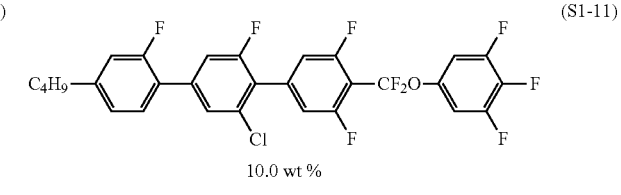
(S1-11)
10.0 wt %

-continued

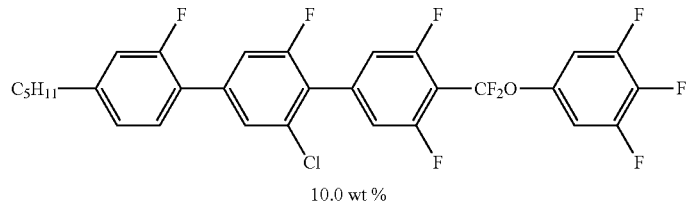
(S2-1)
10.0 wt %

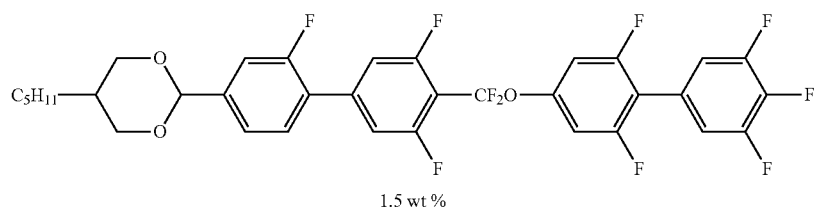
(10-3)
1.5 wt %

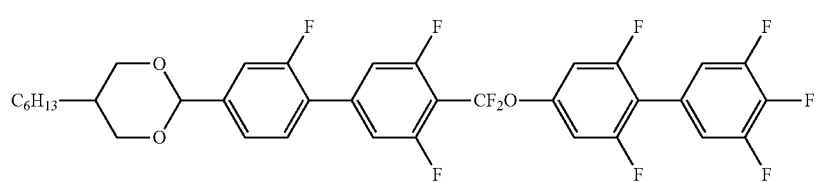
(10-3)
1.5 wt %

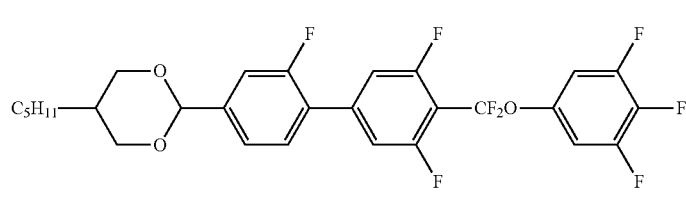
(9-17)
2.0 wt %

Phase transition temperature (° C.) of the liquid crystal composition E is N 89.2-89.5 I.

Then, a liquid crystal composition F containing the liquid crystal composition E (93.0 wt %), and a chiral reagent BN—H3 (4.0 wt %) and BN-5 (3.0 wt %) was obtained.

Phase transition temperature (° C.) of the liquid crystal composition F is N*73.0 BP 76.0 I.

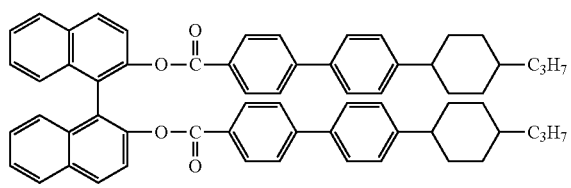
BN-H3

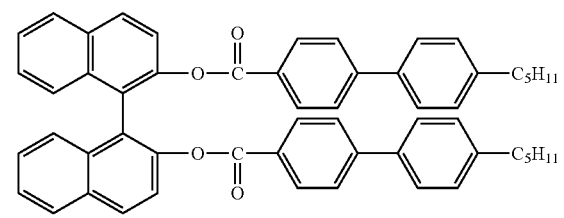
BN-5

Example 21

Preparation of Mixture of Monomer and Liquid Crystal Composition

A liquid crystal composition F-1M was prepared by mixing 89.4 wt % of the liquid crystal composition F, 5.0 wt % of n-dodecyl acrylate, 5.0 wt % of 1,4-bis(4-(6-(acryloxy)hexyloxy)benzoyloxy)-2-methylbenzene, and 0.6 wt % of 2,2'-dimethoxyphenylacetophenone as a photo polymerization initiator, and was used as a mixture of the liquid crystal composition and a monomer.

Preparation of Polymer/Liquid Crystal Composite Material

The liquid crystal composition F-1M was held between a non-aligned comb-like electrode substrate and the opposite glass substrate (without an electrode) with a cell thickness of 10 um, and then the resulting cell was heated until a blue phase was formed at 35.0° C. In this state, the cell was irradiated with UV light of 365 nm at an intensity of 23 mWcm$^{-2}$ for 1 min for polymerization.

The polymer/liquid crystal composite material F-1P thus prepared could maintain an optically isotropic liquid crystal phase even being cooled to room temperature.

Example 22

A cell holding the polymer/liquid crystal composite material F-1P obtained in Example 21 was arranged in the optical system of FIG. 2 to measure the electro-optical properties. The light source was the white light source with a polarizing microscope (ECLIPSE LV100POL, manufactured by Nikon). The cell was arranged in the optical system in a manner such that the incident light from the light source irradiated on the cell was perpendicular to the surface of the cell, and the line direction of the comb-like electrode was at 45 degrees with respect to the polarizer and the analyzer respectively. The relationship between the applied voltage and the transmittance was investigated at room temperature. If a rectangular wave of 55.0 V was applied, then the transmittance was up to 86%, and the transmitted light intensity was saturated.

Example 23

A liquid crystal composition G was prepared by mixing the liquid crystal compounds shown in figure below in the following ratios.

The number of the compound of the present invention corresponding to a general formula is recorded at the right side of the structural formula.

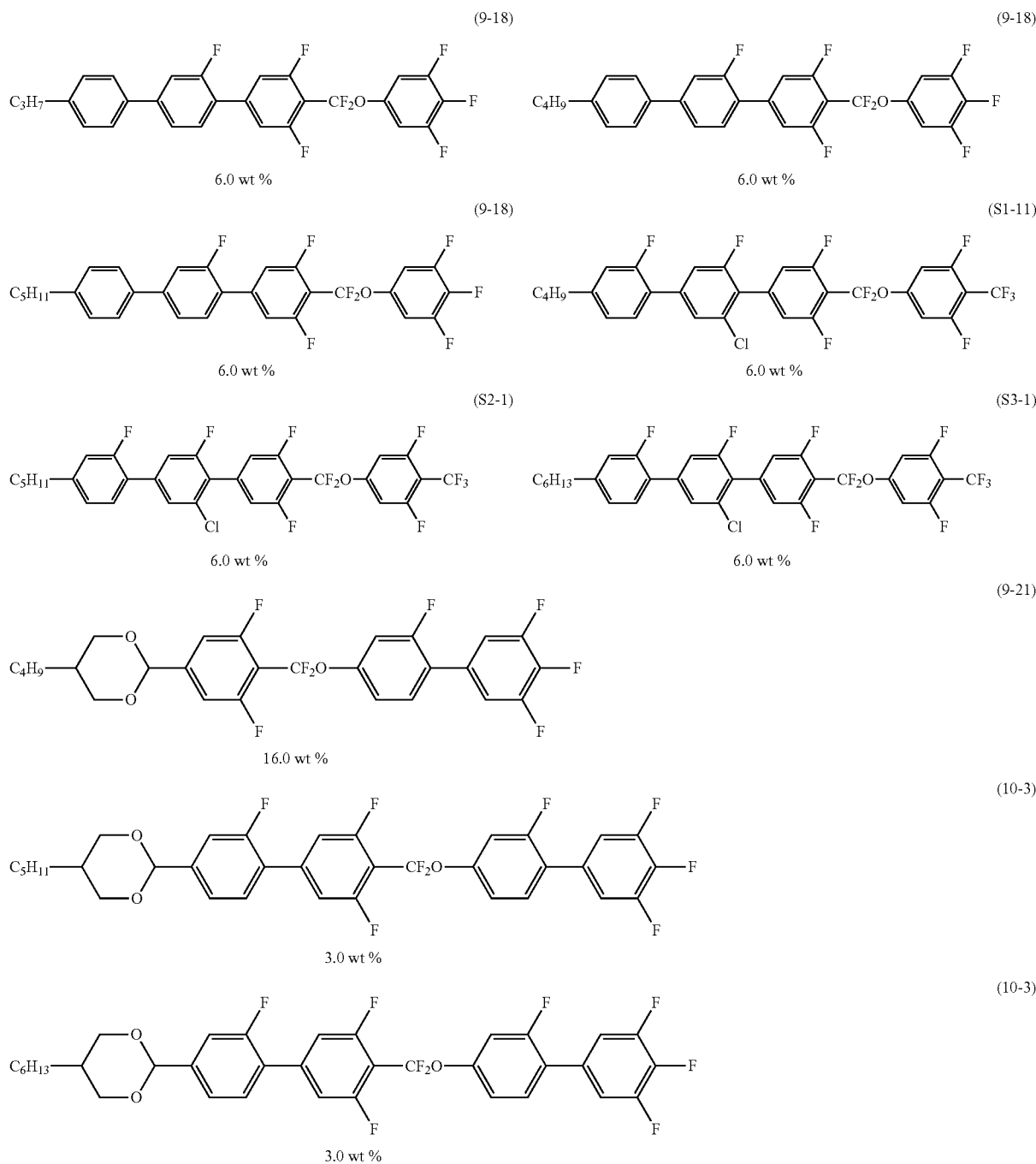

-continued

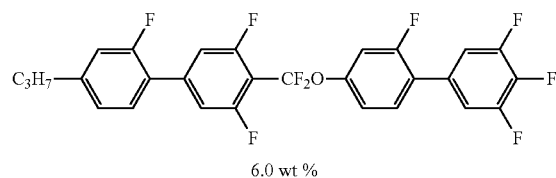

(9-22) 6.0 wt % (left)
(9-22) 6.0 wt % (right)

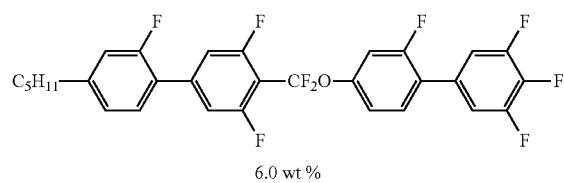

(9-22) 6.0 wt % (left)
(S8-1) 8.0 wt % (right)

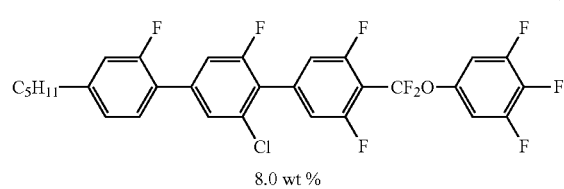

(S9-1) 8.0 wt % (left)
(S10-1) 8.0 wt % (right)

Phase transition temperature (° C.) of the liquid crystal composition G is N 87.1-87.8 I.

Then, a liquid crystal composition H containing the liquid crystal composition G (91.5 wt %) and chiral reagents BN—H3 (4.75 wt %) and BN-5 (3.75 wt %) was obtained.

Phase transition temperature (° C.) of the liquid crystal composition H is N*60.1 BP.

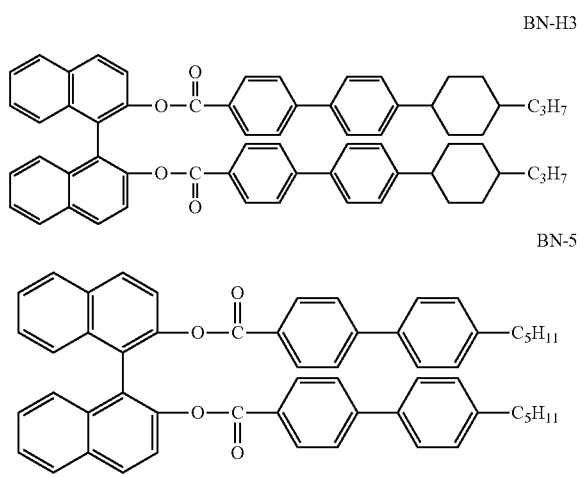

BN-H3

BN-5

Example 24

Preparation of Mixture of Monomer and Liquid Crystal Composition

A liquid crystal composition H-1M was prepared by mixing 89.4 wt % of the liquid crystal composition H, 5.0 wt % of n-dodecyl acrylate, 5.0 wt % of 1,4-bis(4-(6-(acryloxy)hexyloxy)benzoyloxy)-2-methylbenzene, and 0.6 wt % of 2,2'-dimethoxyphenylacetophenone as a photo polymerization initiator, and was used as a mixture of the liquid crystal composition and a monomer.

Preparation of Polymer/Liquid Crystal Composite Material

The liquid crystal composition H-1M was held between a non-aligned comb-like electrode substrate and the opposite glass substrate (without electrode) with a cell thickness of 10 μm, and then the resulting cell was heated until a blue phase was formed at 34.0° C. In this state, the cell was irradiated with UV light of 365 nm at an intensity of 23 mWcm$^{-2}$ for 1 min for polymerization.

The polymer/liquid crystal composite material H-1P thus prepared could maintain an optically isotropic liquid crystal phase even being cooled to room temperature.

Example 25

A cell holding the polymer/liquid crystal composite material H-1P obtained in Example 24 was arranged in the optical system of FIG. 2 to measure the electro-optical properties. The light source was the white light source with a polarizing microscope (ECLIPSE LV100POL, manufactured by Nikon). The cell was arranged in the optical system in a manner such that the incident light from the light source irradiated on the cell was perpendicular to the surface of the cell, and the line direction of the comb-like electrode was at 45 degrees with respect to the polarizer and the analyzer respectively. The relationship between the applied voltage and the transmittance was investigated at room temperature. If a rectangular wave of 75.0 V was applied, then the transmittance was up to 85%, and the transmitted light intensity was saturated. The response time when a saturation voltage is applied at room temperature is increased to be 1.1 ms and is decreased to be 0.4 ms, and is a high-speed response time.

Example 26

A liquid crystal composition I was prepared by mixing the liquid crystal compounds shown in figure below in the following ratios.

The number of the compound of the present invention corresponding to a general formula is recorded at the right side of the structural formula.

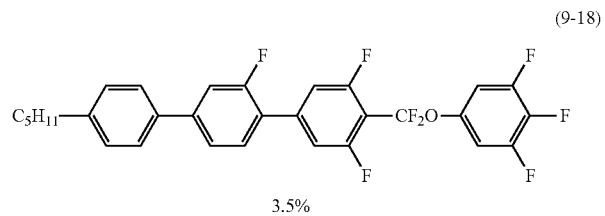
(9-18)
3.5%

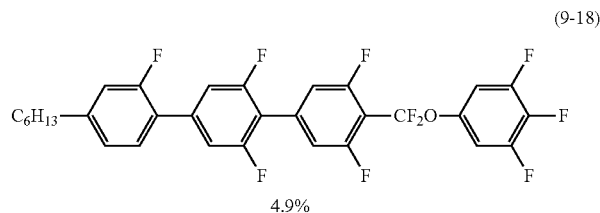
(9-18)
4.9%

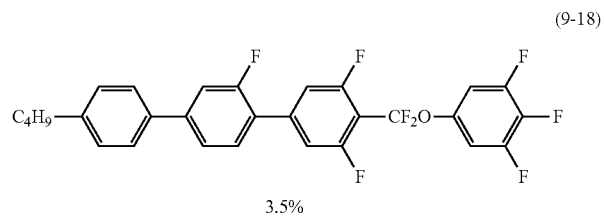
(9-18)
3.5%

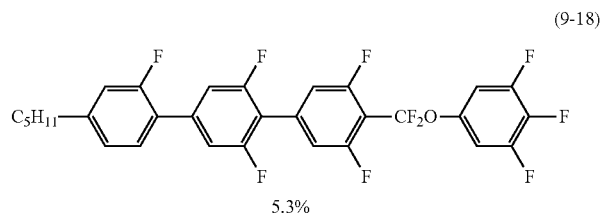
(9-18)
5.3%

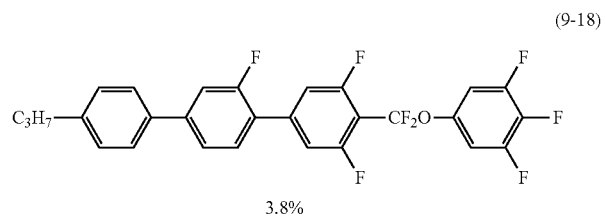
(9-18)
3.8%

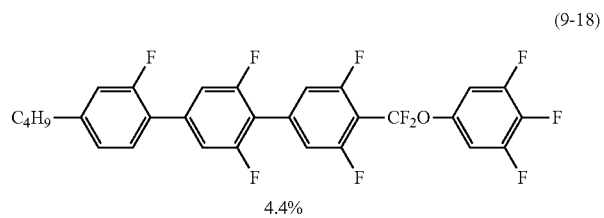
(9-18)
4.4%

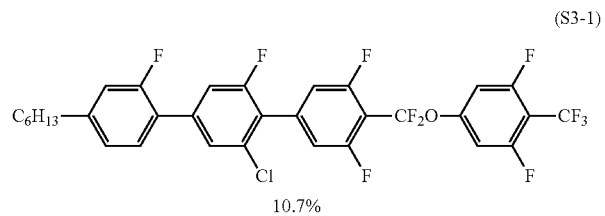
(S3-1)
10.7%

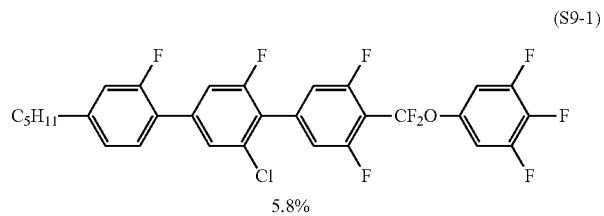
(S9-1)
5.8%

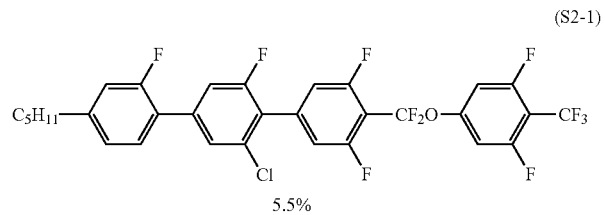
(S2-1)
5.5%

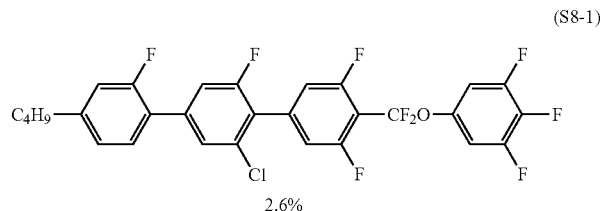
(S8-1)
2.6%

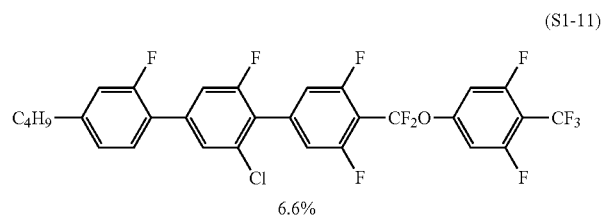
(S1-11)
6.6%

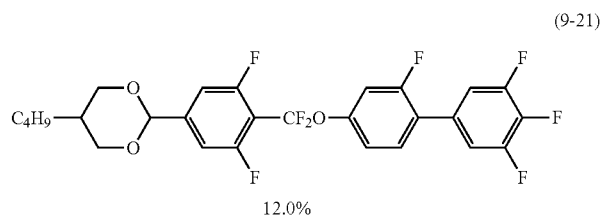
(9-21)
12.0%

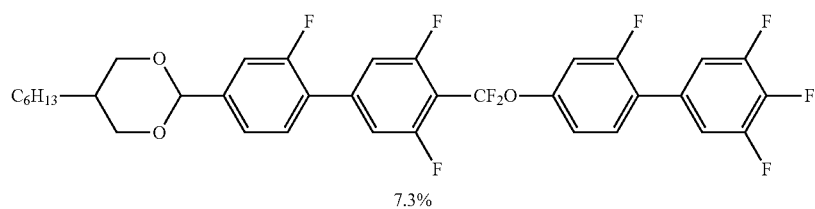
(10-3)
7.3%
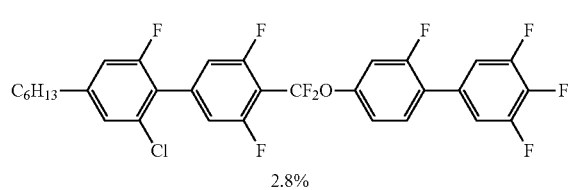
(S7-1)
2.8%
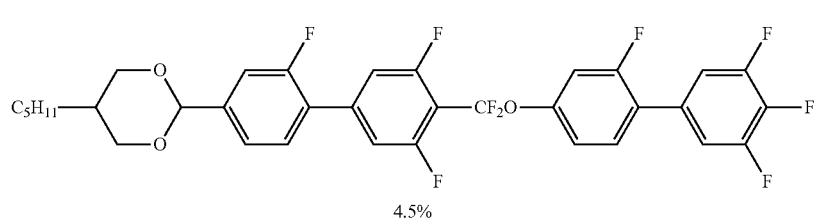
(10-3)
4.5%
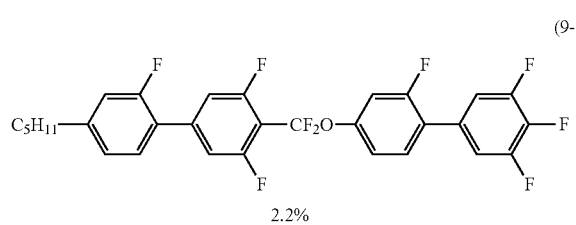
(9-22)
2.2%
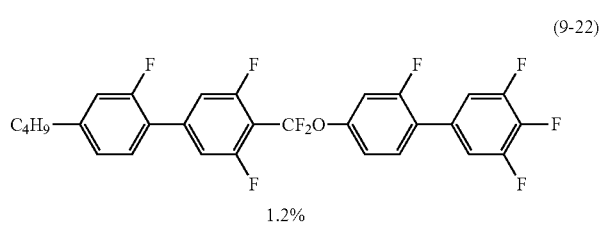
(9-22)
1.2%
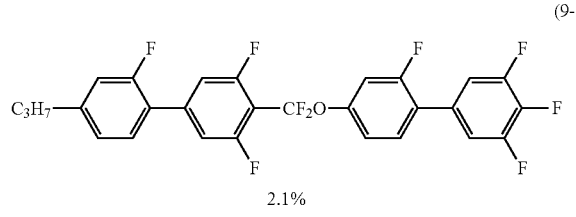
(9-22)
2.1%
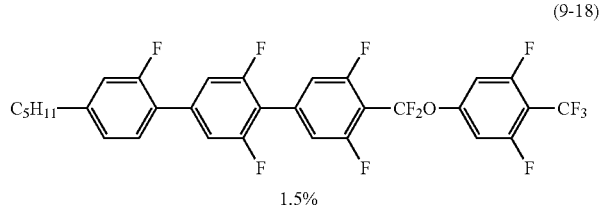
(9-18)
1.5%
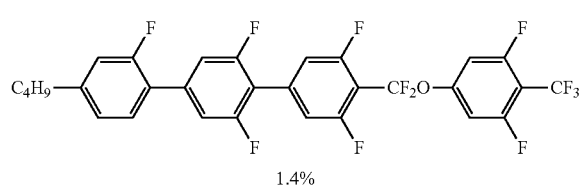
(9-18)
1.4%
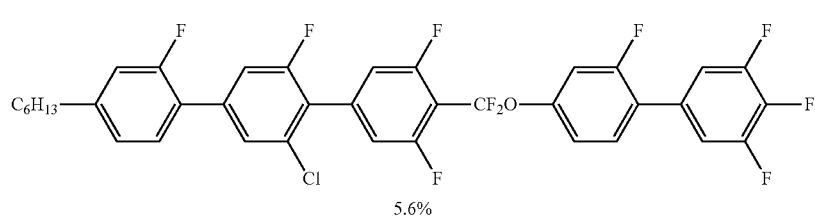
(S4-1)
5.6%

-continued (S11-1)

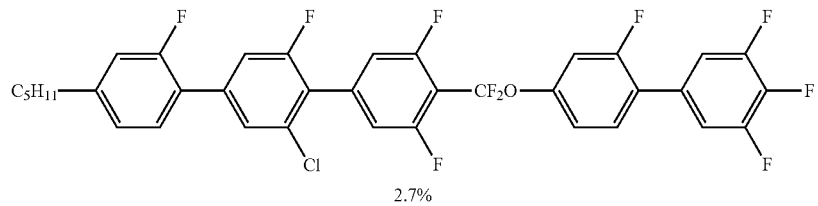

2.7%

Phase transition temperature (° C.) of the liquid crystal composition I is N 87.3-88.9 I.

Then, a liquid crystal composition J containing the liquid crystal composition I (93.7 wt %) and the chiral reagent BN—H3 (6.3 wt %) was obtained.

Phase transition temperature (° C.) of the liquid crystal composition J is N*74.8 BP.

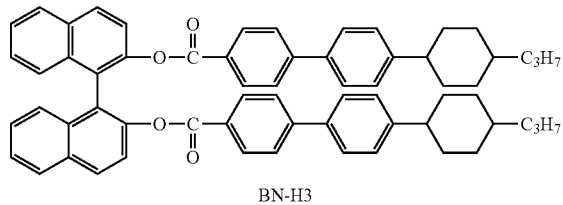

BN-H3

Example 27

Preparation of Mixture of Monomer and Liquid Crystal Composition

A liquid crystal composition J-1M was prepared by mixing 89.0 wt % of the liquid crystal composition J, 5.4 wt % of n-dodecyl acrylate, 5.0 wt % of 1,4-bis(4-(6-(acryloxy)hexyloxy)benzoyloxy)-2-methylbenzene, and 0.6 wt % of 2,2'-dimethoxyphenylacetophenone as a photo polymerization initiator, and was used as a mixture of the liquid crystal composition and a monomer.

Preparation of Polymer/Liquid Crystal Composite Material

The liquid crystal composition J-1M was held between a non-aligned comb-like electrode substrate and the opposite glass substrate (without an electrode) with a cell thickness of 10 μm, and then the resulting cell was heated until a blue phase was formed at 41.0° C. In this state, the cell was irradiated with UV light of 365 nm at an intensity of 23 mWcm$^{-2}$ for 1 min for polymerization.

The polymer/liquid crystal composite material J-1P thus prepared could maintain an optically isotropic liquid crystal phase even being cooled to room temperature.

Example 28

A cell holding the polymer/liquid crystal composite material J-1P obtained in Example 27 was arranged in the optical system of FIG. 2 to measure the electro-optical properties. The light source was the white light source with a polarizing microscope (ECLIPSE LV100POL, manufactured by Nikon). The cell was arranged in the optical system in a manner such that the incident light from the light source irradiated on the cell was perpendicular to the surface of the cell, and the line direction of the comb-like electrode was at 45 degrees with respect to the polarizer and the analyzer respectively. The relationship between the applied voltage and the transmittance was investigated at room temperature. If a rectangular wave of 65 V was applied, then the transmittance was up to 87%, and the transmitted light intensity was saturated. The cell maintains an optical isotropy without crystallization at 0° C. for 1 week.

APPLICABILITY IN INDUSTRY

The present invention is applicable, for example, in the field of optical device, such as display device using a liquid crystal medium.

What is claimed is:

1. A compound, represented by Formula (1):

(1)

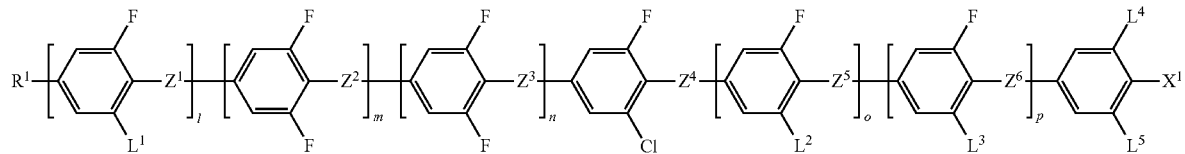

wherein in Formula (1), $R^1$ is hydrogen or a $C_{1-20}$ alkyl, wherein arbitrary —CH$_2$— in the alkyl may be substituted with —O—, —S—, —COO—, —OCO—, —CH=CH—, —CF=CF— or —C≡C—, and arbitrary hydrogen in the alkyl and the alkyl with arbitrary —CH$_2$— substituted with —O—, —S—, —COO—, —OCO—, —CH=CH—, —CF=CF—, or —C≡C— may be substituted with halogen or a $C_{1-3}$ alkyl; $Z^1$, $Z^2$, $Z^3$, $Z^4$, $Z^5$, and $Z^6$ are independently a single bond or —CF$_2$O—, provided that at least one of $Z^1$, $Z^2$, $Z^3$, $Z^4$, $Z^5$, and $Z^6$ is —CF$_2$O—; $L^1$, $L^2$, $L^3$, $L^4$, and $L^5$ are independently hydrogen or fluorine; $X^1$ is halogen, —C≡N, —N=C=S, —SF$_5$ or a $C_{1-3}$ alkyl in which arbitrary hydrogen is substituted with fluorine, and arbitrary —CH$_2$— in the alkyl may be substituted with —O—, —S—, —CH=CH— or —C≡C—; and l, m, n, o and p are independently 0 or 1, and 1≦l+m+n+o+p≦3.

2. The liquid crystal compound according to claim 1, wherein in Formula (1), $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or —(CH$_2$)$_v$—CH=CF$_2$, in which v is 0 or an integer of 1-19; and $X^1$ is halogen, —SF$_5$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$, or —CH=CHCF$_2$CF$_3$.

3. The liquid crystal compound according to claim 1, wherein in Formula (1), $R^1$ is a $C_{1-20}$ alkyl or a $C_{2-21}$ alkenyl.

4. The liquid crystal compound according to claim 1, represented by Formula (1-1), Formula (1-2), Formula (1-3), Formula (1-4), Formula (1-5) or Formula (1-6):

wherein in the formulas, $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or —(CH$_2$)$_v$—CH=CF$_2$, in which v is 0 or an integer of 1-19; $Z^1$, $Z^2$, $Z^3$, $Z^4$, $Z^5$ and $Z^6$ are independently a single bond or —CF$_2$O—, provided that at least one of $Z^1$, $Z^2$, $Z^3$, $Z^4$, $Z^5$ and $Z^6$ is —CF$_2$O—; $L^1$, $L^2$, $L^3$, $L^4$ and $L^5$ are independently hydrogen or fluorine; and $X^1$ is halogen, —SF$_5$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$, or —CH=CHCF$_2$CF$_3$.

5. The liquid crystal compound according to claim 4, represented by Formula (1-1-1), Formula (1-1-2), Formula (1-2-1), Formula (1-2-2), Formula (1-3-1), Formula (1-3-2), Formula (1-4-2), Formula (1-4-3), Formula (1-5-3) or Formula (1-6-2):

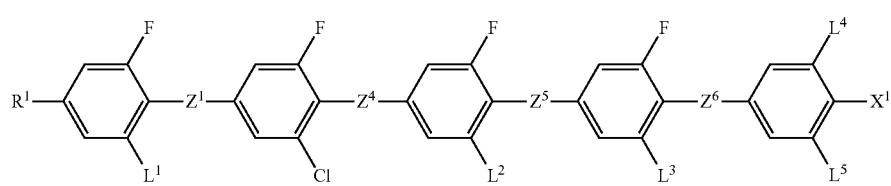

(1-1)

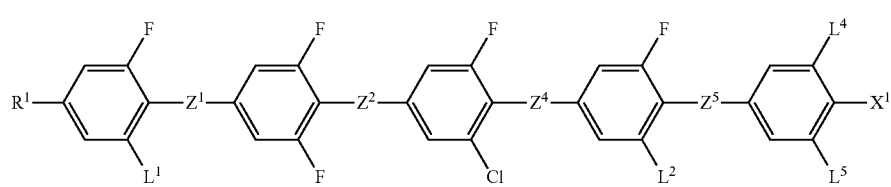

(1-2)

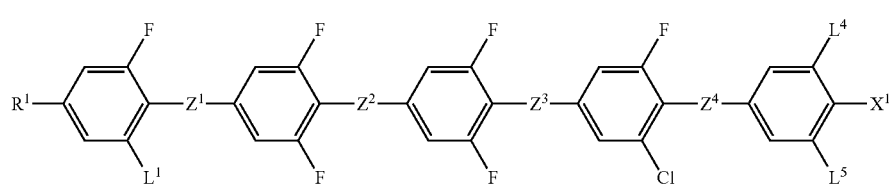

(1-3)

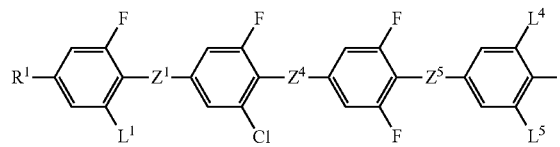

(1-4)

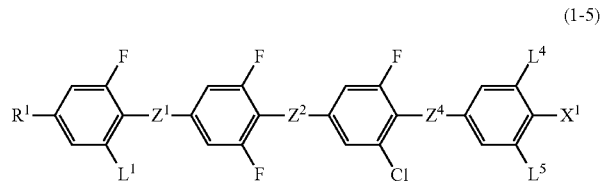

(1-5)

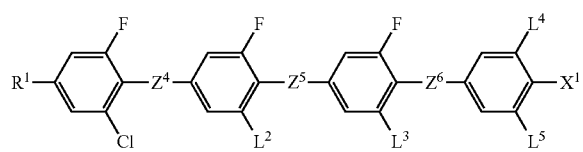

(1-6)

(1-1-1)
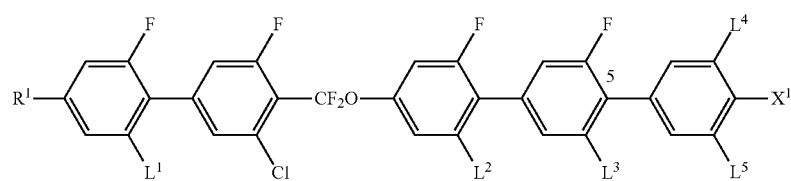
(1-1-2)
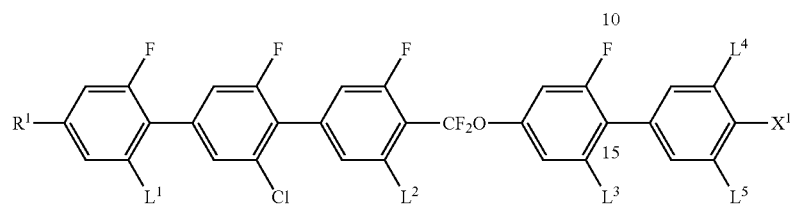
(1-2-1)
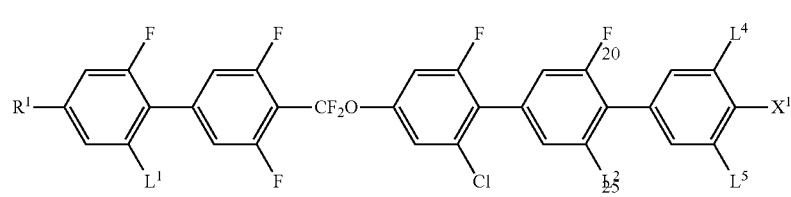
(1-2-2)
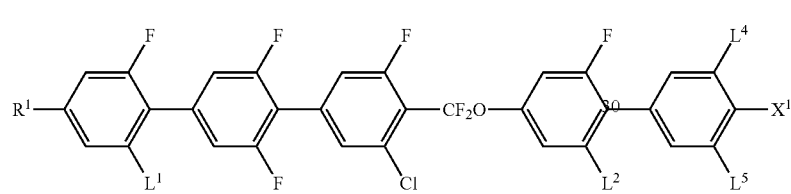
(1-3-1)
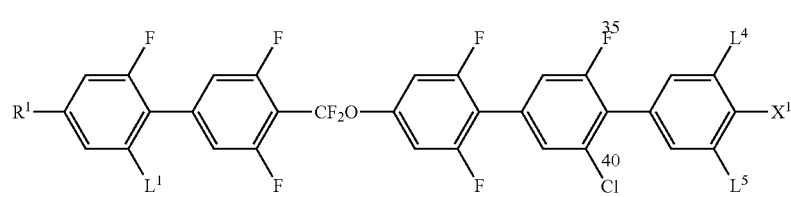
(1-3-2)
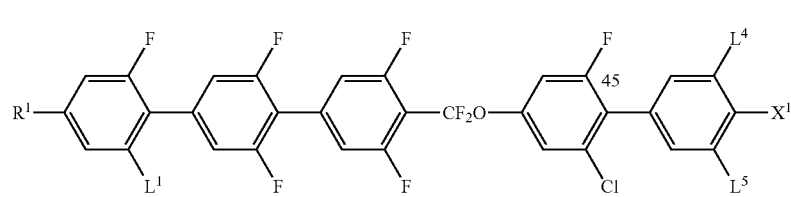
(1-4-2)
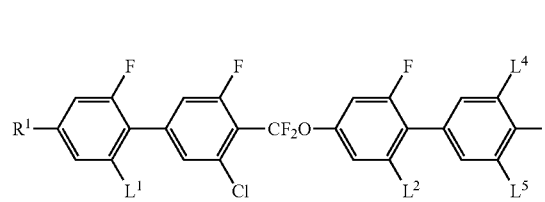
(1-4-3)
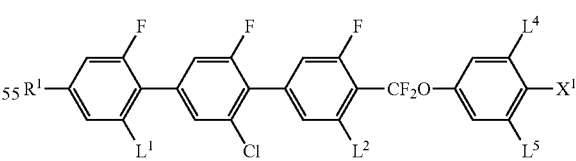
(1-5-3)
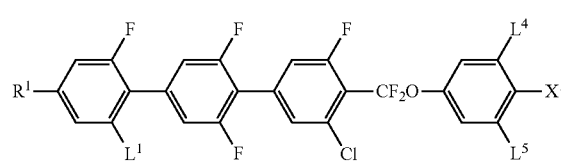
(1-6-2)
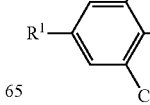

wherein in the formulas, R' is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{2-19}$ alkenylthio, or —$(CH_2)_v$— CH=$CF_2$, in which v is 0 or an integer of 1-19; $L^1$, $L^2$, $L^3$, $L^4$ and $L^5$ are independently hydrogen or fluorine; and $X^1$ is halogen, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$, or —CH=$CHCF_2CF_3$.

6. The liquid crystal compound according to claim 5, represented by Formula (1-1-2), Formula (1-2-2), Formula (1-4-3) or Formula (1-5-3).

7. The liquid crystal compound according to claim 1, wherein $L^1$ is hydrogen.

8. The liquid crystal compound according to claim 1, wherein $L^1$ is fluorine.

9. The liquid crystal compound according to claim 1, wherein both $L^4$ and $L^5$ are fluorine, and $X^1$ is fluorine, chlorine, —$OCF_3$ or —$CF_3$.

10. A liquid crystal compound, represented by Formula (1-4-3-1), Formula (1-1-2-1), Formula (1-5-3-1), Formula (1-2-2-1) or Formula (1-6-2-1):

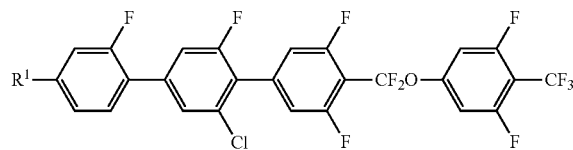

(1-4-3-1)

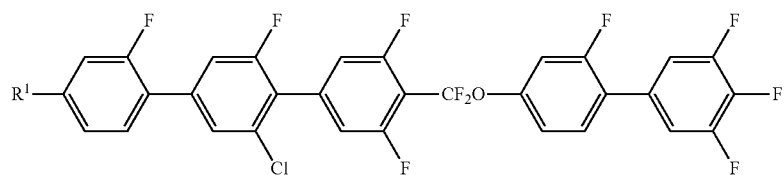

(1-1-2-1)

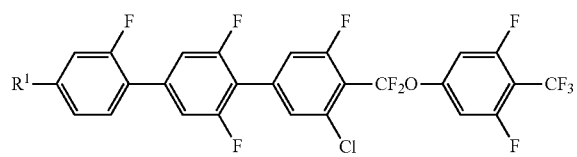

(1-5-3-1)

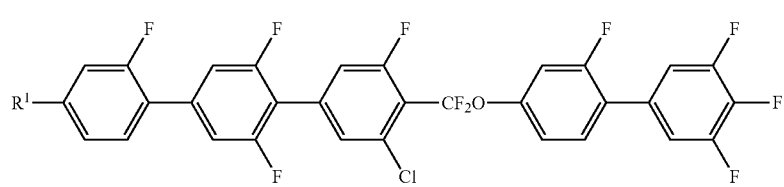

(1-2-2-1)

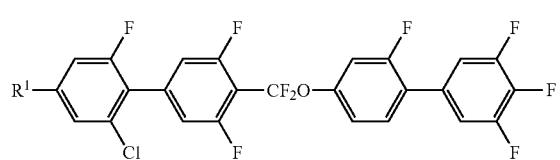

(1-6-2-1)

wherein in the formulas, $R^1$ is a $C_{1-20}$ alkyl or a $C_{2-20}$ alkenyl.

11. A liquid crystal composition, comprising the compound according to claim 1 and a chiral reagent, and exhibiting an optically isotropic liquid crystal phase.

12. The liquid crystal composition according to claim 11, further comprising at least one compound selected from the group consisting of the compounds represented by Formula (2), Formula (3) and Formula (4):

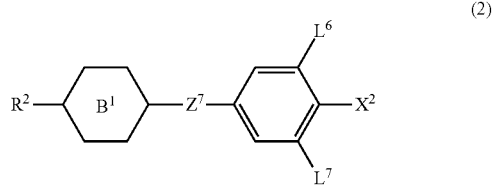

(2)

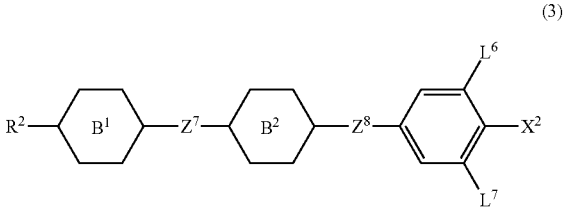

(3)

-continued (4)

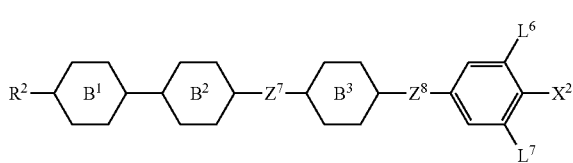

wherein in the formulas, R² is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; X² is fluorine, chlorine, —$OCF_3$, —$OCHF_2$, —$CF_3$, —$CHF_2$, —$CH_2F$, —$OCF_2CHF_2$ or —$OCF_2CHFCF_3$; rings B¹, B² and B³ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is substituted with fluorine, or naphthalene-2,6-diyl in which arbitrary hydrogen is substituted with fluorine or chlorine; Z⁷ and Z⁸ are independently —$(CH_2)_2$—, —$(CH_2)_4$—, —COO—, —$CF_2O$—, —$OCF_2$—, —CH=CH—, —C≡C—, —$CH_2O$— or a single bond; and L⁶ and L⁷ are independently hydrogen or fluorine.

13. The liquid crystal composition according to claim 11, further comprising at least one compound selected from the group consisting of the compounds represented by Formula (5):

(5)

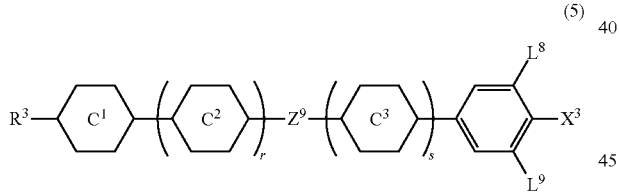

wherein in the formula, R³ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; X³ is —C≡N or —C≡C—C≡N; ring C¹, ring C² and ring C³ are independently 1,4-cyclohexylene, 1,4-phenylene, 1,4-phenylene in which arbitrary hydrogen is substituted with fluorine, naphthalene-2,6-diyl, naphthalene-2,6-diyl in which arbitrary hydrogen is substituted with fluorine or chlorine, 1,3-dioxane-2,5-diyl, tetrahydropyran-2,5-diyl, or pyrimidine-2,5-diyl; Z⁹ is —$(CH_2)_2$—, —COO—, —$CF_2O$—, —$OCF_2$—, —C≡C—, —$CH_2O$— or a single bond; L⁸ and L⁹ are independently hydrogen or fluorine; and r is 1 or 2, s is 0 or 1, r+s=0, 1 or 2.

14. The liquid crystal composition according to claim 11, further comprising at least one compound selected from the group consisting of the compounds represented by Formula (6):

(6)

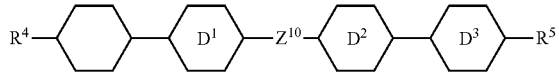

wherein in the formula, R⁴ and R⁵ are independently a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; ring D¹, ring D² and ring D³ are independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and Z¹⁰ is —C≡C—, —COO—, —$(CH_2)_2$—, —CH=CH— or a single bond.

15. The liquid crystal composition according to claim 12, further comprising at least one compound selected from the group consisting of the compounds represented by Formula (5):

(5)

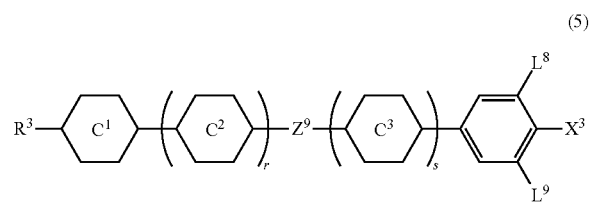

wherein in the formula, R³ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; X³ is —C≡N or —C≡C—C≡N; ring C¹, ring C² and ring C³ are independently 1,4-cyclohexylene, 1,4-phenylene, 1,4-phenylene in which arbitrary hydrogen is substituted with fluorine, naphthalene-2,6-diyl, naphthalene-2,6-diyl in which arbitrary hydrogen is substituted with fluorine or chlorine, 1,3-dioxane-2,5-diyl, tetrahydropyran-2,5-diyl, or pyrimidine-2,5-diyl; Z⁹ is —$(CH_2)_2$—, —COO—, —$CF_2O$—, —$OCF_2$—, —C≡C—, —$CH_2O$— or a single bond; L⁸ and L⁹ are independently hydrogen or fluorine; and r is 1 or 2, s is 0 or 1, r+s=0, 1 or 2.

16. The liquid crystal composition according to claim 12, further comprising at least one compound selected from the group consisting of the compounds represented by Formula (6):

(6)

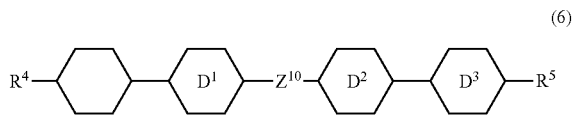

wherein in the formula, R⁴ and R⁵ are independently a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl and the alkenyl may be substituted with —O—; ring D¹, ring D² and ring D³ are independently 1,4-cyclohexylene, pyrimidine-2,5-diyl, 1,4-phenylene, 2-fluoro-1,4-phenylene, 3-fluoro-1,4-phenylene, or 2,5-difluoro-1,4- phenylene; and $Z^{10}$ is —C≡C—, —COO—, —(CH$_2$)$_2$—, —CH=CH— or a single bond.

17. The liquid crystal composition according to claim 13, further comprising at least one compound selected from the group consisting of the compounds represented by Formula (6):

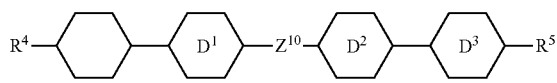

(6)

wherein in the formula, R$^4$ and R$^5$ are independently a C$_{1-10}$ alkyl or a C$_{2-10}$ alkenyl, wherein arbitrary hydrogen in the alkyl and the alkenyl may be substituted with fluorine, and arbitrary —CH$_2$— in the alkyl and the alkenyl may be substituted with —O—; ring D$^1$, ring D$^2$ and ring D$^3$ are independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^{10}$ is —C≡C—, —COO—, —(CH$_2$)$_2$—, —CH=CH— or a single bond.

18. The liquid crystal composition according to claim 11, further comprising at least one compound selected from the group consisting of the compounds represented by Formula (7), Formula (8), Formula (9) and Formula (10):

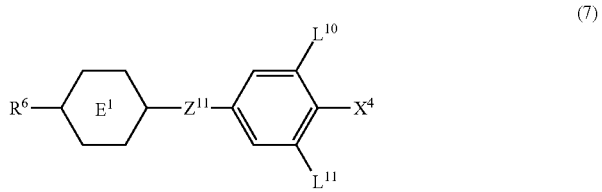

(7)

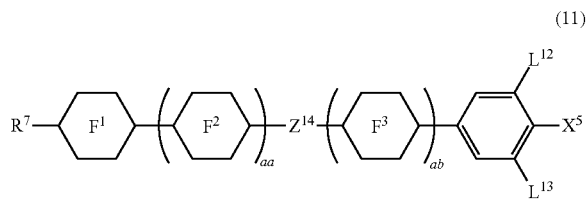

(8)

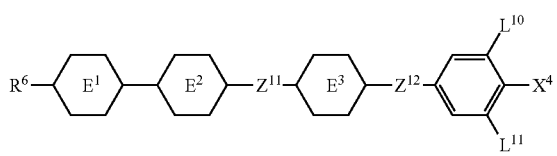

(9)

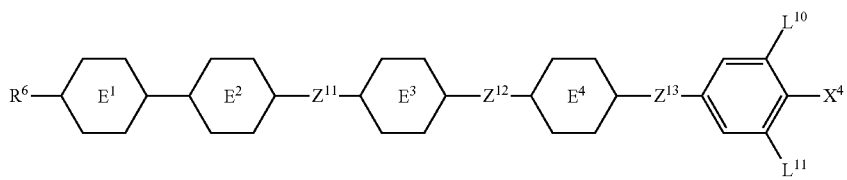

(10)

wherein in the formulas, R$^6$ is a C$_{1-10}$ alkyl, a C$_{2-10}$ alkenyl, or a C$_{2-10}$ alkynyl, wherein arbitrary hydrogen in the alkyl, the alkenyl and the alkynyl may be substituted with fluorine, and arbitrary —CH$_2$— in the alkyl, the alkenyl and the alkynyl may be substituted with —O—; X$^4$ is fluorine, chlorine, —SF$_5$, —OCF$_3$, —OCHF$_2$, —CF$_3$, —CHF$_2$, —CH$_2$F, —OCF$_2$CHF$_2$ or —OCF$_2$CHFCF$_3$; ring E$^1$, ring E$^2$, ring E$^3$ and ring E$^4$ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is substituted with fluorine or chlorine, or naphthalene-2,6-diyl in which arbitrary hydrogen is substituted with fluorine or chlorine; $Z^{11}$, $Z^{12}$ and $Z^{13}$ are independently —(CH$_2$)$_2$—, —(CH$_2$)$_4$—, —COO—, —CF$_2$O—, —OCF$_2$—, —CH=CH—, —CH$_2$O—, or a single bond, provided that when any one of ring E$^1$, ring E$^2$, ring E$^3$, and ring E$^4$ is 3-chloro-5-fluoro-1,4-phenylene, $Z^{11}$, $Z^{12}$ and $Z^{13}$ are not —CF$_2$O—; and L$^{10}$ and L$^{11}$ are independently hydrogen or fluorine.

19. The liquid crystal composition according to claim 11, further comprising at least one compound selected from the group consisting of the compounds represented by Formula (11):

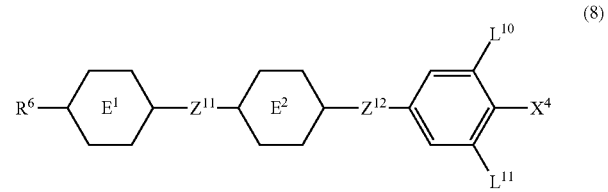

(11)

wherein in the formula, R$^7$ is a C$_{1-10}$ alkyl, a C$_{2-10}$ alkenyl, or a C$_{2-10}$ alkynyl, wherein arbitrary hydrogen in the alkyl, the alkenyl and the alkynyl may be substituted with fluorine, and arbitrary —CH$_2$— in the alkyl, the alkenyl and the alkynyl may be substituted with —O—; X$^5$ is —C≡N, —N=C=S or —C≡C—C≡N; ring F$^1$, ring F$^2$ and ring F$^3$ are independently 1,4-cyclohexylene, 1,4-phenylene,1,4-phenylene in which arbitrary hydrogen is substituted with fluorine or chlorine, naphthalene-2,6-diyl, naphthalene-2,6-diyl in which arbitrary hydrogen is substituted with fluorine or chlorine, 1,3-dioxane-2,5-diyl, tetrahydropyran-2,5-diyl, or pyrimidine-2,5-diyl; $Z^{14}$ is —(CH$_2$)$_2$—, —COO—, —CF$_2$O—, —OCF$_2$—, —C≡C—, —CH$_2$O— or a single bond; L$^{12}$ and L$^{13}$ are independently hydrogen or fluorine; and aa is 0, 1 or 2, ab is 0 or 1, aa+ab is 0, 1 or 2.

20. The liquid crystal composition according to claim 11, comprising at least one antioxidant and/or UV absorber.

21. The liquid crystal composition according to claim 11, wherein the optically isotropic liquid crystal phase does not exhibit two or more colors of diffracted light.

22. The liquid crystal composition according to claim 11, wherein the optically isotropic liquid crystal phase exhibits two or more colors of diffracted light.

23. The liquid crystal composition according to claim 21, obtained by adding a chiral reagent into a composition having a temperature difference between an upper-limit temperature and a lower-limit temperature of 3° C.-150° C. of co-existence of a chiral nematic phase and a non-liquid crystal isotropic phase.

24. The liquid crystal composition according to claim 21, obtained by adding a chiral reagent into a composition having a temperature difference between an upper-limit temperature and a lower-limit temperature of 5° C.-150° C. of co-existence of a chiral nematic phase and a non-liquid crystal isotropic phase.

25. The liquid crystal composition according to claim 21, obtained by adding a chiral reagent into a composition having a temperature difference between an upper-limit temperature and a lower-limit temperature of 3° C.-150° C. of co-existence of a nematic phase and a non-liquid crystal isotropic phase.

26. The liquid crystal composition according to claim 11, wherein the content of the chiral reagent is 1-40 wt % based on the total weight of the liquid crystal composition.

27. The liquid crystal composition according to claim 11, wherein the content of the chiral reagent is 5-15 wt % based on the total weight of the liquid crystal composition.

28. The liquid crystal composition according to claim 26, exhibiting a chiral nematic phase at any temperature in the range of 70° C. to −20° C., and having a helical pitch of 700 nm or less within at least a part of the temperatures range.

29. The liquid crystal composition according to claim 26, wherein the chiral reagent comprises at least one compound selected from the group consisting of compounds represented by Formulas (K1) to (K5):

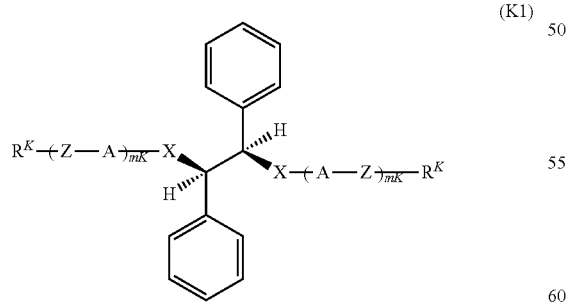

(K1)

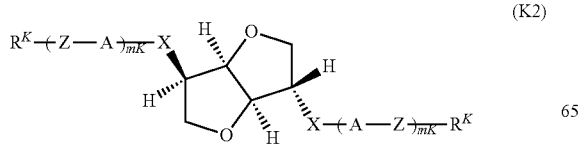

(K2)

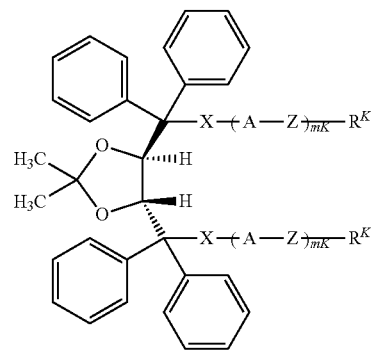

(K3)

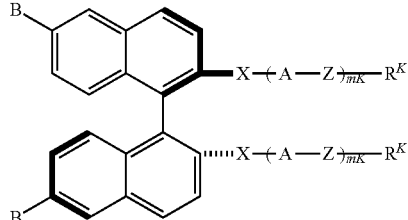

(K4)

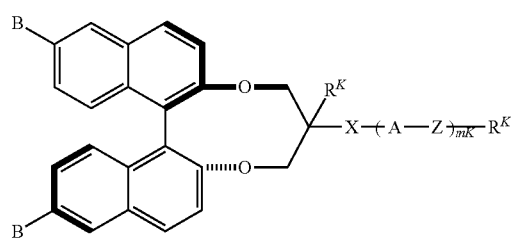

(K5)

wherein in formulas (K1) to (K5), $R^K$ is independently hydrogen, halogen, —C≡N, —N=C=O, —N=C=S, or a $C_{1-20}$ alkyl, wherein arbitrary —$CH_2$— in the alkyl may be substituted with —O—, —S—, —COO—, —OCO—, —CH=CH—, —CF=CF— or —C≡C—, and arbitrary hydrogen in the alkyl may be substituted with halogen; A is independently aromatic or non-aromatic 3 to 8-membered ring, or a fused ring of 9 or more carbons, wherein arbitrary hydrogen in the rings may be substituted with halogen, a $C_{1-3}$ alkyl, or a $C_{1-3}$ haloalkyl, —$CH_2$— in the rings may be substituted with —O—, —S— or —NH—, —CH= in the rings may be substituted with —N=; B is independently hydrogen, halogen, a $C_{1-3}$ alkyl, a $C_{1-3}$ haloalkyl, aromatic or a non-aromatic 3 to 8-membered ring, or a fused ring of 9 or more carbons, wherein arbitrary hydrogen in the rings may be substituted with halogen, a $C_{1-3}$ alkyl, or a $C_{1-3}$ haloalkyl, —$CH_2$— in the rings may be substituted with —O—, —S— or —NH—, and —CH= in the rings may be substituted with —N=; Z is independently a single bond, or a $C_{1-8}$ alkylene, wherein arbitrary —$CH_2$— in the alkylene may be substituted with —O—, —S—, —COO—, —OCO—, —CSO—, —OCS—, —N=N—, —CH=N—, —N=CH—, —CH=CH—, —CF=CF— or —C≡C—, and arbitrary hydrogen in the alkylene may be substituted with halogen;

X is a single bond, —COO—, —OCO—, —$CH_2O$—, —$OCH_2$—, —$CF_2O$—, —$OCF_2$—, or —$CH_2CH_2$—; and mK is an integer of 1-4.

30. The liquid crystal composition according to claim 26, wherein the chiral agent comprises at least one compound selected from the group consisting of compounds represented by Formulas (K2-1) to (K2-8), Formulas (K4-1) to (K4-6) and Formulas (K5-1) to (K5-3):
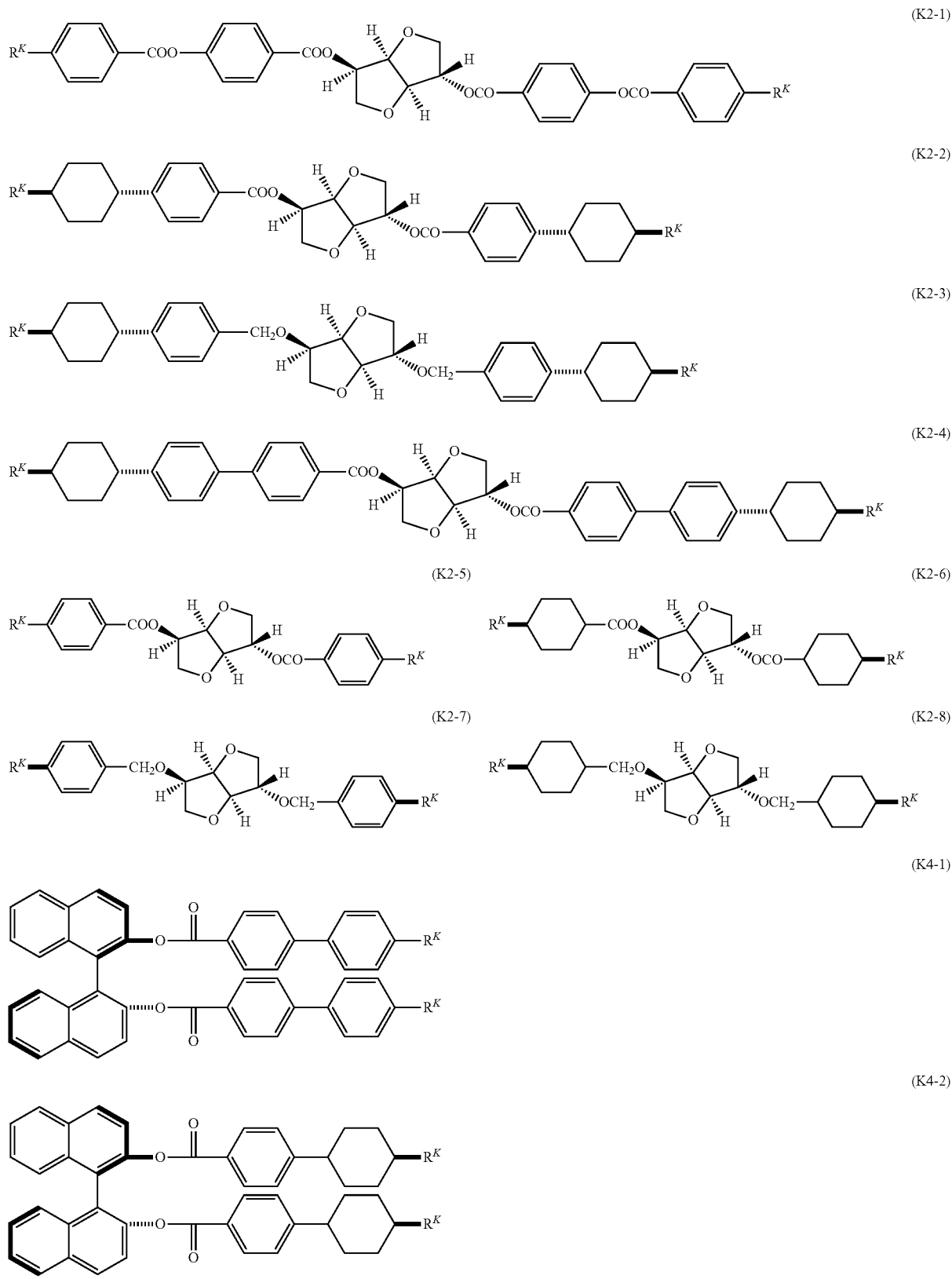

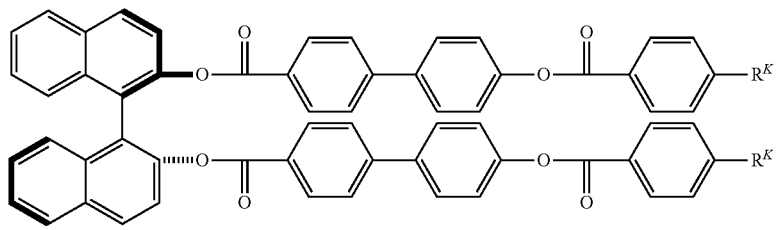
(K4-3)
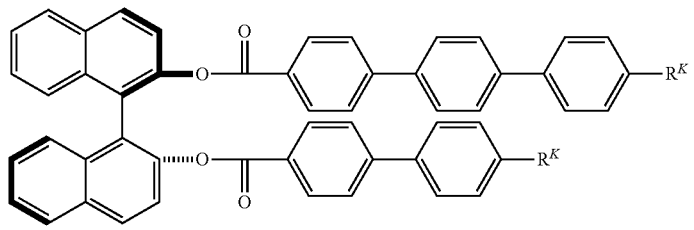
(K4-4)
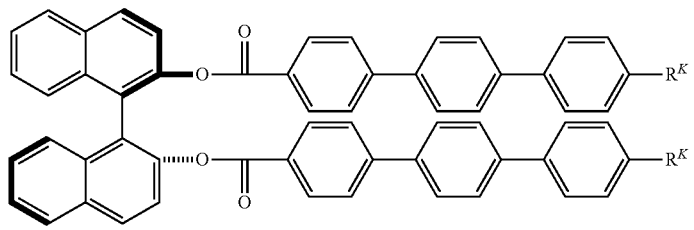
(K4-5)
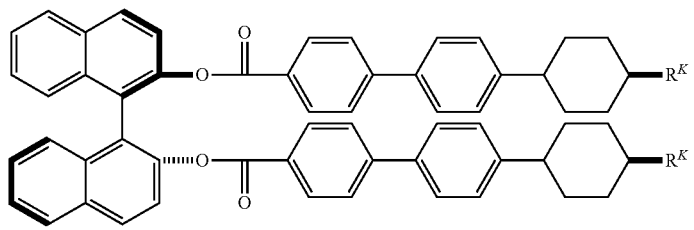
(K4-6)
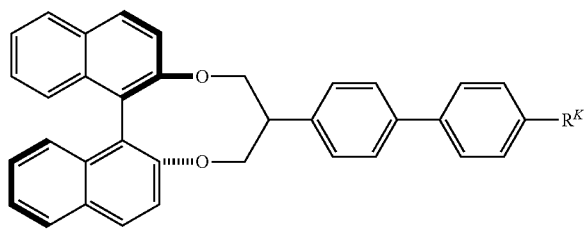
(K5-1)
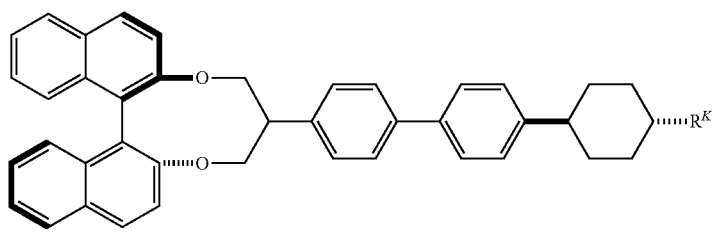
(K5-2)

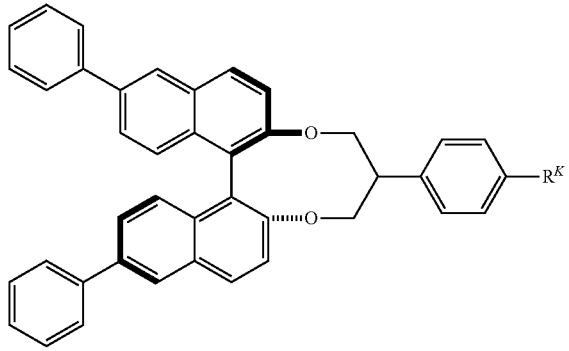

(K5-3)

wherein in the formulas, $R^K$ is independently a $C_{3-10}$ alkyl, wherein —$CH_2$— adjacent to a ring in the alkyl may be substituted with —O—, and arbitrary —$CH_2$— in the alkyl may be substituted with —CH═CH—.

31. A mixture, comprising the liquid crystal composition according to claim 11 and a polymerizable monomer.

32. The mixture according to claim 31, wherein the polymerizable monomer is a photopolymerizable monomer or a thermal-polymerizable monomer.

33. A polymer/liquid crystal composite material, obtained by polymerizing the mixture comprising the liquid crystal composition according to claim 11 and a polymerizable monomer, for use in a device driven in an optically isotropic liquid crystal phase.

34. A polymer/liquid crystal composite material, obtained by polymerizing the mixture comprising the liquid crystal composition according to claim 11 and a polymerizable monomer in a non-liquid crystal isotropic phase or an optically isotropic liquid crystal phase.

35. The polymer/liquid crystal composite material according to claim 33, wherein the polymer contained in the polymer/liquid crystal composite material has a mesogen moiety.

36. The polymer/liquid crystal composite material according to claim 33, wherein the polymer contained in the polymer/liquid crystal composite material has a cross-linked structure.

37. The polymer/liquid crystal composite material according to claim 33, wherein the content of the liquid crystal composition is 60-99 wt %, and the content of the polymer is 1-40 wt %.

38. An optical device, comprising a liquid crystal medium arranged between substrates having electrodes arranged on either or both surfaces thereof and an electric field-applying means for applying an electric field to the liquid crystal medium via the electrodes, wherein the liquid crystal medium is the liquid crystal composition according to claim 11, wherein a content of the chiral reagent is 1-40 wt % based on the total weight of the liquid crystal composition or the polymer/liquid crystal composite material obtained by polymerizing the mixture comprising the liquid crystal composition according to claim 11 and a polymerizable monomer, for use in a device driven in an optically isotropic liquid crystal phase.

39. An optical device, comprising a set of substrates having electrodes arranged on either or both surfaces thereof and at least one being transparent, a liquid crystal medium arranged between the substrates, a polarizer arranged outside of the substrates, and an electric field-applying means for applying an electric field to the liquid crystal medium via the electrodes, wherein the liquid crystal medium is the liquid crystal composition according to claim 11, wherein a content of the chiral reagent is 1-40 wt % based on the total weight of the liquid crystal composition or the polymer/liquid crystal composite material obtained by polymerizing the mixture comprising the liquid crystal composition according to claim 11 and a polymerizable monomer, for use in a device driven in an optically isotropic liquid crystal phase.

40. The optical device according to claim 39, wherein on at least one of the set of substrates, the electrodes are constructed in a manner such that an electric field is applied in at least two directions.

41. The optical device according to claim 39, wherein on one or two of the set of substrates arranged in parallel, the electrodes are constructed in a manner such that an electric field is applied in at least two directions.

42. The optical device according to claim 38, wherein the electrodes are arranged in matrix form to form pixel electrodes, and each pixel is provided with an active element being a thin film transistor (TFT).

* * * * *